US012110698B2

(12) United States Patent
Bellissimo et al.

(10) Patent No.: US 12,110,698 B2
(45) Date of Patent: Oct. 8, 2024

(54) SYSTEMS AND METHODS OF PRODUCING COMPONENTS FOR USE IN THE CONSTRUCTION OF MODULAR BUILDING UNITS

(71) Applicant: Buildz, LLC, Forest City, NC (US)

(72) Inventors: Mark Joseph Bellissimo, Wellington, FL (US); Jason Daryl Hunsinger, Forest City, NC (US); Stanley Clark Beard, Jr., Hendersonville, NC (US); Harrison Grant Meadows, Forest City, NC (US)

(73) Assignee: Buildz, LLC, Forest City, NC (US)

( * ) Notice: Subject to any disclaimer, the term of this patent is extended or adjusted under 35 U.S.C. 154(b) by 0 days.

(21) Appl. No.: 18/505,584

(22) Filed: Nov. 9, 2023

(65) Prior Publication Data

US 2024/0068252 A1 Feb. 29, 2024

Related U.S. Application Data

(63) Continuation of application No. 17/115,491, filed on Dec. 8, 2020, now Pat. No. 11,851,897, which is a
(Continued)

(51) Int. Cl.
*E04G 21/16* (2006.01)
*B27M 3/00* (2006.01)
(Continued)

(52) U.S. Cl.
CPC ........... *E04G 21/16* (2013.01); *B27M 3/0073* (2013.01); *B27M 3/04* (2013.01); *E04B 1/7654* (2013.01); *E04B 2/707* (2013.01); *E04B 5/12* (2013.01)

(58) Field of Classification Search
CPC ..... B27M 3/0073; B27M 3/04; E04B 1/7654; E04B 2/707; E04B 5/12; E04G 21/16
See application file for complete search history.

(56) References Cited

U.S. PATENT DOCUMENTS

| | | | |
|---|---|---|---|
| 2,281,402 | A | 4/1942 | Wilson |
| 2,574,163 | A | 11/1951 | Bamford |

(Continued)

FOREIGN PATENT DOCUMENTS

| | | | |
|---|---|---|---|
| CA | 2573687 | A | 2/2008 |
| EP | 3802032 | B1 | 4/2021 |

(Continued)

OTHER PUBLICATIONS

European Search Report from EP Application No. 23164624.1 dated Jun. 29, 2023 [Cited in Parent].

(Continued)

*Primary Examiner* — Jason L Vaughan
(74) *Attorney, Agent, or Firm* — Venable LLP; Michele V. Frank

(57) ABSTRACT

Disclosed herein are various systems, sub-system, and methods for the manufacture of a wall module for using in building a modular construction unit, e.g., for using in building residential homes, commercial offices, educational or service facilities, etc. using a substantially entirely automated modular construction technique. According to the disclosure herein, the resulting wall module includes an internal wall frame including wall studs attached between a top plate and a bottom plate, with, in some embodiment, one or more framing sub-assemblies attached therein to define openings through the wall module. The wall frame has suitable panel members the respective surfaces thereof corresponding to the interior and exterior surfaces of the modular construction unit. The wall frames, when completely assembled, can be transported to be assembled with
(Continued)

other constituent components of the modular construction unit to complete the manufacture of the modular construction unit.

59 Claims, 83 Drawing Sheets

Related U.S. Application Data continuation of application No. PCT/US2019/036097, filed on Jun. 7, 2019.

(60) Provisional application No. 62/682,568, filed on Jun. 8, 2018.

(51) Int. Cl.

| | |
|---|---|
| ***B27M 3/04*** | (2006.01) |
| ***E04B 1/76*** | (2006.01) |
| ***E04B 2/70*** | (2006.01) |
| ***E04B 5/12*** | (2006.01) |

(56) References Cited

U.S. PATENT DOCUMENTS

| | | | |
|---|---|---|---|
| 2,754,862 | A | 7/1956 | Kemp, Jr. |
| 3,581,367 | A | 6/1971 | Zeinetz |
| 3,591,067 | A | 7/1971 | Vial et al. |
| 3,601,882 | A | 8/1971 | McRae |
| 3,685,129 | A | 8/1972 | Jureit et al. |
| 3,688,965 | A | 9/1972 | Kellner et al. |
| 3,699,622 | A | 10/1972 | Frydenberg |
| 3,706,408 | A | 12/1972 | Burch |
| 3,711,007 | A | 1/1973 | Fry |
| 3,811,167 | A | 5/1974 | Schneider |
| 3,851,384 | A | 12/1974 | Kellner et al. |
| 3,897,620 | A | 8/1975 | Wright |
| 3,986,247 | A | 10/1976 | Kellner et al. |
| 4,133,097 | A | 1/1979 | Slade |
| 4,829,651 | A | 5/1989 | Shirai |
| 4,867,819 | A | 9/1989 | Richardelli et al. |
| 5,031,886 | A | 7/1991 | Sosebee |
| 5,615,122 | A | 3/1997 | Lacrosse |
| 5,641,368 | A | 6/1997 | Romes et al. |
| 5,646,860 | A | 7/1997 | Greiner et al. |
| 5,850,686 | A | 12/1998 | Mertes |
| 6,418,601 | B1 | 7/2002 | Olden et al. |
| 7,172,064 | B2 | 2/2007 | Alversson |
| 7,979,981 | B2 | 7/2011 | Bertrand |
| 11,236,519 | B2 | 2/2022 | Bellissimo et al. |
| 11,472,059 | B2 | 10/2022 | Kent |
| 11,873,652 | B2 | 1/2024 | Bellissimo et al. |
| 2005/0055973 | A1 | 3/2005 | Hagen et al. |
| 2005/0102971 | A1 | 5/2005 | O'Leary et al. |
| 2007/0144102 | A1 | 6/2007 | Baij |
| 2008/0168741 | A1 | 7/2008 | Gilgan et al. |
| 2008/0289288 | A1 | 11/2008 | Bertrand |
| 2009/0300999 | A1 | 12/2009 | Ferriera |
| 2010/0006392 | A1 | 1/2010 | Weinmann |
| 2010/0281784 | A1 | 11/2010 | Leo |
| 2013/0330435 | A1 | 12/2013 | Lim |
| 2021/0164246 | A1 | 6/2021 | Bellissimo et al. |
| 2021/0187783 | A1 | 6/2021 | Bellissimo et al. |

FOREIGN PATENT DOCUMENTS

| | | | |
|---|---|---|---|
| EP | 3802031 | B1 | 4/2022 |
| GB | 2539661 | A | 12/2016 |
| WO | 2019/237030 | A1 | 12/2019 |
| WO | 2019/237034 | A1 | 12/2019 |
| WO | 2022183037 | A1 | 9/2022 |

OTHER PUBLICATIONS

Notice of Allowance from U.S. Appl. No. 17/115,491 dated May 9, 2023 [Cited in Parent].
Notice of Allowance from U.S. Appl. No. 17/115,491 dated Aug. 9, 2023 [Cited in Parent].
Communication under Rule 71(3) EPC from EP Application No. 19733354.5 dated Aug. 24, 2023 [Cited in Parent].
Decision to grant a European patent pursuant to Article 91(1) EPC from EP Application No. 19733354.5 dated Oct. 26, 2023 [Cited in Parent].
Notice of Allowance from Canadian Application No. 3,102,568 dated Sep. 11, 2023 [Cited in Parent].
International Search Report and Written Opinion for Application No. PCT/US2019/036097 dated Aug. 27, 2019 [Cited in Parent].
International Search Report and Written Opinion for Application No. PCT/US2019/036108 dated Aug. 27, 2019 [Cited in Parent].
Anonymous: "Info-408: Critical Seal (Spray Foam at Rim Joist) Building Science Corporation", dated Sep. 17, 2009 (2009-09-17) [Cited in Parent].
Panama Search Report for Application No. 93306-01 dated Aug. 6, 2021 [Cited in Parent].
Panama Search Report for Application No. 93307-01 dated Aug. 6, 2021 [Cited in Parent].
Notice of Allowance dated May 9, 2023 from U.S. Appl. No. 17/115,491 [Cited in Parent].
Notice of Allowance dated Aug. 9, 2023 from U.S. Appl. No. 17/115,491 [Cited in Parent].
European Office Action for Application No. 197333537 dated Jan. 21, 2022 [Cited in Parent].
Chilean Office Action for Application No. 202003187 dated Feb. 17, 2022 [Cited in Parent].
Chilean Office Action for Application No. 2020003188 dated Apr. 14, 2022 [Cited in Parent].
Indian Examination Report for Application No. 202147000837 dated Jul. 11, 2022 [Cited in Parent].
Indian Examination Report for Application No. 202147000836 dated Jul. 14, 2022 [Cited in Parent].
Colombian Office Action for Application No. 20200015543 dated Oct. 31, 2022 [Cited in Parent].
Canadian Office Action for Application No. 3,102,568 dated Feb. 2, 2023 [Cited in Parent].
European Office Action for U.S. Appl. No. 19/733,354 dated Feb. 2, 2023 [Cited in Parent].
Canadian Office Action for Application No. 3,102,605 dated Feb. 22, 2024.
Communication under Rule 71(3) EPC for European Application No. 23164624.1 dated Feb. 12, 2024.
Office Action for Mexican Application No. MX/a/2020/013138 dated Jan. 16, 2024.
Extended Search Report for European Application No. 23211147.6 dated Jan. 17, 2024.
Canadian Notice of Allowance for Application No. 3,102,568 dated Feb. 8, 2024.
Notice of Allowance from U.S. Appl. No. 18/529,484 dated Aug. 19, 2024.
Extended European Search Report from EP Patent Application No. 24179077.3 dated Aug. 27, 2024.

SYSTEMS AND METHODS OF PRODUCING COMPONENTS FOR USE IN THE CONSTRUCTION OF MODULAR BUILDING UNITS

CROSS-REFERENCE TO RELATED APPLICATIONS

This application is a continuation of U.S. Non-provisional application Ser. No. 17/115,491 filed on Dec. 8, 2020, which is a continuation of and claims priority to PCT Application Serial No. PCT/US2019/036097, which was filed on Jun. 7, 2019, which claims the benefit of and priority to U.S. Provisional Application No. 62/682,568, which was filed on Jun. 8, 2018, the entire disclosures of which are incorporated herein by reference.

TECHNICAL FIELD

The subject matter disclosed herein relates generally to the construction of modular construction units. In particular, the presently disclosed subject matter relates to a system for constructing a wall section for use in a modular construction unit, as well as associated methods of manufacture thereof.

BACKGROUND

The production of modular, or prefabricated, buildings is a growing industry. In this type of manufacturing, sections of a building or structure are partially assembled at a remote location, and the sections are then delivered to the final building site, where final construction of the structure is ultimately completed by assembling the various sections together. Such modular structures can be used for a variety of purposes, including, for example, as temporary or permanent buildings, such as residential homes, commercial offices, educational or service facilities, etc.

Modular structures can have advantages over site-built structures in that they can often be built more rapidly and less expensively than structures built using such traditional construction techniques. In many cases, quality measurements such as squareness and structural integrity and strength can also be improved in modular constructed structures over traditional construction techniques, due to enhanced and/or automated processes available at the remote assembly location where the modular construction units are built and/or assembled before being transported to the final building site for final assembly. In particular, remote assembly can be advantageous in that it is more repeatable, offering greater accuracy and precision than is often possible using conventional construction techniques. This reduces the cost of the structure through by allowing for reduced safety factors to account for, due to the increased use of automation, decreased instances of human error, less material waste, and efficient process flow methods.

Nonetheless, opportunity still exists to improve modular building assembly systems. Existing modular building methods suffer from disadvantages related to process and/or tooling inflexibility. For example, a system might be limited to particular structural components or to particular material(s) and/or fastener type(s). In some cases, manual intervention by a human operator may be necessary with regularity at many steps of the process. Additionally, some systems are not capable of performing quality control checks. Thus, a need exists for improved systems, devices, and methods for the manufacture of modular construction units.

SUMMARY

This summary lists several embodiments of the presently disclosed subject matter, and in many cases lists variations and permutations of these embodiments. This summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently disclosed subject matter, whether listed in this summary or not. To avoid excessive repetition, this Summary does not list or suggest all possible combinations of such features.

In one aspect, a system for assembling a wall structure for a modular construction unit is provided, the system comprising: a framing sub-assembly station configured to form framing sub-assemblies, each of which define one or more openings through the wall structure after the wall structure is assembled; a wall stud station configured to form and provide a plurality of wall studs for forming an internal wall frame of the wall structure; a main framing assembly station configured to form the wall frame of the wall structure by attaching each of the wall studs between top and bottom plates that define the top and bottom edges of the wall structure, wherein the framing sub-assemblies are installed within the wall frame of the wall structure according to a set of assembly instructions in a controller for the wall structure being assembled; a sheathing system configured to position a plurality of sheathing panels over an outer surface of the wall frame of the wall structure, wherein the plurality of sheathing panels are placed over the wall frame of the wall structure in a predetermined pattern specified in the set of assembly instructions, and wherein the sheathing system is configured to apply a plurality of first fasteners to at least temporarily secure each of the plurality of sheathing panels onto the outer surface of the wall frame of the wall structure; a sheathing fastening station configured to apply a plurality of second fasteners at a plurality of predetermined positions to secure the plurality of sheathing panels over the outer surface of the wall frame of the wall structure, wherein the plurality of predetermined positions correspond to locations of the plurality of wall studs and/or the framing sub-assemblies within the wall frame, wherein none of the plurality of secondary fasteners is installed in a position within cavities defined by the framing sub-assemblies or an area between studs of the vertical structure; a pre-drilling station configured to form one or more through-holes in designated positions of one or more of the wall studs of the wall frame of the wall structure, the one or more through-holes being configured for a third fastener to be at least partially threadably engaged therein for connection of the wall structure to a floor or ceiling structure; a sawing/routing station comprising a plurality of cutting devices configured to form openings through one or more of the sheathing panels at positions corresponding to the openings defined by the framing sub-assemblies, wherein locations of each of the cavities is stored within the set of assembly instructions; a utility installation system configured to allow installation of at least one of a plurality of utilities within the vertical structure, the plurality of utilities comprising plumbing and/or electrical facilities; at least one flip table station at which the wall frame is rotated from a first horizontal position, in which the sheathing panels are facing up, in a direction away from a transport frame supporting and/or transporting the wall frame, to a vertical position, in which the wall frame is in a substantially similar orientation to a position in which the wall structure will be in when assembled as part of the modular construction unit, and to a second horizontal position, in which the sheathing panels are facing down, in a direction towards the transport frame supporting and/or transporting the wall frame, the first and second horizontal positions being rotated by approximately 180° relative to each other; an insulation installation system configured to apply an insulation material within one or more of the cavities defined between adjacent wall studs of the wall frame; a first curing station configured to dry an outer surface of the insulation material within the one or more cavities; a drywall installation station configured to arrange and attach a plurality of drywall panels over an opposite surface of the wall frame from the surface on which the sheathing panels are attached, wherein the plurality of drywall panels are arranged over the wall frame of the vertical structure in a predetermined pattern specified in the set of assembly instructions, and wherein the drywall system is configured to apply a plurality of drywall fasteners to secure each of the plurality of drywall panels onto the inner surface; a wall covering station configured to adhesively apply a plurality of wall covering strips from a roll of wall covering material in a substantially continuous single layer without adjacent wall covering strips overlapping each other; and a storage magazine station in which the wall structures are stored when fully assembled, wherein the wall structures are oriented within the storage magazine station so as to be individually accessible for transportation to a final assembly area of the modular construction unit.

In some embodiments, the system comprises a lumber saw station which receives dimensional lumber from a lumber yard and transport station, cuts the dimensional lumber to a specified length, and outputs cut lumber in a form for use as one of the top and bottom plates or as a member of a framing sub-assembly.

In some embodiments, the system comprises a distribution robot configured to, based on a length of the cut lumber output from the lumber saw station, pick up and deposit the cut lumber onto one of a plurality of shelves on a cut lumber storage rack or to divert the cut lumber onto a plate trolley configured to transport the cut lumber having a length specified for one of the top and/or bottom plates of the wall frame onto a plate conveyor.

In some embodiments of the system, the plate conveyor is configured to transport lumber for one of the top and bottom plates of the structure to the main framing assembly station.

In some embodiments of the system, the framing sub-assembly station comprises: a table on which one or more of the framing sub-assemblies of the wall frame are assembled; at least one gripper robot configured to retrieve the cut lumber from the cut lumber storage rack and position the cut lumber onto the table in a position to form a specified framing sub-assembly, and at least one fastener robot configured to apply fasteners to attach a plurality of pieces of cut lumber on the framing sub-assembly together in a form of the specified framing sub-assembly.

In some embodiments, the system comprises a framing sub-assembly storage rack configured to receive and dispense a plurality of differently shaped and/or sized framing sub-assemblies assembled at the framing sub-assembly station to the main framing assembly station.

In some embodiments of the system, the wall stud station comprises a cascade stager configured to hold a plurality of wall studs in respective different positions, wherein the wall studs are pieces of dimensional lumber retrieved from a lumber yard adjacent the cascade stager by a wall stud robot.

In some embodiments of the system, the wall stud station comprises one or more first cutting devices configured to create holes in one or more of the pieces of dimensional lumber while on the cascade stager.

In some embodiments of the system, the one or more first cutting devices is movable along a frame of the cascade stager in a direction of a length of the wall studs on the cascade stager for forming the holes at a plurality of positions along the length wall studs.

In some embodiments of the system, the cascade stud stager is configured to transfer a finished wall stud from a final, or bottom, position on the cascade stager to a delivery trough configured to transport the finished wall stud to the main framing assembly station and raise the finished wall stud into an installation position between, and substantially coplanar with, the top plate and the bottom plate at the main framing assembly station.

In some embodiments, the system comprises at least one second cutting device configured to cut one or more of the plurality of wall studs on the cascade stager to a designated length according to a height of the wall frame, as measured in an orientation in which the wall frame is assembled as part of the modular construction unit.

In some embodiments, the system comprises a wall stud robot configured to analyze lumber and load the lumber into the cascade stager when the dimensional lumber is determined to satisfy at least one of a plurality of lumber quality parameters.

In some embodiments of the system, the wall stud robot comprises a suction head comprising one or more lifter assemblies having a distance measuring device, a stud presence detector, at least one vacuum meter, and at least one pressure gauge.

In some embodiments of the system, the stud robot is configured to apply a lifting force against one or more of the pieces of dimensional lumber adjacent the cascade stager by generating a vacuum to lift one or more of the pieces of dimensional lumber at a same time for loading into the cascade stager.

In some embodiments of the system, the stud forming system comprises a stud dimensional analysis system, which is configured to analyze the lumber to measure one or more of the plurality of lumber quality parameters.

In some embodiments of the system, the main framing assembly station comprises top and bottom plate conveyors configured to receive a top or bottom plate, respectively, from a plate robot and transport the top and bottom plates, respectively, in a direction of a length of the top and bottom plates to be arranged on opposite sides of the delivery trough.

In some embodiments of the system, the main framing assembly station is configured to receive finished wall studs from the wall stud station via the delivery trough and attach the finished wall studs at predetermined intervals between the top and bottom plates to form the wall frame.

In some embodiments of the system, the main framing assembly station is configured to position at least one framing sub-assembly at a designated position, such that the at least one framing sub-assembly is arranged horizontally between adjacent wall studs and vertically at the designated position between the top plate and the bottom plate.

In some embodiments, the system comprises a lag bolt installation station comprising at least one articulating robotic arm with a fastener driver configured to insert one of the lag bolts into one of the through-holes and rotationally engage each of the lag bolts within a corresponding one of the through-holes.

In some embodiments of the system, the lag bolt installation station comprises a feeder which is connected to the robotic arm and is configured to dispense a plurality of lag bolts sequentially to the fastener driver for threadable insertion within a designated one of the through-holes of the wall studs of the wall frame.

In some embodiments of the system, the fastener driver is extendable in a direction substantially aligned with a longitudinal axis of the through-holes.

In some embodiments of the system, one or more of the main framing assembly station, the sheathing station, the sheathing fastening station, the pre-drilling station, the sawing/routing station, the insulation installation station, the curing station, and the drywall installation station comprise a respective frame transport, which comprises a conveyor configured to transport the wall frame between adjacent stations on a plurality of tracks, the tracks being laterally expandable to support wall frames of different heights, as measured in the direction substantially transverse between the top plate and the bottom plate.

In some embodiments of the system, the pre-drilling station comprises, adjacent to at least two tracks of a frame transport on which the wall frame is movable through the pre-drilling station, a stopper system comprising at least first and second vertically actuatable posts, wherein the first post is configured to stop a movement of the wall frame such that the one or more through-holes may be formed through a wall stud in contact with the first post, wherein the second post is spaced apart from the first post, in a direction of movement of the wall frame along the frame transport, by a width of the wall stud, and wherein the second post is vertically actuated, when a double wall stud configuration is detected, to stop a movement of the wall frame such that the one or more through-holes may be formed through a trailing wall stud of the double wall stud.

In some embodiments of the system, one or more of the main framing assembly station, the sheathing system, the sheathing fastening station, the sawing/routing station, and the drywall installation station comprise a squaring station configured to ensure that the wall frame is substantially square at each such station.

In some embodiments of the system, the drywall installation station comprises a sensor configured to detect a position of each stud in the wall frame such that the fasteners are inserted through the drywall panels and into the wall studs.

In some embodiments of the system, the drywall installation station comprises a plurality of filler applicators configured to dispense a filler material into holes formed by the fasteners being driven into and/or partially through the drywall panels.

In some embodiments of the system, the drywall installation station comprises a plurality of drywall tape applicators configured to apply a mastic and a drywall tape over joints between adjacent drywall panels.

In some embodiments of the system, the insulation installation system comprises a pivoting insulation head configured to extend over and/or at least partially within the cavities between adjacent wall studs to pack the insulation material within the cavity at a specified density.

In some embodiments of the system, the insulation installation system comprises a segmented partition connected to a frame of the insulation head, the segmented partition being configured to retain the insulation within the cavity into which the insulation material is being installed.

In some embodiments of the system, the insulation installation system is configured to install a cellulose insulation by blowing the cellulose insulation into each of the cavities between adjacent wall studs.

In another aspect, a method of assembling a wall structure for a modular construction unit is provided, the method comprising: cutting, at a lumber saw, dimensional lumber to form a top plate and/or a bottom plate of the wall structure; transporting, using a plate conveyor, the top plate and/or the bottom plate of the wall structure to a main framing assembly station; cutting, at the lumber saw, dimensional lumber to form pieces of cut lumber for assembly into one or more framing sub-assemblies; forming, at a framing sub-assembly station, framing sub-assemblies that define one or more openings through the wall structure after the wall structure is assembled; forming, at a wall stud station, a plurality of wall studs for assembly as a wall frame of the wall structure; transporting the wall studs to the main framing assembly station, where the wall studs are positioned between, and attached to, the top and bottom plates; inserting, at the main framing assembly station, the framing sub-assemblies within the wall frame of the wall structure according to a set of assembly instructions for the wall structure being assembled; arranging, at a sheathing station, a plurality of sheathing panels over at least a portion of an outer surface of the wall frame of the wall structure, wherein the plurality of sheathing panels are arranged over the frame of the wall structure in a predetermined pattern specified in a set of assembly instructions provided to a controller; applying, at a sheathing fastening station, a plurality of first fasteners to at least partially secure each of the plurality of sheathing panels onto the wall frame of the wall structure; applying, at a sheathing fastening station, a plurality of fasteners at a plurality of predetermined positions to secure the plurality of sheathing panels onto the wall frame of the wall structure, wherein the plurality of predetermined positions correspond to locations of the wall studs and/or the framing sub-assemblies over which the plurality of sheathing panels are arranged, and wherein none of the plurality of secondary fasteners is installed in a position within openings defined by the framing sub-assemblies or within cavities between adjacent studs of the wall structure; drilling, at a pre-drilling station, one or more through-holes in designated positions of one or more of the wall studs of the wall frame of the wall structure, the one or more through-holes being configured for a third fastener to be at least partially threadably engaged therein for connection of the wall structure to a floor or ceiling structure; cutting, using one or more cutting devices of a sawing/routing station, slots within the sheathing panels to form openings through one or more of the sheathing panels at positions corresponding to the openings defined by the framing sub-assemblies, wherein locations of each of the cavities is stored within the set of assembly instructions; installing, at a utility installation system, at least one of a plurality of utilities within the wall frame, the plurality of utilities comprising plumbing and/or electrical utilities; flipping, at one or more flip table stations, the wall frame such that the surface of the wall frame on which the sheathing panels are attached is rotated by approximately 180° to be adjacent to tracks of a frame transport on which the wall frame is transported to an insulation installation station; applying, at the insulation installation station, an insulation material within one or more of the cavities defined between adjacent wall studs of the wall frame; drying, at a curing station, an outer surface of the insulation material within the one or more cavities; arranging, at a drywall installation station, a plurality of drywall panels over a second surface of the wall frame opposite the surface of the wall frame on which the sheathing panels are attached, wherein the plurality of drywall panels are placed over the frame of the vertical structure in a predetermined pattern specified in the set of assembly instructions; applying a plurality of fasteners to secure each of the plurality of drywall panels onto the second surface; adhesively applying, at a wall covering station, a plurality of wall covering strips from a roll of wall covering material in a substantially continuous single layer without adjacent wall covering strips overlapping each other; and transferring fully assembled wall structures to a storage magazine for storage, wherein the wall structures are oriented within the storage magazine station so as to be individually accessible for transportation to a final assembly area of the modular construction unit.

In some embodiments, the method comprises: receiving, at a lumber saw station, dimensional lumber from a lumber yard and transport station; cutting, using a lumber saw of the lumber saw station, the dimensional lumber to a specified length; and outputting cut lumber from the lumber saw in a form for use as one of the top and bottom plates or as a member of a framing sub-assembly.

In some embodiments, the method comprises, using a distribution robot and based on a length of the cut lumber output from the lumber saw: picking up and depositing the cut lumber onto one of a plurality of shelves on a cut lumber storage rack, or diverting the cut lumber onto a plate trolley configured to transport the cut lumber having a length specified for one of the top and/or bottom plates of the wall frame onto a plate conveyor.

In some embodiments, the method comprises transporting lumber for one of the top and bottom plates of the structure to the main framing assembly station.

In some embodiments, the method comprises: retrieving, using at least one gripper robot of the framing sub-assembly station, the cut lumber from the cut lumber storage rack and positioning the cut lumber onto a table of the framing sub-assembly station in a position to form a specified framing sub-assembly; applying, using at least one fastener robot of the framing sub-assembly station, fasteners to attach a plurality of pieces of cut lumber on the framing sub-assembly together in a form of the specified framing sub-assembly; assembling the framing sub-assemblies on the framing sub-assembly table; and transporting, using a first framing sub-assembly elevator, each of the framing sub-assemblies to a framing sub-assembly storage rack.

In some embodiments, the method comprises: receiving, at the first framing sub-assembly elevator, a plurality of different framing sub-assemblies from the framing sub-assembly station; storing each different framing sub-assembly on a different shelf of the framing sub-assembly storage rack; and dispensing, using a second framing sub-assembly elevator, the framing sub-assemblies from the framing sub-assembly storage rack for assembly into a wall frame of a wall structure in the main framing assembly station.

In some embodiments, the method comprises holding, using a cascade stager of the wall stud station, a plurality of wall studs in respective different positions, wherein the wall studs are pieces of dimensional lumber retrieved from a lumber yard adjacent the cascade stager by a wall stud robot.

In some embodiments, the method comprises forming, using one or more first cutting devices of the wall stud station, holes in one or more of the pieces of dimensional lumber while on the cascade stager.

In some embodiments, the method comprises: transferring a finished wall stud from a final, or bottom, position on the cascade stager to a delivery trough that transports the finished stud to the main framing assembly station; and raising, via a portion of the delivery trough within the main framing assembly station, the finished wall stud into an installation position between, and substantially coplanar with, the top plate and the bottom plate at the main framing assembly station.

In some embodiments, the method comprises cutting, using at least one second cutting device, one or more of the plurality of wall studs on the cascade stager to a designated length according to a height of the wall frame, as measured in an orientation in which the wall frame is assembled as part of the modular construction unit.

In some embodiments of the method, the main framing assembly station comprises top and bottom plate conveyors configured to receive a top or bottom plate, respectively, from a plate robot and transport the top and bottom plates, respectively, in a direction of a length of the top and bottom plates to be arranged on opposite sides of the delivery trough.

In some embodiments, the method comprises receiving, at the main framing assembly station, finished wall studs from a wall stud station and attaching the finished wall studs at predetermined intervals between the top and bottom plates to form the wall frame.

In some embodiments, the method comprises positioning, at the main framing assembly station, at least one framing sub-assembly at a designated position, such that the at least one framing sub-assembly is arranged horizontally between adjacent wall studs and vertically at the designated position between the top plate and the bottom plate.

In some embodiments, the method comprises, using a stud robot of the wall stud station, analyzing and loading the dimensional lumber adjacent the cascade stager into the cascade stager when the dimensional lumber is determined to satisfy at least one of a plurality of lumber quality parameters.

In some embodiments of the method, the stud robot comprises a lifter having a distance measuring device, a stud presence detector, at least one vacuum meter, and at least one pressure gauge.

In some embodiments, the method comprises applying, using the stud robot, a lifting force against one or more of the pieces of dimensional lumber adjacent the cascade stager by generating a vacuum to lift one or more of the pieces of dimensional lumber at a same time and loading the pieces of dimensional lumber into the cascade stager.

In some embodiments, the method comprises, using a stud dimensional analysis system, analyzing the dimensional lumber lifted by the stud robot to measure one or more of the plurality of lumber quality parameters.

In some embodiments, the method comprises inserting, using at least one articulating robotic arm with a fastener driver of a lag bolt installation station, and rotatably engaging one of a plurality of lag bolts into a corresponding one of the through-holes.

In some embodiments, the method comprises dispensing, from a feeder of the lag bolt installation station that is connected to the robotic arm, a plurality of lag bolts sequentially to the fastener driver for threadable insertion within a designated one of the through-holes of the wall studs of the wall frame.

In some embodiments of the method, the fastener driver is extendable in a direction substantially aligned with a longitudinal axis of the through-holes.

In some embodiments of the method, one or more of the main framing assembly station, the sheathing station, the sheathing fastening station, the pre-drilling station, the sawing/routing station, the insulation installation station, the curing station, and the drywall installation station comprise a respective frame transport, which comprises a conveyor that transports the wall frame between adjacent stations on a plurality of tracks, the tracks being laterally expandable to support wall frames of different heights, as measured in the direction substantially transverse between the top plate and the bottom plate.

In some embodiments of the method, the pre-drilling station comprises, adjacent to at least two tracks of a frame transport on which the wall frame is movable through the pre-drilling station, a stopper system comprising at least first and second vertically actuatable posts, wherein the first post is configured to stop a movement of the wall frame such that the one or more through-holes may be formed through a wall stud in contact with the first post, wherein the second post is spaced apart from the first post, in a direction of movement of the wall frame along the frame transport, by a width of the wall stud, and wherein the second post is vertically actuated, when a double wall stud configuration is detected, to stop a movement of the wall frame such that the one or more through-holes may be formed through a trailing wall stud of the double wall stud.

In some embodiments of the method, one or more of the main framing assembly station, the sheathing system, the sheathing fastening station, the sawing/routing station, and the drywall installation station comprise a squaring station that engages with the wall frame to ensure that the wall frame is substantially square at each such station.

In some embodiments of the method, the drywall installation station comprises a sensor that detects a position of each stud in the wall frame such that the fasteners are inserted through the drywall panels and into the wall studs.

In some embodiments of the method, the drywall installation station comprises a plurality of filler applicators that dispense a filler material into holes formed by the fasteners being driven into and/or partially through the drywall panels.

In some embodiments of the method, the drywall installation station comprises a plurality of drywall tape applicators that apply a mastic and a drywall tape over joints between adjacent drywall panels.

In some embodiments of the method, the insulation installation system comprises a pivoting insulation head that extends over and/or at least partially within one of the cavities between adjacent wall studs to pack the insulation material within the cavity at a specified density.

In some embodiments of the method, the insulation installation system comprises a segmented partition connected to a frame of the insulation head, the segmented partition being provided to retain the insulation within the cavity into which the insulation material is being installed.

In some embodiments of the method, the insulation installation system blows a cellulose insulation material into each of the cavities between adjacent wall studs.

In another embodiment, a method of attaching sheathing panels over a surface of a wall frame, which comprises a plurality of wall studs arranged between opposing top and bottom plates, is provided, the method comprising: retrieving a sheathing panel from a supply area, positionally registering the sheathing panel (e.g., on a conveyor); transporting the sheathing panel to a designated position on the wall frame according to a predetermined sheathing pattern; and depositing the sheathing panel in the designated position on the wall frame. In some embodiments, the method comprises positioning further sheathing panels in further designated positions on the wall frame according to the predetermined sheathing pattern. In some embodiments of the method, the sheathing panels cover all, or a portion of (e.g., a majority of), an exterior surface of the wall frame. In some embodiments, the method comprises engaging the wall frame and driving, at a leading edge thereof, corners of the wall frame against a registration stop to ensure that the wall frame is square before the fasteners are applied to the wall frame. In some embodiments, fasteners are applied to secure the sheathing panels to the wall frame for transport to a sheathing fastening station.

In another embodiment, a method of forming framing sub-assemblies for assembly as part of a wall frame is provided, the method comprising: retrieving dimensional lumber from a cut lumber storage rack; arranging, using one or more gripper robots, the dimensional lumber on a sub-assembly table in a predetermined pattern corresponding to the framing sub-assembly; and applying fasteners, using one or more fastener robots, to secure the dimensional lumber together in the predetermined pattern. In some embodiments, the one or more gripper robots and the one or more fastener robots operate collaboratively within a domain of the sub-assembly table.

In another embodiment, a method of forming wall studs for assembly into a wall frame is provided, the method comprising: detecting, using a wall stud robot, cut lumber within a lumber storage area; lifting, using one or more lifter assemblies of the wall stud robot, one or more pieces of cut lumber from the lumber storage area; analyzing, using a dimensional analysis system, the one or more pieces of cut lumber being lifted by the one or more lifter assemblies; depositing, together or individual, the one or more pieces of cut lumber onto a cascade stager; cutting, at the cascade stager using a first cutting device, the one or more pieces of cut lumber to a predetermined length corresponding to a height of the wall frame being assembled; and transporting the lumber from the cascade stager to a main framing assembly station to be attached between a top plate and a bottom plate to form the wall frame. In some embodiments, the method comprises forming, using a second cutting device, holes through a width of the one or more pieces of lumber, the holes being oriented so as to, in an assembled wall frame, provide a passage between adjacent wall cavities formed by adjacent wall studs in the wall frame. In some embodiments, the lifter assemblies apply a vacuum to generate a suction force to lift the one or more pieces of lumber. In some embodiments, the lifter assemblies comprise a vacuum gauge, a pressure gauge, a distance sensor, and/or a proximity sensor.

In another embodiment, a method of assembling a wall frame is provided, the method comprising: providing a top plate in a first plate guide; providing a bottom plate in a second plate guide; arranging a first wall stud between the top plate and the bottom plate; attaching the first wall stud to the top plate and the bottom plate at opposite ends of the wall stud; advancing the top and bottom plates along the first and second plate guides; arranging a subsequent wall stud between the top plate and the bottom plate; and attaching the second wall stud to the top plate and the bottom plate at opposite ends of the wall stud. In some embodiments, the steps are repeated until the entire wall frame is assembled. In some embodiments, the wall studs pass underneath one of the first and second plate guides to be arranged between the top and bottom plates and are lifted vertically to be aligned and/or coplanar with the top and bottom plates. In some embodiments, framing sub-assemblies are provided and/or attached within the wall frame between adjacent wall studs.

In some embodiments, wall studs are arranged in contact with each other to form a double stud configuration.

In another embodiment, a method of fastening a plurality of sheathing panels to a wall frame comprising wall studs arranged between opposing top and bottom plates, as well as framing sub-assemblies arranged between one or more adjacent wall studs, the method comprising: providing the plurality of sheathing panels over an outer surface of the wall frame to cover substantially all, or a portion of, the outer surface of the wall frame; providing a frame over the wall frame, the frame being movable along a length of the wall frame; providing a plurality of fastening devices connected to the frame to be movable along the frame in a direction along a width, or a height, of the wall frame; transmitting locations of the wall studs and/or framing sub-assemblies underneath the plurality of sheathing panels; and applying a plurality of fasteners through the sheathing panels and into one of the wall studs and/or the framing sub-assemblies to secure the sheathing panels to the outer surface of the wall panel. In some embodiments, the fastening devices are automated nail guns and the fasteners are nails. In some embodiments, the fastening devices are automated staple guns and the fasteners are staples. In some embodiments, the fasteners are not applied in a region of the wall frame between adjacent wall studs or within openings defined by the framing assemblies. In some embodiments, the fasteners are applied only through the sheathing panels in positions where one of the wall studs or framing sub-assemblies are arranged behind the sheathing panel, such that no fasteners are applied that are not embedded in a wall stud or a framing sub-assembly. In some embodiments, the method comprises moving the frame along the length of the wall frame and moving the fastening devices along the frame in the direction of the width of the wall frame to apply the fasteners to secure each sheathing panel to an underlying wall stud or framing sub-assembly of the wall frame. In some embodiments, the fastening devices comprise wheels that contact the sheathing panels as the fastening devices move thereover to ensure a uniform gap between the fastening devices and the sheathing panels. In some embodiments, the method comprises engaging the wall frame and driving, at a leading edge thereof, corners of the wall frame against a registration stop to ensure that the wall frame is square before the fasteners are applied to the wall frame.

In another embodiment, a method of forming through-holes through wall studs of a wall frame is provided, the method comprising: providing the wall frame comprising wall studs attached between opposing top and bottom plates on a frame transport comprising at least two transport tracks; providing a frame over the wall frame, the frame extending across the frame transport in a direction transverse to, or substantially perpendicular to, a length of the wall frame; attaching one or more drill units to the frame; providing one or more longitudinally extendable drill heads on the one or more drill units; moving the one or more drill units to a position in the width direction of the wall unit corresponding to a height of the wall frame at which the through-holes are to be formed; attaching at least one vertically actuatable post adjacent each of the transport tracks of the frame transport; advancing the wall frame along the transport tracks in a direction of the length of the wall frame; detecting a position of a wall stud adjacent to the at least one post; actuating the at least one post into a deployed position to stop a transit of the wall frame along the transport tracks underneath the drill head; advancing the drill head to drill at least one through-hole through the wall stud; retracting the at least one post; advancing the wall frame along the transport tracks; deploying the at least one post when a subsequent wall stud is detected; and forming a further through-hole through the subsequent wall stud; wherein through-holes are formed in a plurality of, or all, wall studs of the wall frame. In some embodiments, the drill head comprises one or more drill chucks that hold a drill bit, which can be a spade bit, hole saw, or any suitable cutting or boring implement. In some embodiments, the one or more drill chucks comprises a plurality of drill chucks that can be arranged in a plane. In some embodiments, the distance between the drill chucks can be changed by rotating pucks to which distal drill chucks are attached. In some embodiments, the drill head is rotatable, relative to the drill unit, to align the plane in which the drill chucks are arranged, with a plane along the length of the wall stud in which the through-hole is being formed. In some embodiments, the at least one post comprises at least first and second posts that are spaced apart by a predetermined distance corresponding to a width of the wall studs, wherein the second post is extended, after the through-hole is formed in a first wall stud of the double stud configuration, to the deployed position when two wall studs are arranged sequentially (e.g., in contact with each other) so that that drill head is aligned with a second wall stud of the double stud configuration.

In another embodiment, a method of automatically cutting openings defined by framing sub-assemblies within a wall frame that is covered with a plurality of sheathing panels is provided, the method comprising: providing at least one first cutting device oriented to cut a hole or slot through the sheathing panels in a direction corresponding to a height or width of the wall frame; providing at least one, or a plurality of, second cutting device(s) oriented to cut a hole or slot through the sheathing panels in a direction corresponding to a length of the wall frame; positioning the first cutting device adjacent a first lateral edge of an opening to be formed through the sheathing panels, the opening corresponding to an inner perimeter of a framing sub-assembly; forming, using the first cutting device, a hole or slot through the sheathing panels along the first lateral edge of the opening; arranging the second cutting device(s) adjacent a top or bottom edge of the opening to be formed through the sheathing panels; forming, using the first cutting device, a hole or slot through the sheathing panels along the top and/or bottom edges of the opening; positioning the first cutting device adjacent a second lateral edge of an opening to be formed through the sheathing panels, the opening corresponding to an inner perimeter of a framing sub-assembly; and forming, using the first cutting device, a hole or slot through the sheathing panels along the second lateral edge of the opening. In some embodiments, the method comprises providing at least one third cutting device; attaching the first, second, and third cutting devices to a frame oriented across the height or width of the wall frame; and removing, at corners between the top and bottom edges and the first and second lateral sides of the opening, any remaining material of the sheathing panels to form release the portion of the sheathing panels within the inner perimeter of the framing sub-assembly to release the opening. In some embodiments, the at least one second cutting device comprises at least two second cutting devices, which cut the holes and/or slots along the top and bottom edges of the opening substantially simultaneously.

In another embodiment, a method of installing insulation material within cavities defined between adjacent wall studs of a wall frame is provided, the method comprising: arranging one or more insulation robots with insulation heads attached thereto about the wall frame such that insulation material can be installed within all of the wall cavities of the wall frame; arranging the insulation head over and/or at least partially within a first wall cavity, adjacent a first end of the wall cavity; blowing the insulation material through a supply fitting attached to a frame of the insulation head; arranging a segmented partition on an end of the frame opposite the first end of the wall cavity; monitoring an amount of insulation within the wall cavity; determining when an adequate density of insulation material has been installed within the wall cavity at the first end of the wall cavity; advancing the insulation head, using the insulation robot, along the length of the wall cavity away from the first end; and moving the insulation head to subsequent wall cavities to fill each wall cavity of the wall frame with a predetermined density of insulation material.

In some embodiments, the method comprises pivoting the supply fitting within the wall cavity to pack the insulation material against a plate at the first end of the wall cavity. In some embodiments, the method comprises pivoting the supply fitting away from an interior of the wall cavity as the insulation head moves along the wall cavity towards a second end thereof opposite the first end. In some embodiments, monitoring the amount of insulation material comprises monitoring a pressure within the wall cavity using a pressure feedback sensor and/or a strain gauge. In some embodiments, advancing the insulation head comprises changing a velocity at which the insulation head is advanced based on a rate at which the insulation material is being installed within the wall cavity as the insulation head is advanced. In some embodiments of the method, the insulation material comprises a blown cellulose material comprising a moisture content sufficient to allow the insulation to be blown into the wall cavity via the supply fitting. In some embodiments, the density of the insulation material is provided to a controller, in a form of a pressure measurement from a pressure feedback sensor, and the insulation head is only advanced away from the first end of the wall cavity when a predetermined pressure threshold is exceeded by the pressure measurement from the pressure feedback sensor. In some embodiments, the method comprises drying an outer surface of the insulation material to have a reduced moisture content to allow for a plurality of drywall panels to be attached over the outer surface of the insulation material without the drywall panels absorbing excess moisture, which can lead to mold or other bacterial/fungal growth.

In another embodiment, a method of placing a plurality of drywall panels over an internal surface of a wall frame is provided, the method comprising: providing at least one drywall robot adjacent to the wall frame; providing a position registration table in a position accessible by at least one drywall robot; and individually lifting, using the at least one drywall robot, the plurality of drywall panels and placing the plurality of drywall panels individually on the position registration table; and transferring the plurality of drywall panels from the position registration table onto the wall frame according to a drywall placement pattern. In some embodiments, the at least one drywall robot comprises first and second drywall robots and the drywall panels being arranged in a stack of drywall panels, in which a finished surface of each drywall panel is oriented to face against a finished surface of an adjacent drywall panel within the stack; the method comprising lifting a first drywall panel off of the stack using the first drywall robot, the first drywall panel being oriented with the finished surface thereof facing away from an end effector of the first drywall robot; transferring the first drywall panel from the first drywall robot to the second drywall robot, such that the first drywall panel faces towards an end effector of the second drywall robot; and positioning, using the second drywall robot, the first drywall panel on the internal surface of the wall frame. In some such embodiments, the method comprises: lifting a second drywall panel off of the stack using the first drywall robot, the second drywall panel being oriented with the finished surface thereof facing towards the end effector of the first drywall robot; and positioning, using the first drywall robot, the second drywall panel on the internal surface of the wall frame. In some such embodiments, each drywall panel having an odd number within the stack is positioned on the internal surface of the wall frame by the second drywall robot and each drywall panel having an even number within the stack is positioned on the internal surface of the wall frame by the first drywall robot. In some such embodiments, the first and second drywall panels are positionally registered on the position registration table. In some such embodiments, the second drywall panel is removed from the position registration table and positioned over the wall frame by the second drywall robot. In some embodiments, the end effectors of the robot comprise a gripper head configured to engage with a surface of and lift one of the drywall panels. In some embodiments, the end effectors generate a suction force via a vacuum to generate a force to lift each of the drywall panels. In some embodiments, the method comprises engaging the wall frame and driving, at a leading edge thereof, corners of the wall frame against a registration stop to ensure that the wall frame is square before the fasteners are applied to the wall frame. In some embodiments, a bottom and/or top region along a length of the wall frame is not covered with drywall panels so that a position of the wall studs within the wall frame can be detected to align a plurality of fastening devices with the wall studs using a sensor, for example, a proximity sensor, to apply a plurality of fasteners to secure the plurality of drywall panels to the wall studs of the wall frame.

These and other objects are achieved in whole or in part by the presently disclosed subject matter. Further, objects of the presently disclosed subject matter having been stated above, other objects and advantages of the presently disclosed subject matter will become apparent to those skilled in the art after a study of the following description, drawings and examples.

The methods and systems disclosed herein can be combined in any combination and/or sub-combination, adding elements from other systems and/or sub-systems or steps from other methods and/or sub-methods, as the case may be, and/or omitting elements from other systems and/or subsystems or steps from other methods and/or sub-methods without limitation. Nothing disclosed herein shall be interpreted as limiting in any way the combinations in which the features, structures, steps, etc. may be organized, described, and/or claimed in this or any related applications.

BRIEF DESCRIPTION OF THE DRAWINGS

The presently disclosed subject matter can be better understood by referring to the following figures. The components in the figures are not necessarily to scale, emphasis instead being placed upon illustrating the principles of the presently disclosed subject matter (often schematically). In the figures, like reference numerals designate corresponding parts throughout the different views. A further understanding of the presently disclosed subject matter can be obtained by reference to an embodiment set forth in the illustrations of the accompanying drawings. Although the illustrated embodiment is merely exemplary of systems for carrying out the presently disclosed subject matter, both the organization and method of operation of the presently disclosed subject matter, in general, together with further objectives and advantages thereof, can be more easily understood by reference to the drawings and the following description. The drawings are not intended to limit the scope of this presently disclosed subject matter, which is set forth with particularity in the claims as appended or as subsequently amended, but merely to clarify and exemplify the presently disclosed subject matter.

Like numbers refer to like elements throughout. In the figures, the thickness of certain lines, layers, components, elements or features can be exaggerated for clarity. Where used, broken lines illustrate optional features or operations unless specified otherwise.

For a more complete understanding of the presently disclosed subject matter, reference is now made to the drawings submitted herewith.

Figure 1:
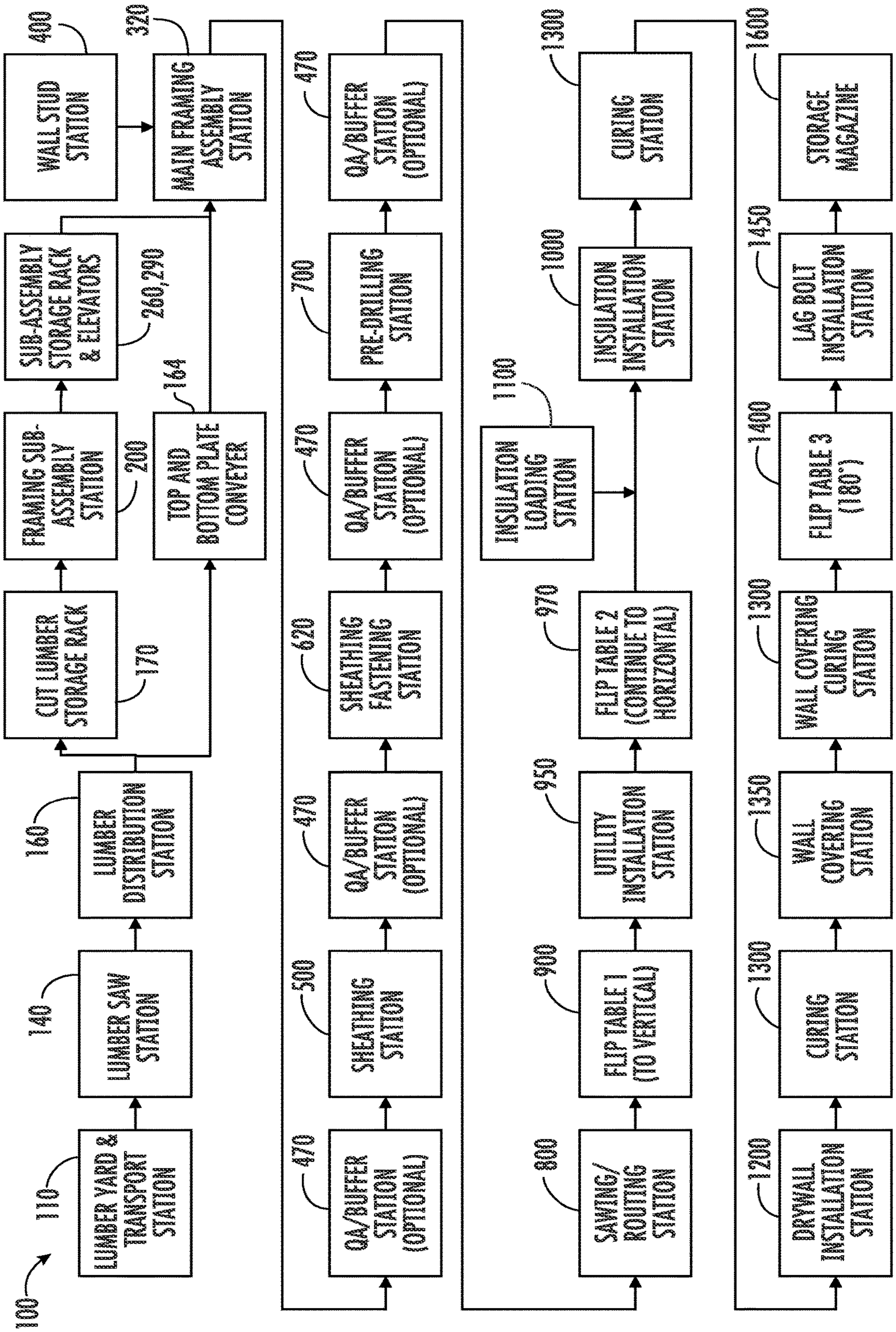

FIG. 1 is a schematic illustration of an example embodiment of a system for constructing a wall section of a modular construction unit.

Figure 2:
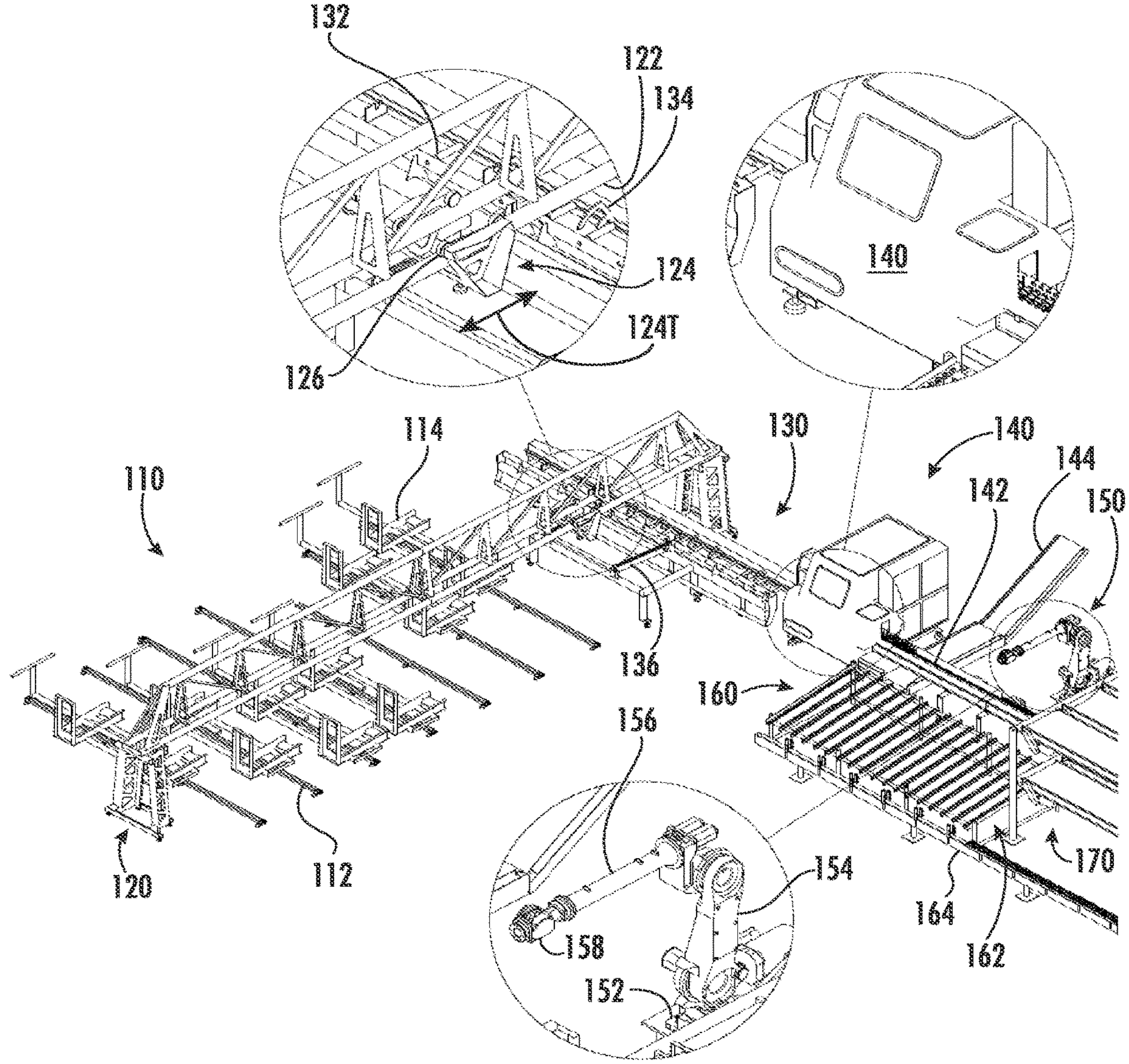

FIG. 2 is an isometric view of example embodiments of the lumber yard and crane station, the lumber saw station, the lumber distribution station shown schematically in FIG. 1.

Figure 3:
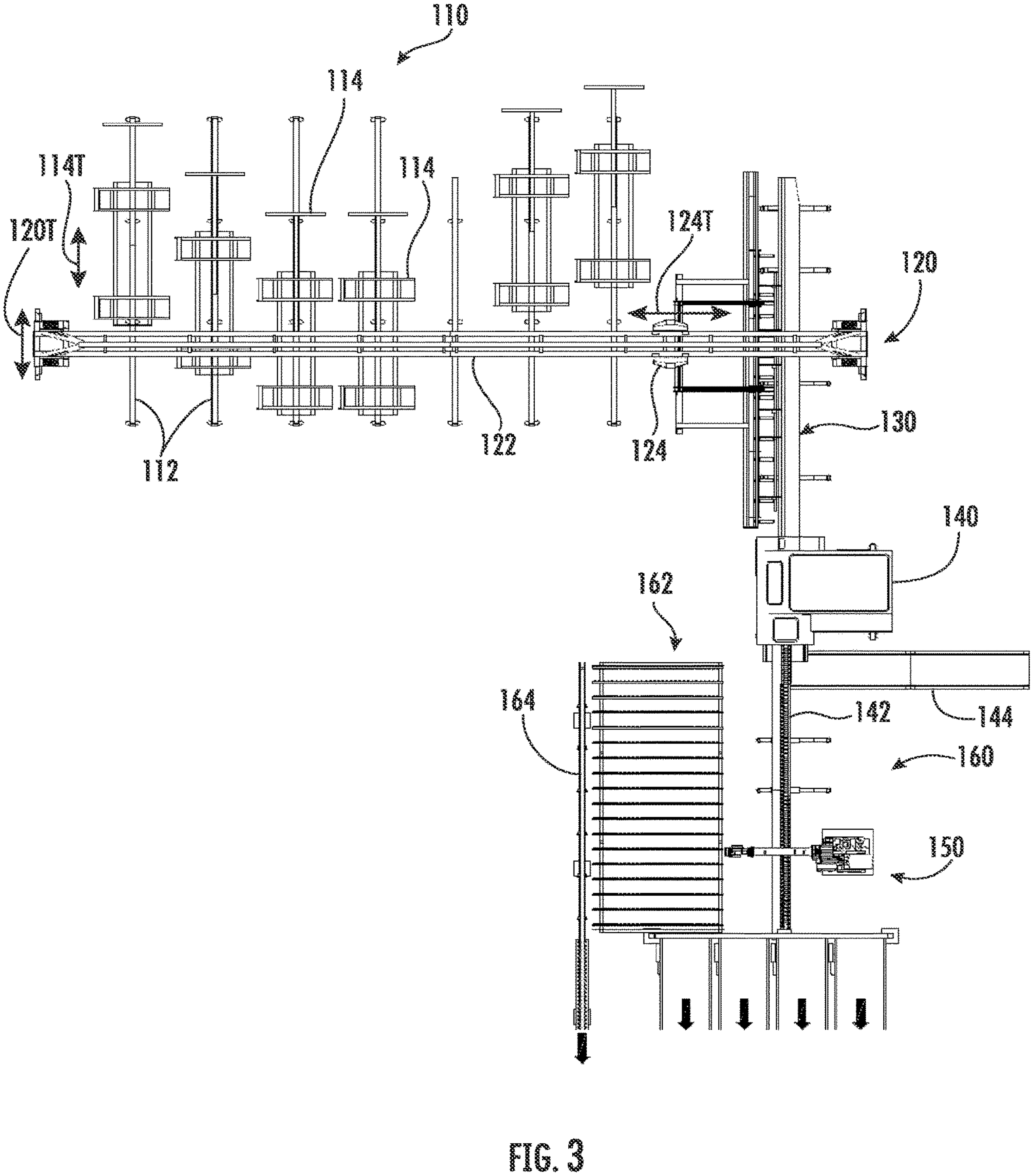

FIG. 3 is a top plan view of the example embodiments of the lumber yard and crane station, the lumber saw station, and the lumber distribution station shown in FIG. 2.

Figure 4:
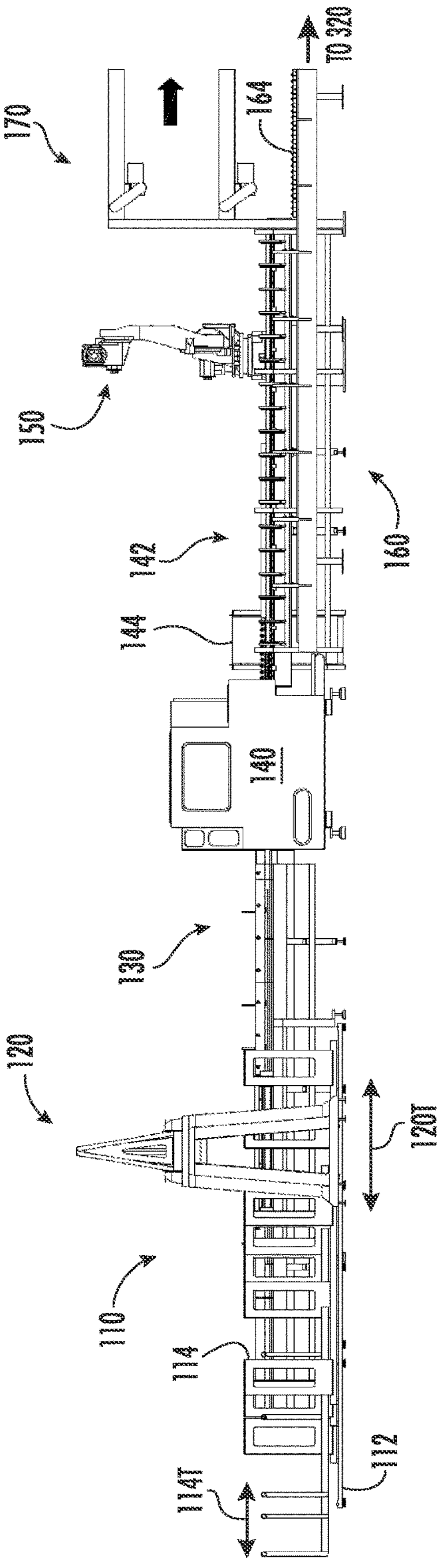

FIG. 4 is a side plan view of the example embodiments of the lumber yard and crane station, the lumber saw station, and the lumber distribution station shown in FIGS. 2 and 3.

Figure 5:
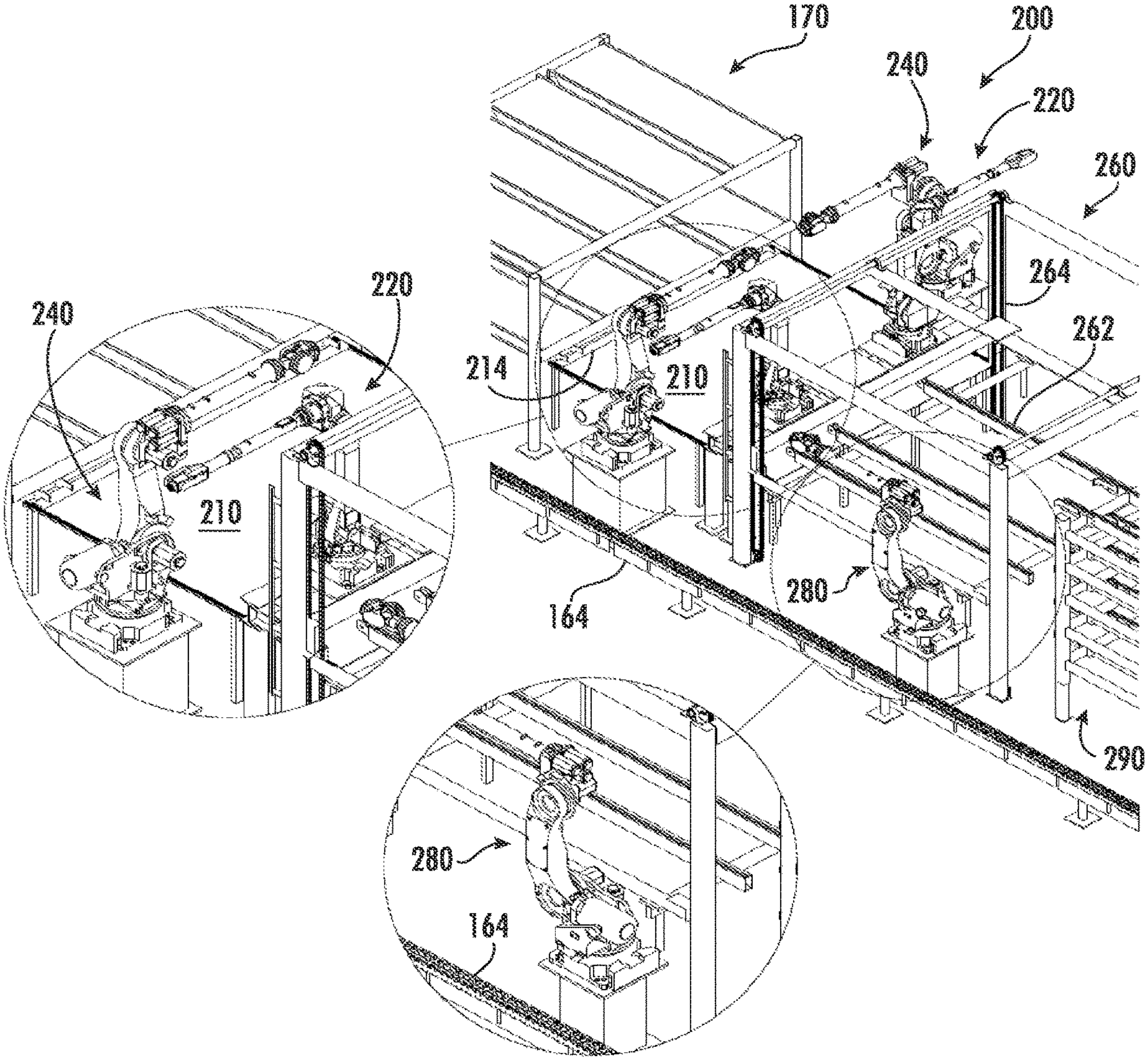

FIG. 5 is an isometric view of example embodiments of the cut lumber storage rack, the framing sub-assembly station, the sub-assembly storage rack and elevators, the sub-assembly diverter robot, and the top and bottom plate conveyor shown schematically in FIG. 1.

Figure 6:
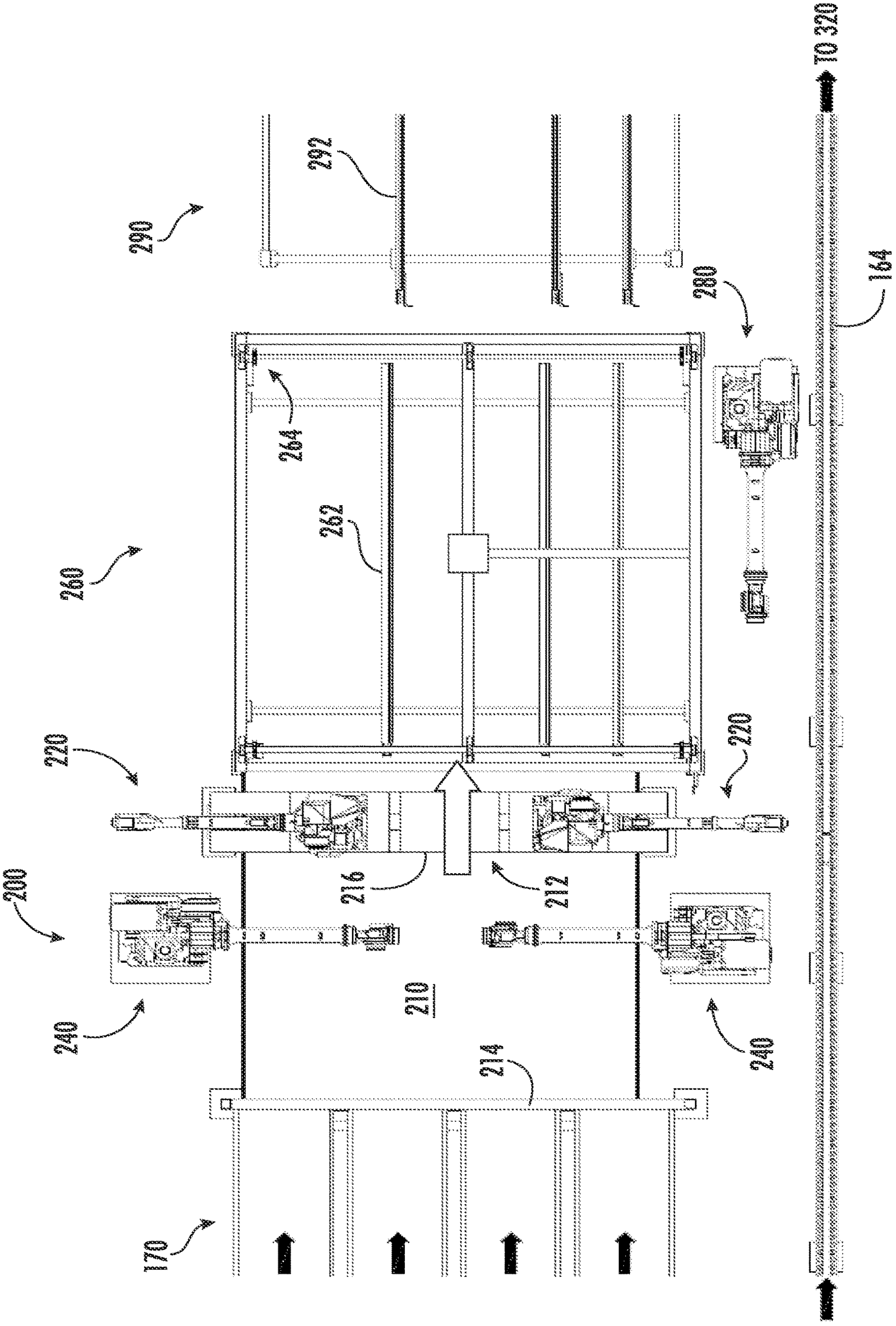

FIG. 6 is a top plan view of the example embodiments of the cut lumber storage rack, the framing sub-assembly station, the sub-assembly storage rack and elevators, the sub-assembly diverter robot, and the top and bottom plate conveyor shown in FIG. 5.

Figure 7:
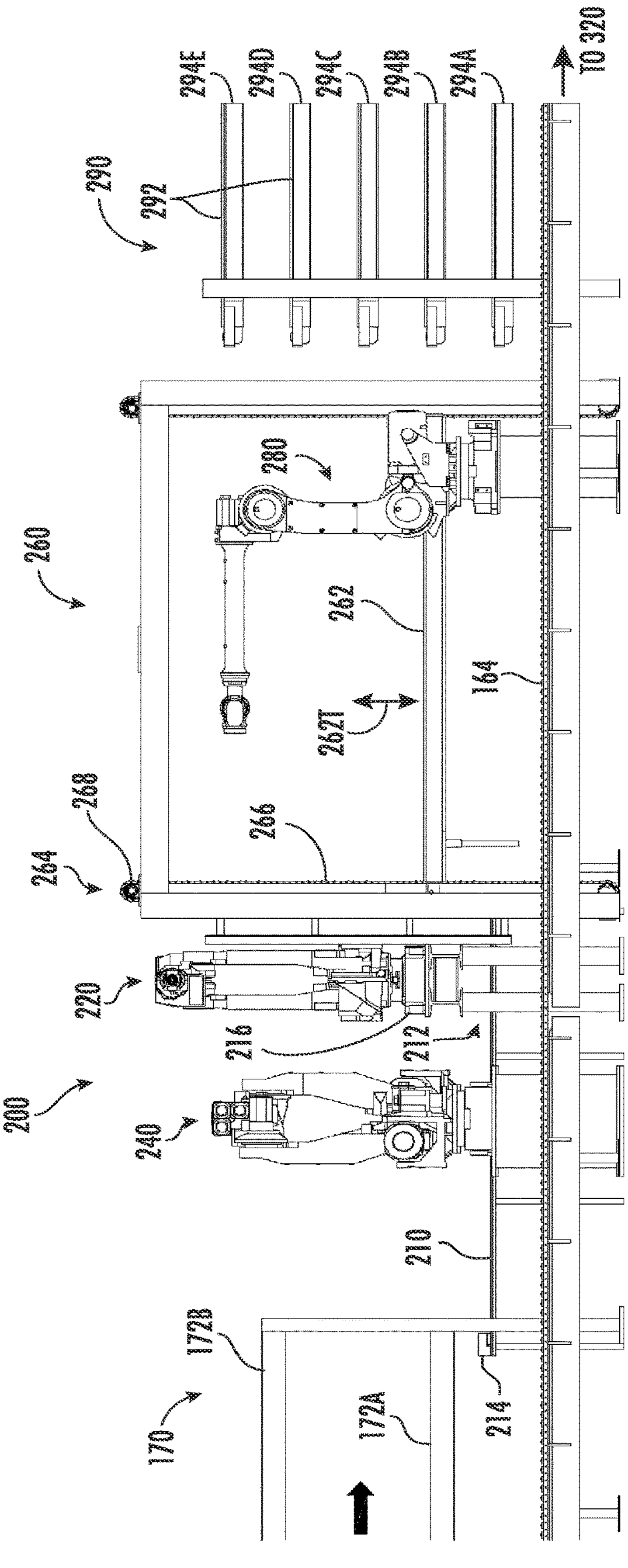

FIG. 7 is a side plan view of the example embodiments of the cut lumber storage rack, the framing sub-assembly station, the sub-assembly storage rack and elevators, the sub-assembly diverter station, and the top and bottom plate conveyor shown in FIGS. 5 and 6.

Figure 8:
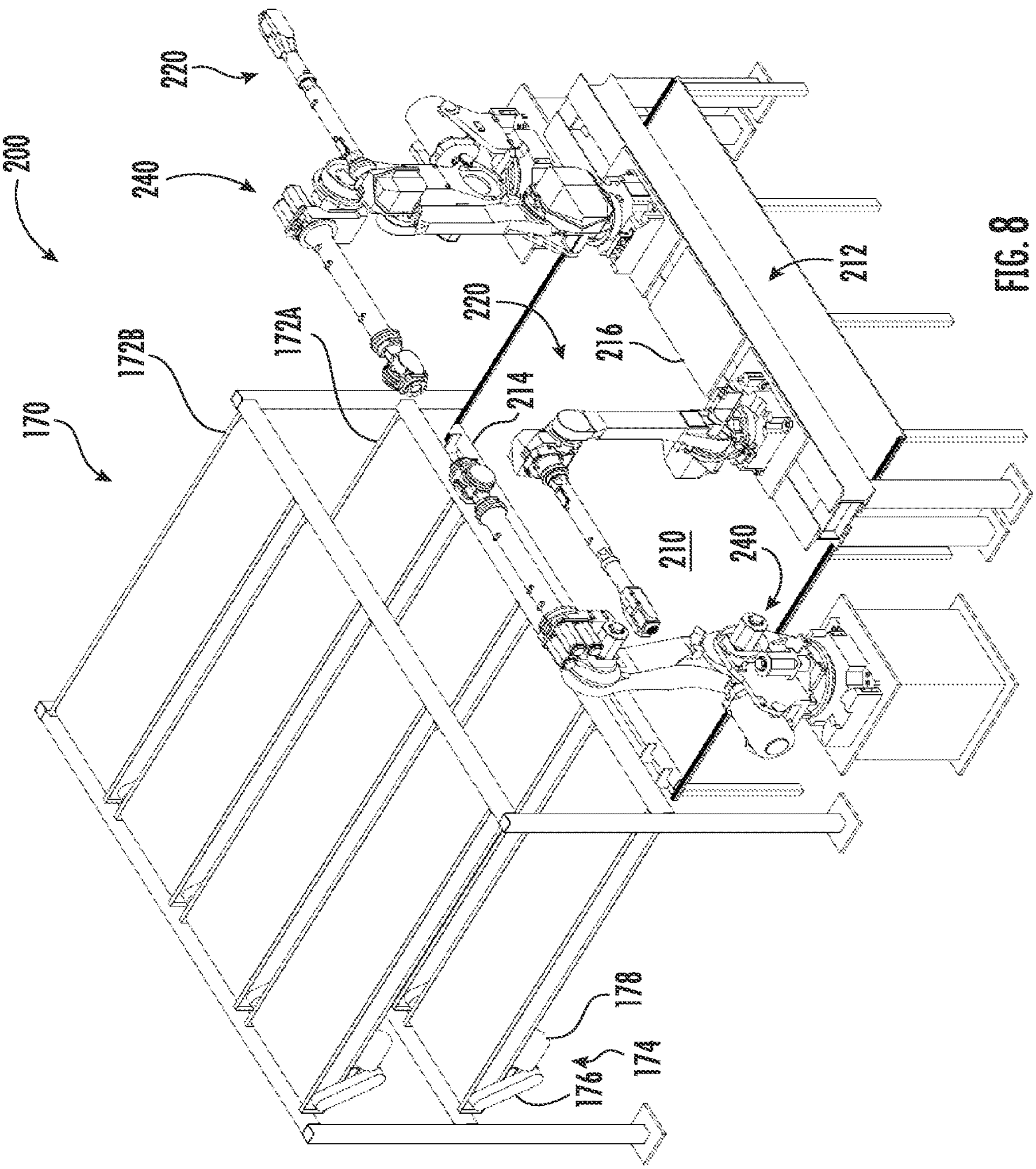

FIG. 8 is an isolated isometric view of the example embodiments of the cut lumber storage rack and the framing sub-assembly station shown in FIGS. 5-7.

Figure 9A:
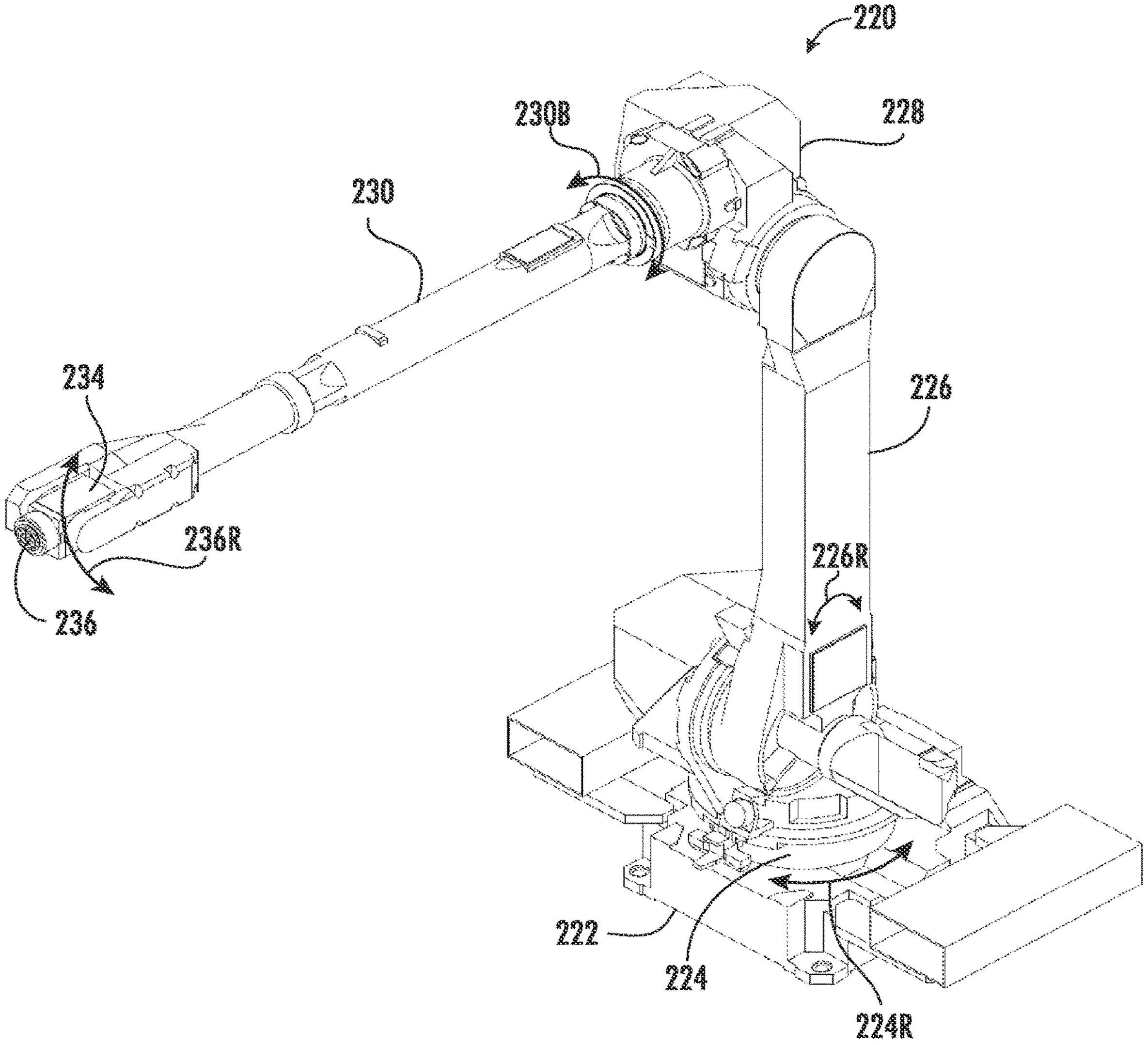

FIG. 9A is an isometric view of an example embodiment of a fastening robot for use in the framing sub-assembly station of FIGS. 5-8.

Figure 9B:
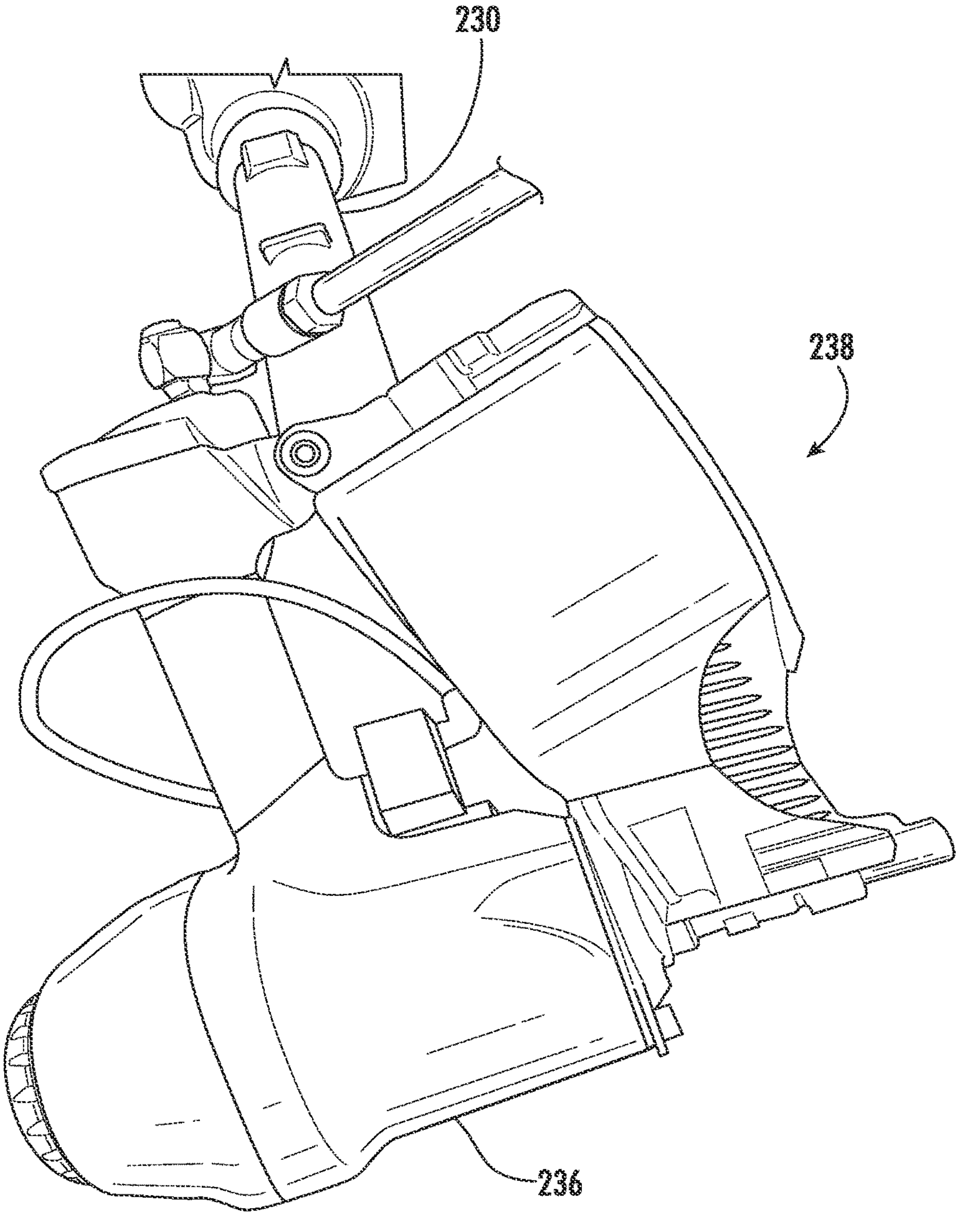

FIG. 9B is a view of an example embodiment of a fastener head for the fastening robot of FIG. 9A.

Figure 10A:
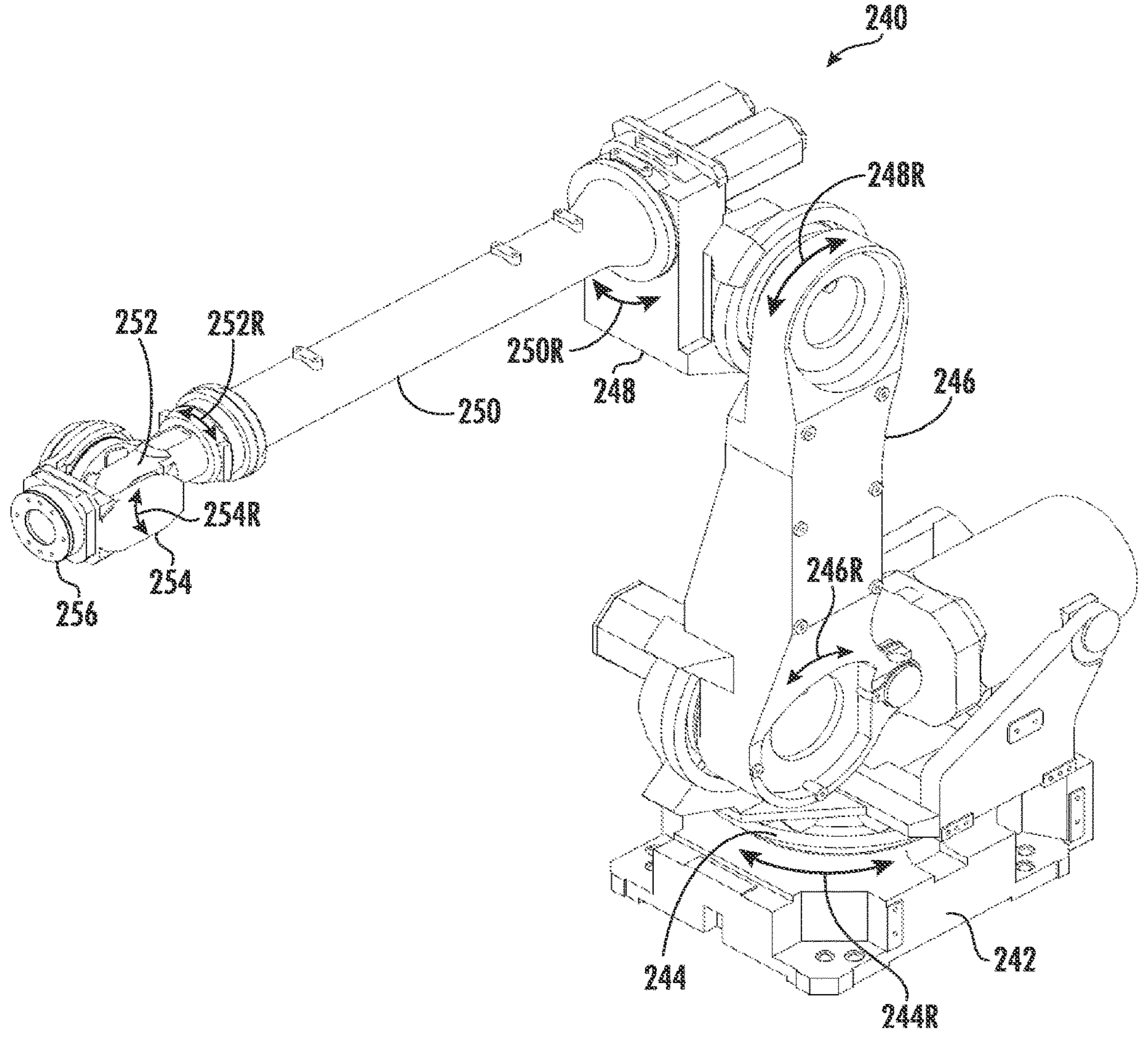

FIG. 10A is an isometric view of an example embodiment of a gripper robot for use in the framing sub-assembly station of FIGS. 5-8.

Figure 10B:
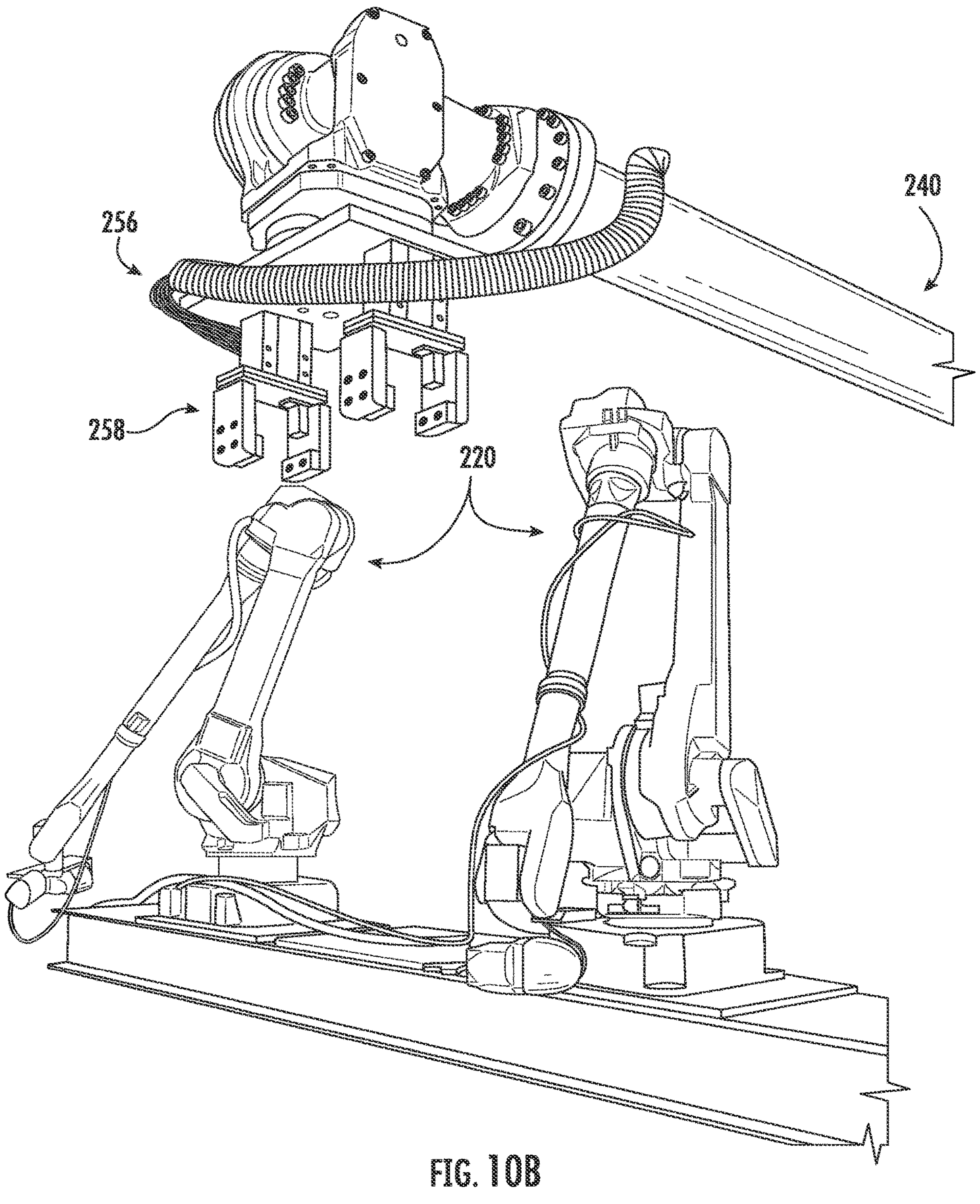

FIG. 10B is a view of an example embodiment of a gripper head suited for the gripper robot of FIG. 10A.

Figure 11A:
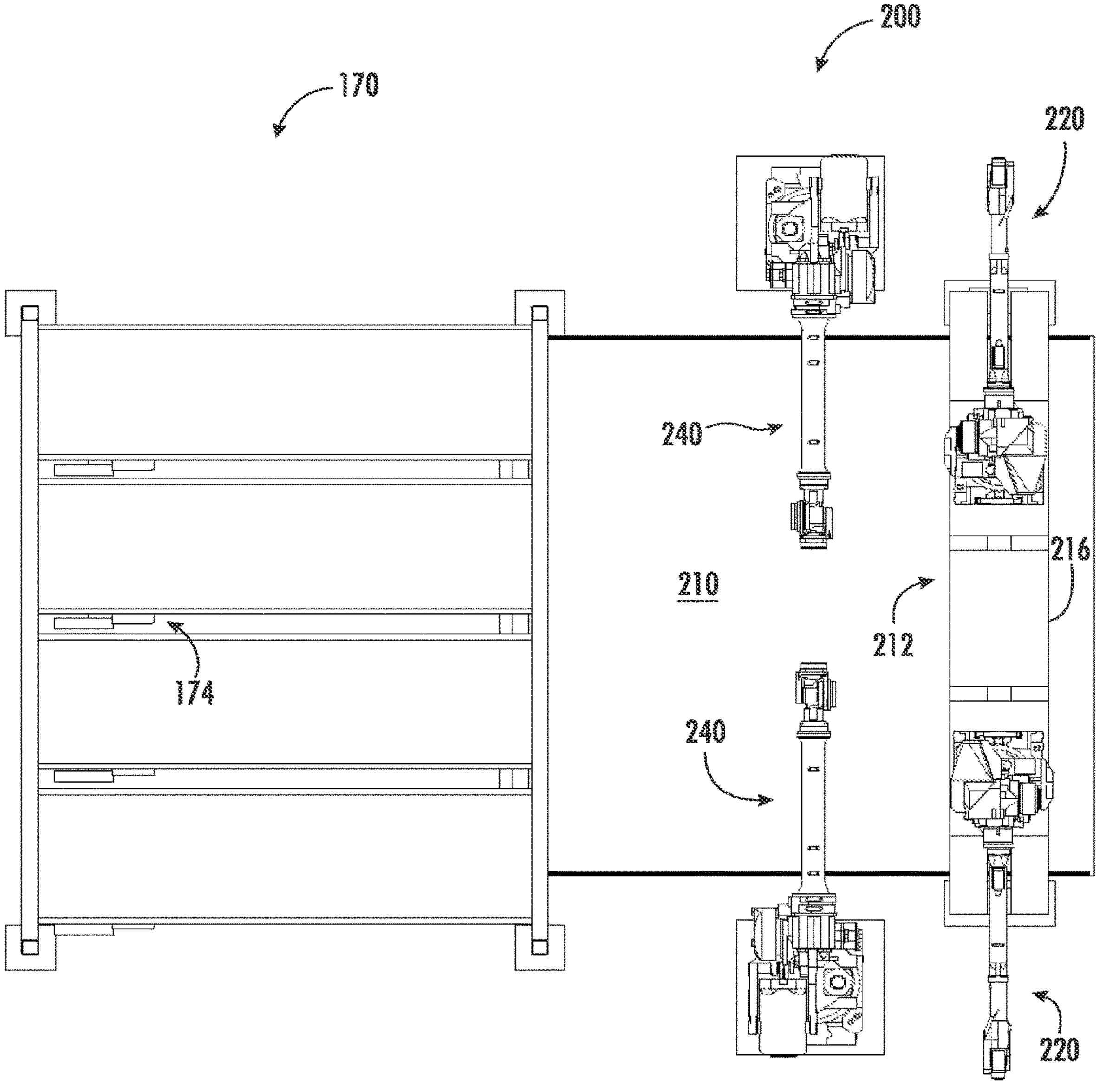

FIG. 11A is a top plan view of the isolated view of the example embodiments of the cut lumber storage rack and the framing sub-assembly station shown in FIG. 8.

Figure 11B:
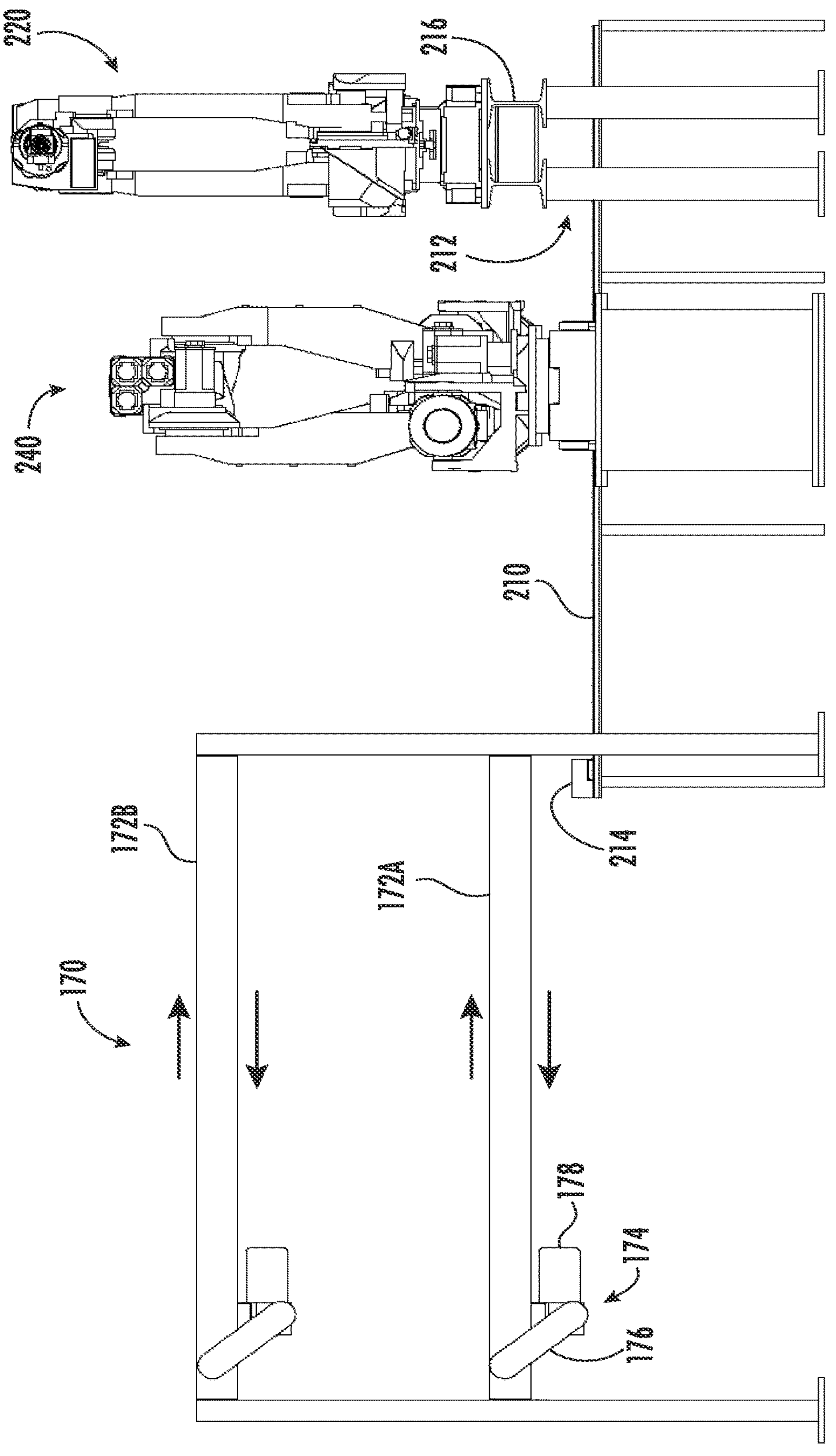

FIG. 11B is a side plan view of the isolated view of the example embodiments of the cut lumber storage rack and the framing sub-assembly station shown in FIG. 8.

Figure 12:
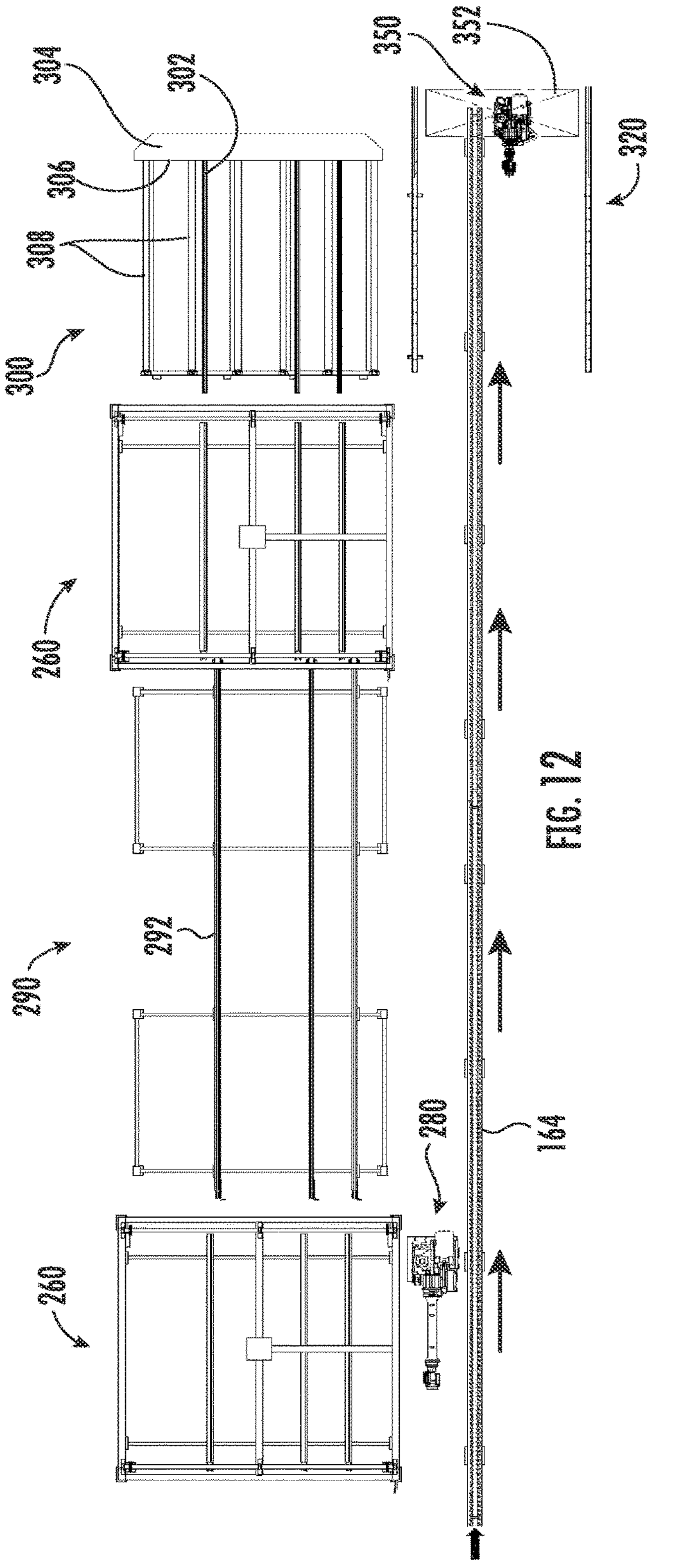

FIG. 12 is a top plan view of example embodiments of the sub-assembly storage racks and elevators, the sub-assembly diverter station, the top and bottom plate conveyor, and the main framing assembly station shown schematically in FIG. 1.

Figure 13:
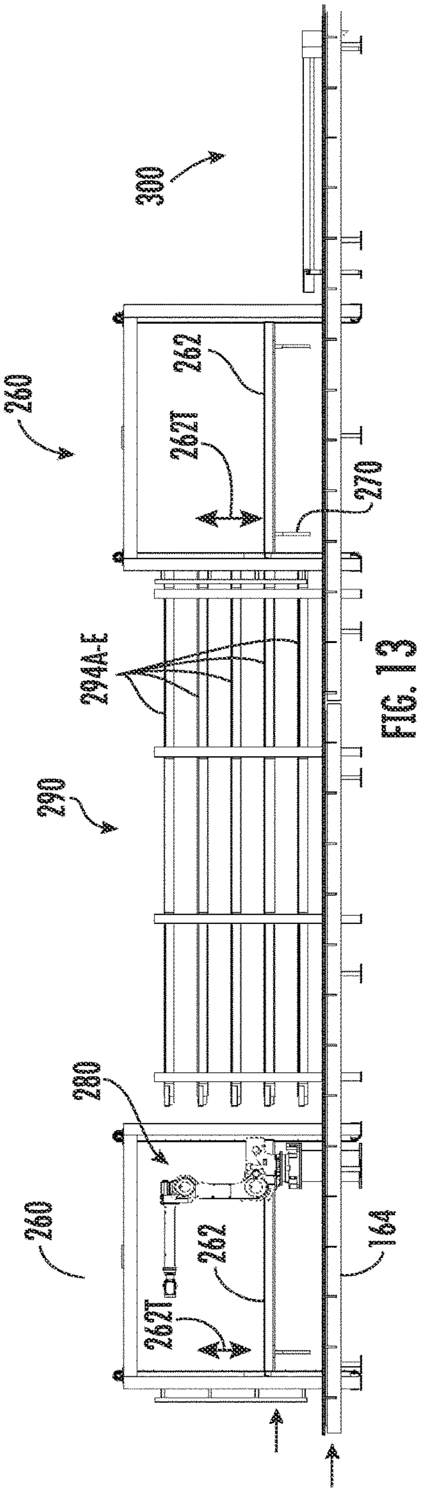

FIG. 13 is a side plan view of the example embodiments of the sub-assembly storage racks and elevators, the sub-assembly diverter station, the top and bottom plate conveyor, and the main framing assembly station shown in FIG. 12.

Figure 14:
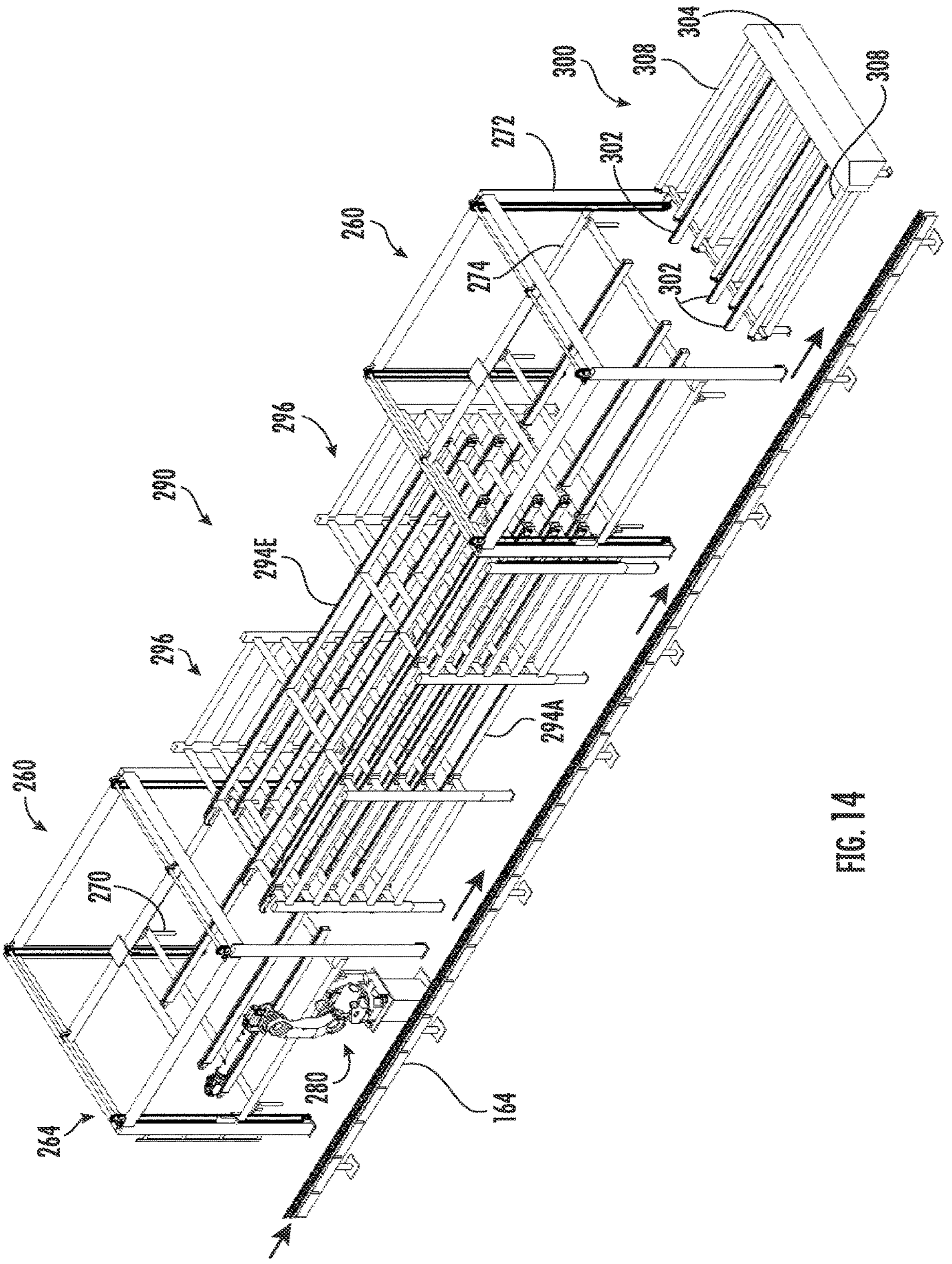

FIG. 14 is an isometric view of the example embodiments of the sub-assembly storage racks and elevators, the sub-assembly diverter station, the top and bottom plate conveyor, and the main framing assembly station shown in FIGS. 12 and 13.

Figure 15:
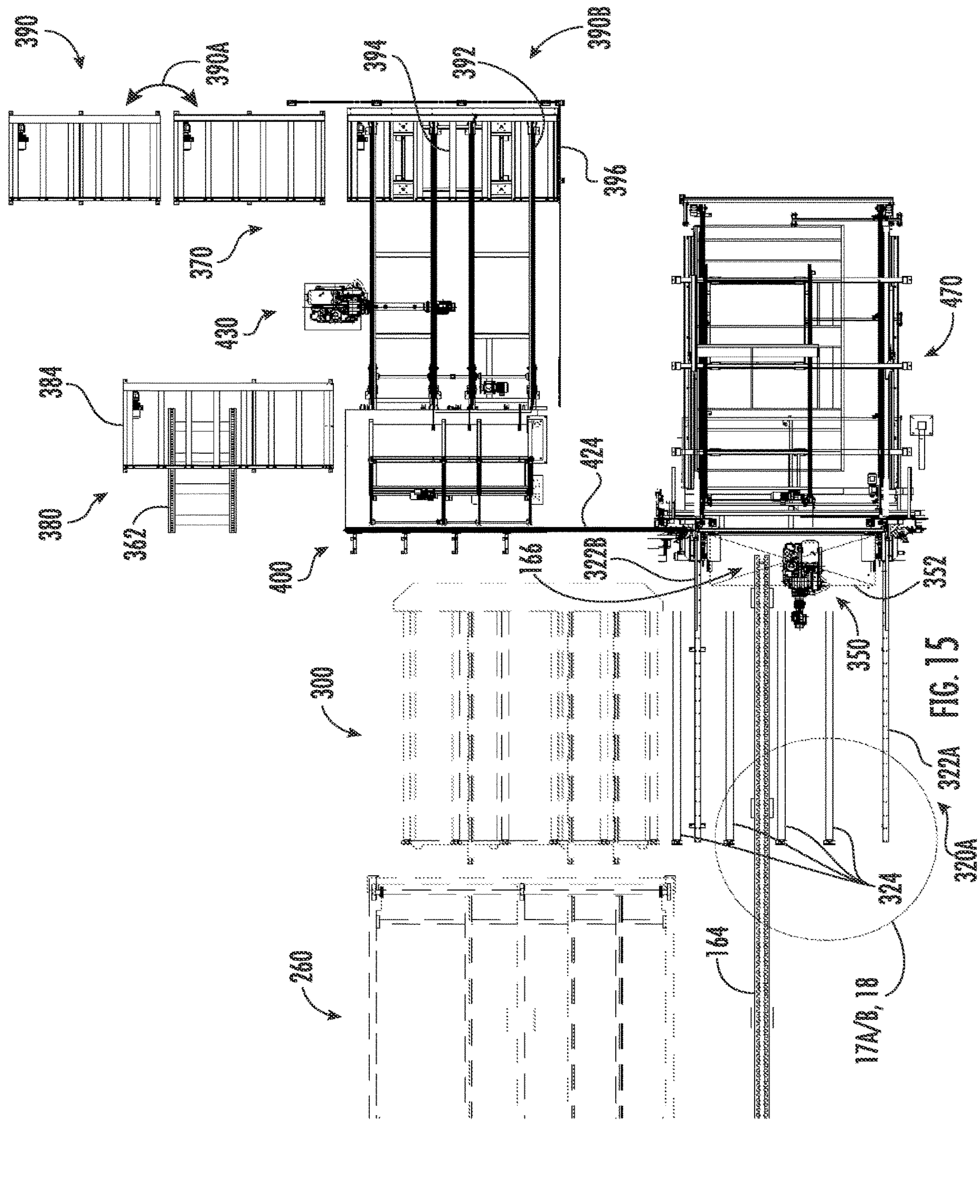

FIG. 15 is a top plan view of example embodiments of the wall stud station and the main framing assembly station shown schematically in FIG. 1.

Figure 16:
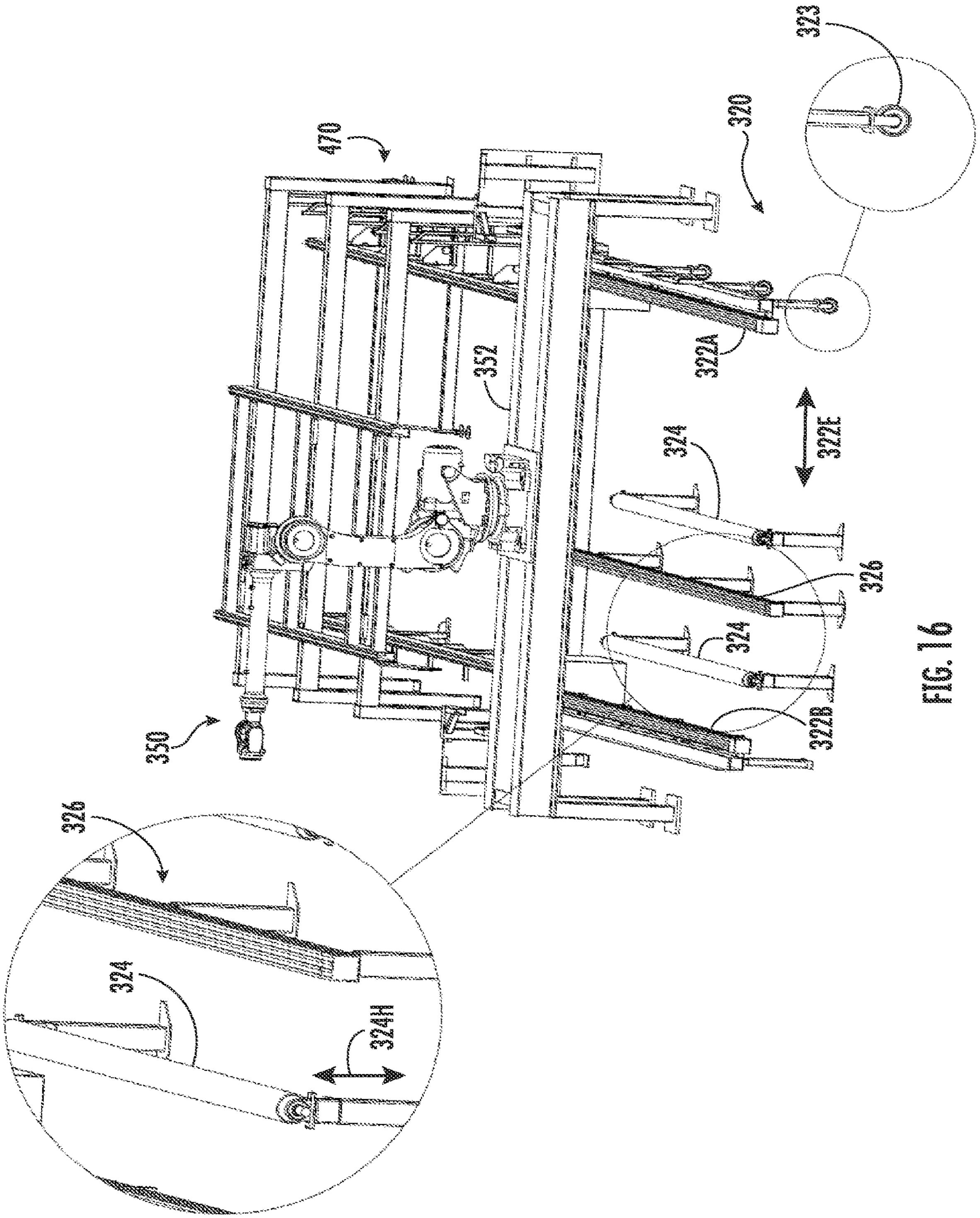

FIG. 16 is an isometric isolated view of the example embodiment of the main framing assembly station shown schematically in FIG. 1.

Figure 17A:
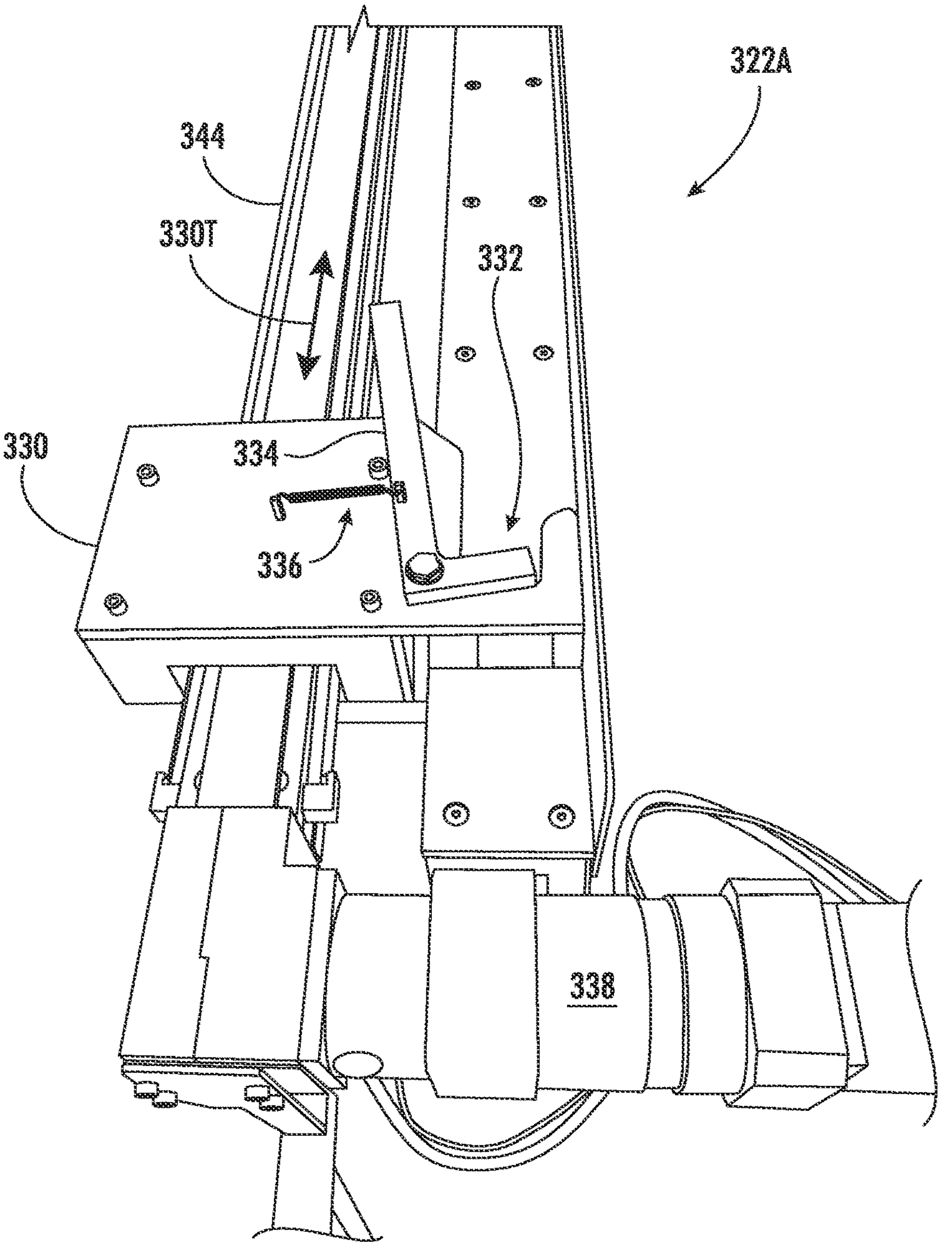
Figure 17B:
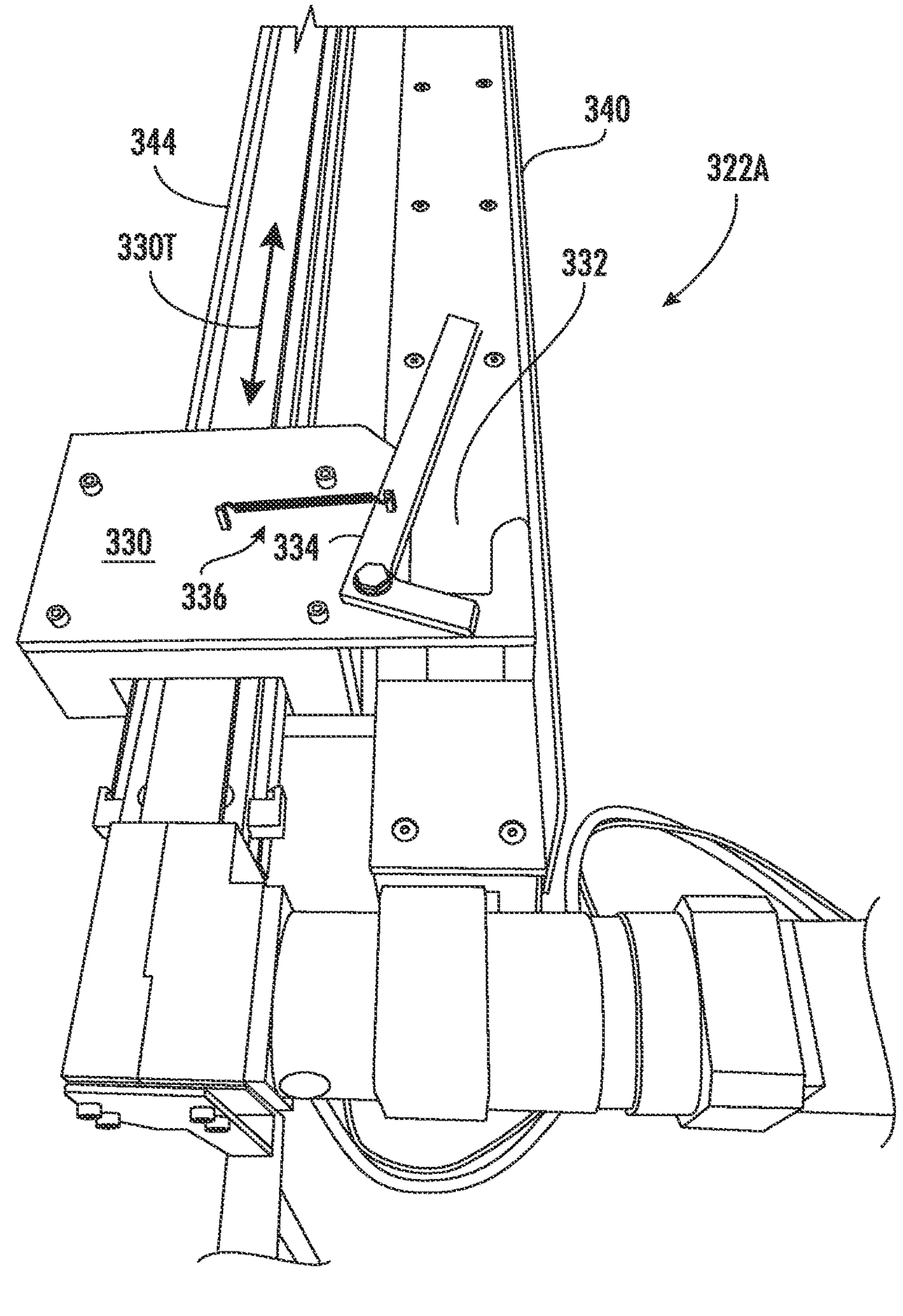

FIGS. 17A and 17B show and example embodiment of a top and bottom plate driver of the main framing assembly station of FIG. 15.

Figure 18:
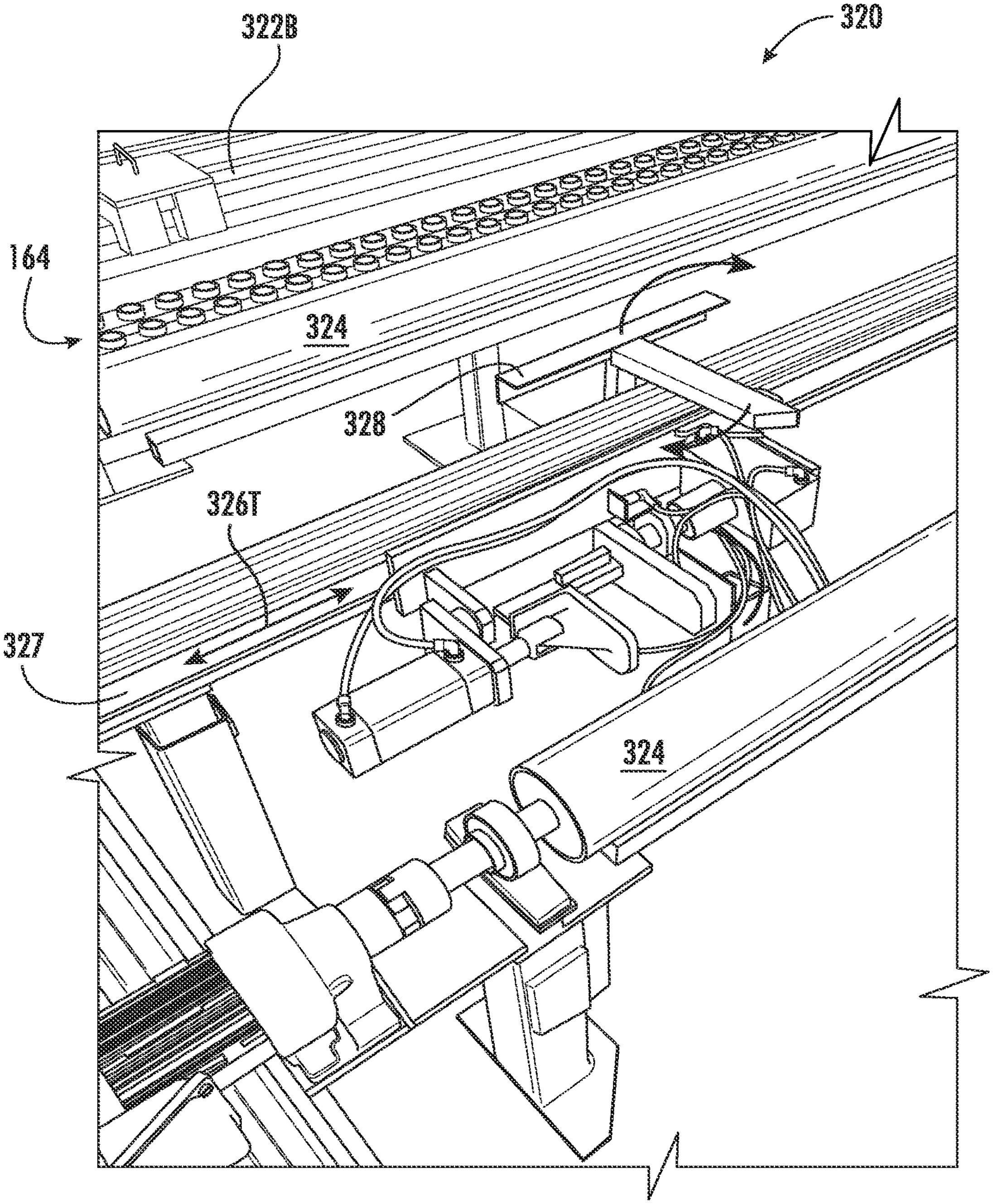

FIG. 18 shows an example embodiment of a framing sub-assembly driver of the main framing assembly station of FIG. 15.

Figure 19:
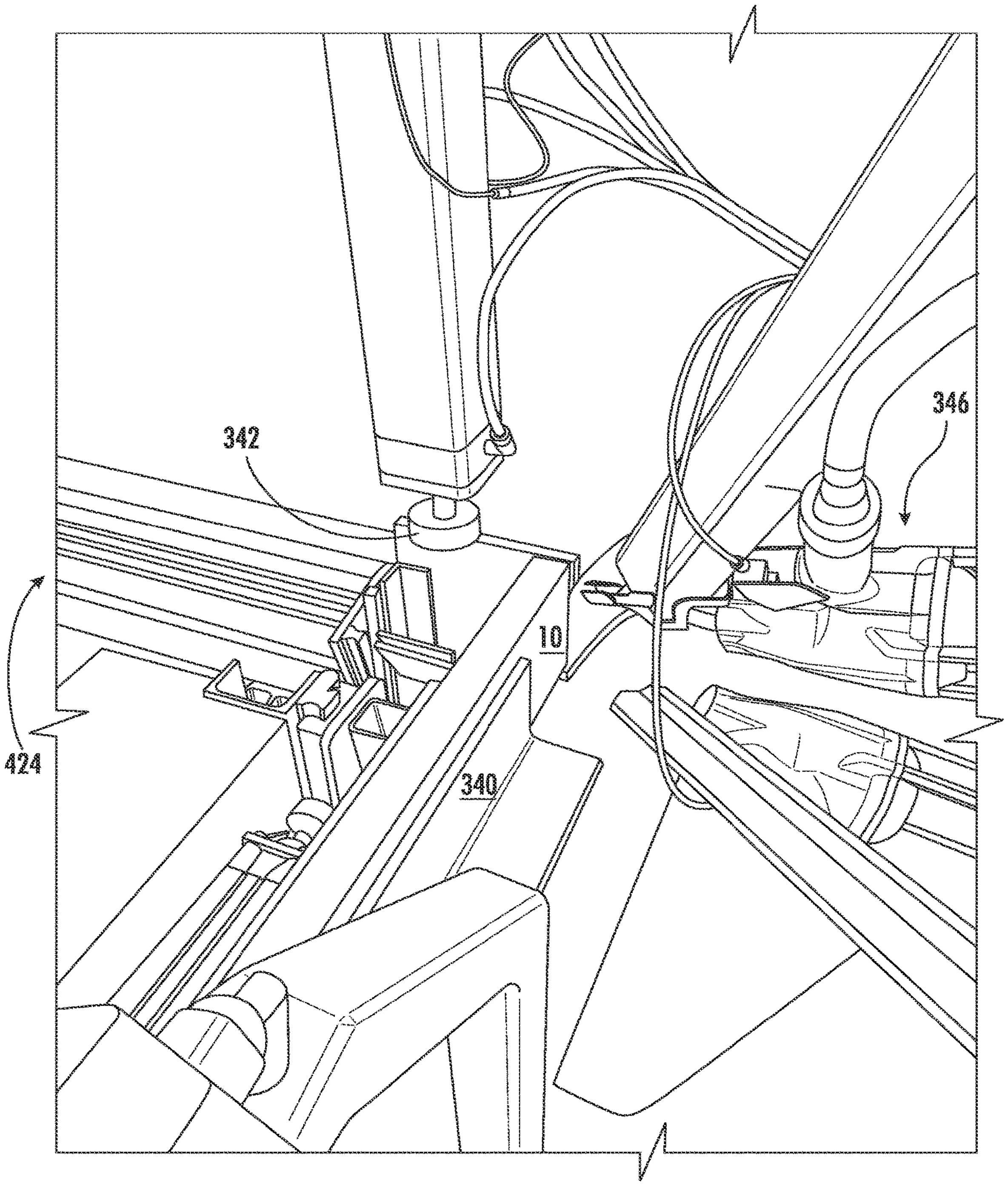

FIG. 19 shows an example embodiment of a vertical clamp of the main framing assembly station of FIG. 15.

Figure 20:
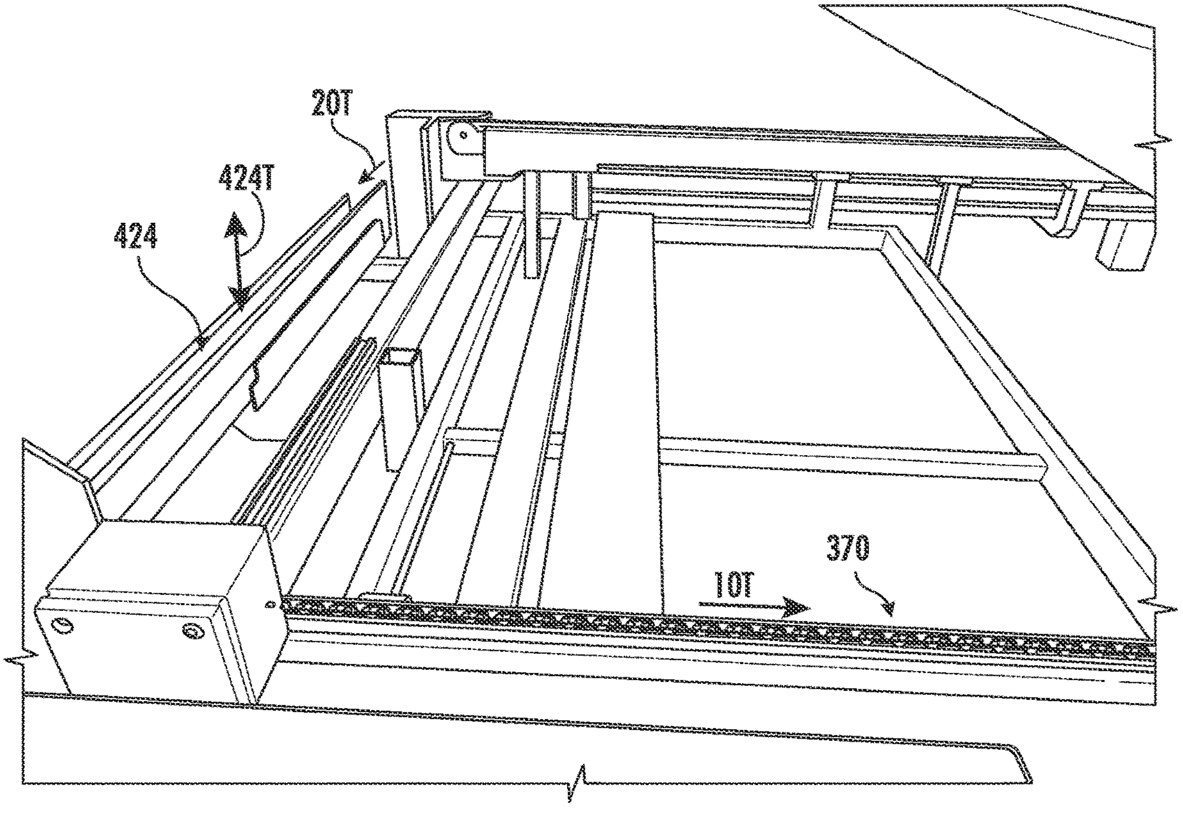

FIG. 20 is a side elevated view of a portion of the main framing assembly station where wall studs from the wall stud station are vertically positioned between a top plate and a bottom plate and fastened together in the main framing assembly station.

Figure 21:
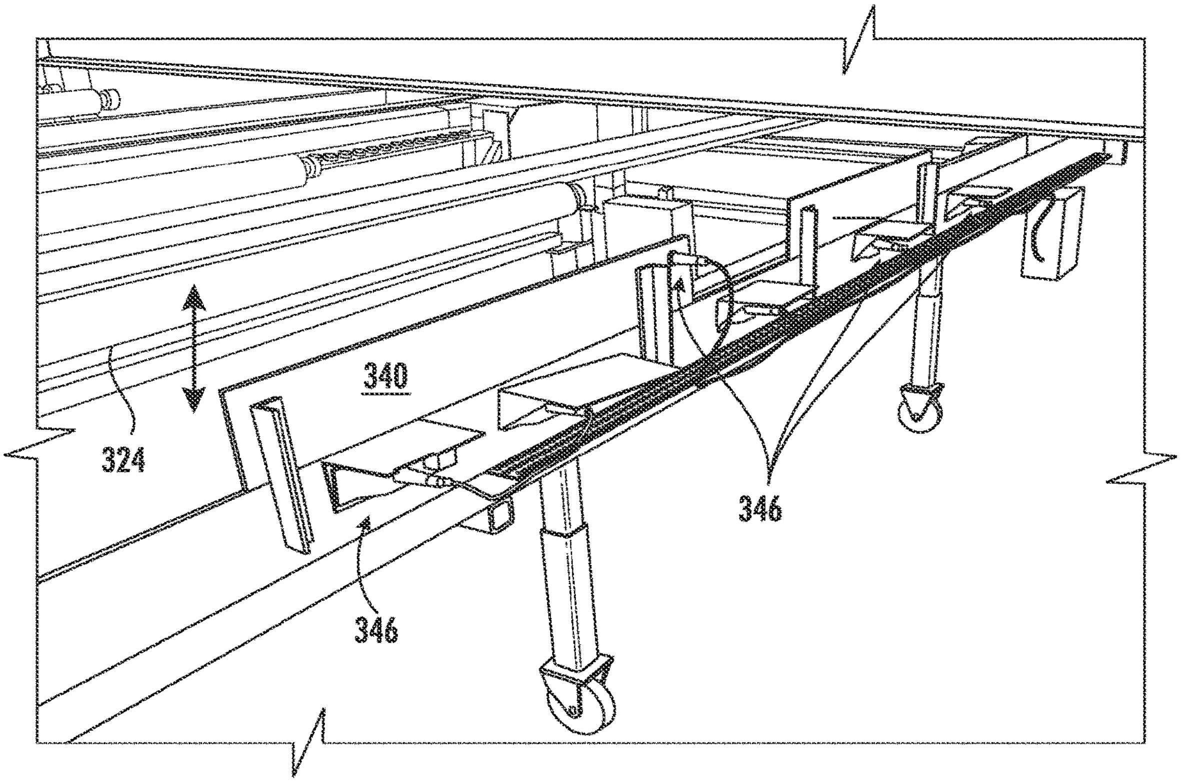

FIG. 21 shows an example embodiment of position sensors along the top and/or bottom plate tracks in the main framing assembly station of FIG. 15.

Figure 22A:
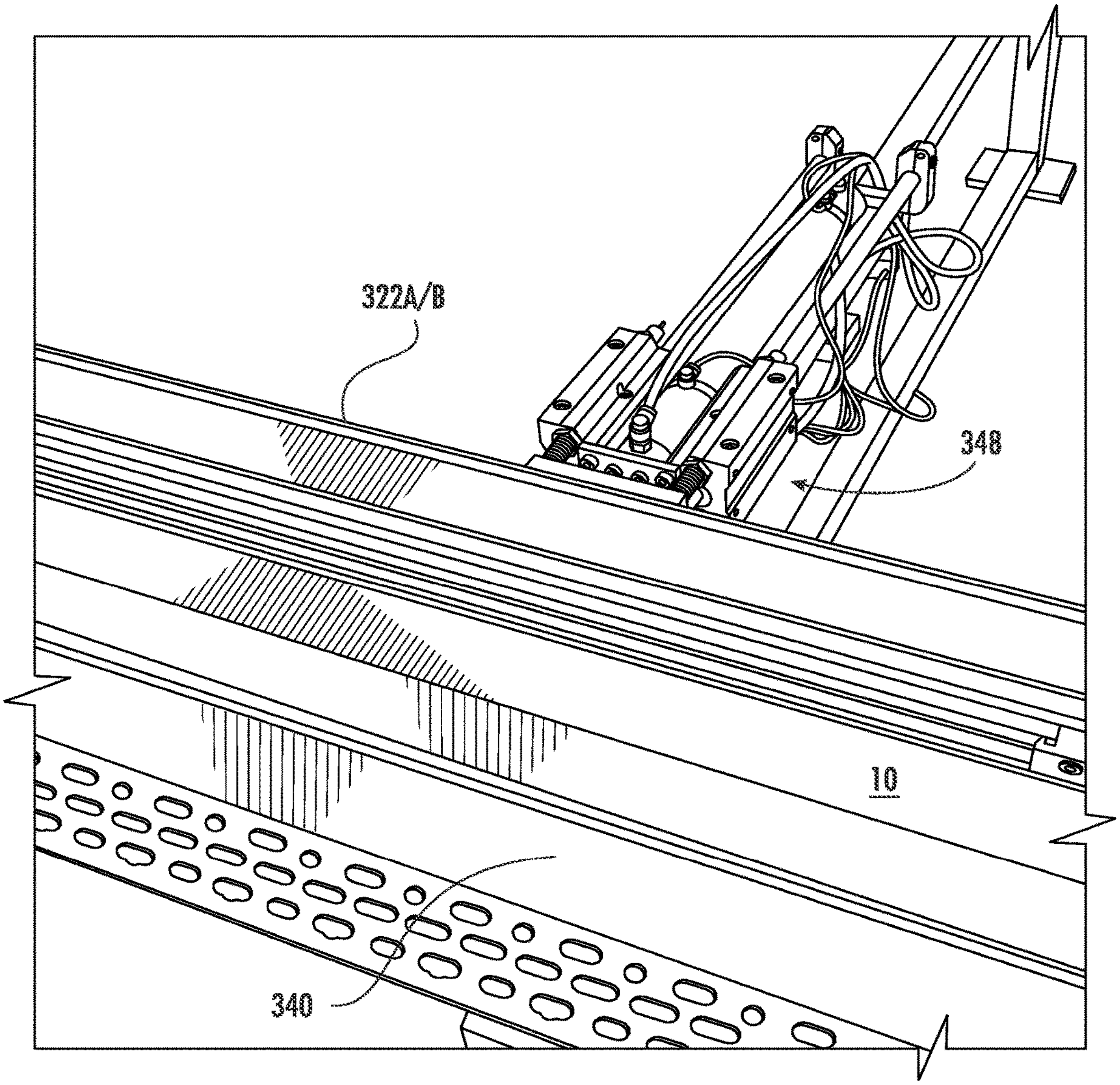
Figure 22B:
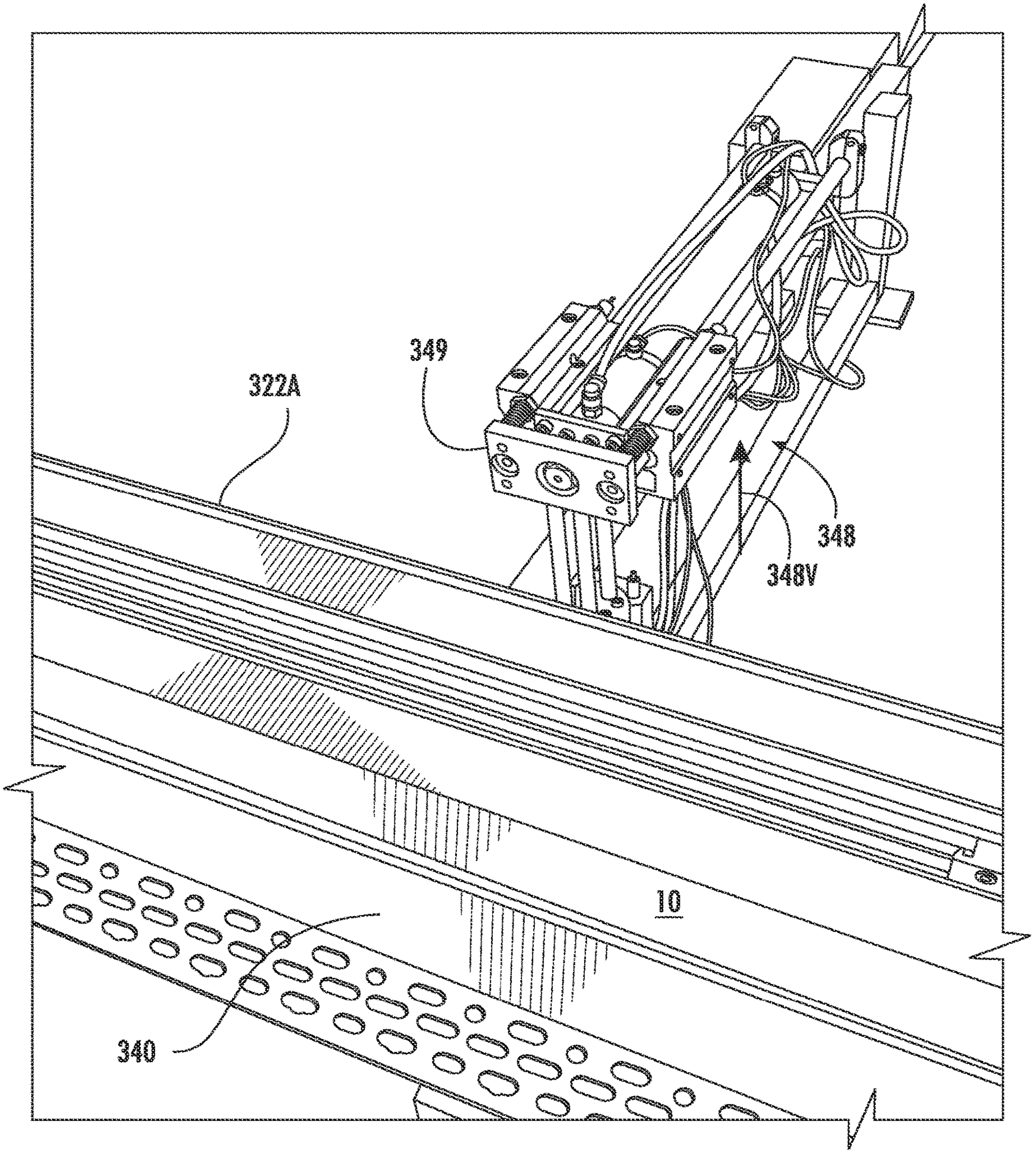
Figure 22C:
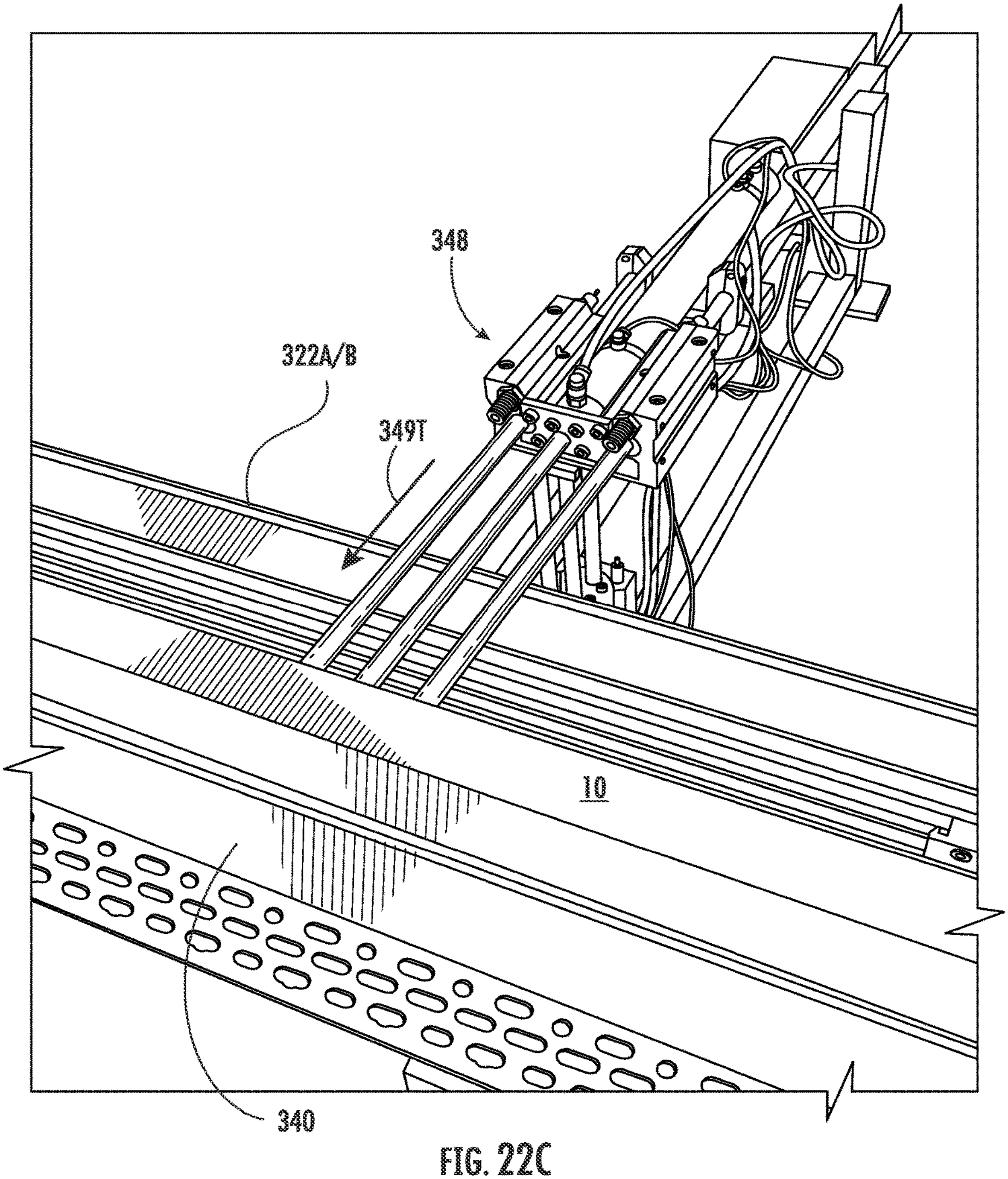

FIGS. 22A-C show an example embodiment of a lateral clamp of the main framing assembly station of FIG. 15 in various states of actuation.

Figure 23:
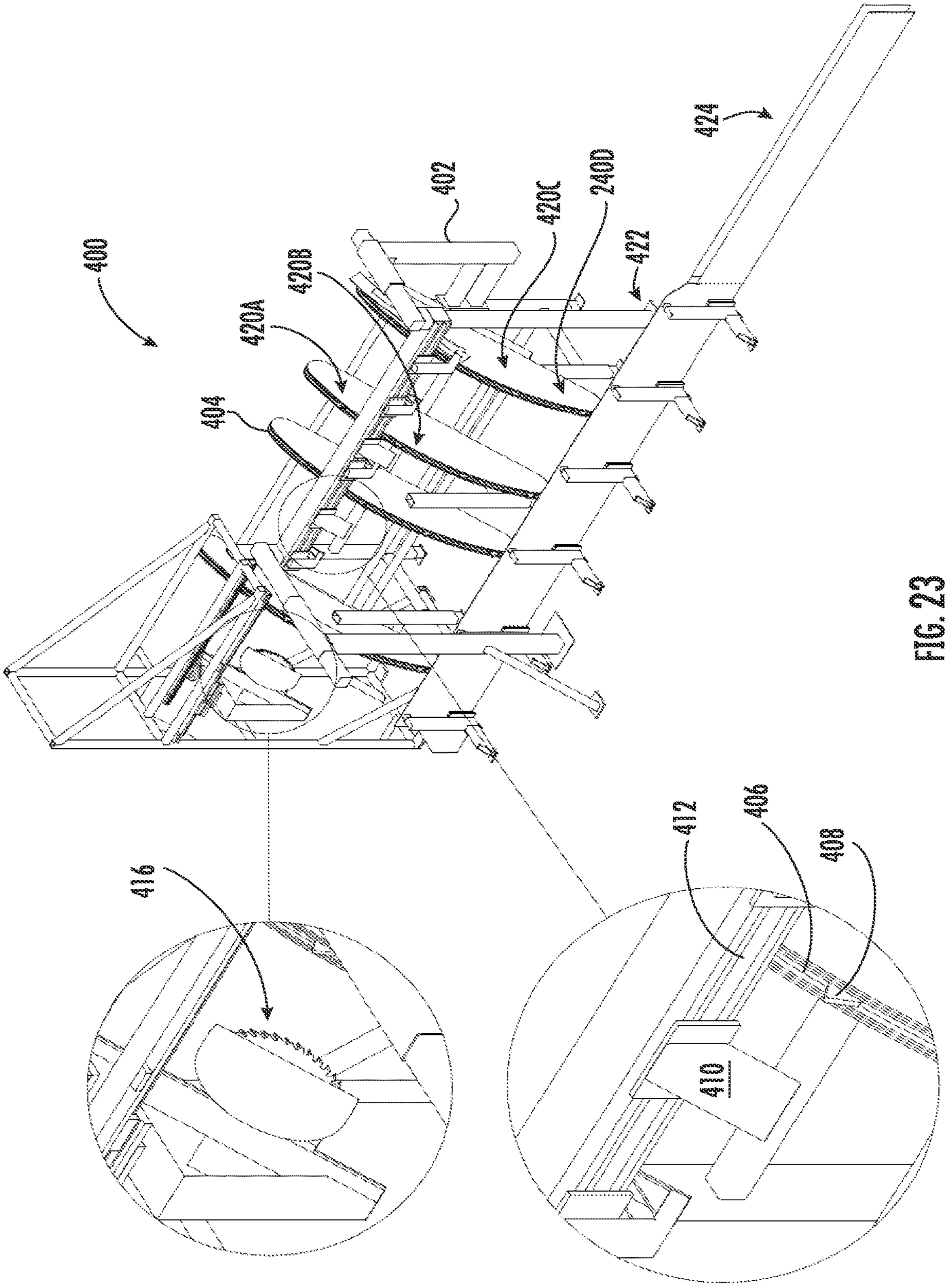
Figure 24A:
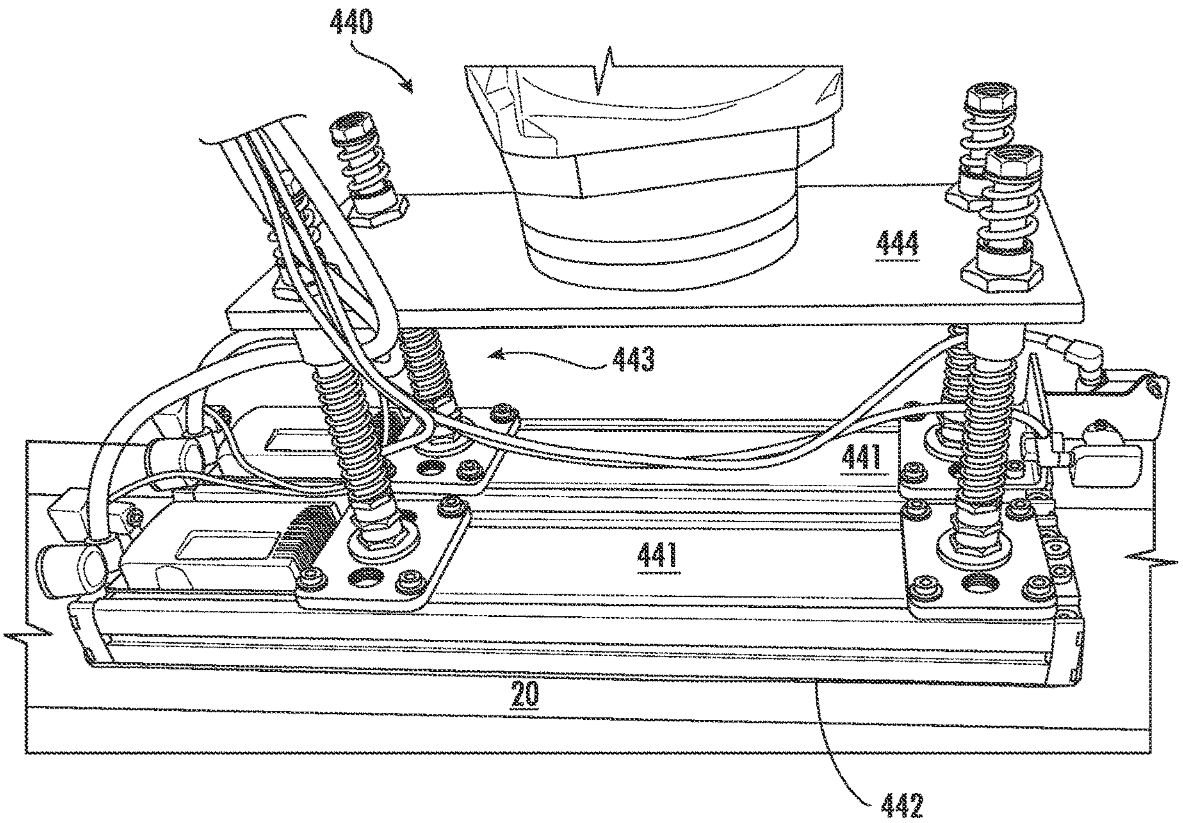
Figure 24B:
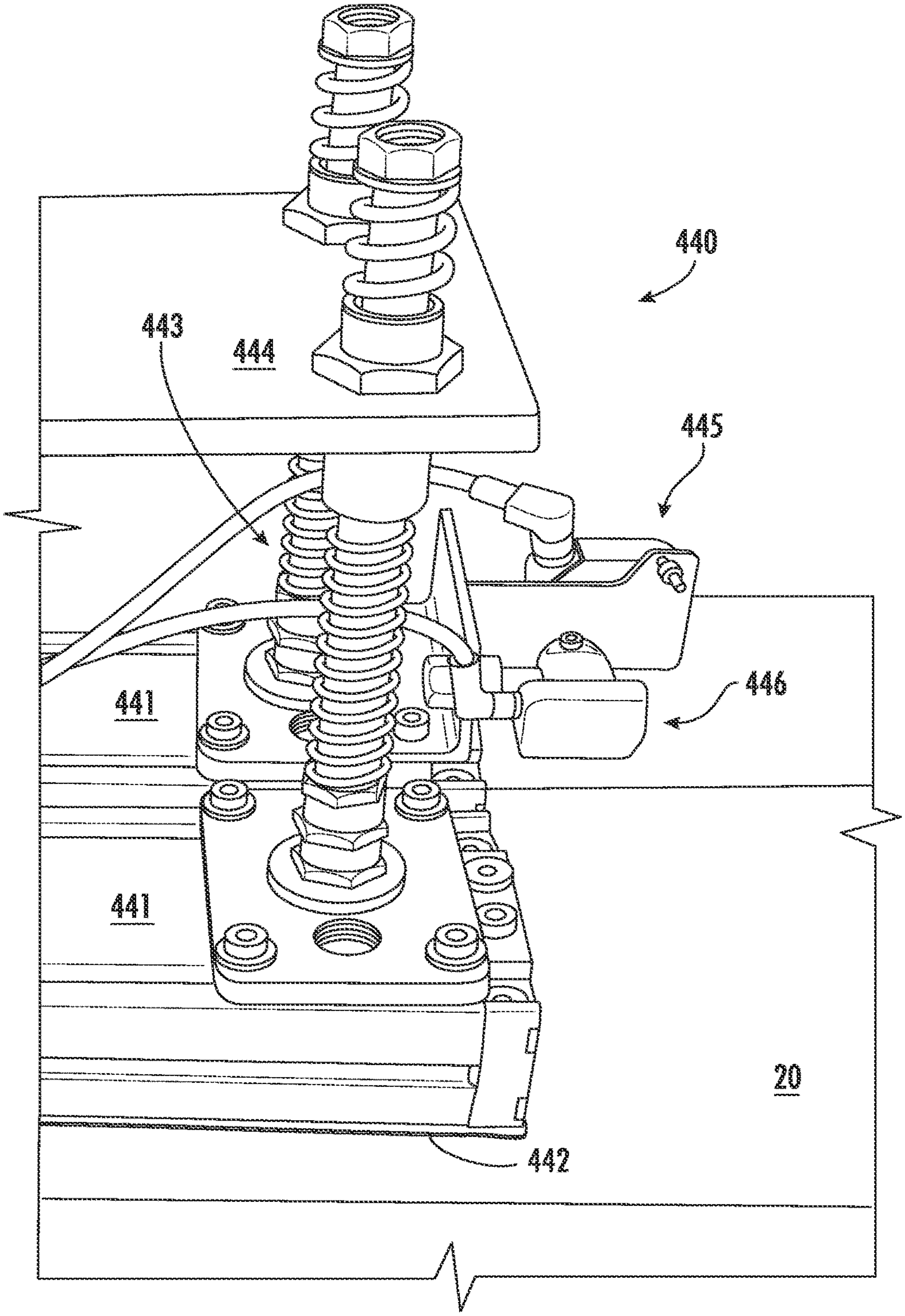
Figure 24C:
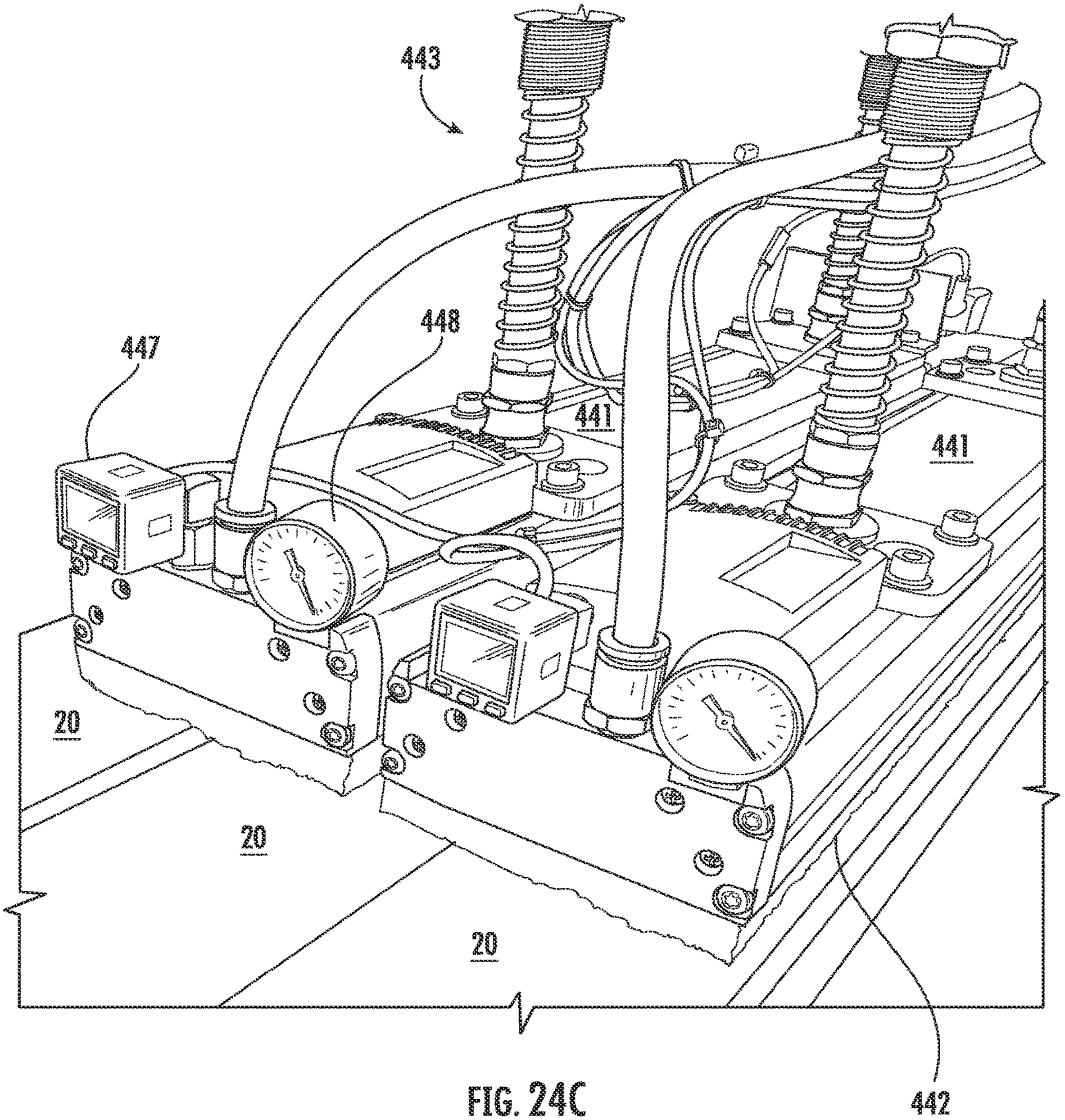
Figure 24D:
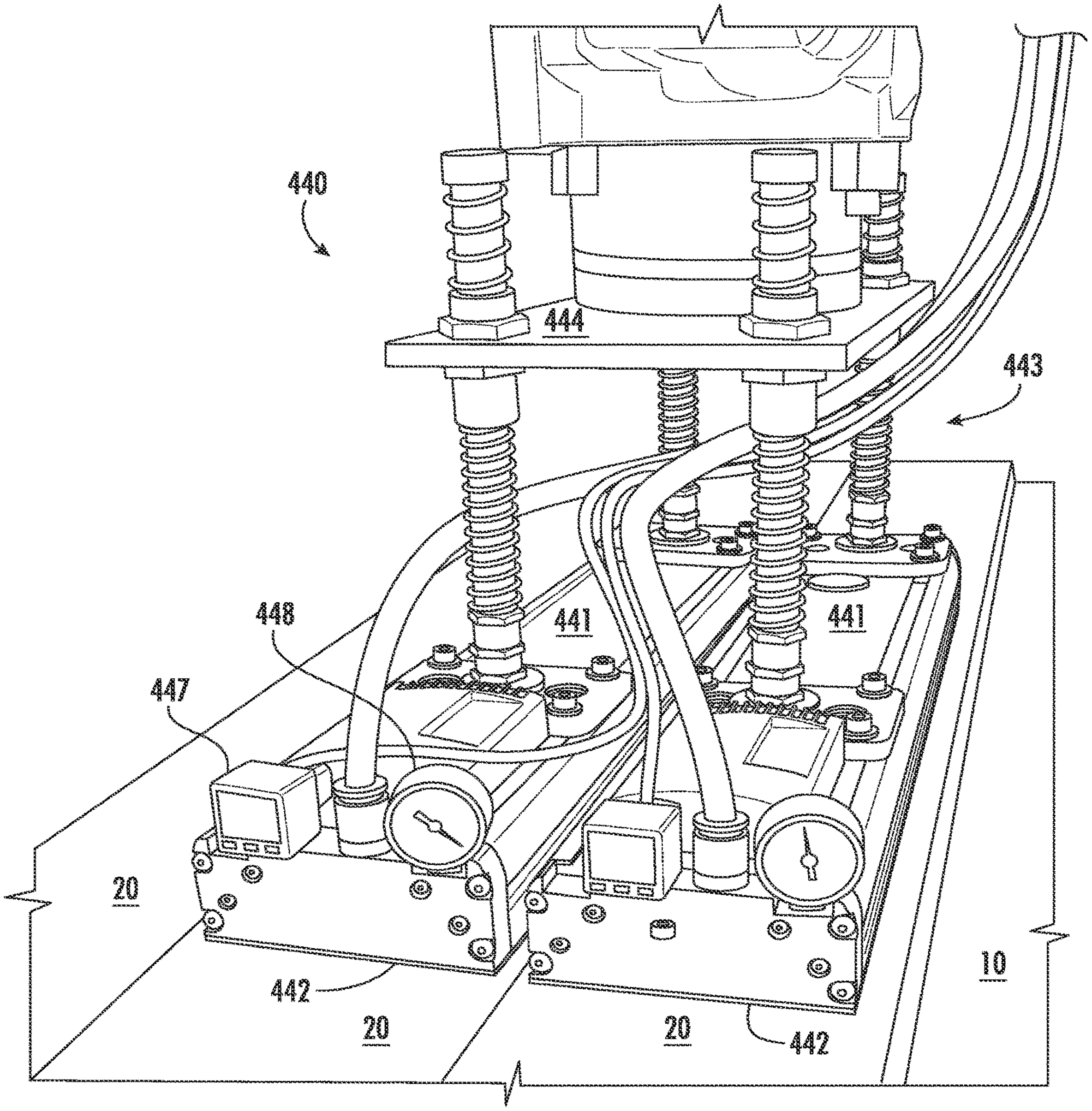

FIG. 23 is an isometric front view of an example embodiment of a cascade stager of the wall stud station of FIG. 15.

FIGS. 24A-D show various aspects and views of a gripper head of a loading robot of the wall stud station of FIG. 15.

Figure 25A:
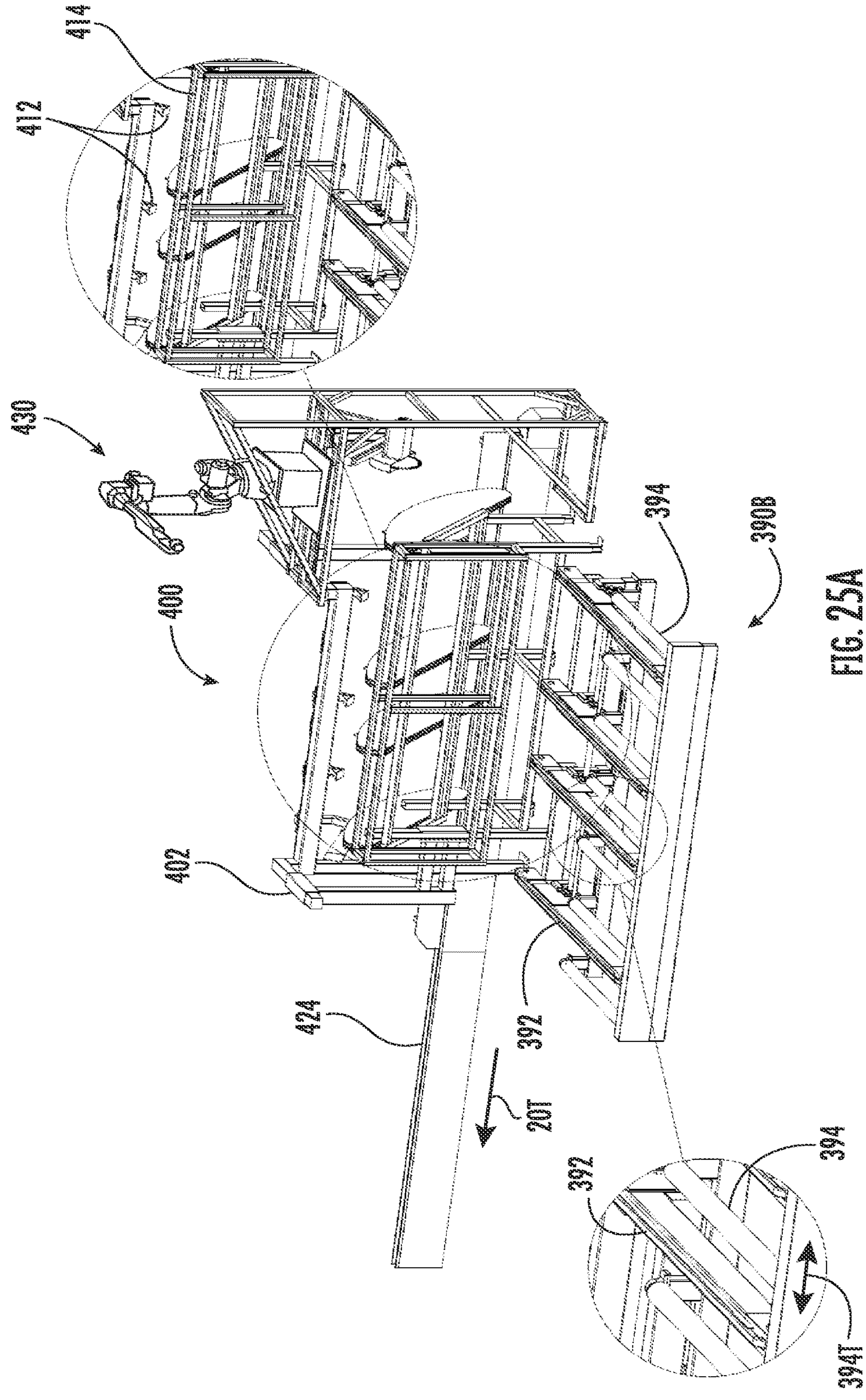

FIG. 25A is an isometric rear view of an example embodiment of a cascade stager of the wall stud station of FIG. 23.

Figure 25B:
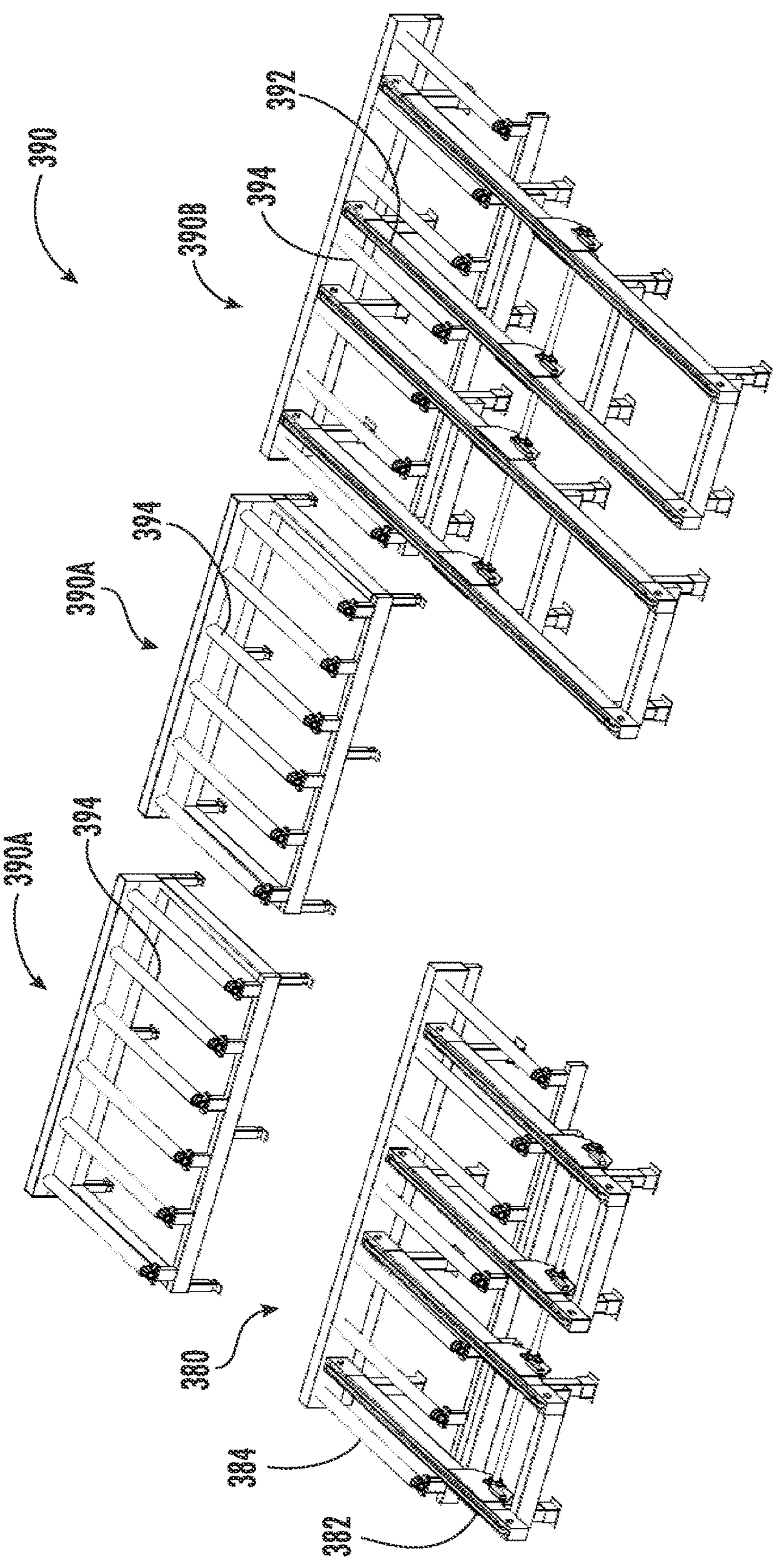

FIG. 25B is an isometric view of an example embodiment of a primary and auxiliary lumber supply station adjacent to the wall stud station of FIG. 23.

Figure 26:
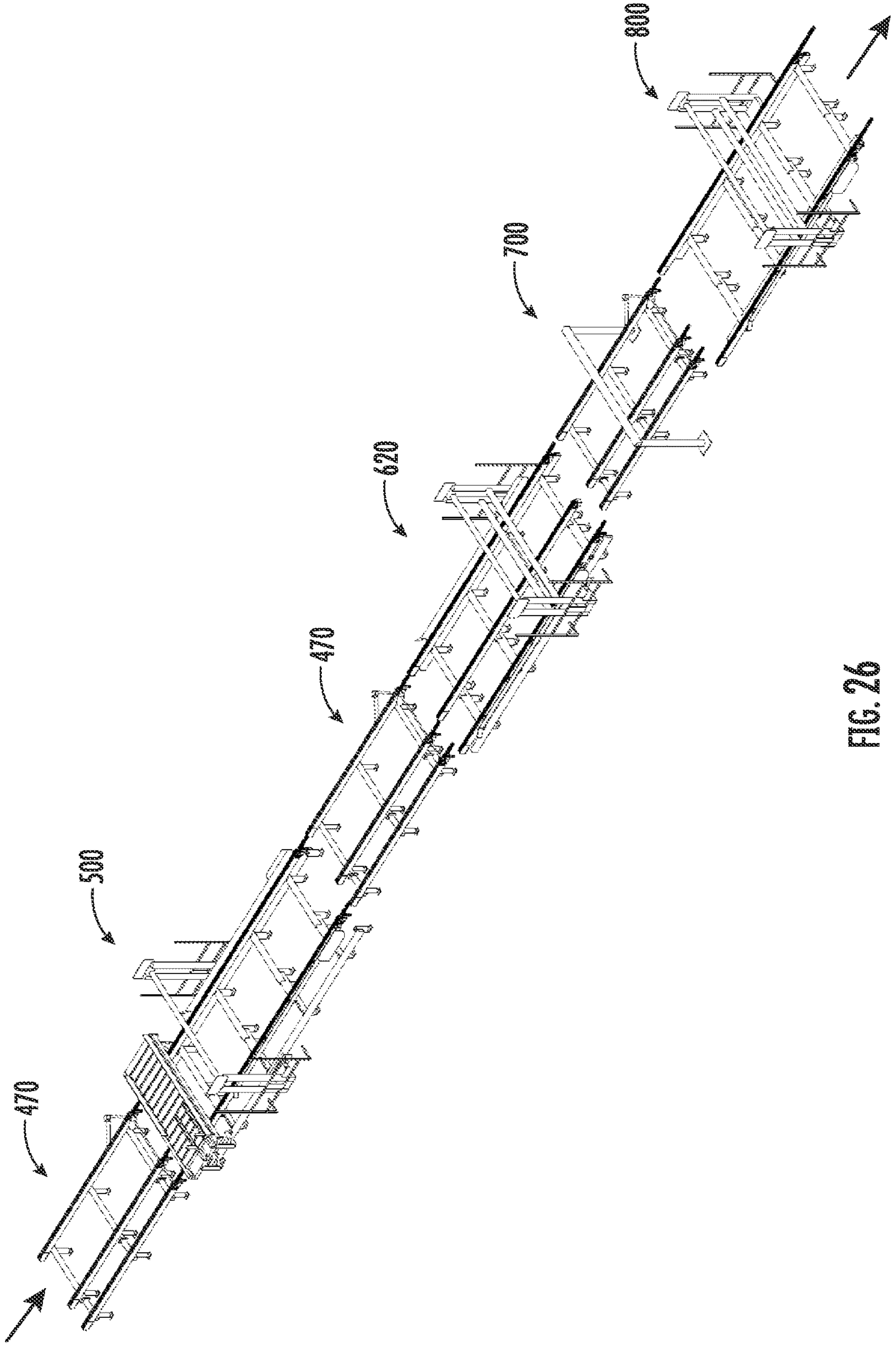

FIG. 26 is an isometric view of example embodiments of a plurality of QA/Buffer stations, one or more of which can be omitted in some embodiments, the sheathing station, the sheathing fastening station, the pre-drilling station, and the sawing/routing station shown schematically in FIG. 1.

Figure 27:
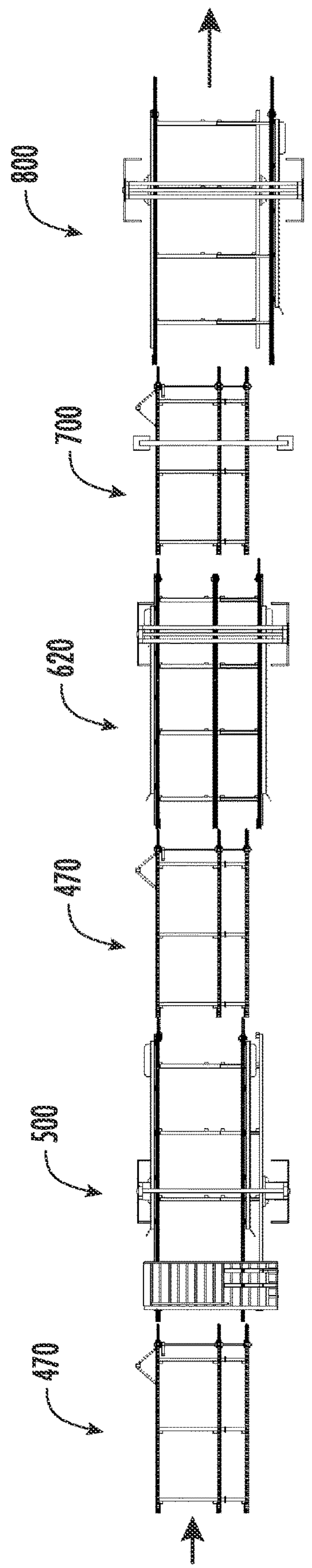

FIG. 27 is a top plan view of the QA/Buffer stations, the sheathing station, the sheathing fastening station, the pre-drilling station, and the sawing/routing station of FIG. 26.

Figure 28:
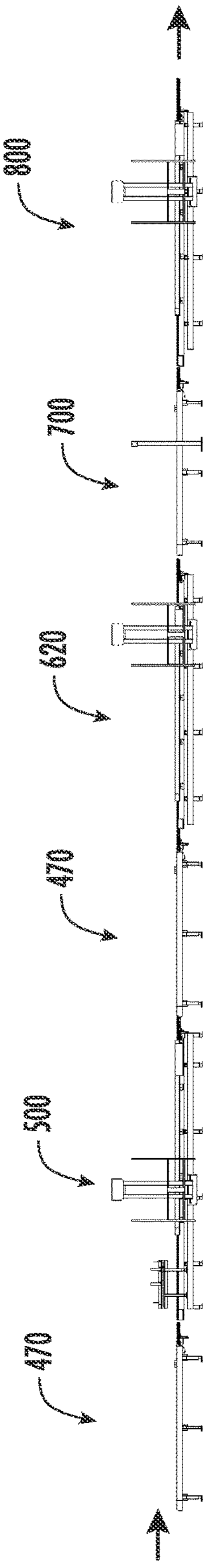

FIG. 28 is a side plan view of the QA/Buffer stations, the sheathing station, the sheathing fastening station, the pre-drilling station, and the sawing/routing station of FIG. 26.

Figure 29:
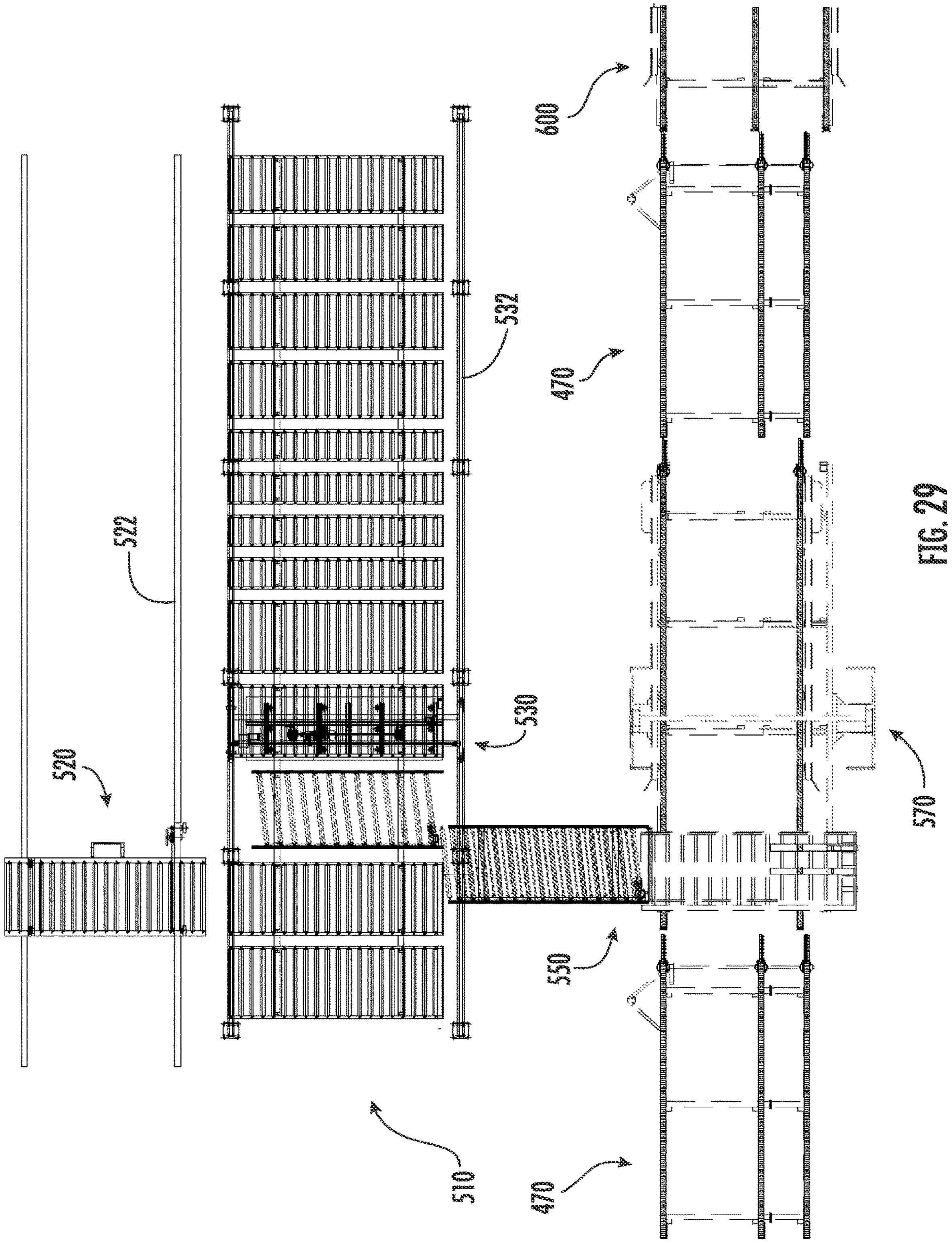

FIG. 29 is a top plan view of an example embodiment of the sheathing station shown schematically in FIG. 1.

Figure 30:
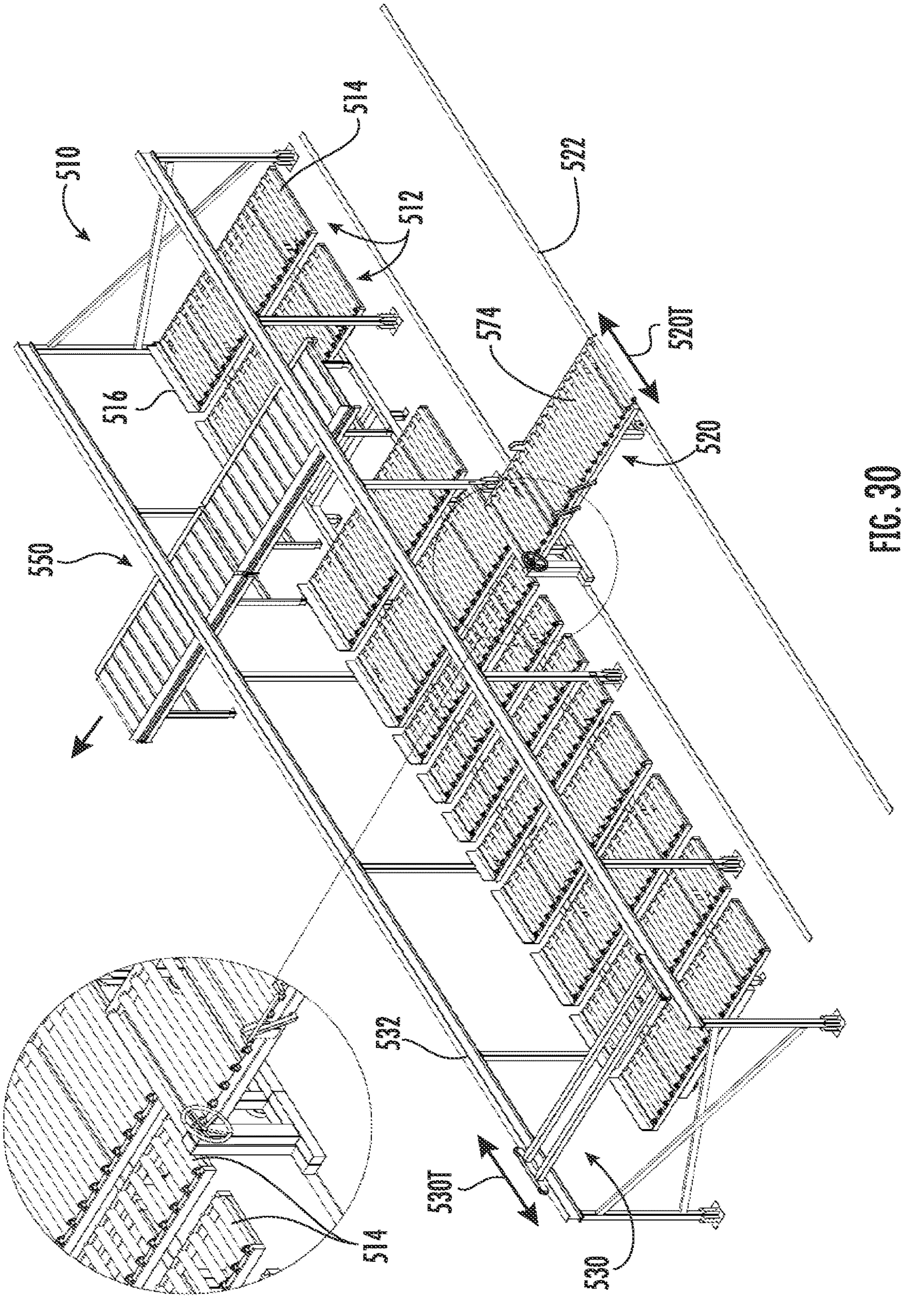

FIG. 30 is an isolated isometric view of a staging area of the sheathing station of FIG. 29, this staging area being where the sheathing is loaded adjacent to the sheathing station for being transferred onto a conveyor to be installed on the wall frame.

Figure 31:
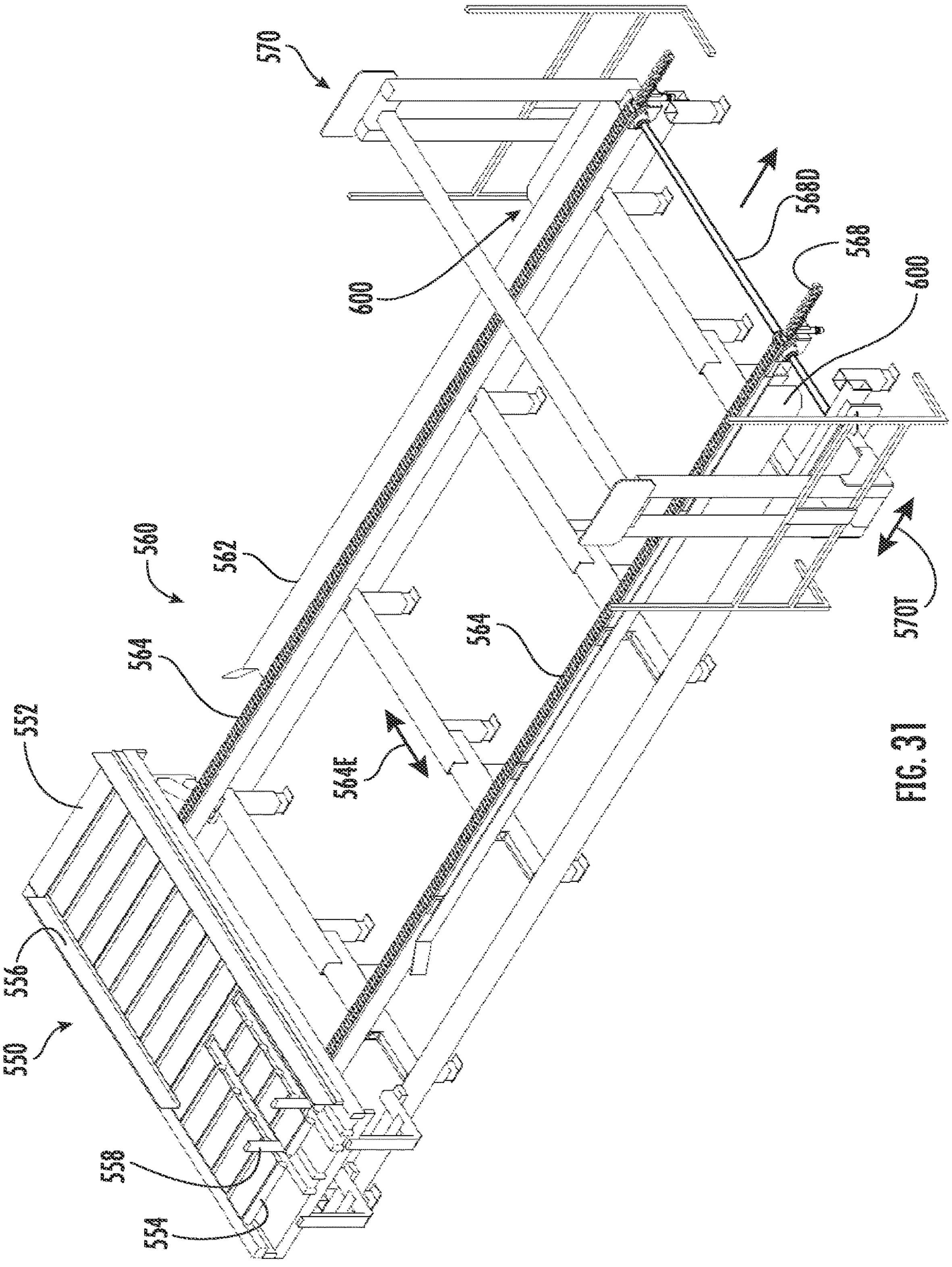

FIG. 31 is an isolated isometric view of a placement area of the sheathing station of FIG. 29, this placement area being where the sheathing is placed on, and at least temporarily fastened to, the wall frame.

Figure 32:
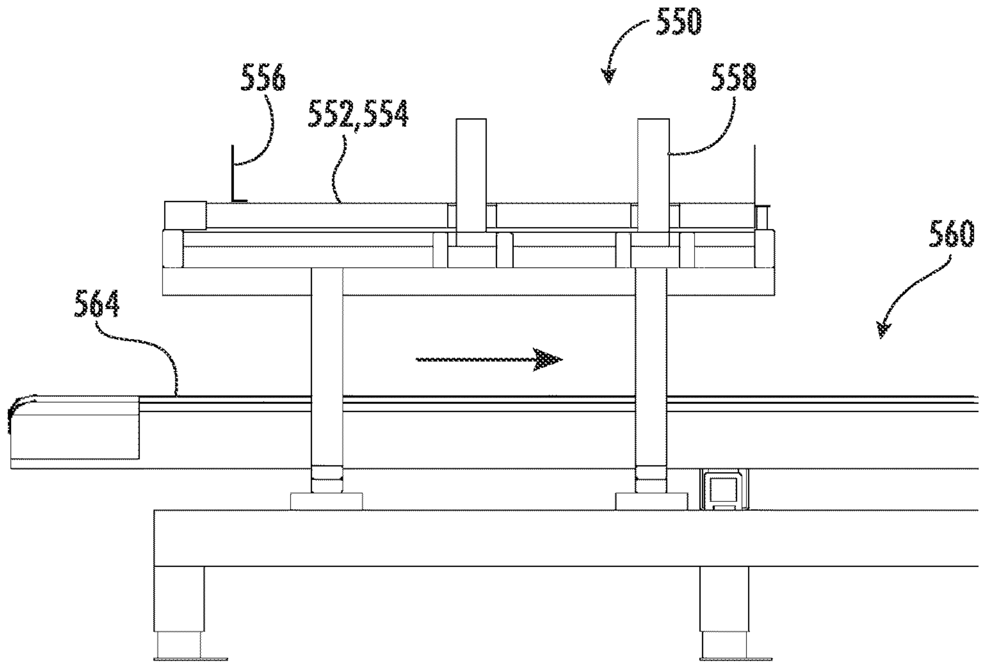

FIG. 32 is an isolated side plan view of a portion of the sheathing station of FIG. 29, this portion showing a sheathing conveyor over a transport path of the sheathing station, on which the wall frame moves through the main framing assembly station.

Figure 33:
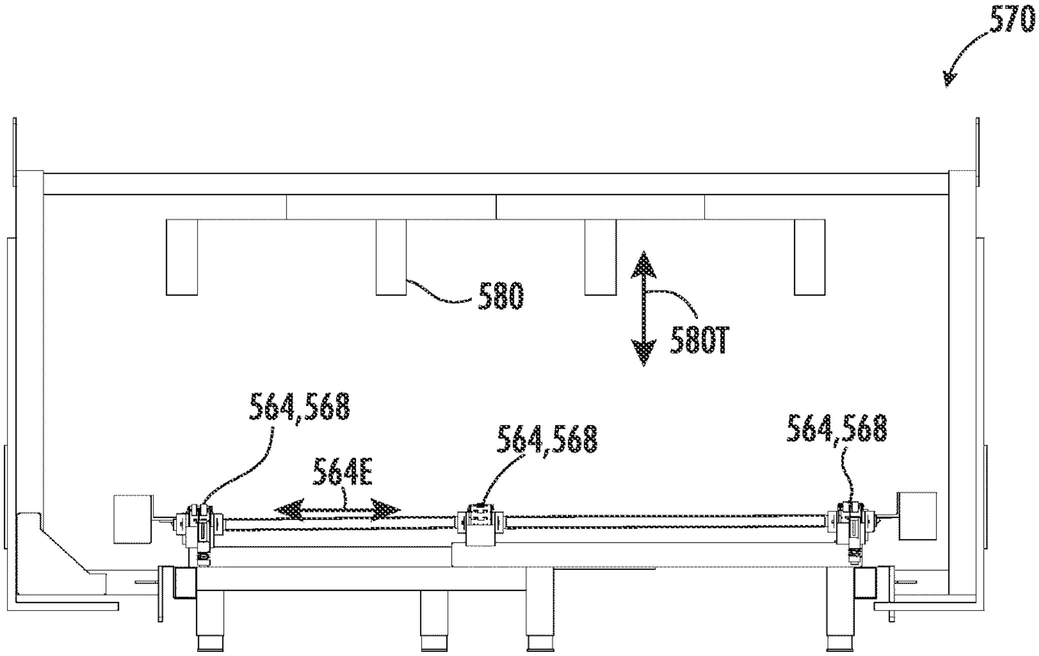

FIG. 33 is a partial front plan view of a portion of the sheathing station of FIG. 29, omitting the sheathing conveyor in this view.

Figure 34:
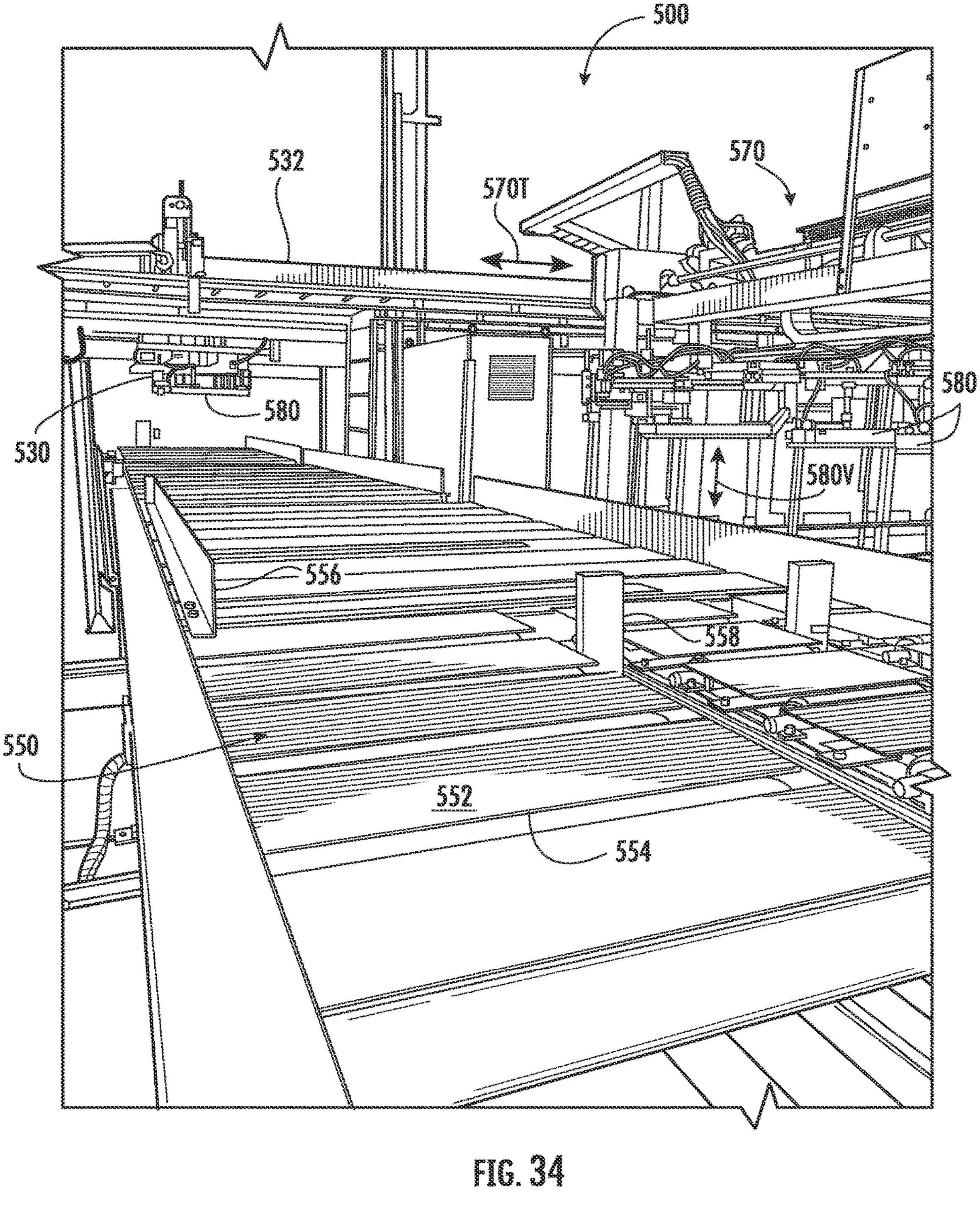

FIG. 34 is an isometric view of an example embodiment of the sheathing conveyor of the sheathing station of FIG. 29.

Figure 35:
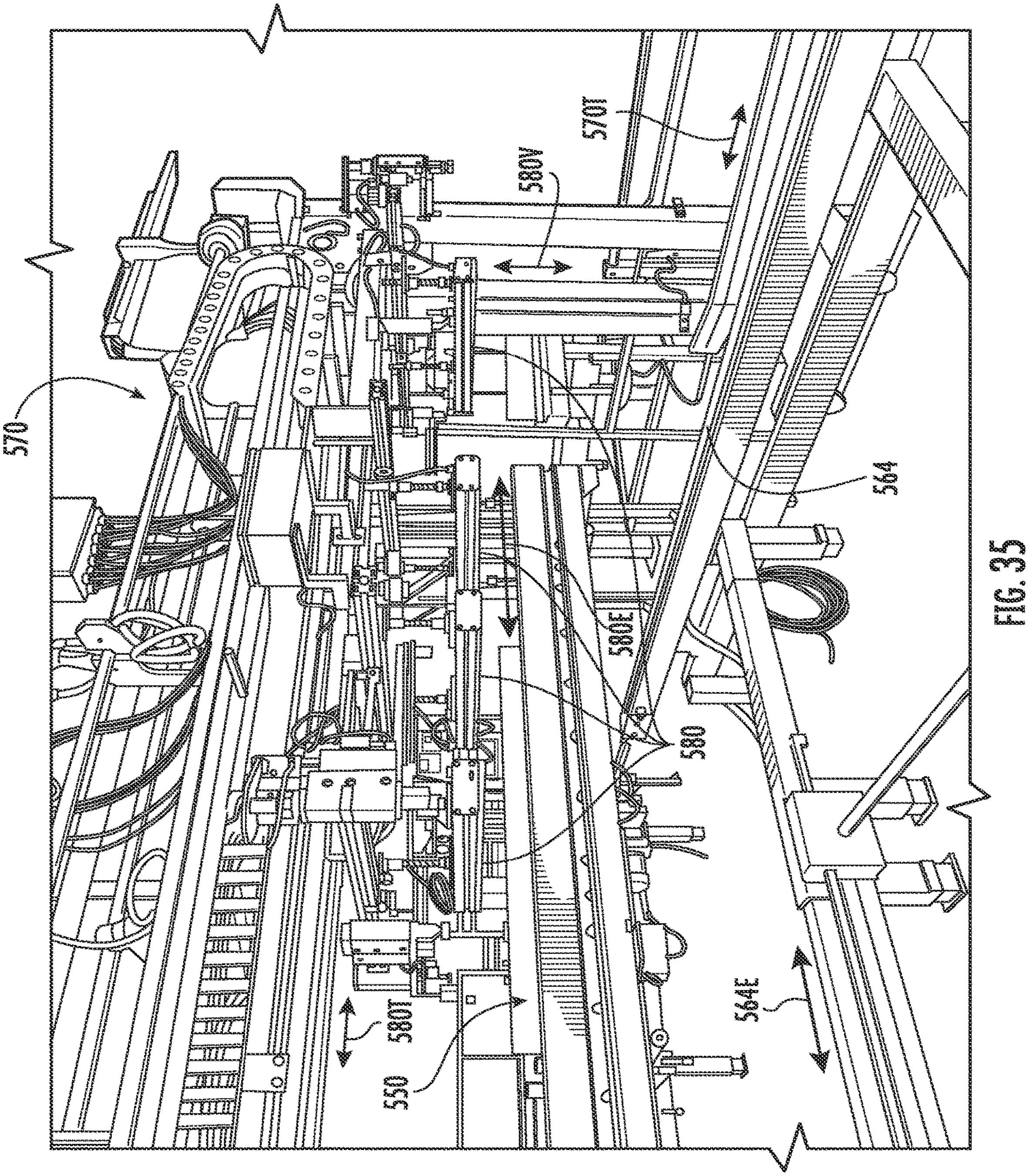
Figure 36:
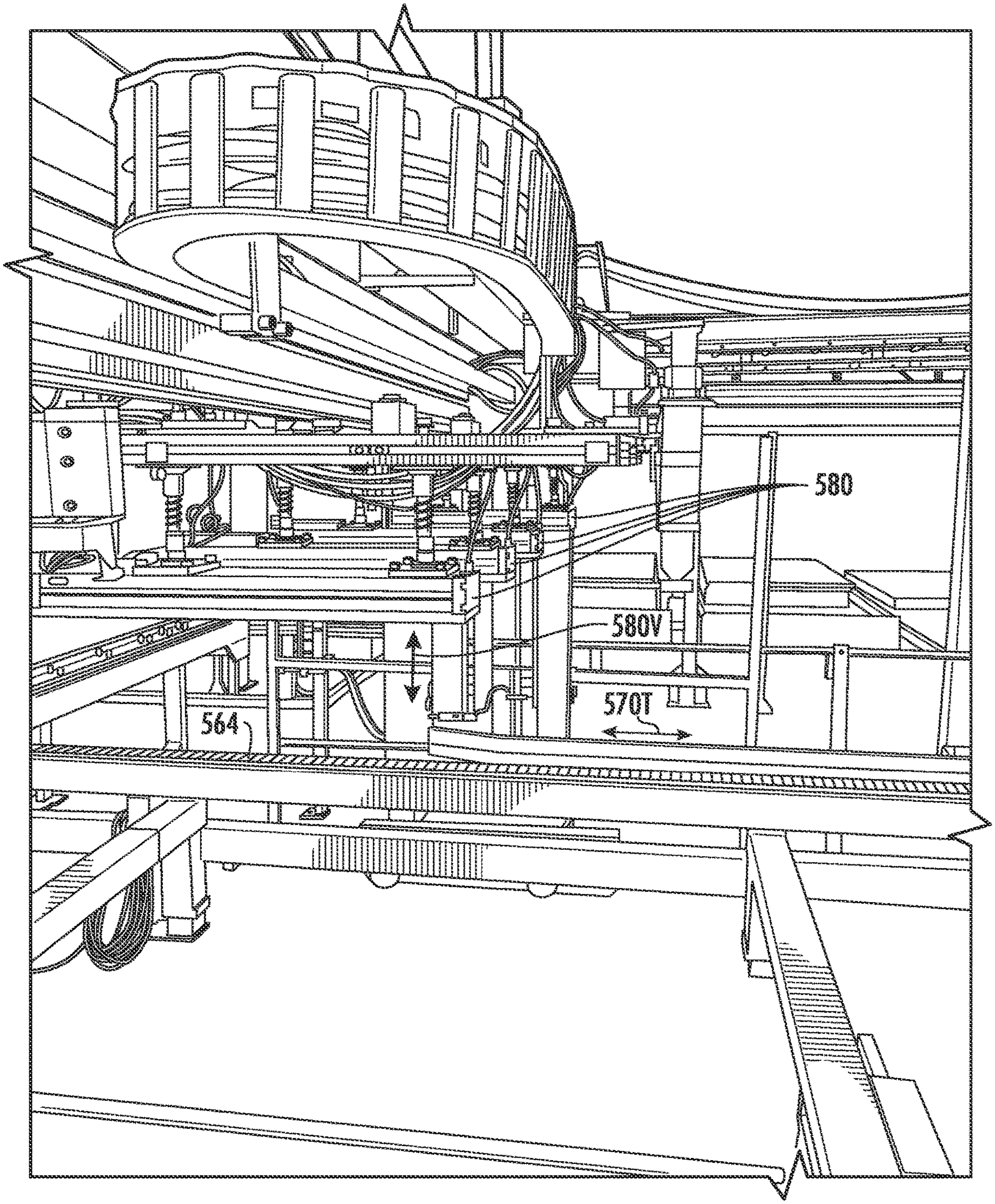

FIGS. 35 and 36 are respective views of an example embodiment of both the sheathing conveyor and the sheathing transport and placement apparatus of the sheathing station of FIG. 29.

Figure 37A:
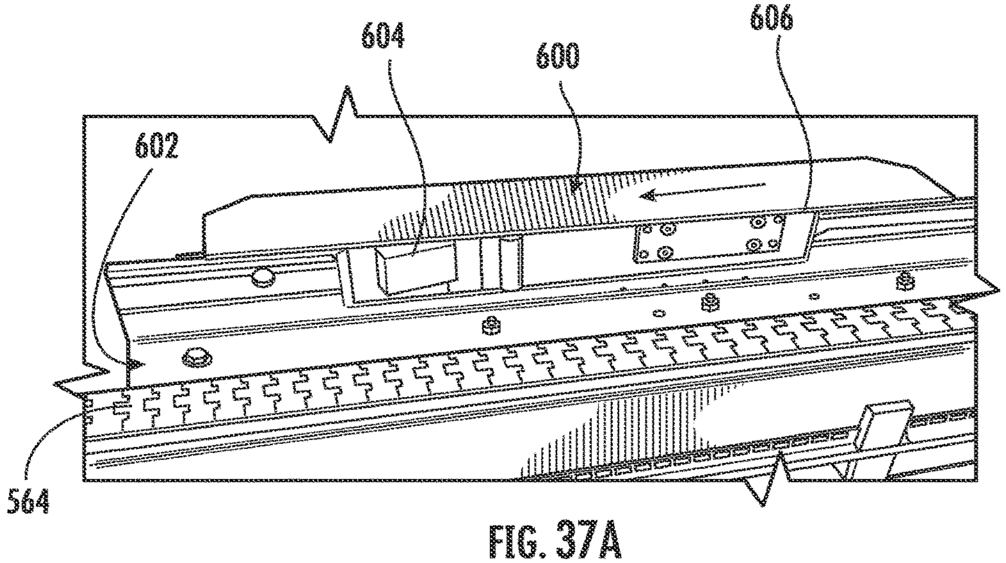
Figure 37B:
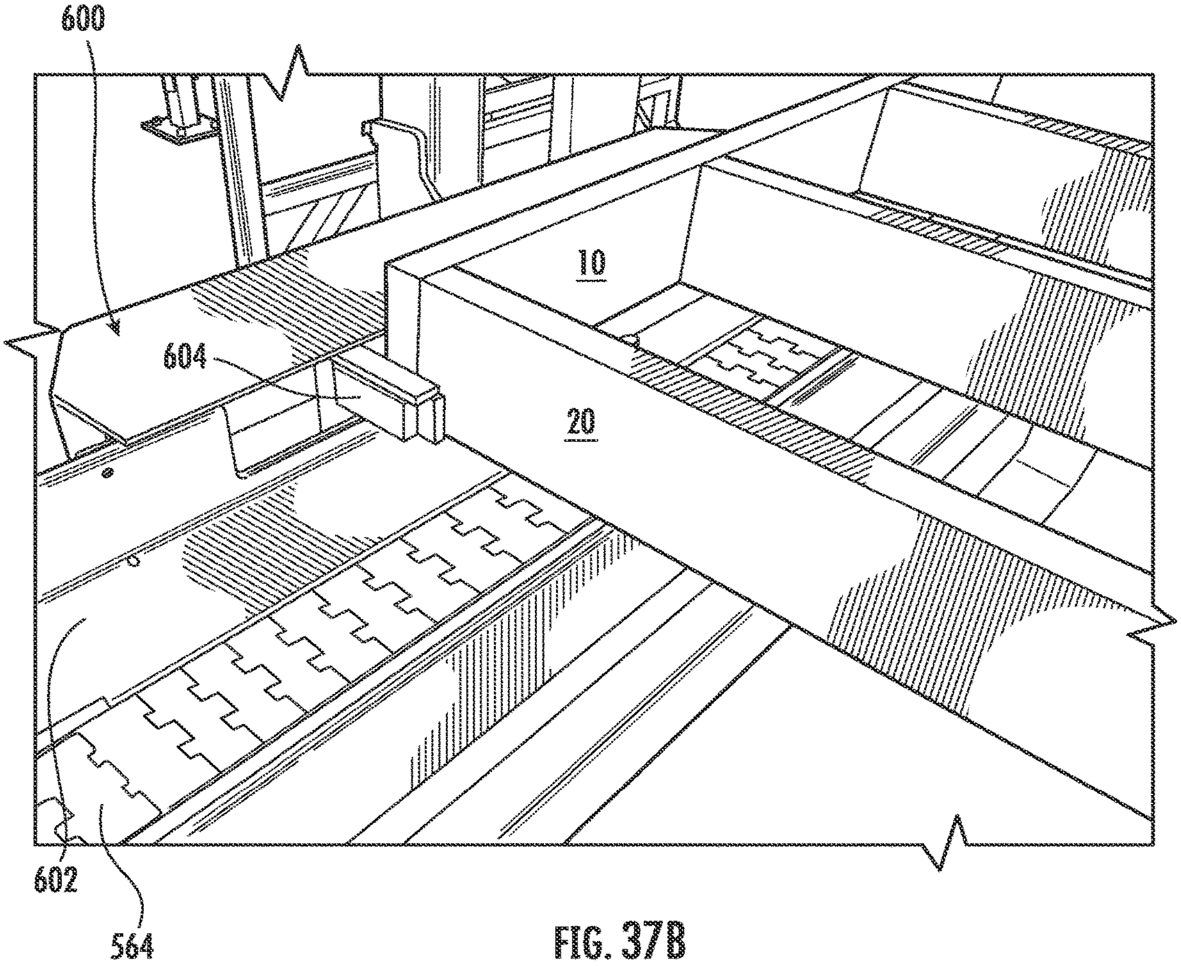

FIGS. 37A and 37B are isometric views of squaring stations that can be installed at one or more of the sheathing station, the sheathing fastening station, the pre-drilling station, the sawing/routing station, the drywall installation station, the drywall mud/tape station, and the wall covering station shown schematically in FIG. 1, FIGS. 34A and 34B shown the squaring stations in retracted and actuated positions, respectively.

Figure 38:
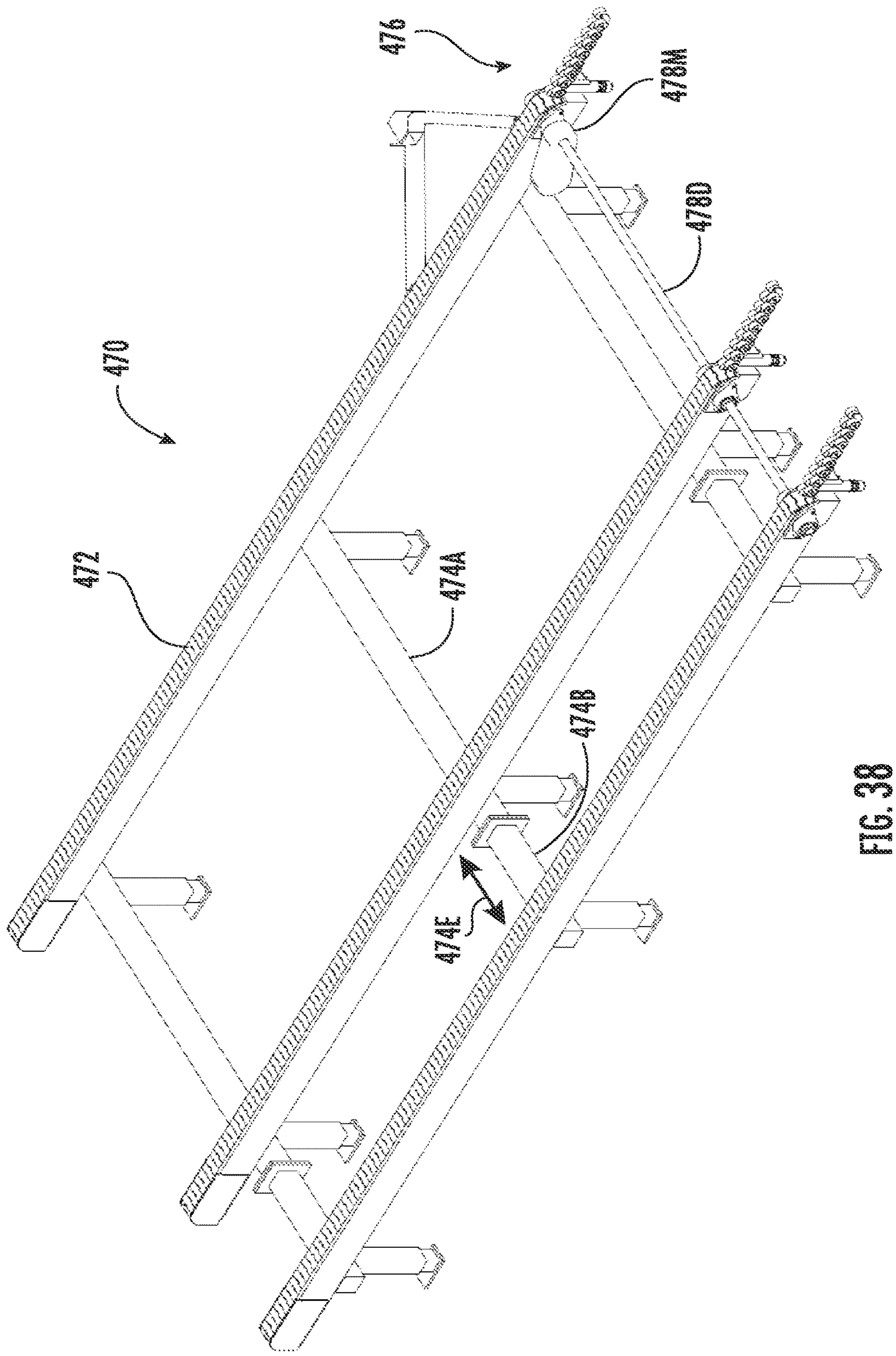

FIG. 38 is an isometric view of an example embodiment of a quality assurance (QA) and/or buffer station, any number of which can be placed between adjacent wall assembly stations, as needed.

Figure 39:
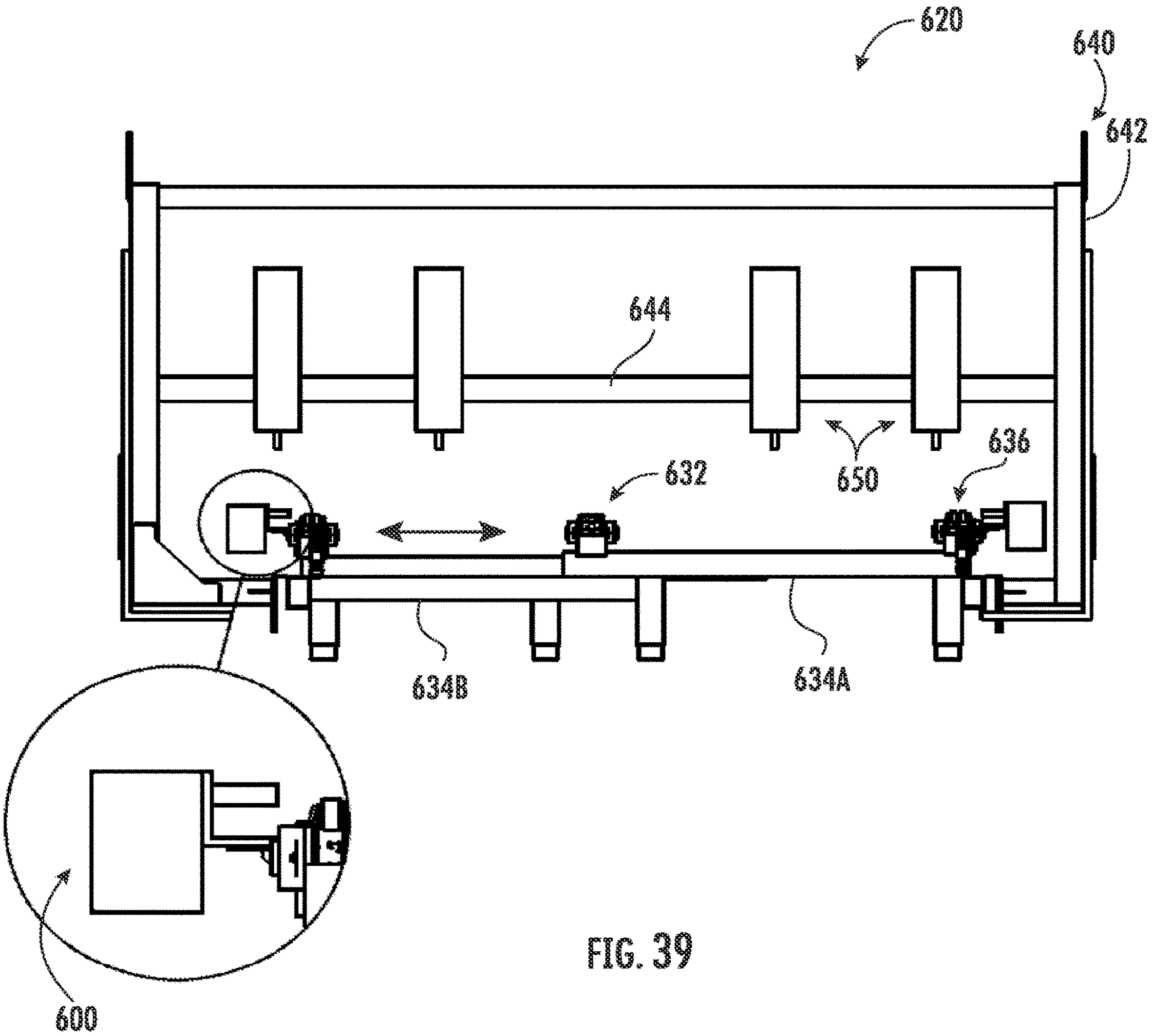

FIG. 39 is a front plan view of an example embodiment of the sheathing fastening station shown schematically in FIG. 1.

Figure 40:
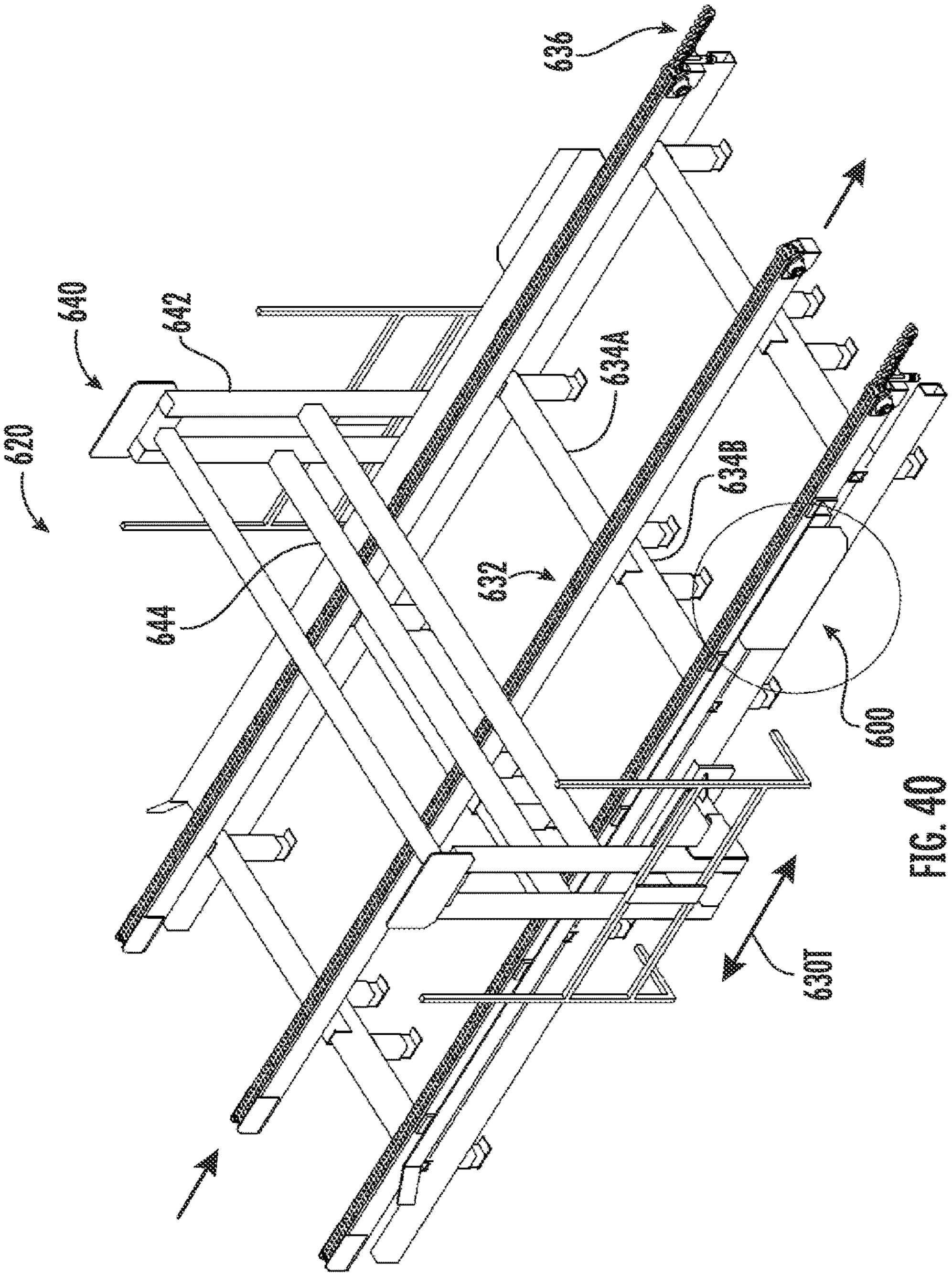

FIG. 40 is an isometric view of the example embodiment of the sheathing fastening station shown in FIG. 36.

Figure 41:
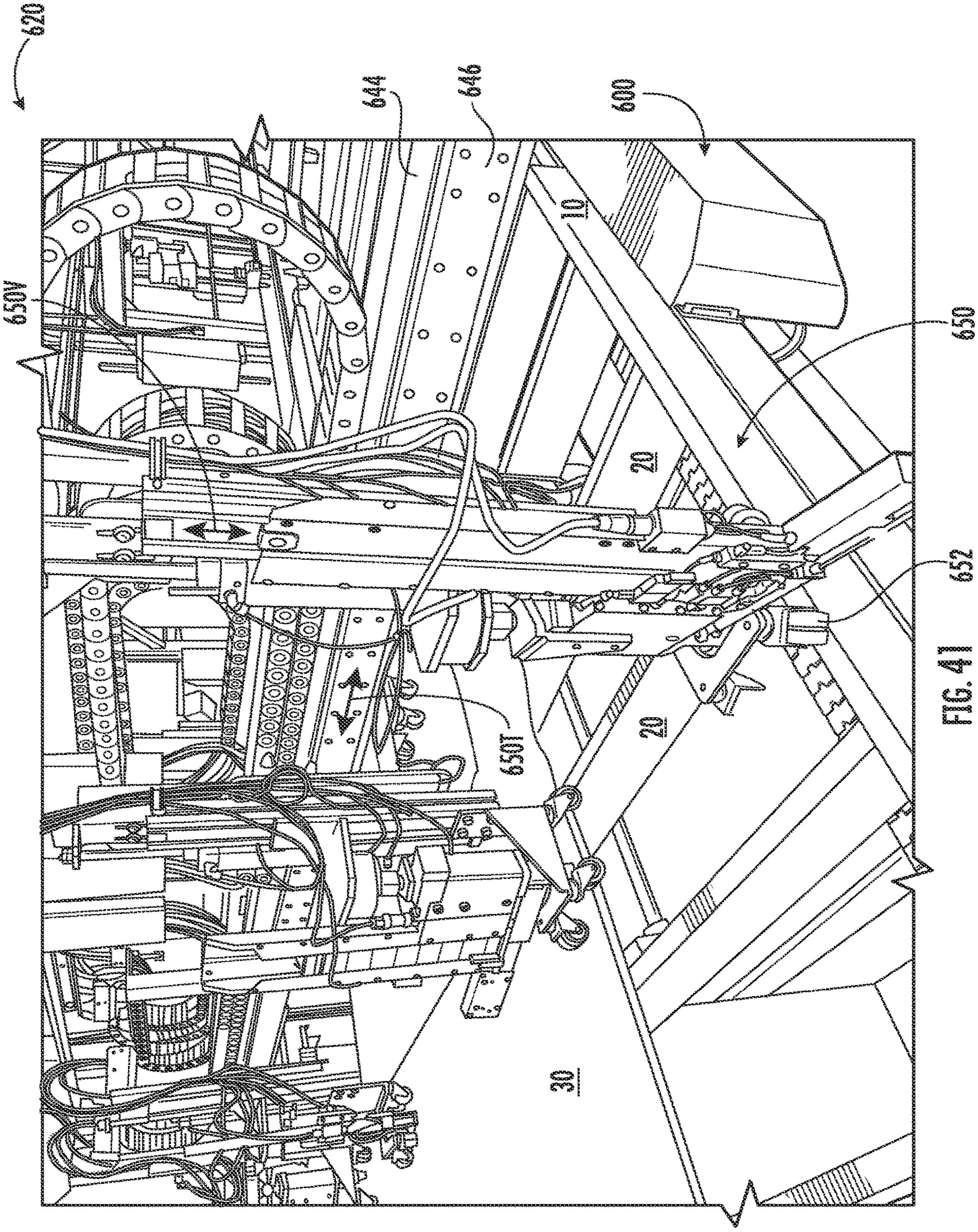

FIG. 41 is an isometric view of the sheathing fastening station shown in FIGS. 39 and 40.

Figure 42:
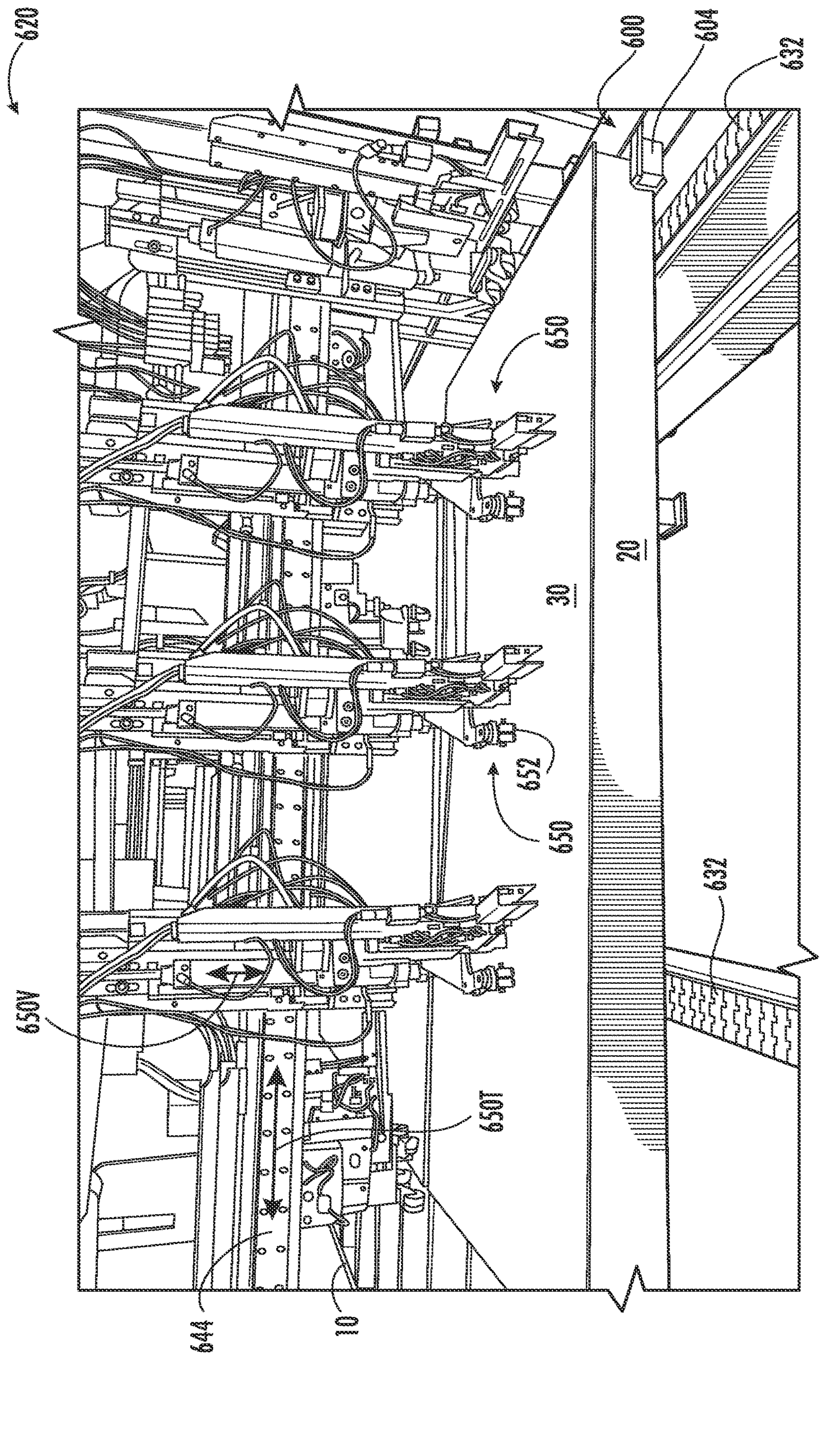

FIG. 42 is front elevated view of the sheathing fastening station shown in FIGS. 39-41.

Figure 43:
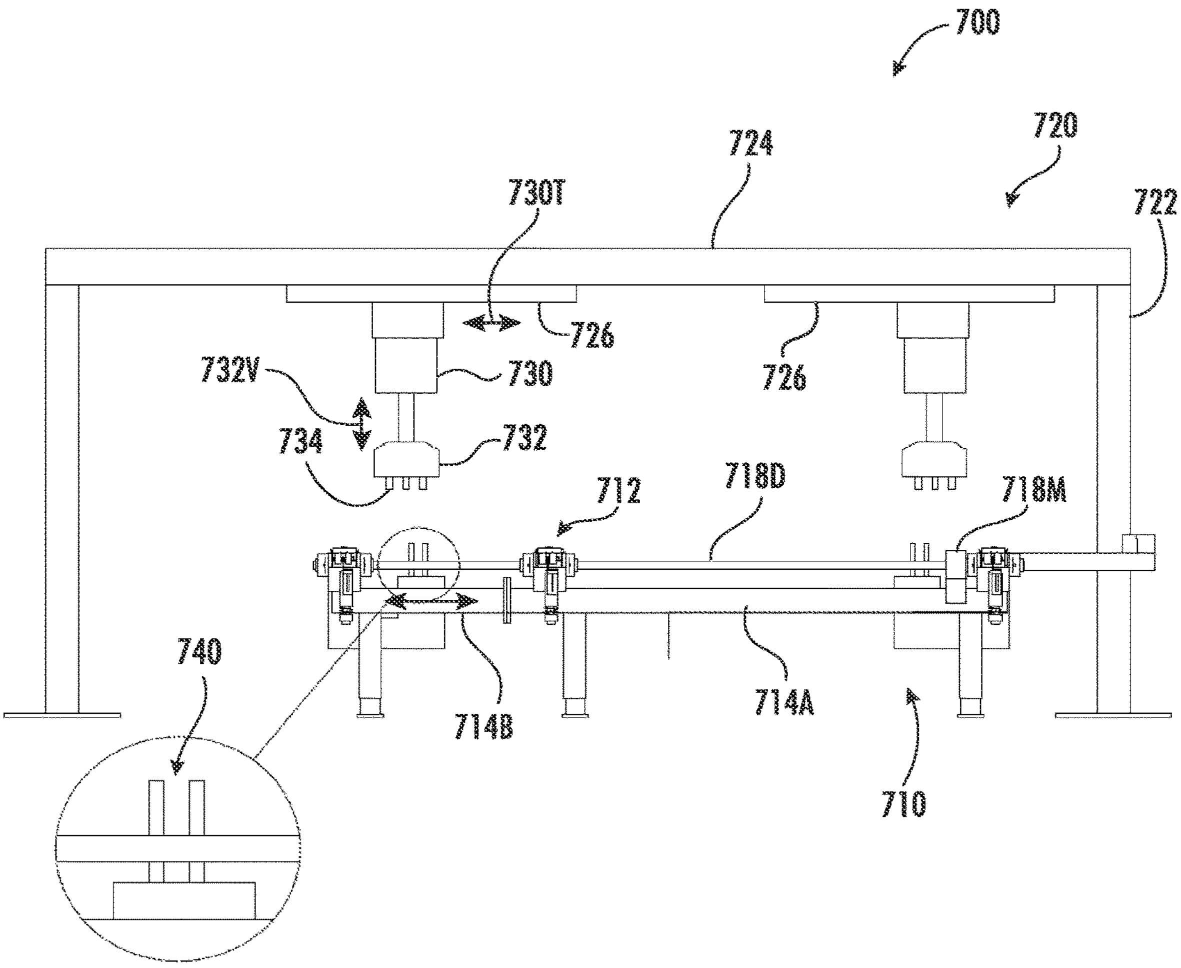

FIG. 43 is a front plan view of an example embodiment of the pre-drilling station shown schematically in FIG. 1.

Figure 44:
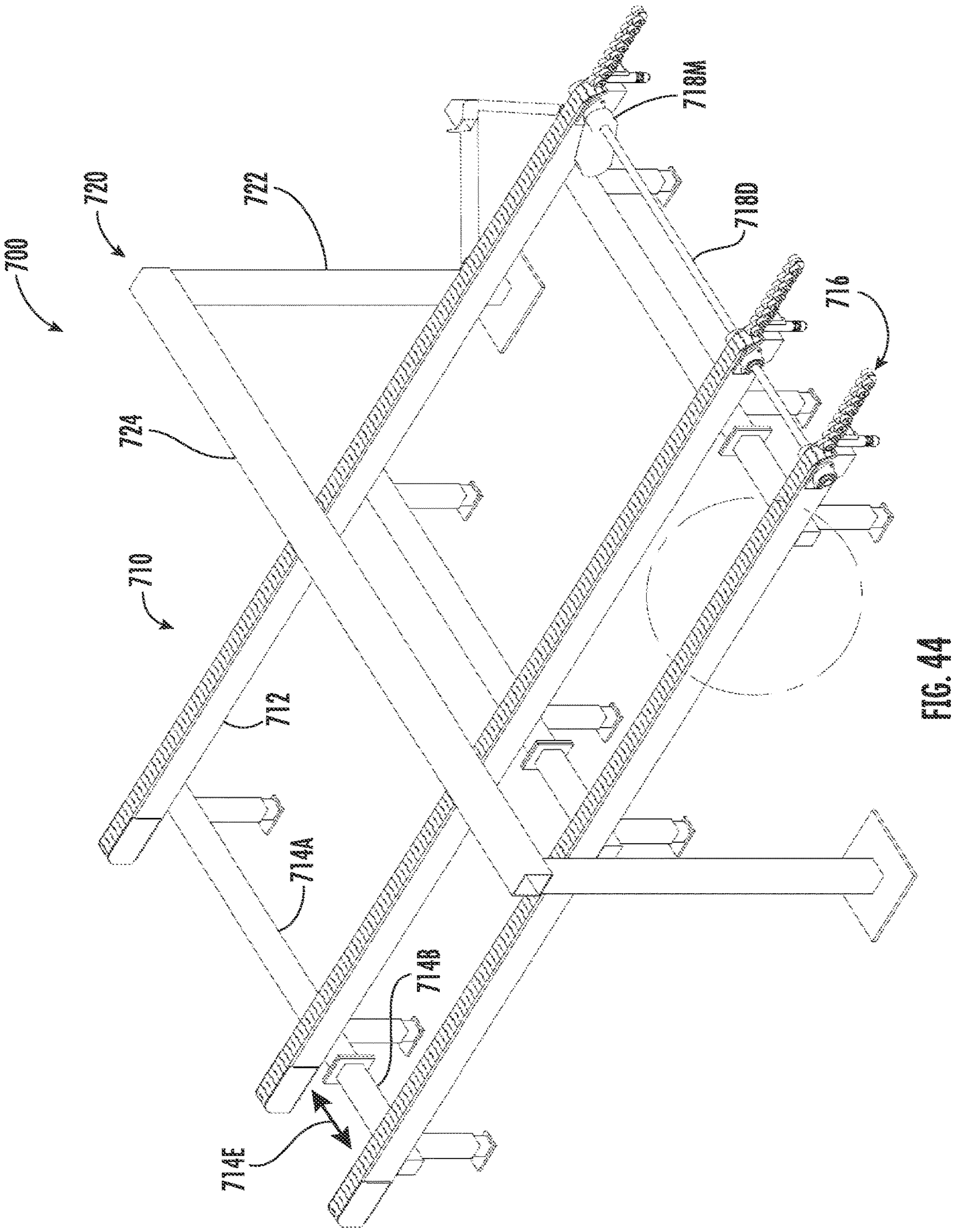

FIG. 44 is an isometric view of the example embodiment of the pre-drilling station shown in FIG. 40.

Figure 45:
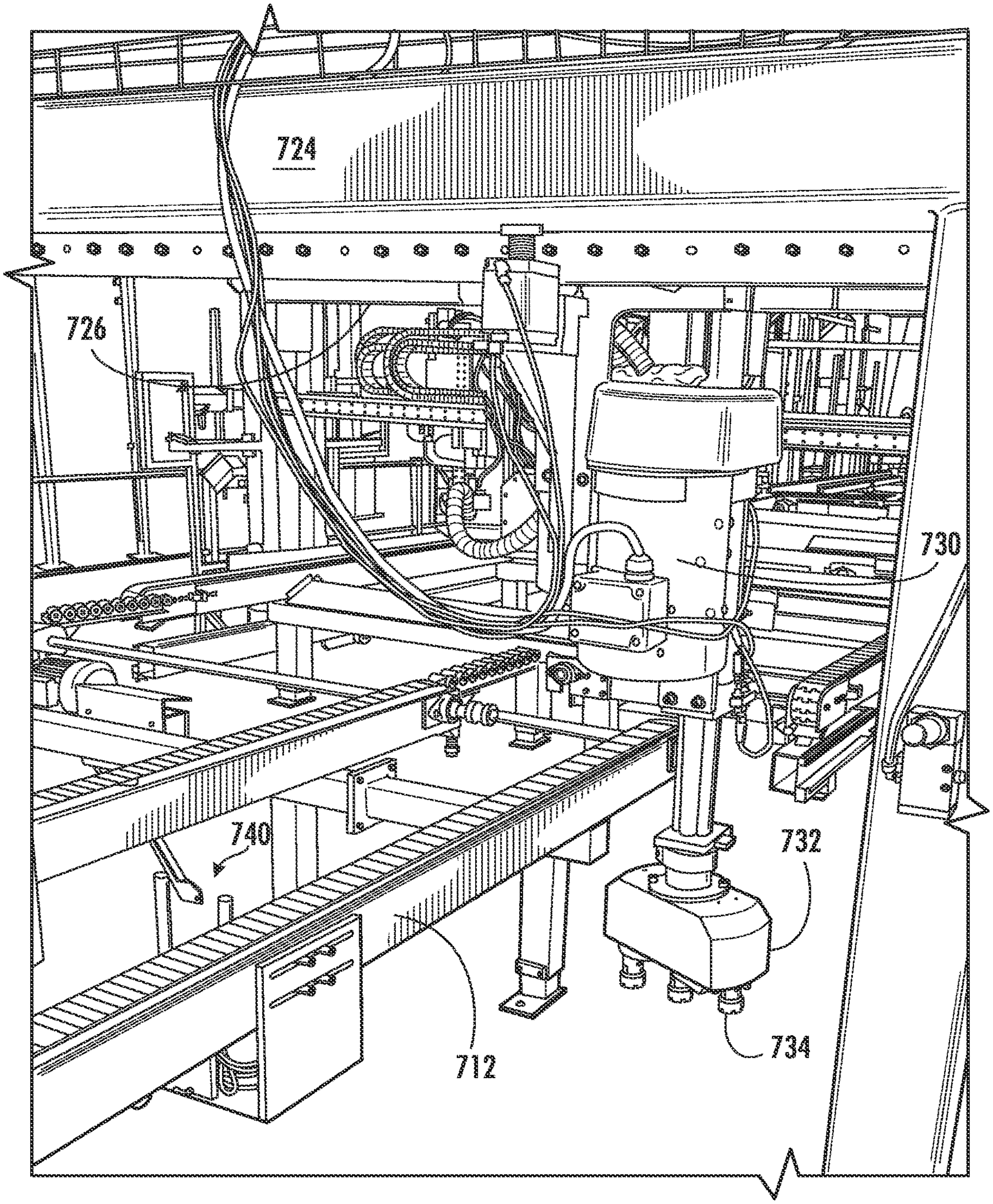

FIG. 45 is an isometric partial view of some aspects of the pre-drilling station shown in FIGS. 43 and 44.

Figure 46:
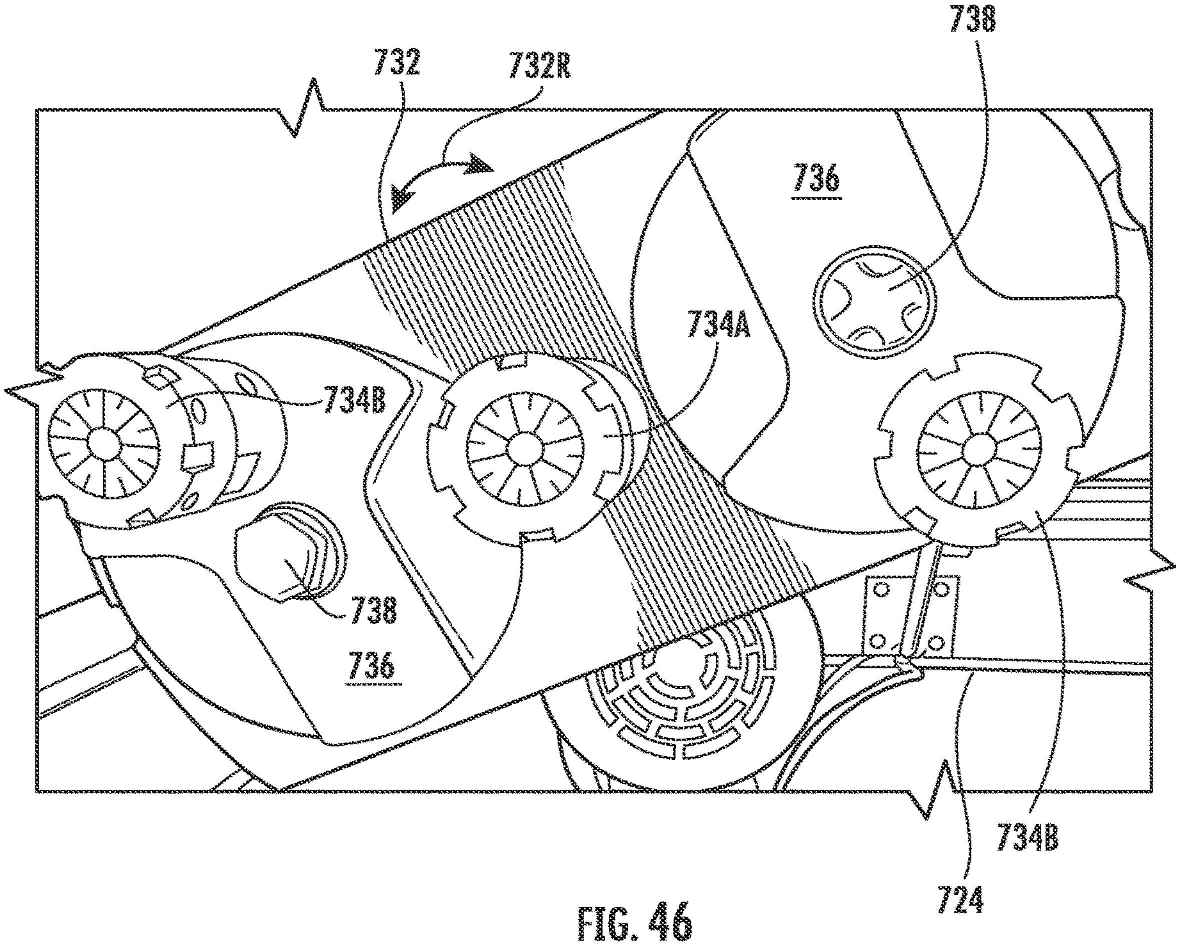

FIG. 46 is a detailed view of an example embodiment of a drilling head of the pre-drilling station shown in FIGS. 43-45.

Figure 47:
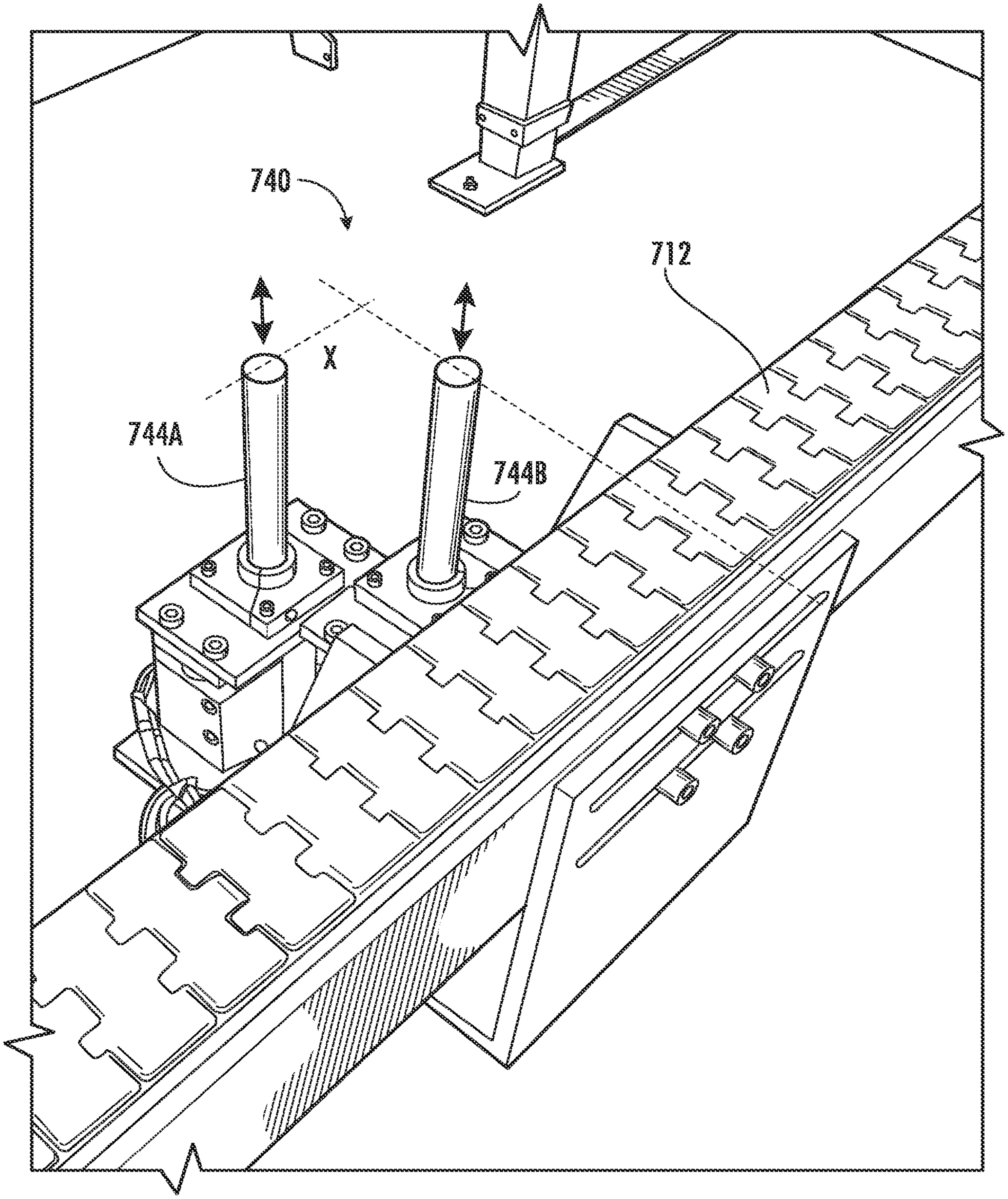
Figure 48:
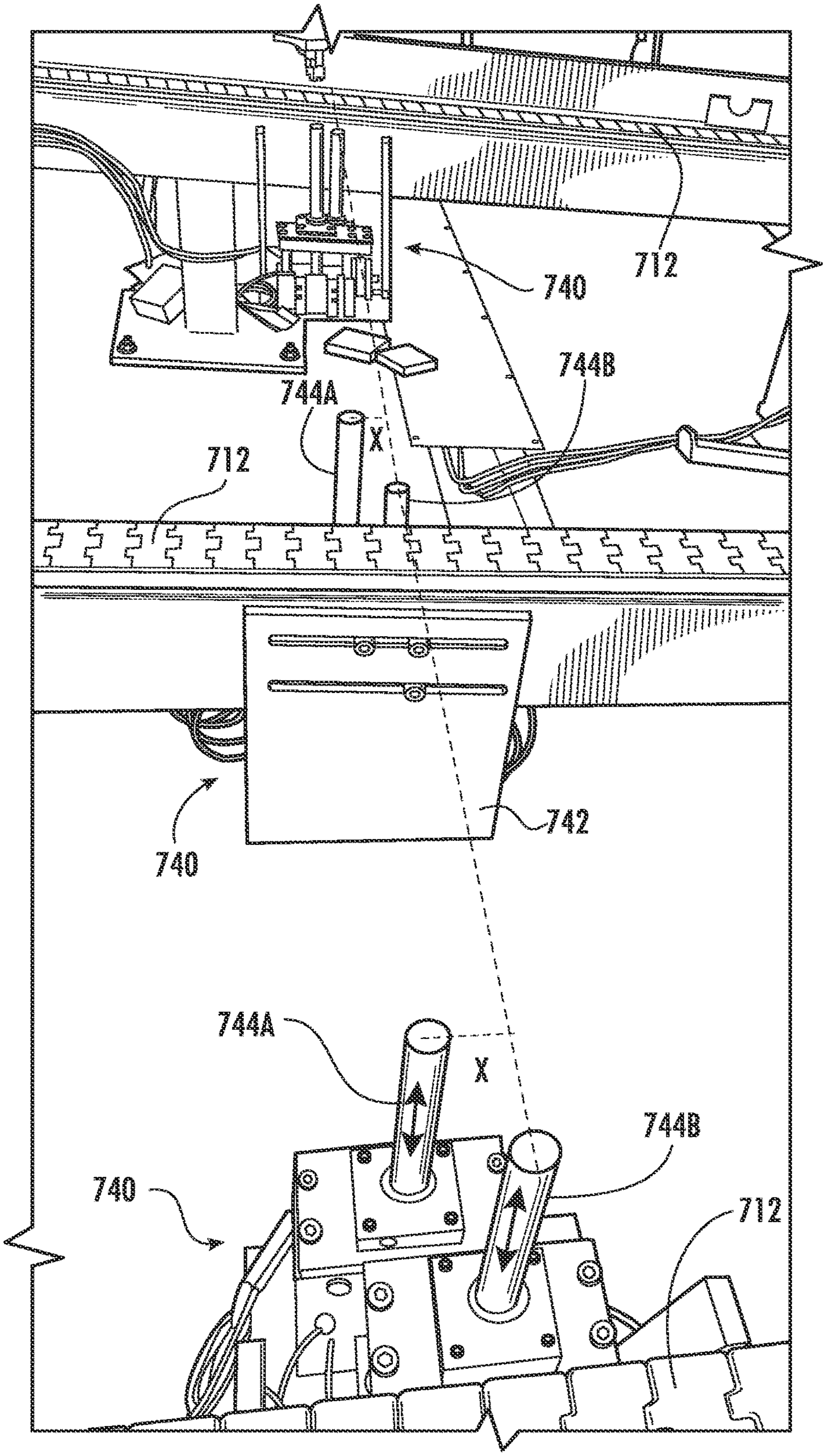

FIGS. 47 and 48 are respective isometric views of stud stops of the pre-drilling station shown in FIGS. 43-45.

Figure 49:
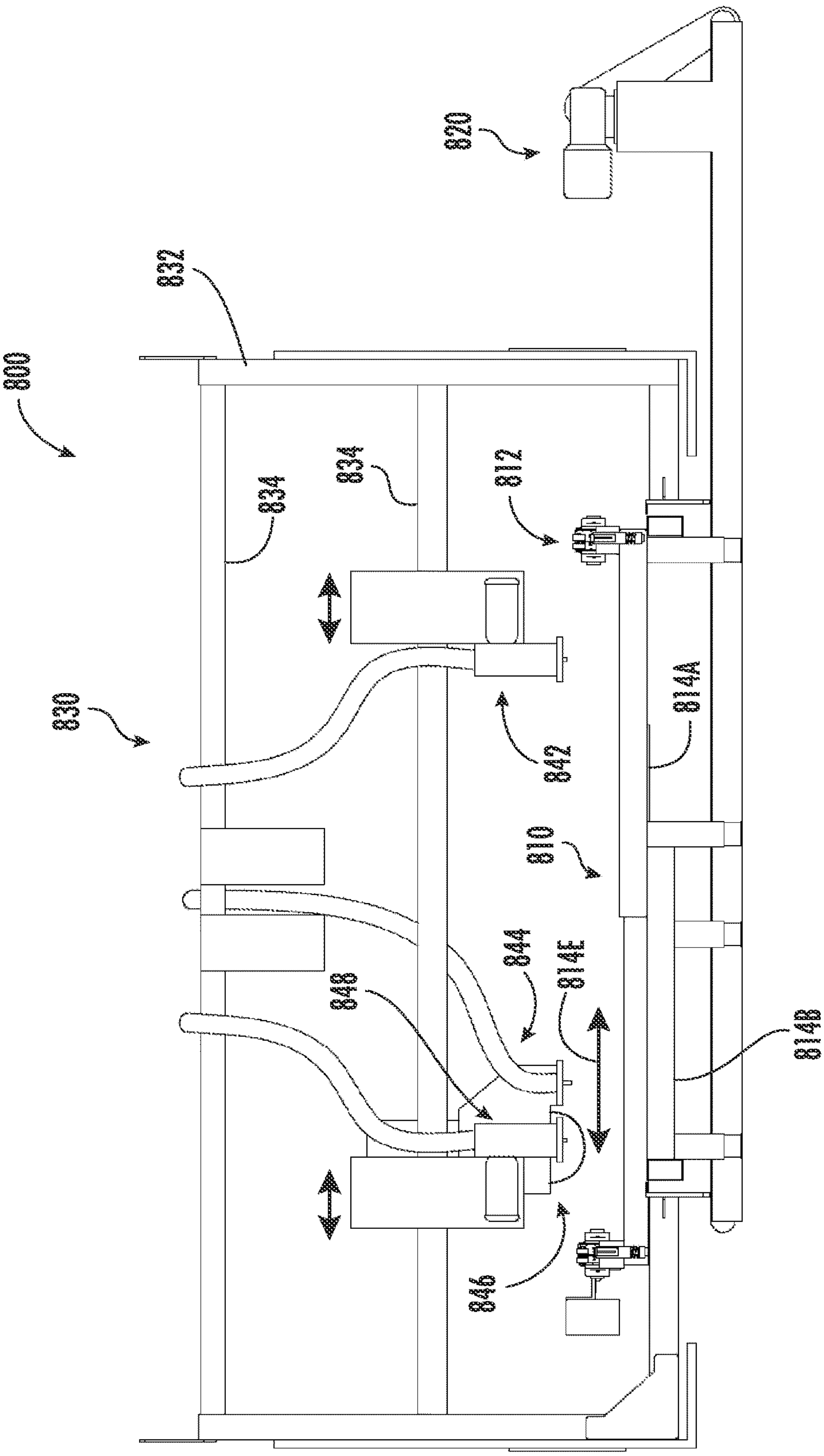

FIG. 49 is a front plan view of an example embodiment of the sawing/routing station shown schematically in FIG. 1.

Figure 50:
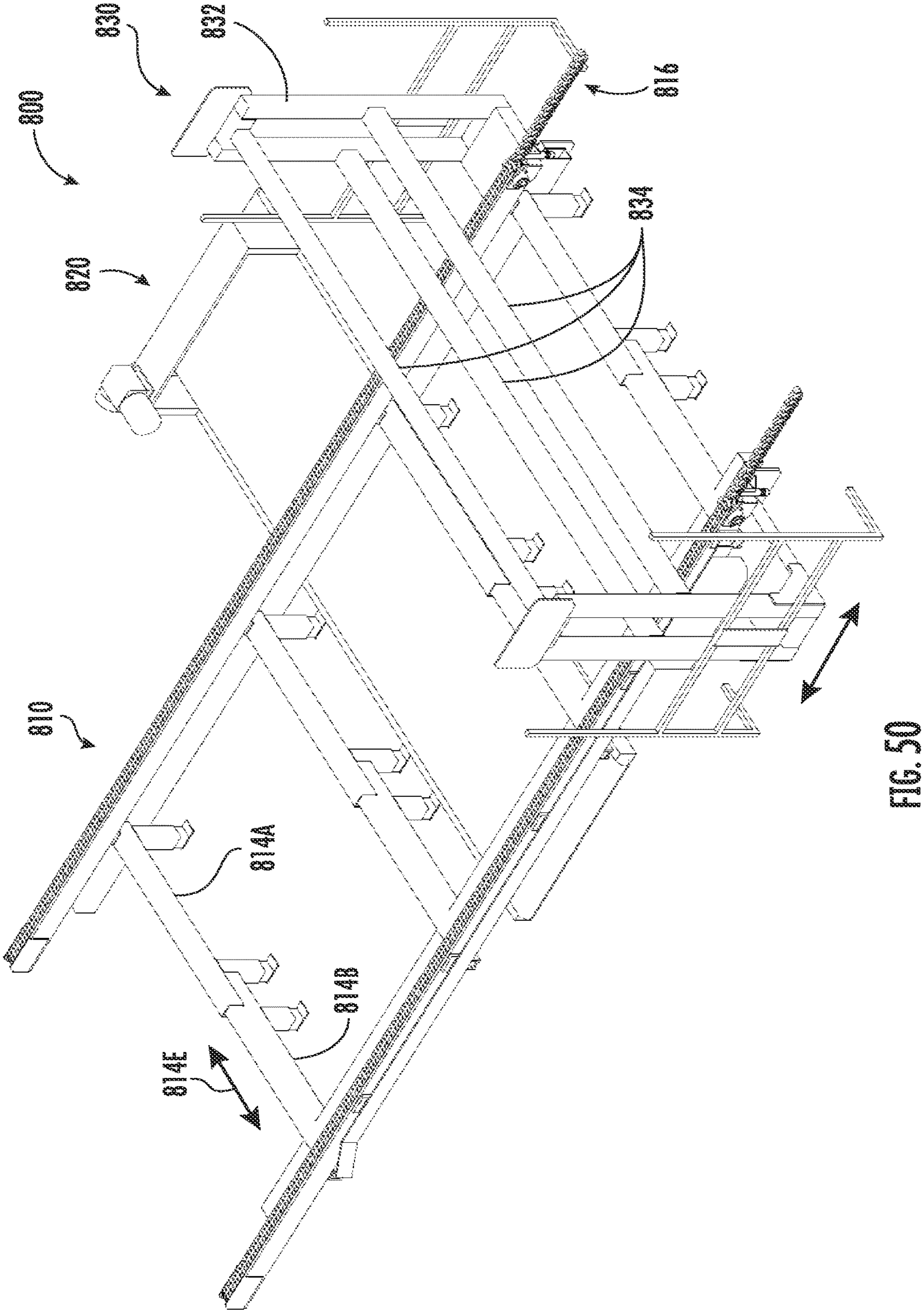

FIG. 50 is an isometric view of the example embodiment of the sawing/routing station shown in FIG. 46.

Figure 51:
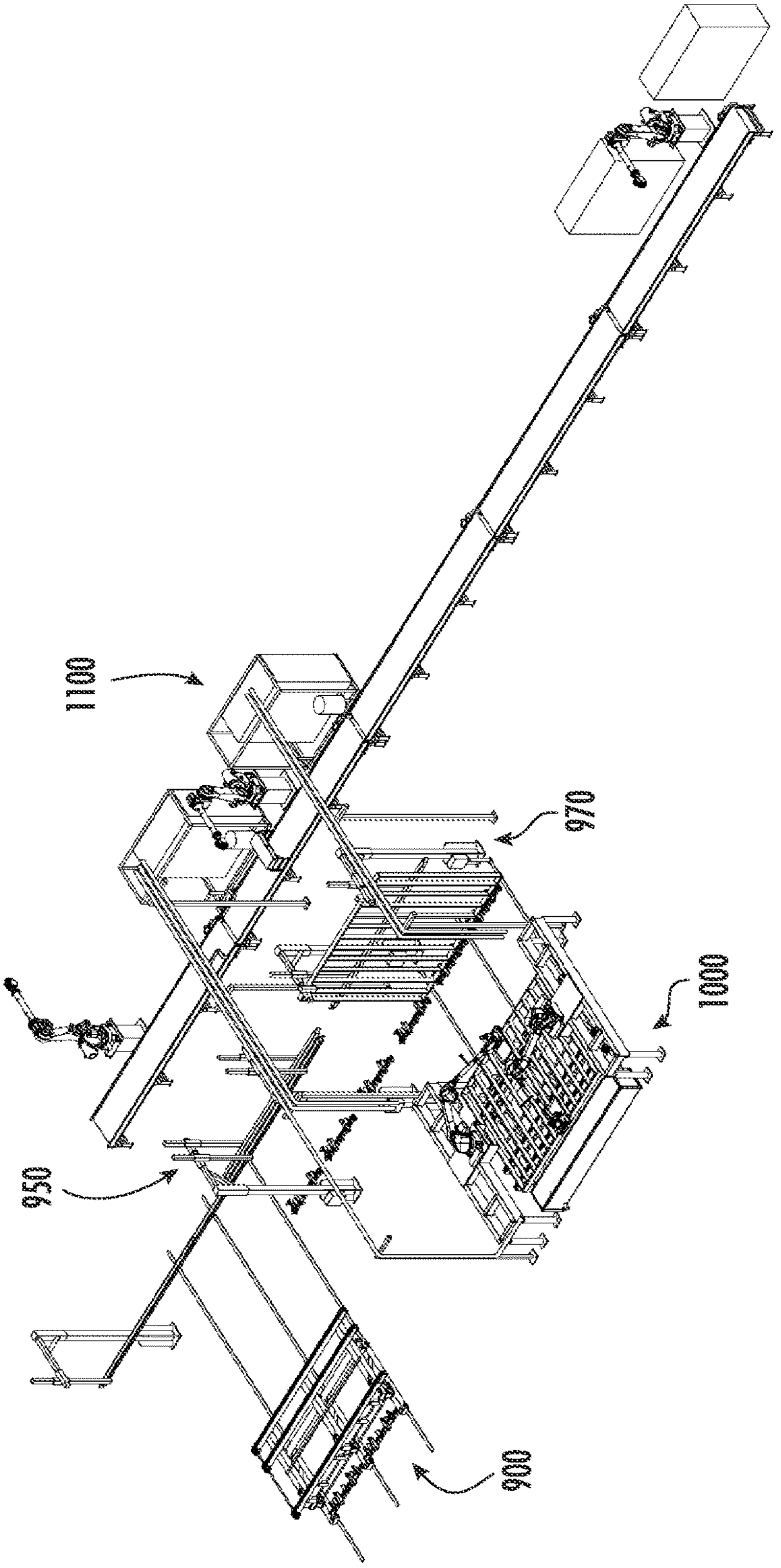

FIG. 51 is an isometric view of example embodiments of the first flip table, the utility installation station, the second flip table, and the insulation installation station shown schematically in FIG. 1.

Figure 52:
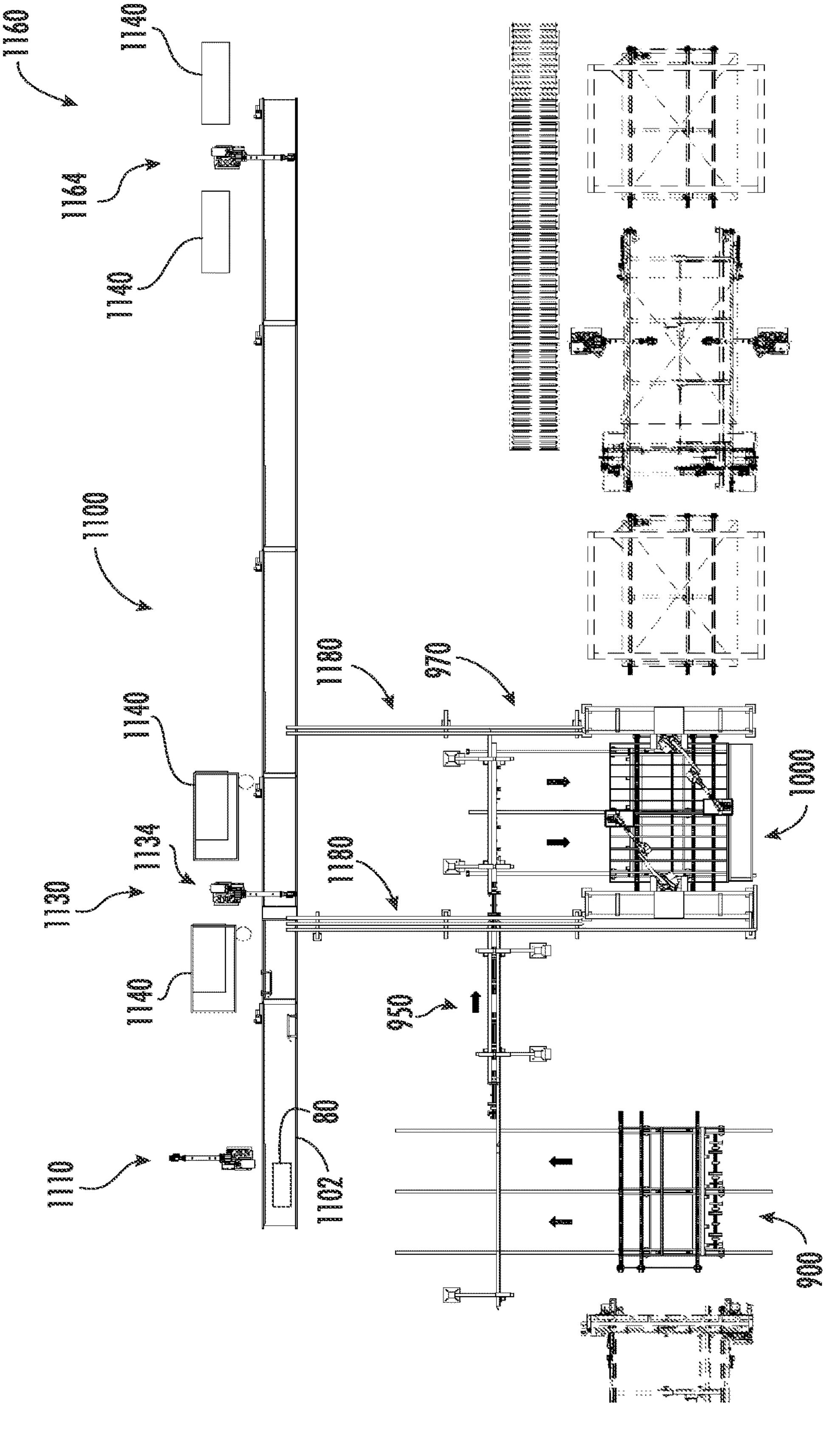

FIG. 52 is a top plan view of the example embodiments of the first flip table, the utility installation station, the second flip table, and the insulation installation station shown in FIG. 51.

Figure 53:
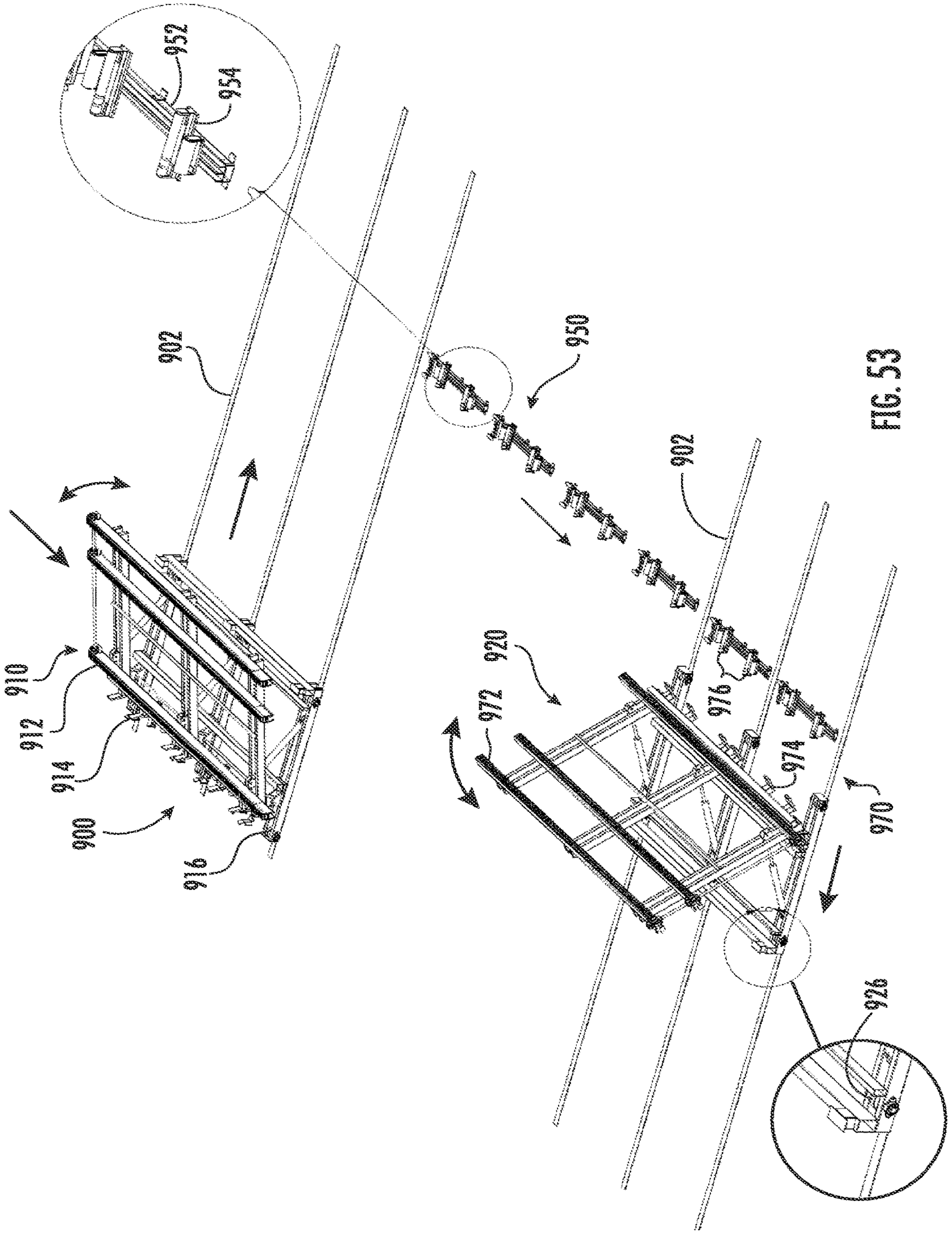

FIG. 53 is an isometric view showing isolated images of the first and second flip tables of FIG. 51 arranged on opposite ends of the utility installation station, the frame of the utility installation station being omitted for clarity in this view.

Figure 54:
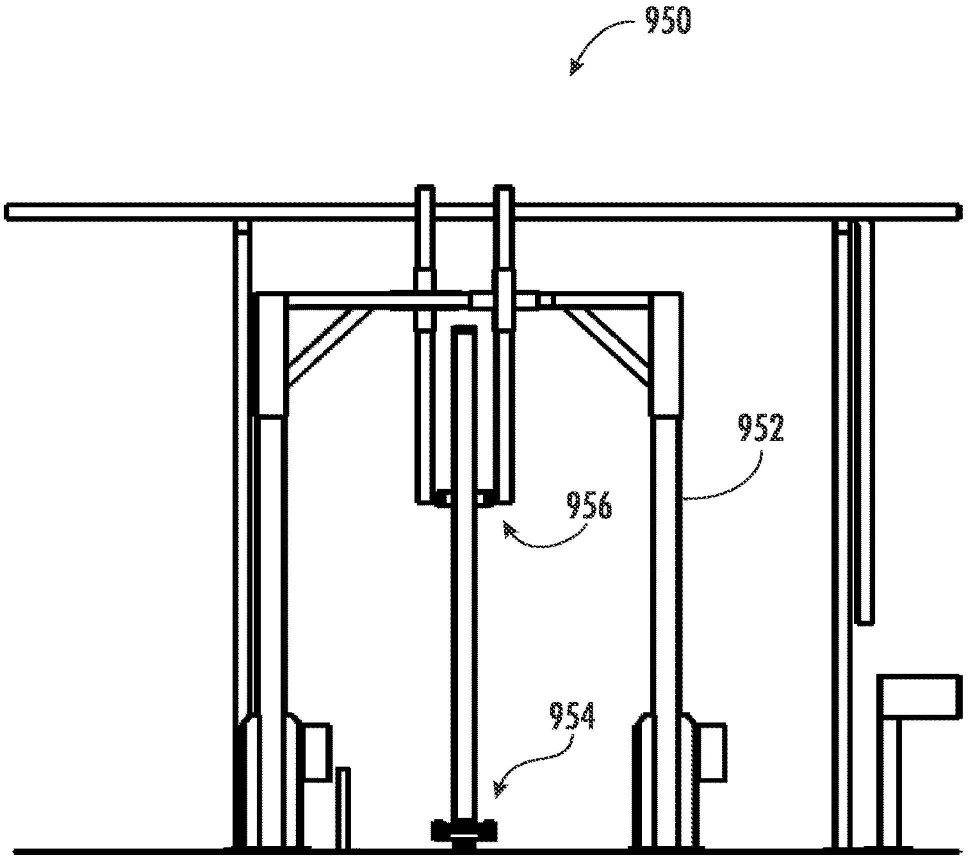

FIG. 54 is a front plan view of a partially assembled wall frame in the example embodiment of the utility installation station shown in FIGS. 51 and 52.

Figure 55:
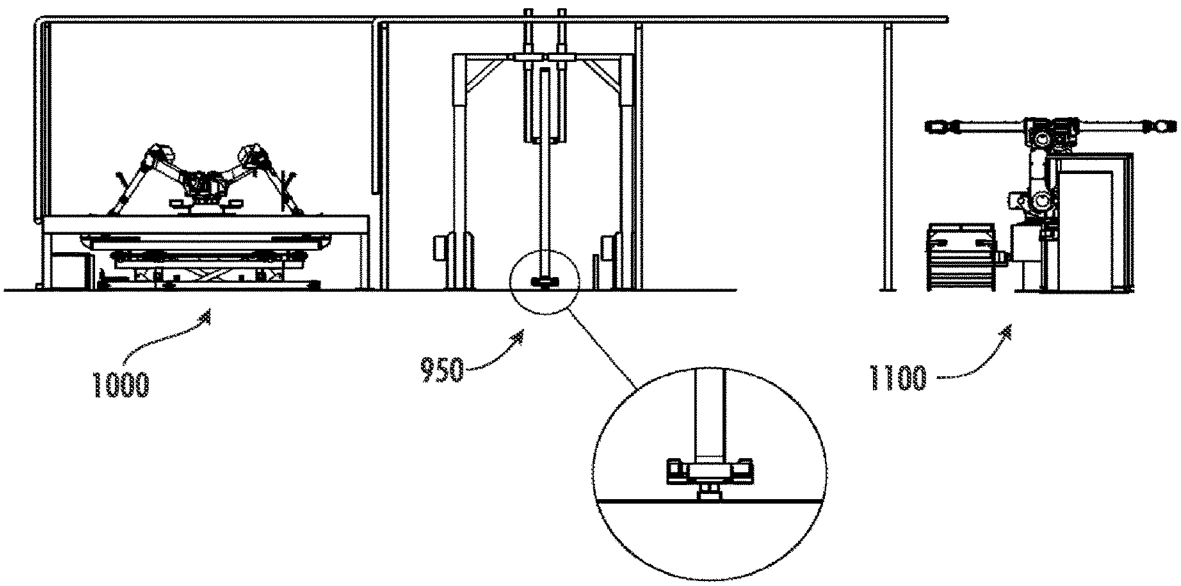

FIG. 55 is a rear plan view of the first flip table, the utility installation station, the second flip table, and the insulation installation station shown in FIGS. 51-54.

Figure 56:
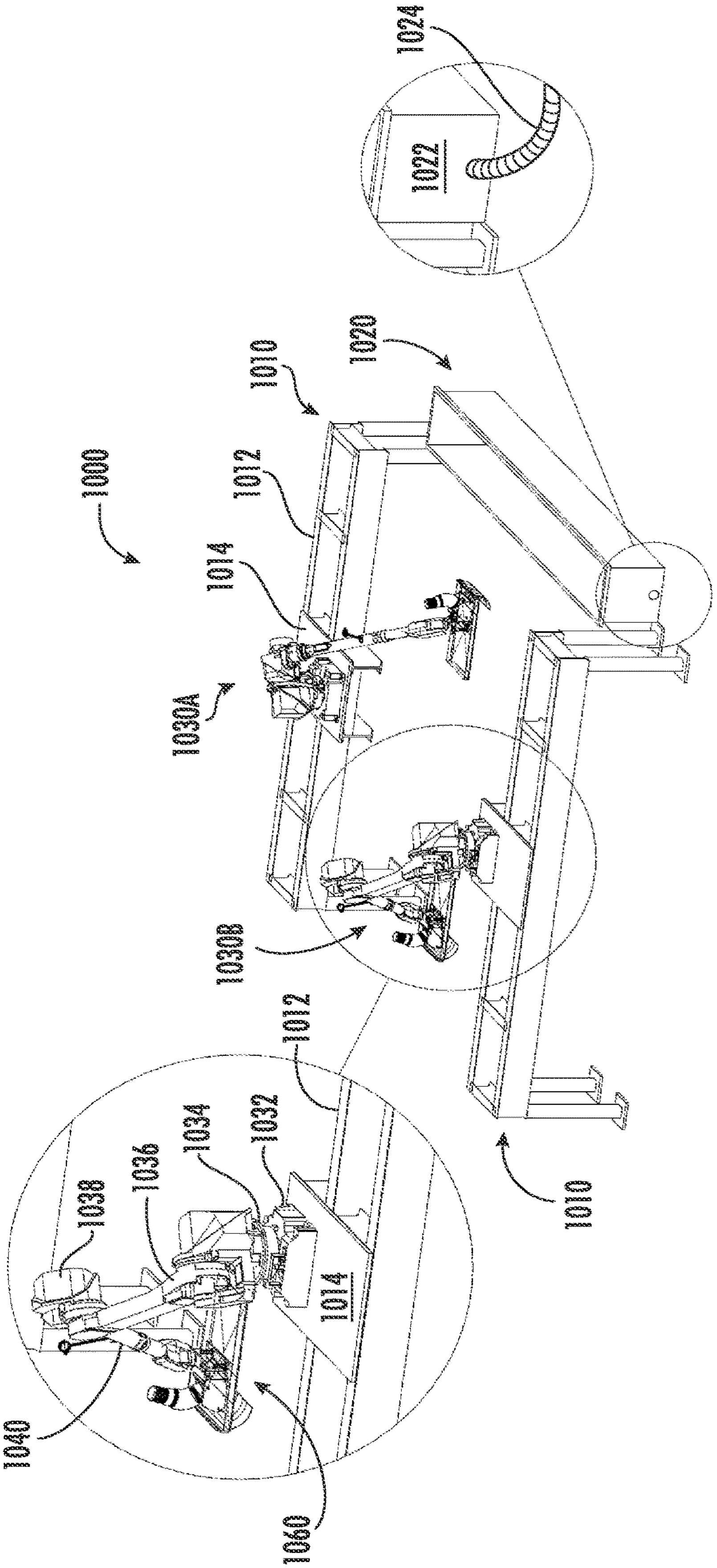

FIG. 56 is an isometric view of the insulation installation station of FIG. 51.

Figure 57:
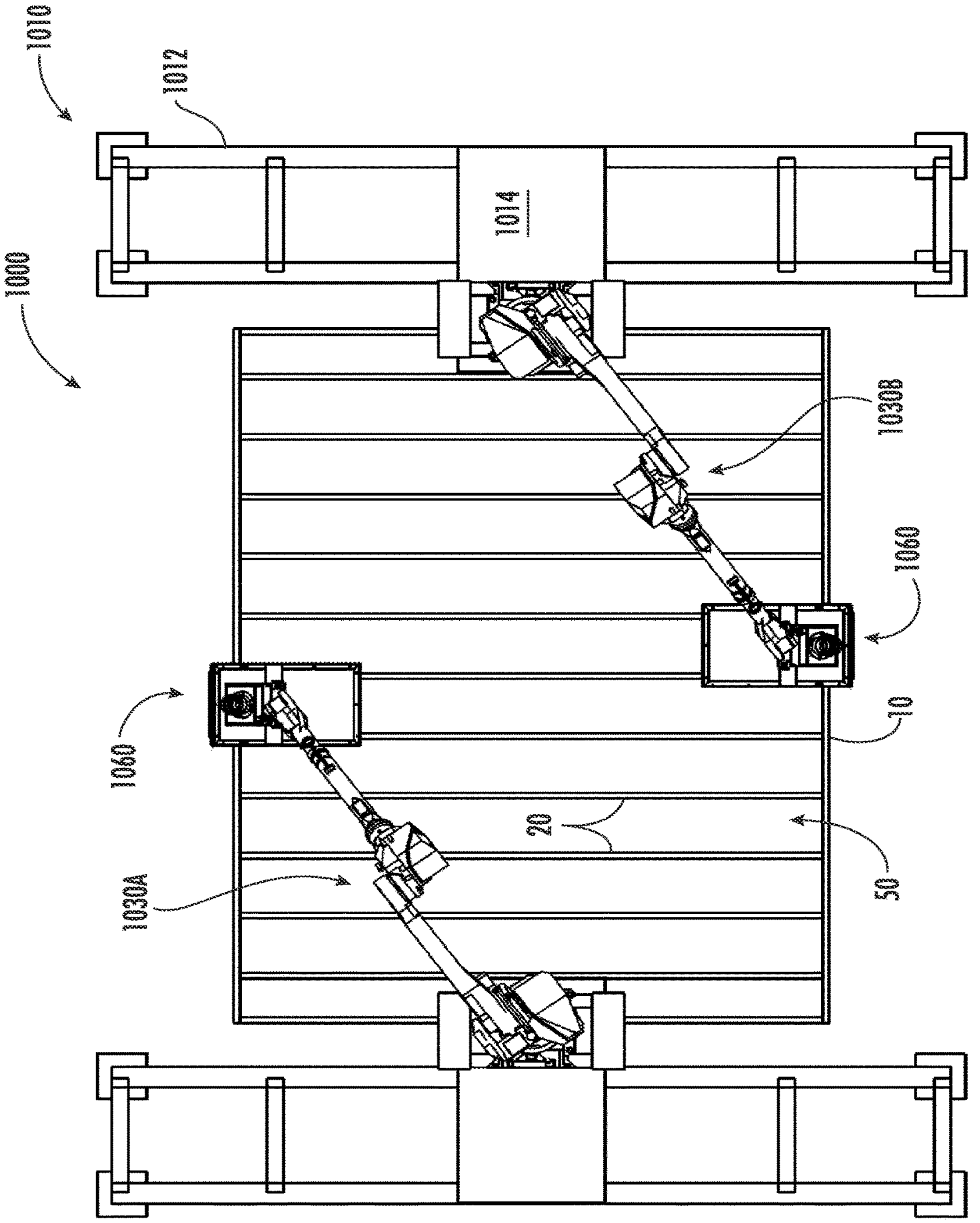

FIG. 57 is a top plan view of the example embodiment of the insulation installation station shown in FIG. 51.

Figure 58:
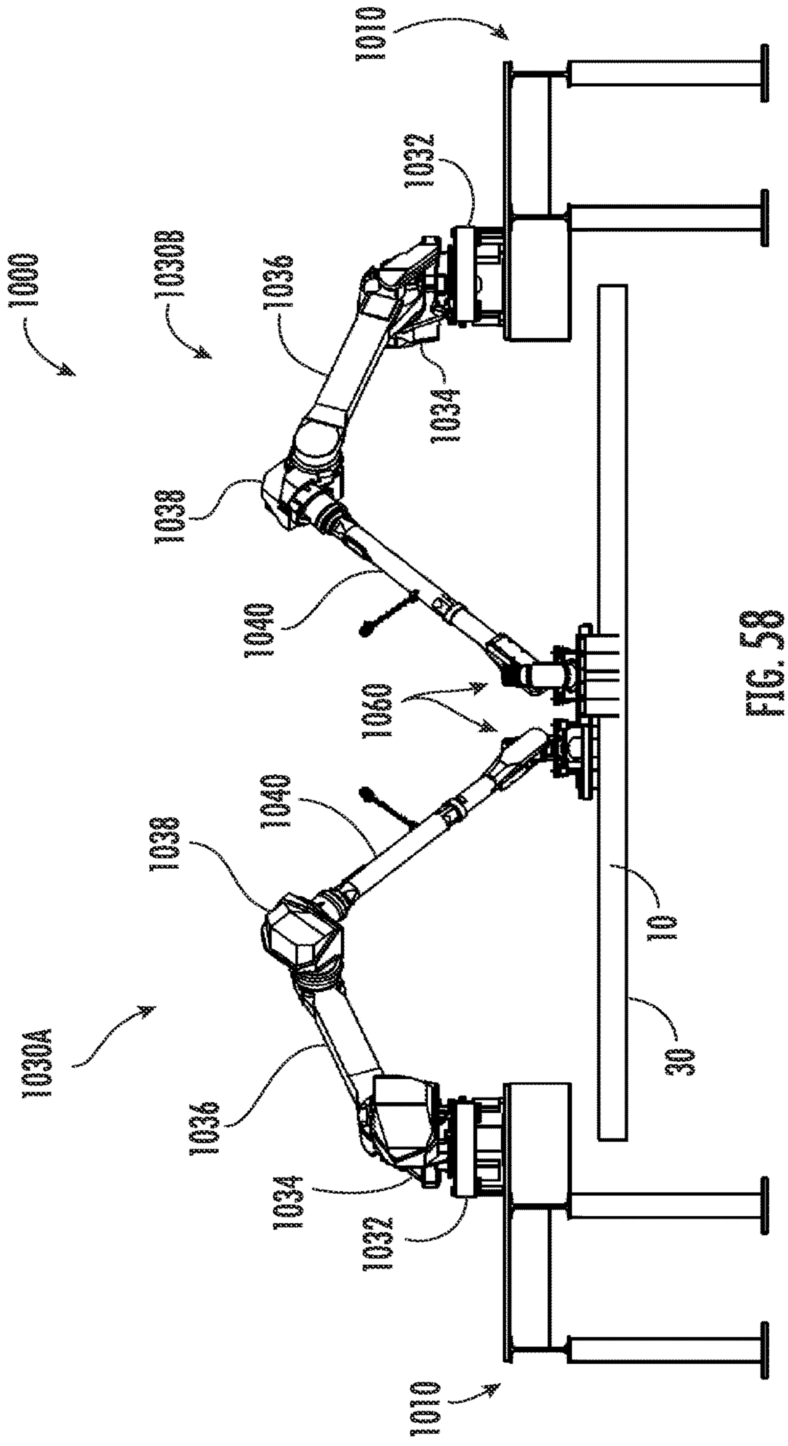

FIG. 58 is a side plan view of the example embodiment of the insulation installation station shown in FIG. 57.

Figure 59:
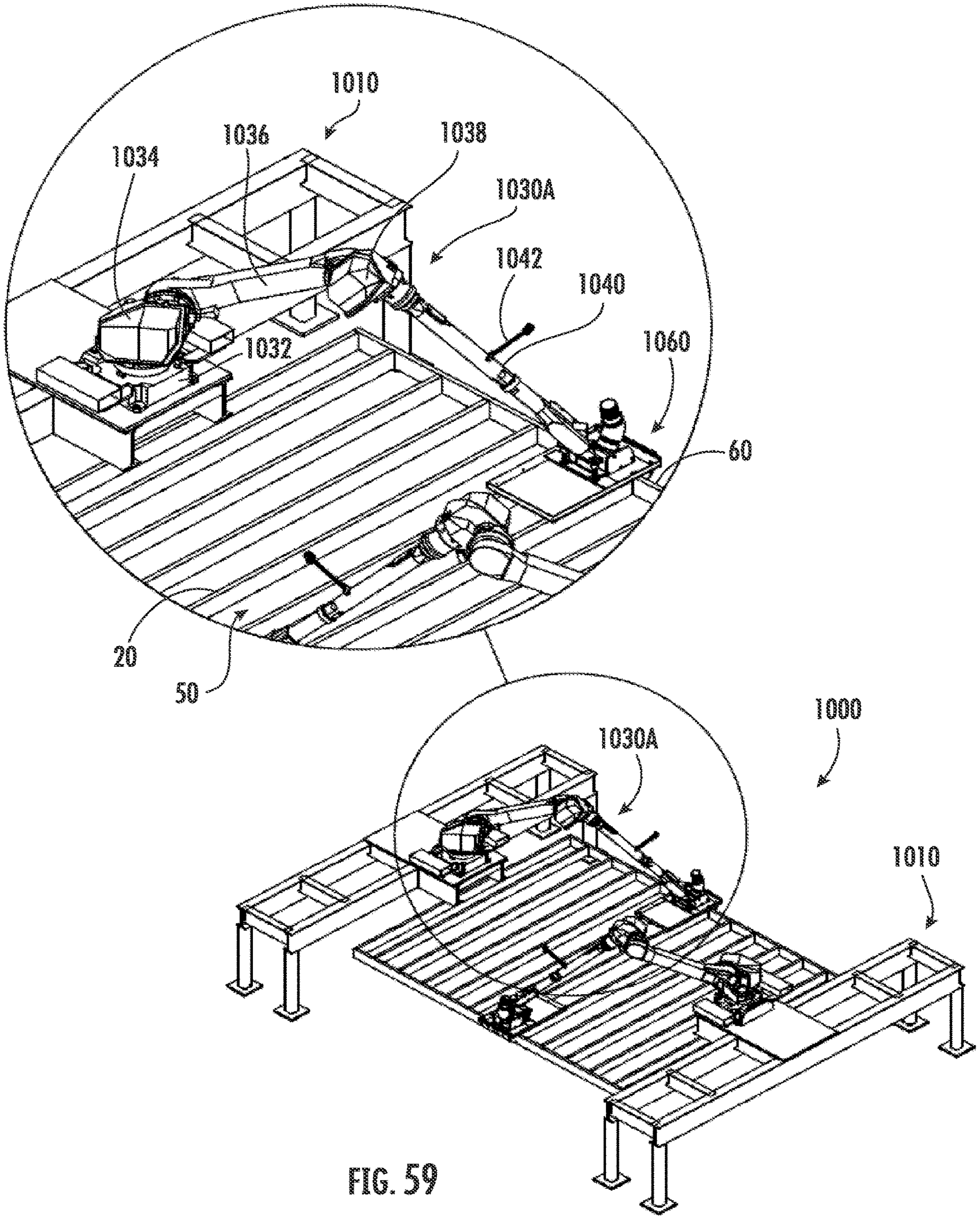

FIG. 59 is an isometric view of the insulation installation station shown in FIGS. 57 and 58.

Figure 60:
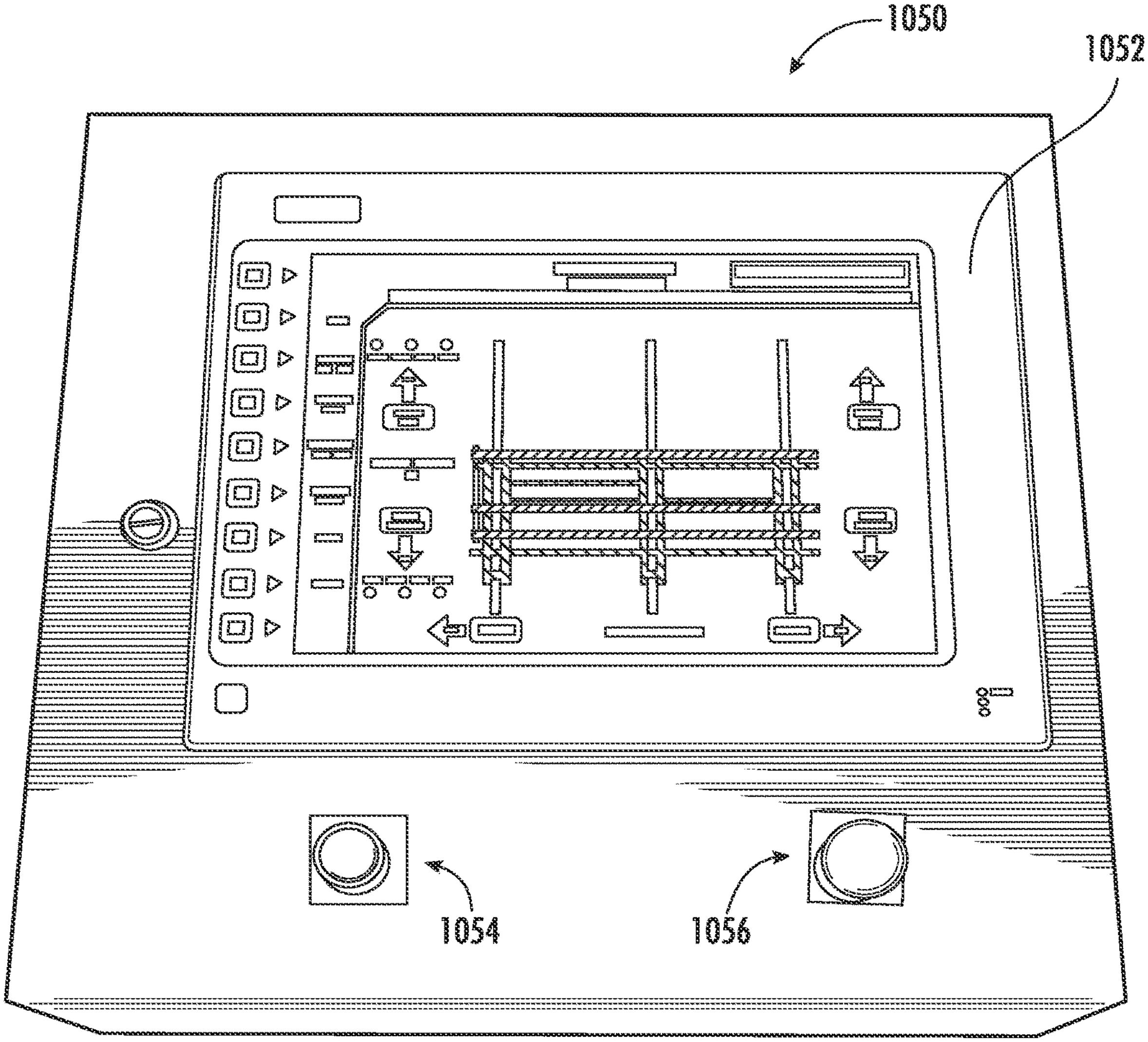
Figure 61A:
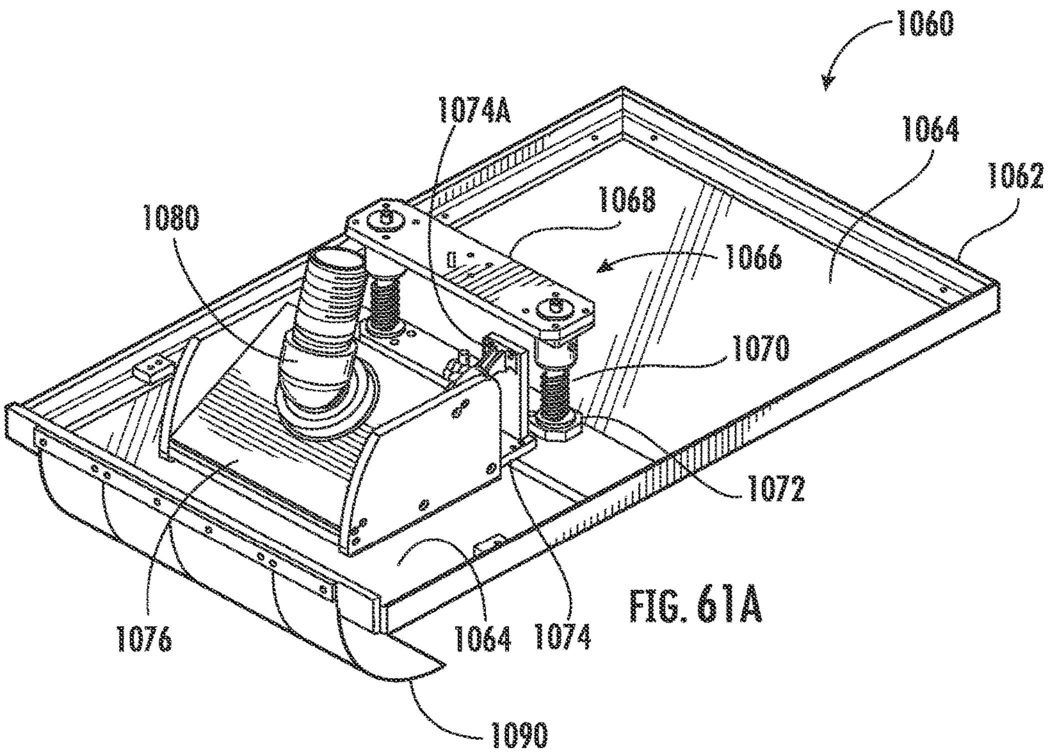
Figure 61B:
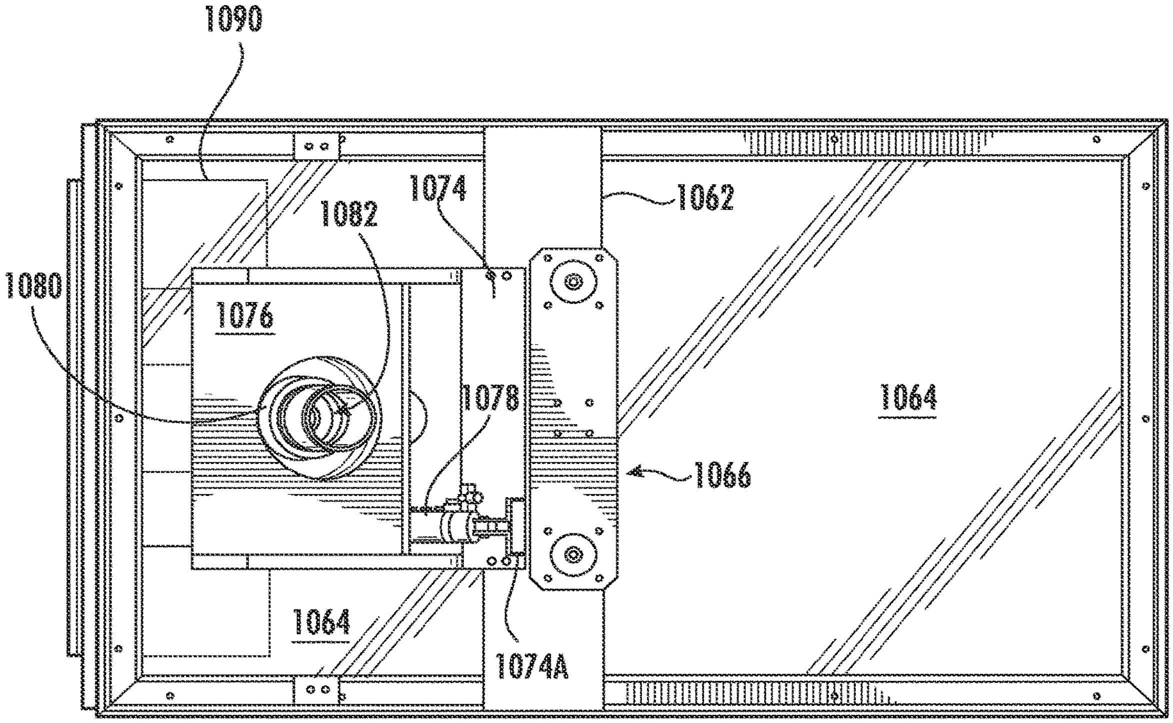
Figure 61C:
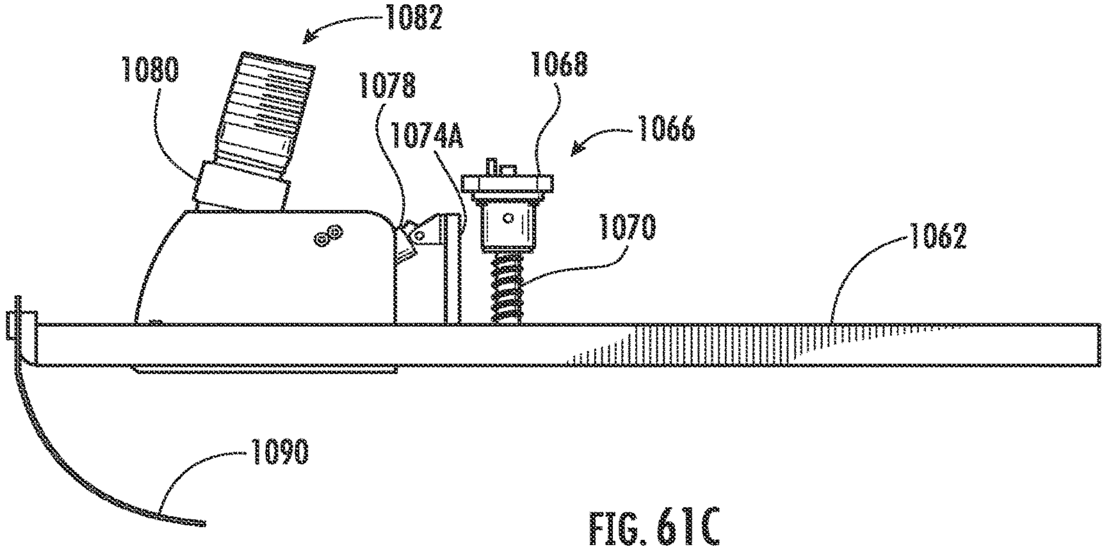
Figure 61D:
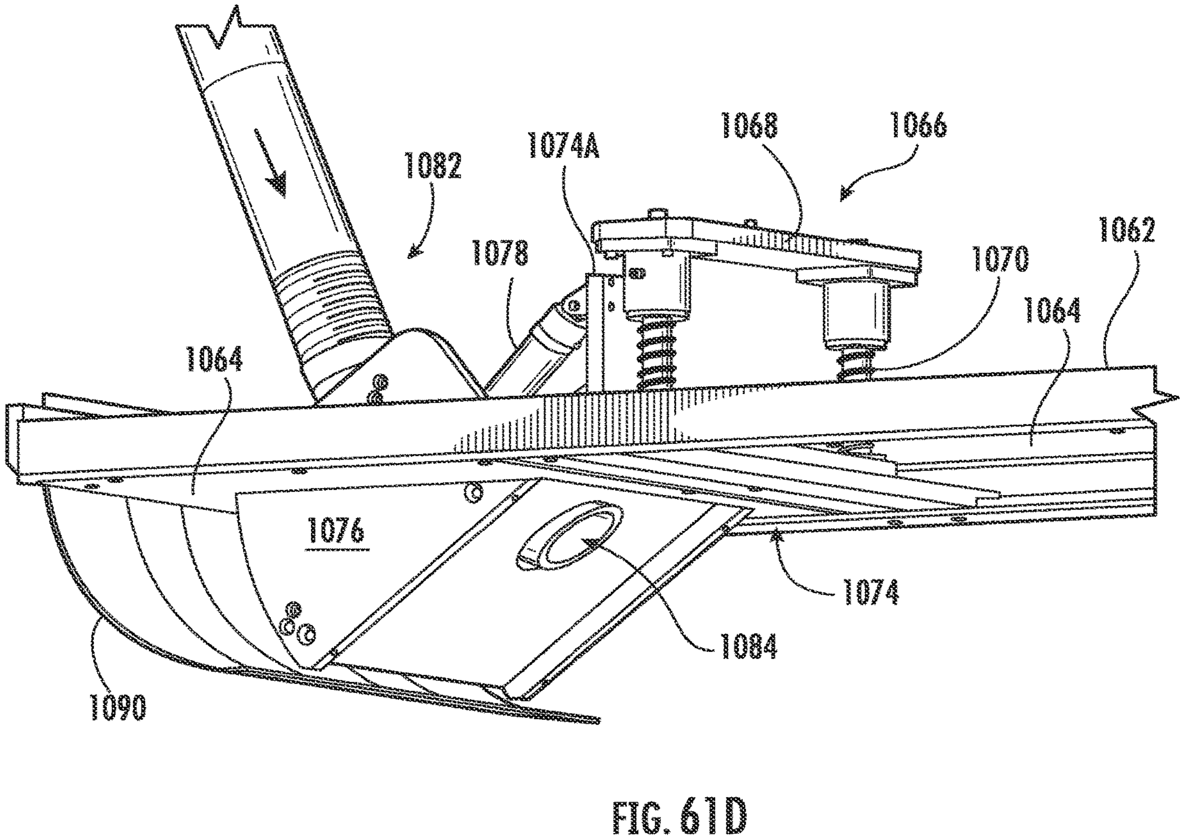

FIG. 60 shows an example embodiment of a man-machine interface for controlling the operation of the insulation installation station shown in FIGS. 57-59.

FIGS. 61A-D are various views of an example embodiment of an insulation dispenser head of the insulation installation station shown in FIGS. 57-59.

Figure 62:
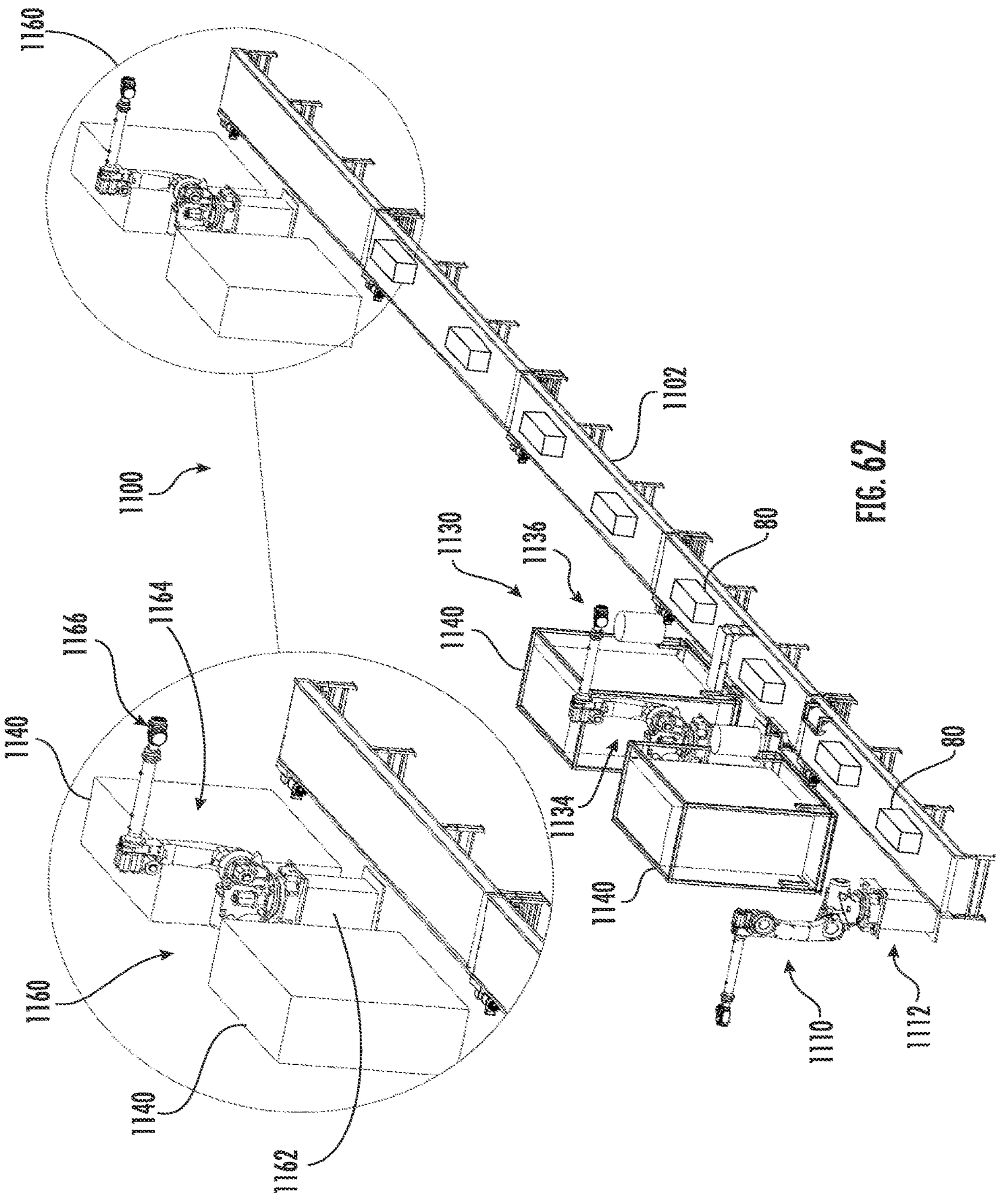

FIG. 62 is an isometric view of an example embodiment of an insulation loading station.

Figure 63:
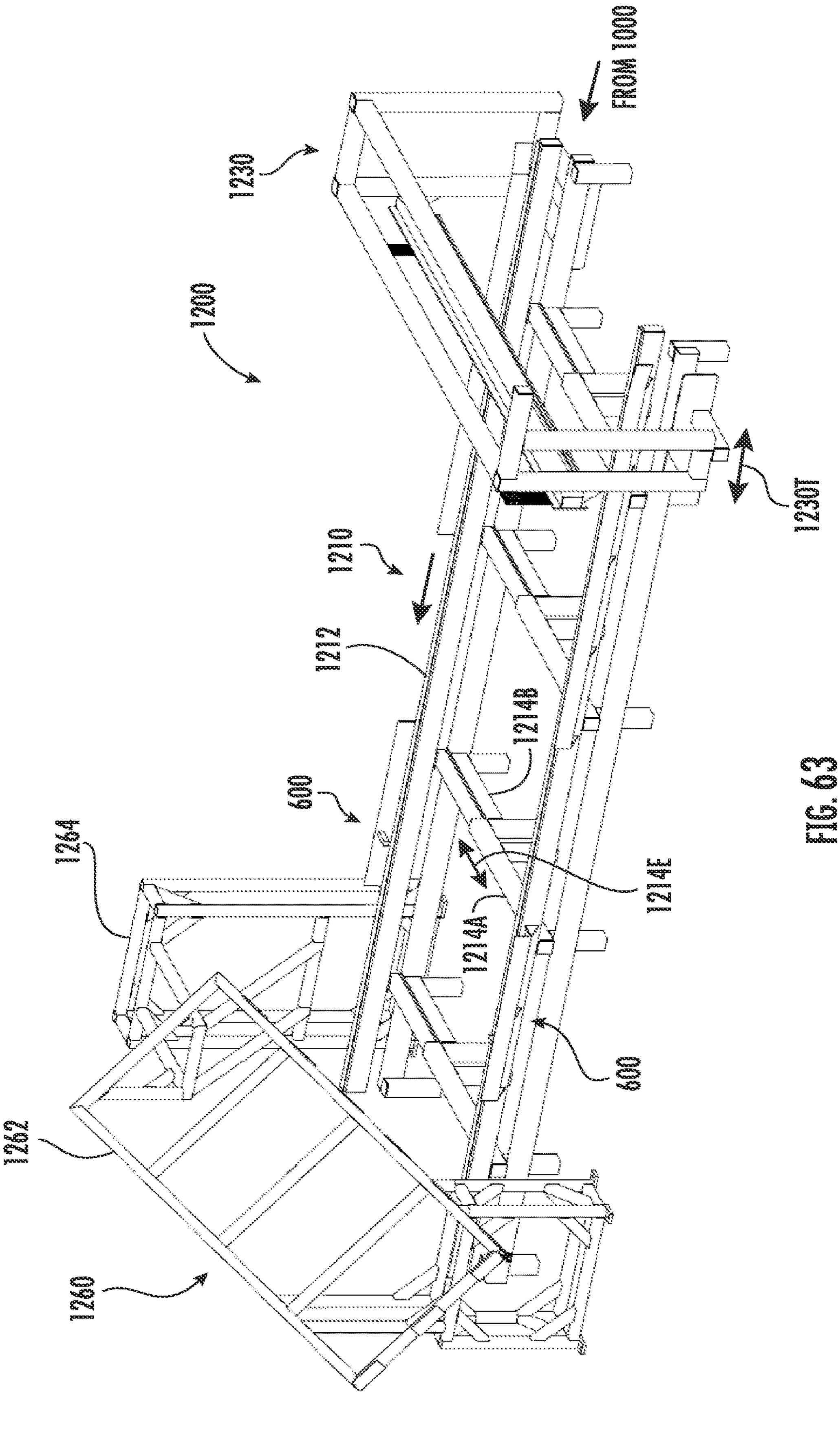
Figure 64:
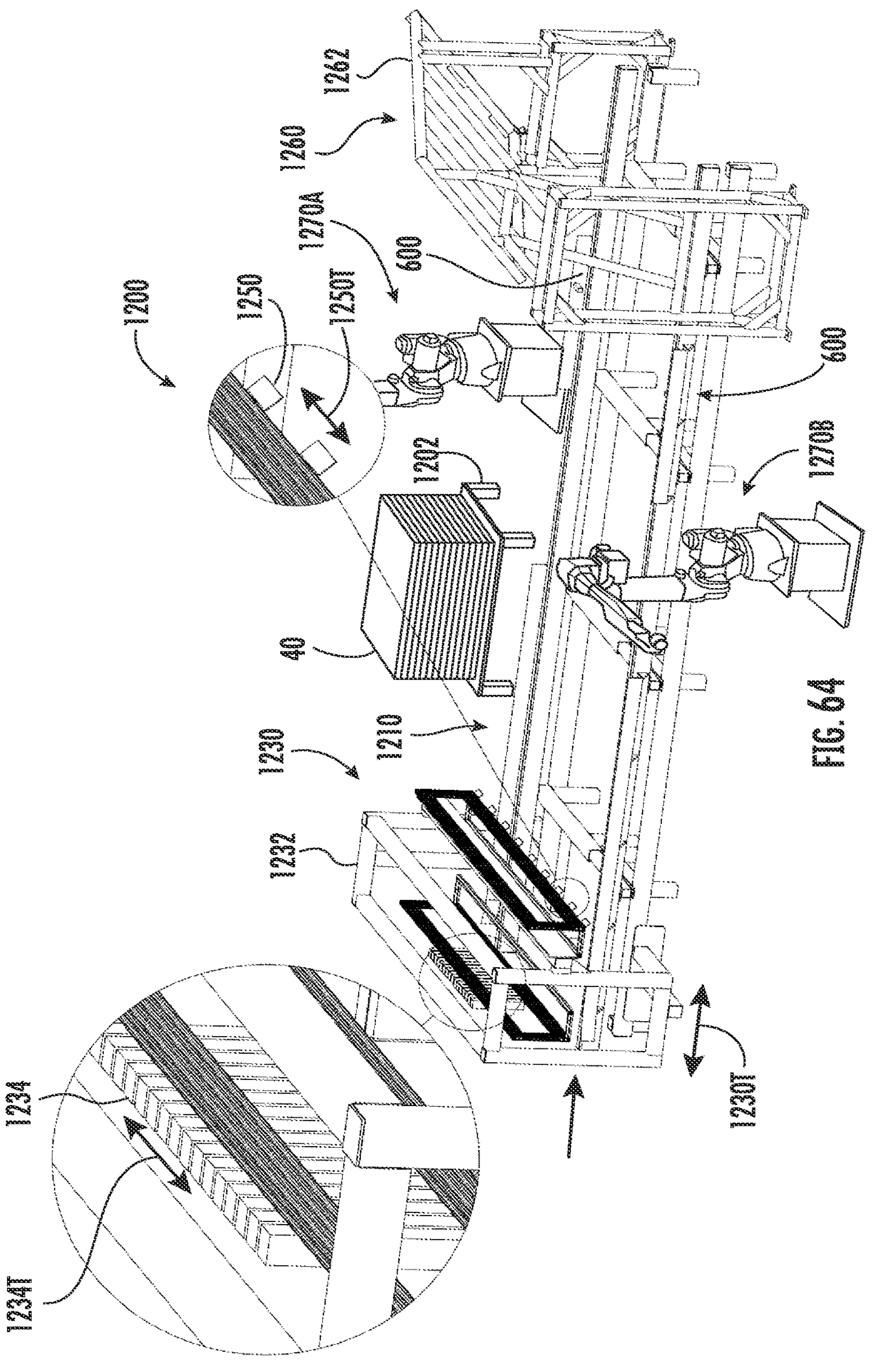
Figure 65:
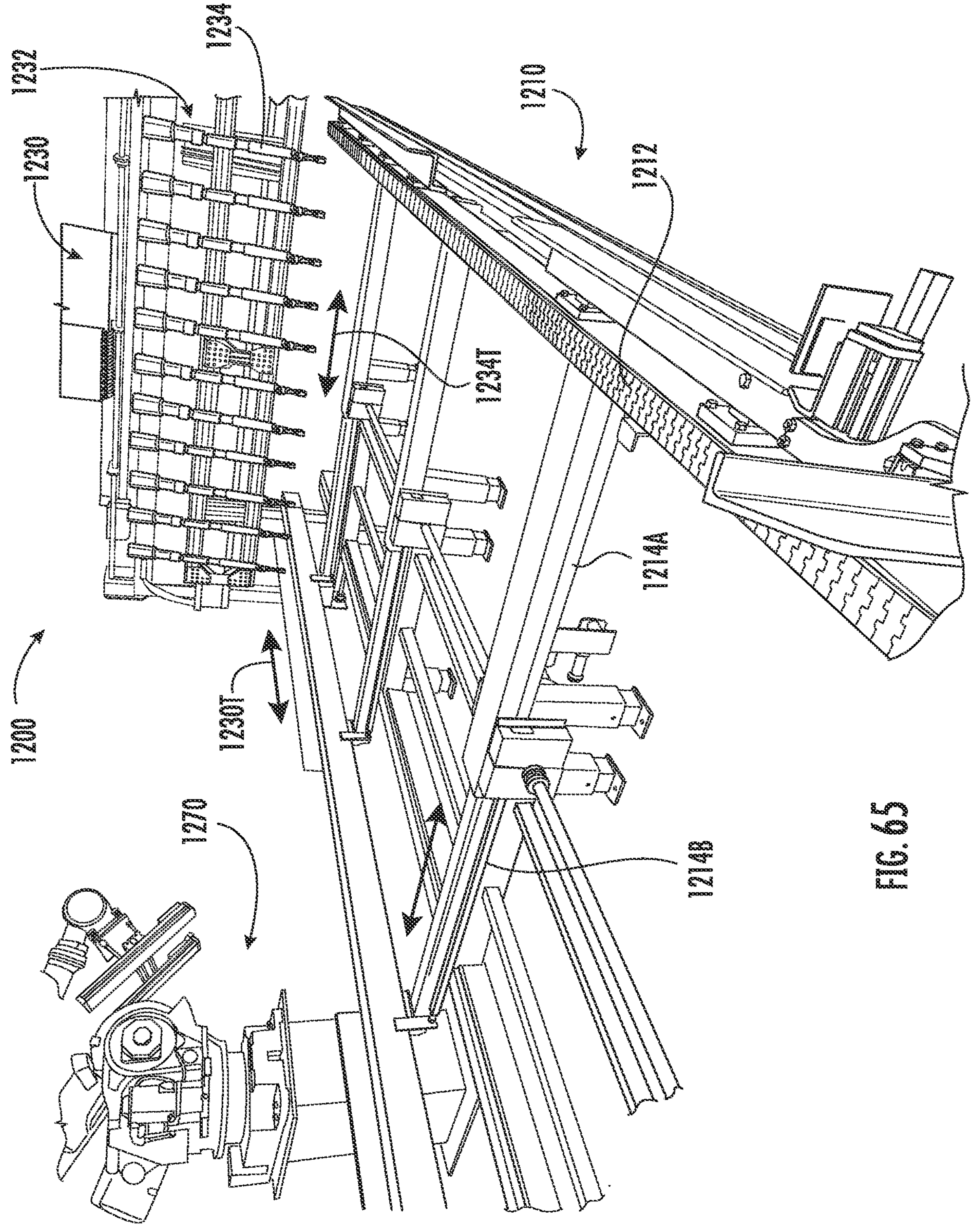

FIGS. 63-65 are respective isometric views of an example embodiment of a drywall installation station shown schematically in FIG. 1.

Figure 66A:
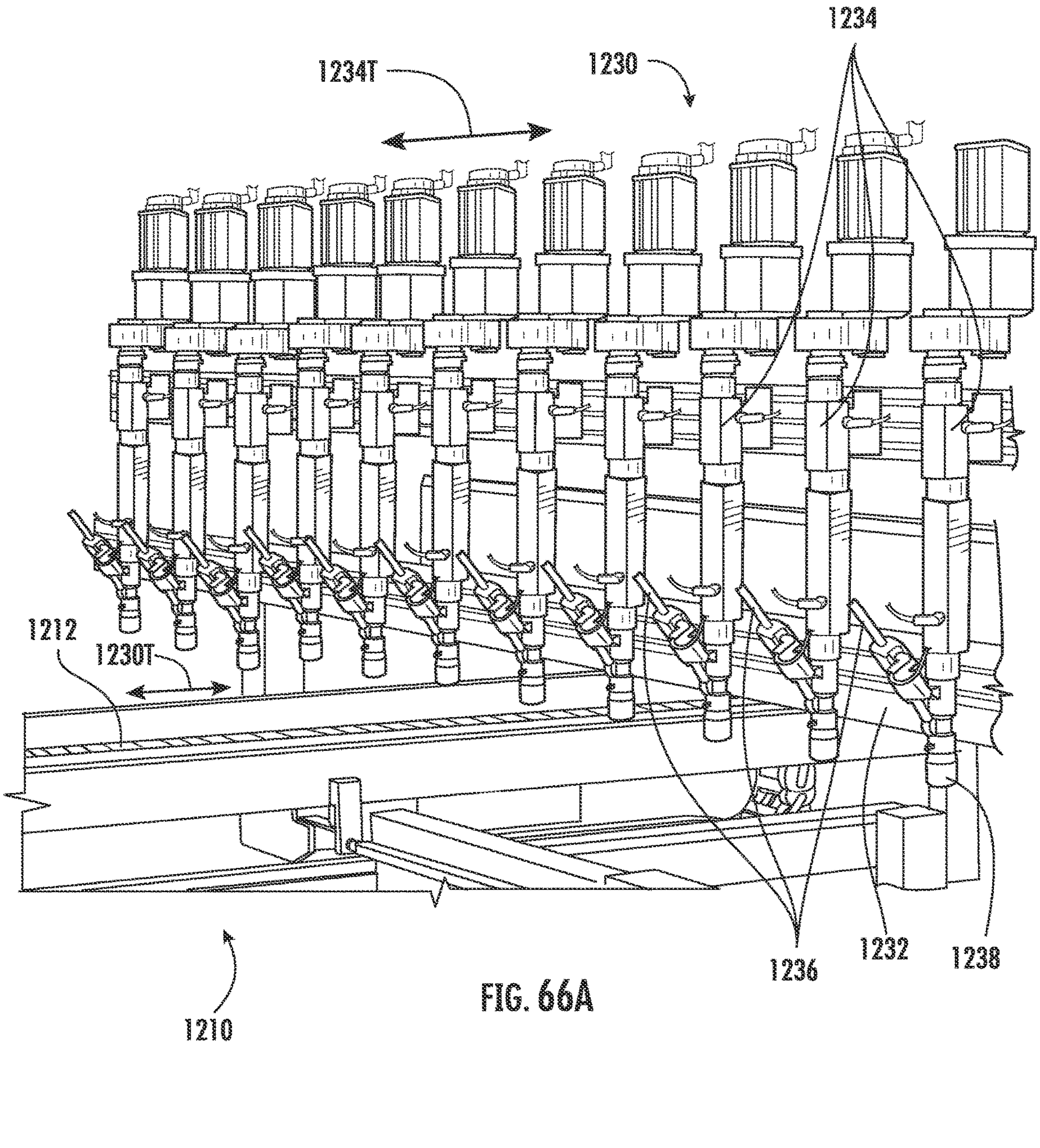
Figure 66B:
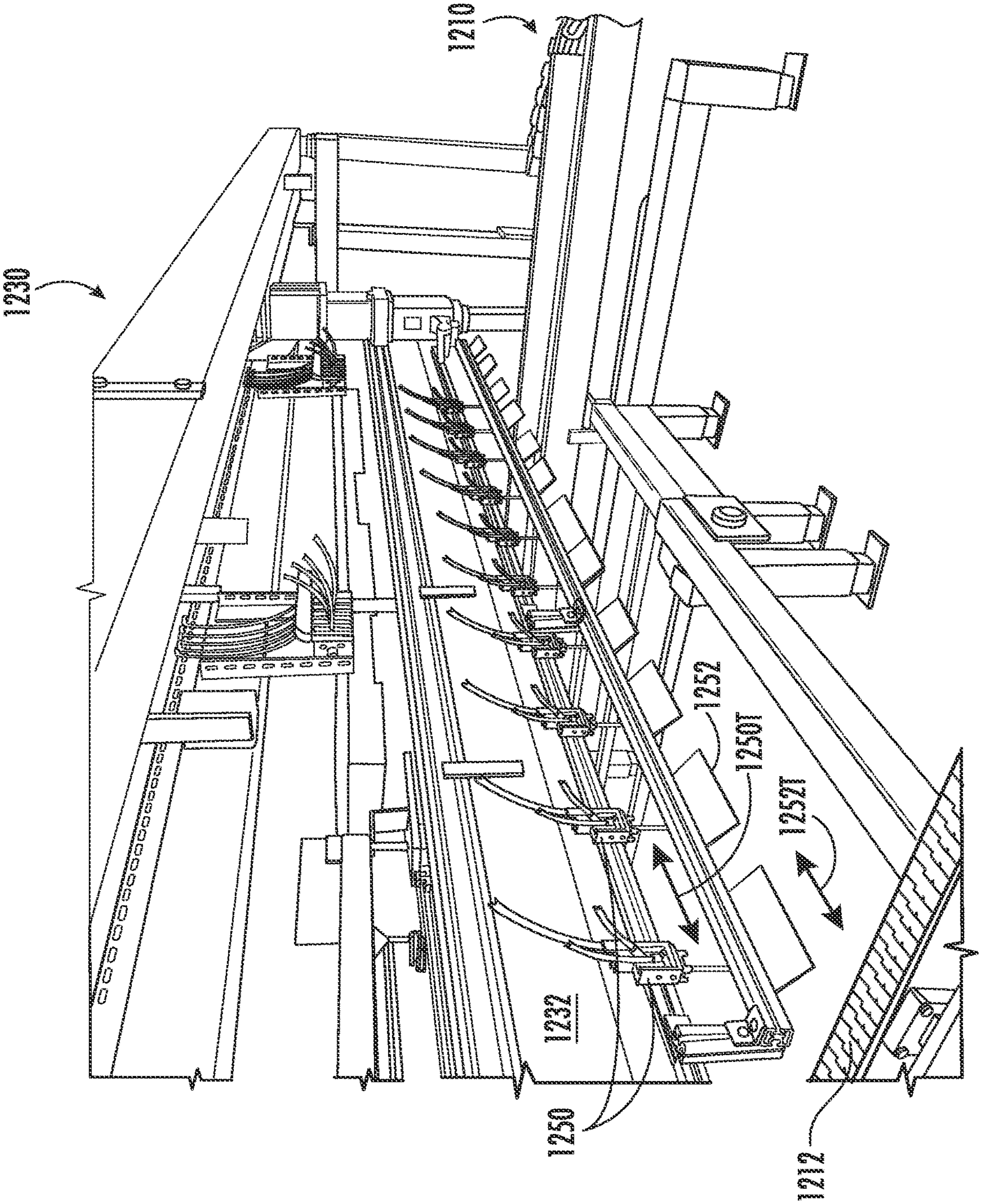

FIGS. 66A-B are front and rear isometric views of an example embodiment of a plurality of fasteners and applicators on the front and rear of a gantry of the drywall installation station of FIGS. 63-65.

Figure 67:
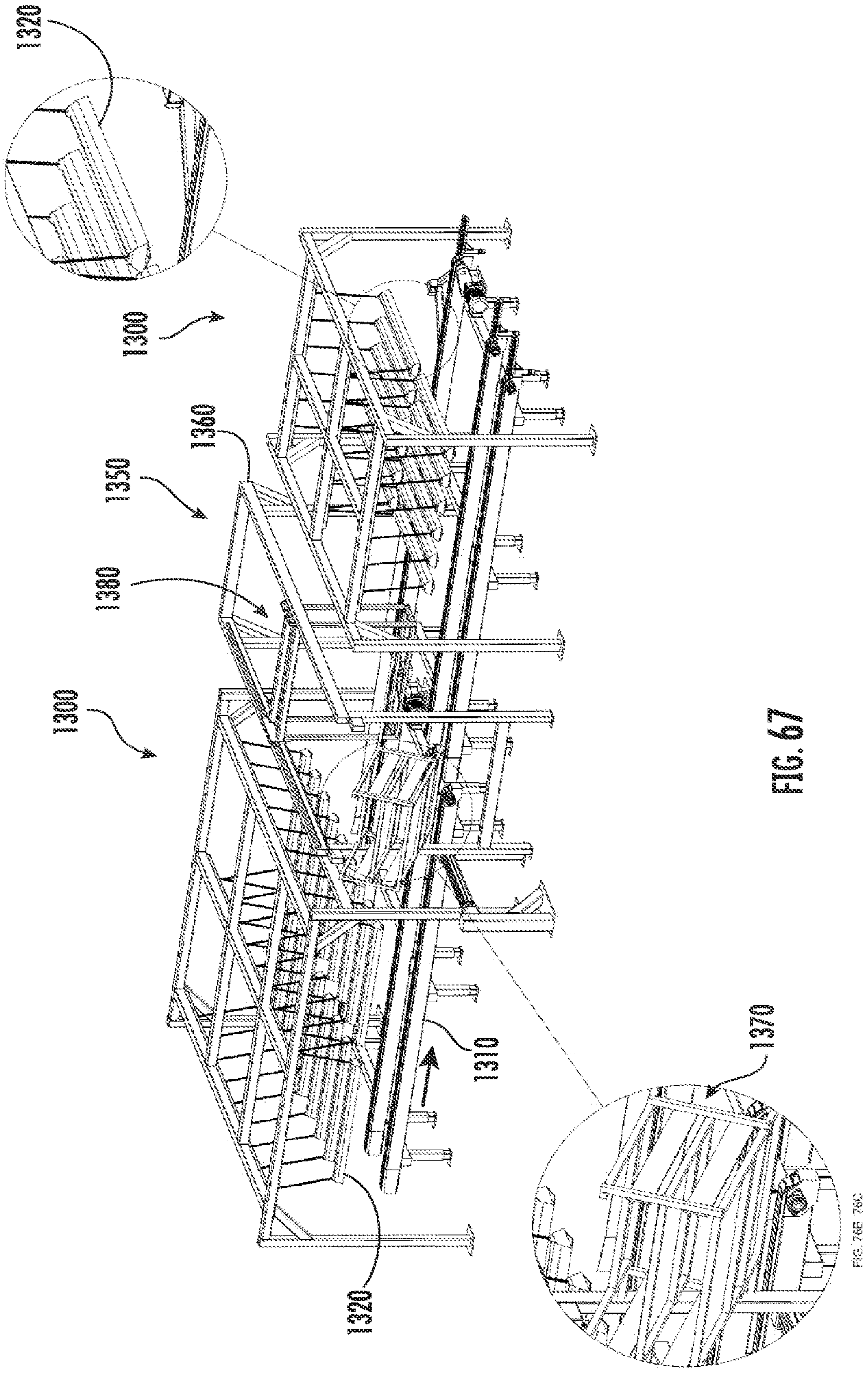

FIG. 67 is an isometric view of an example embodiment of the drywall curing station, the wall covering station, and the wall covering curing station shown schematically in FIG. 1.

Figure 68:
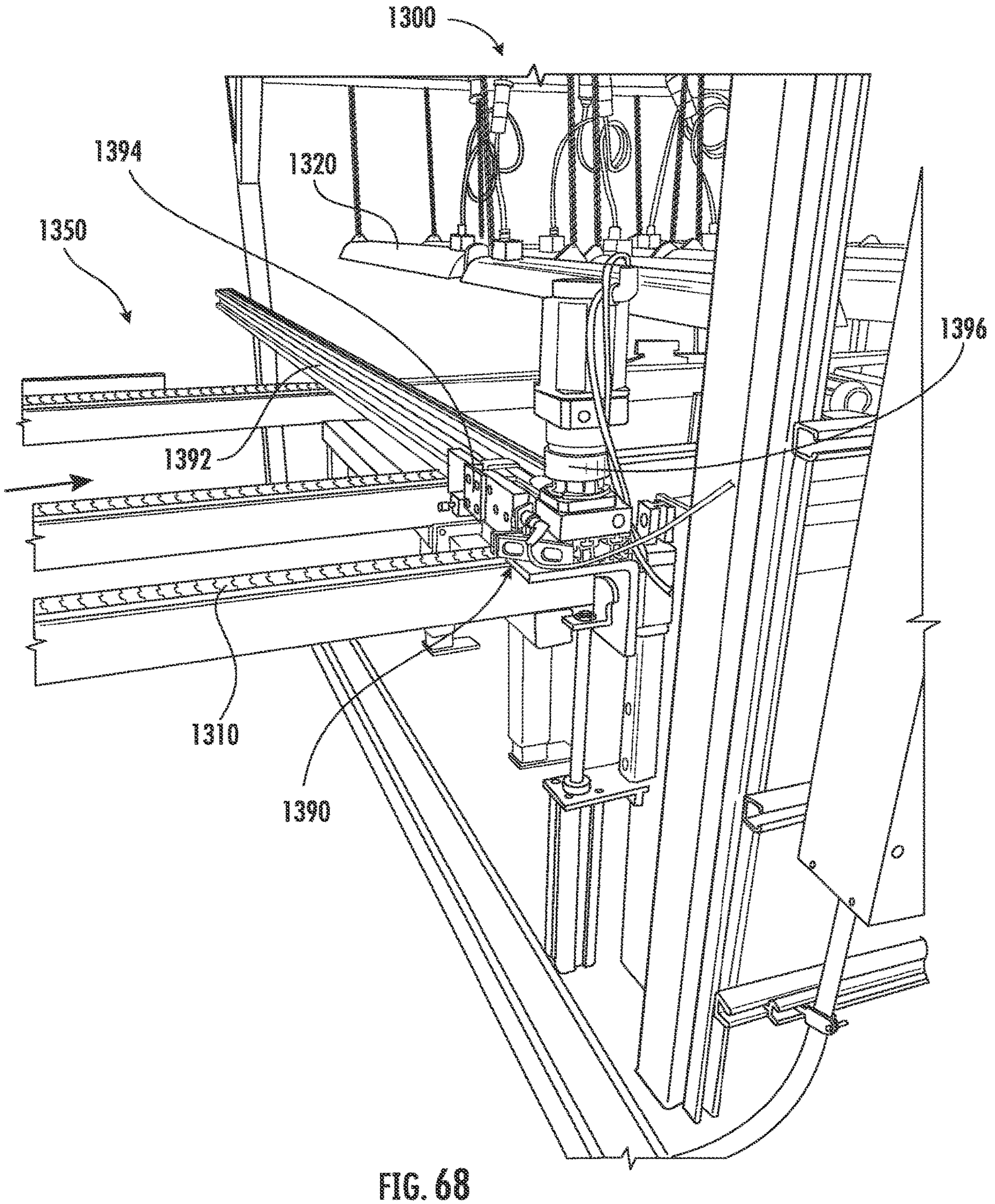

FIG. 68 is an isometric view of an example embodiment of a wall covering scoring and removal station of the wall covering station shown in FIG. 67.

Figure 69:
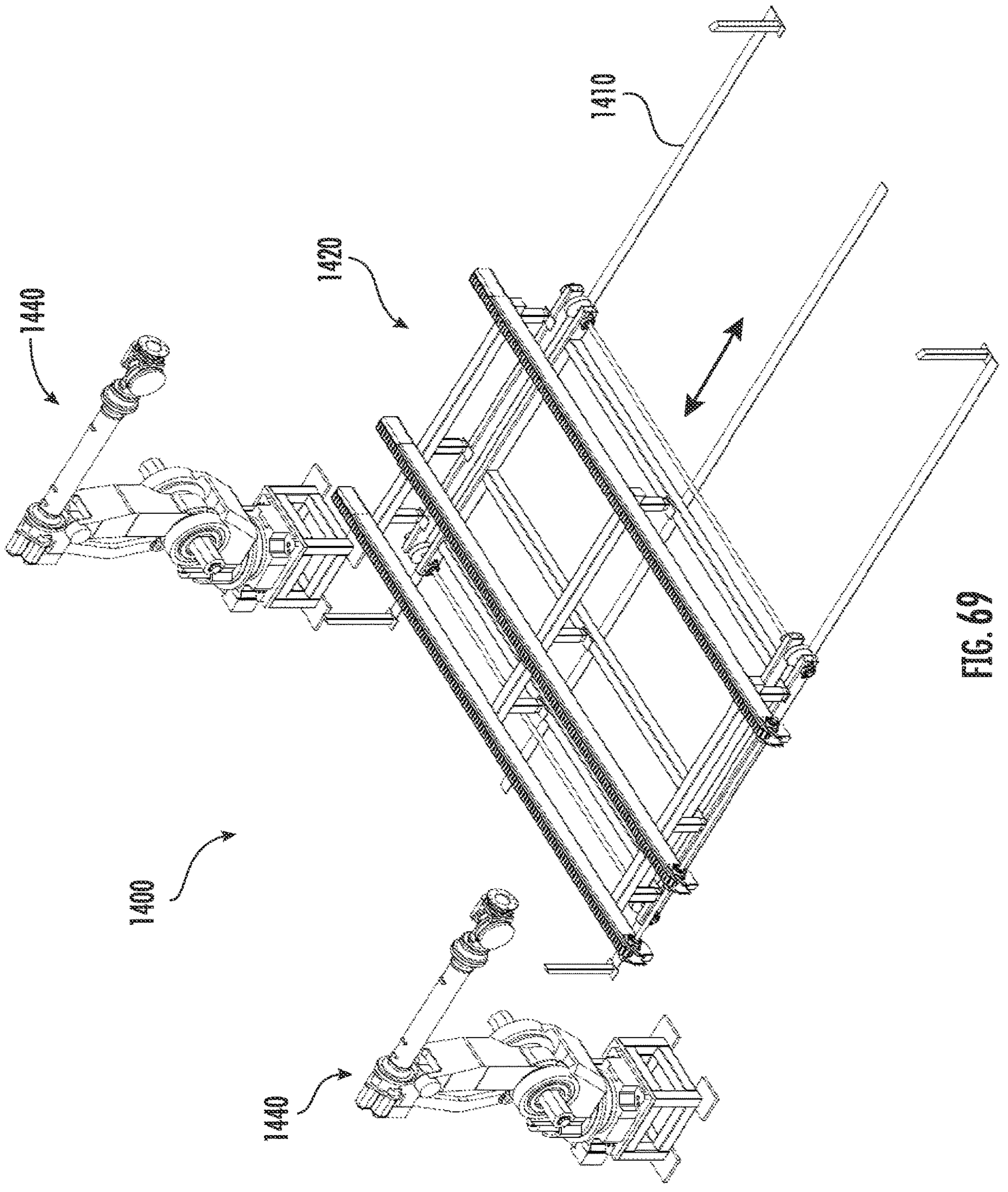

FIG. 69 is an isometric view of the wall flip table station shown schematically in FIG. 1.

Figure 70:
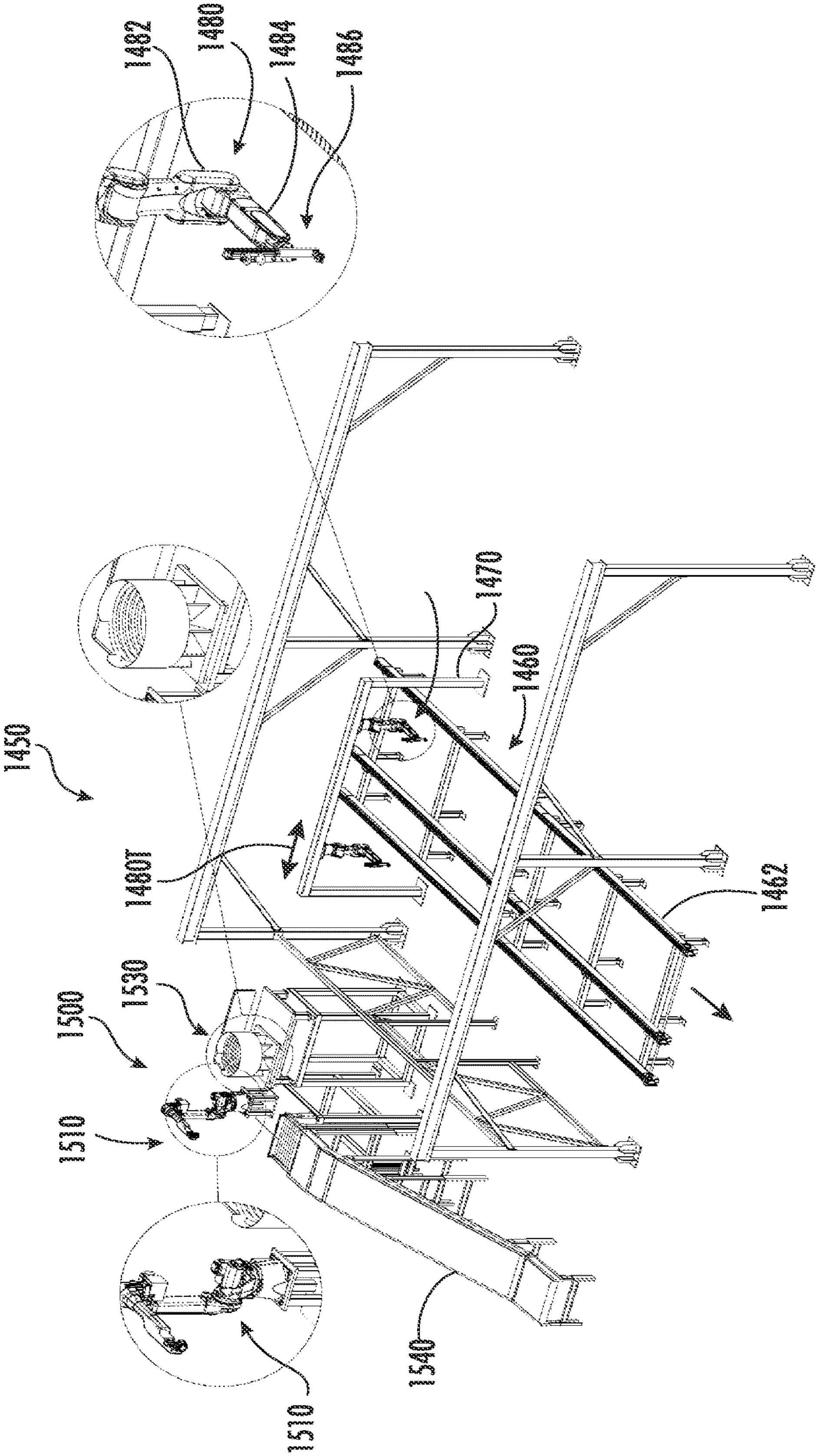

FIG. 70 is an isometric view of the lag bolt installation station shown schematically in FIG. 1.

Figure 71:
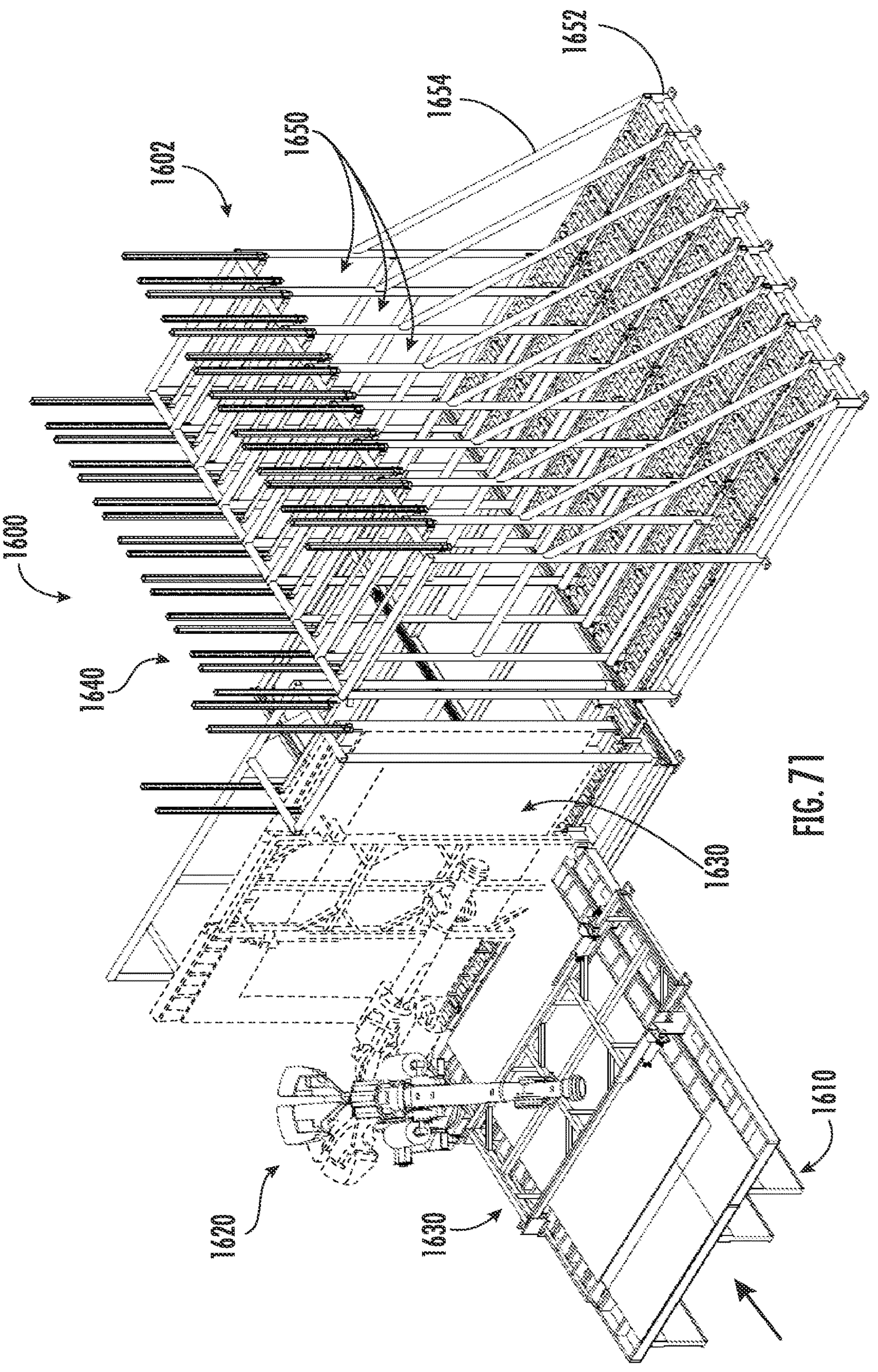
Figure 72:
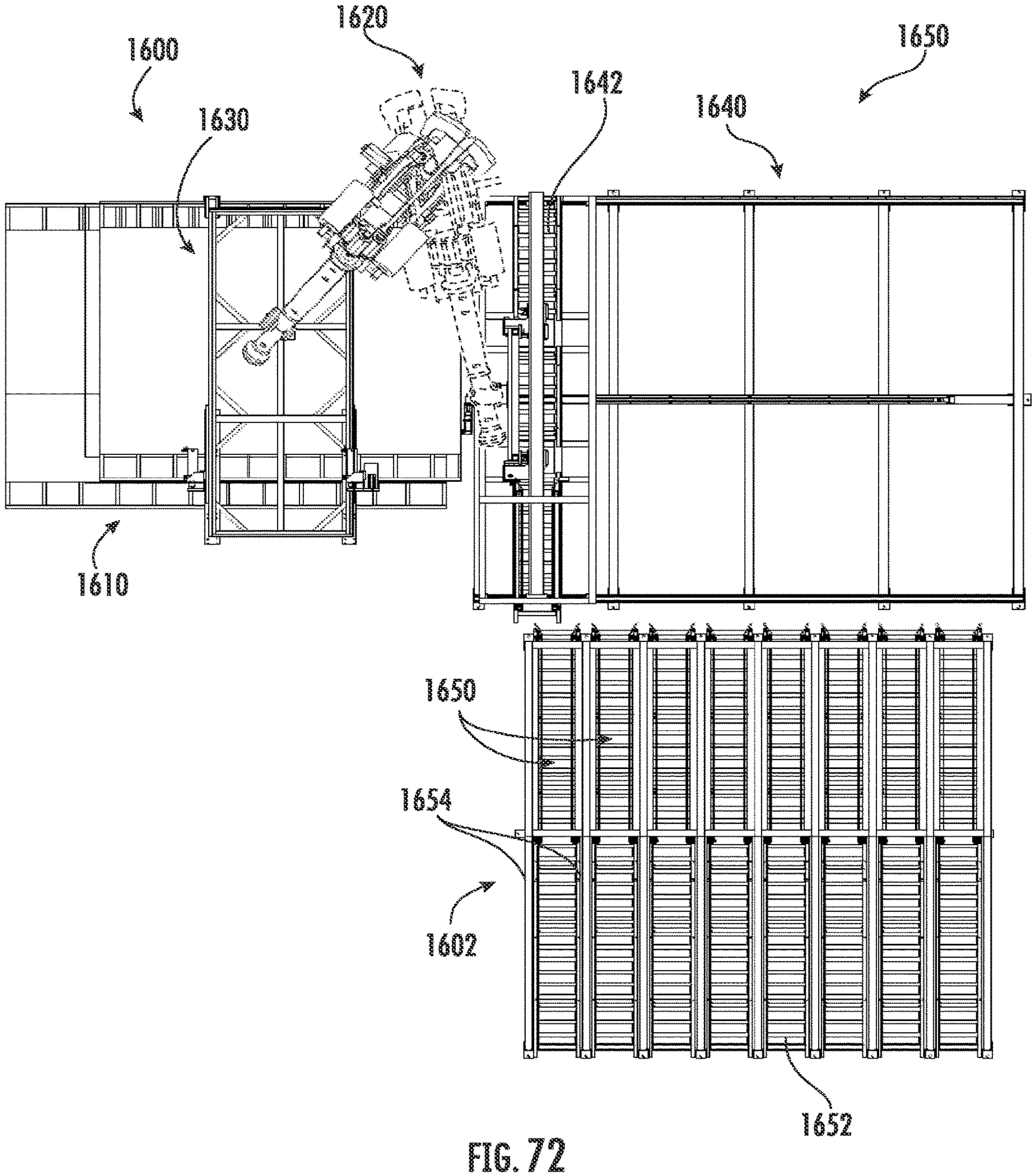
Figure 73:
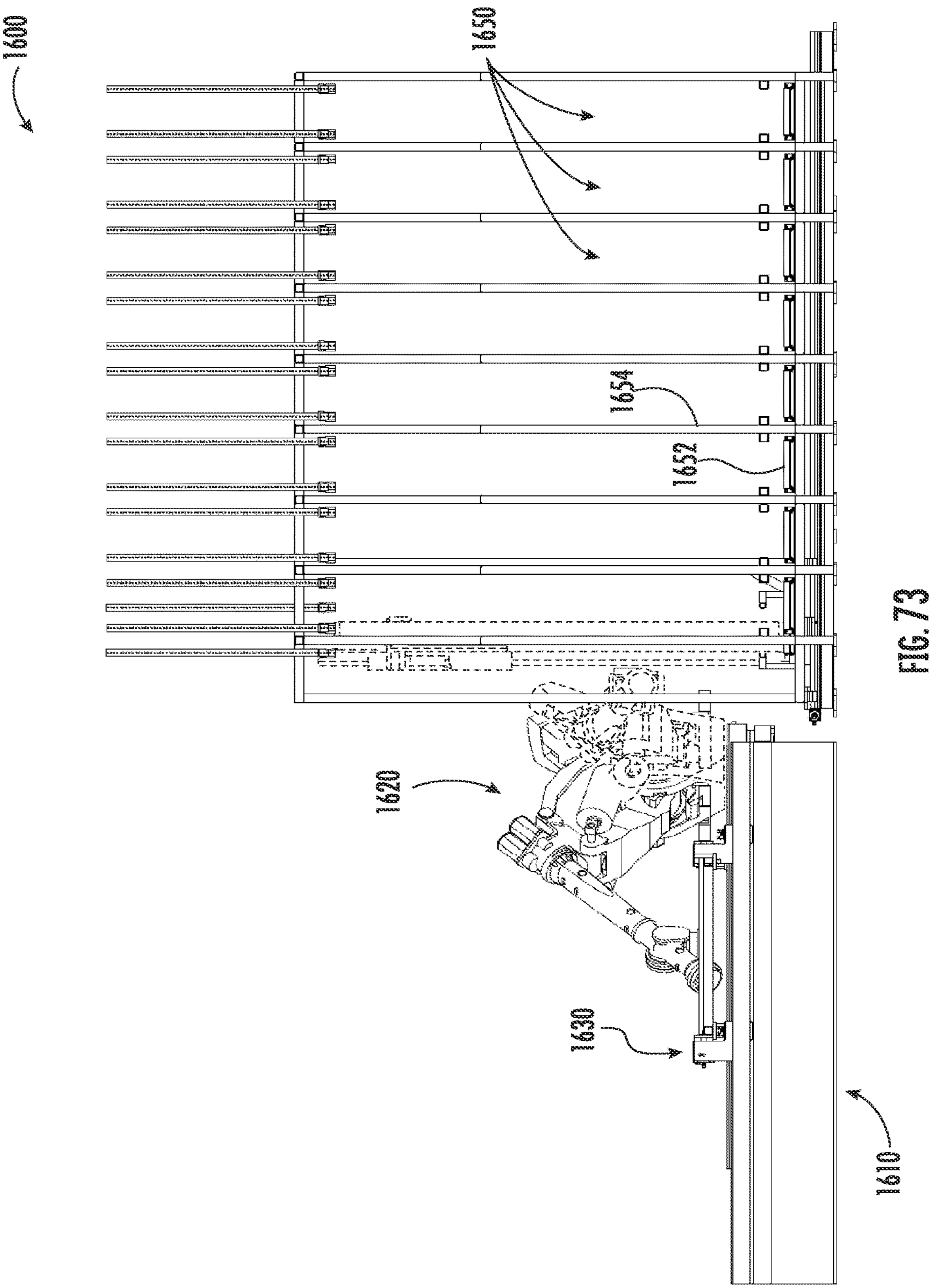

FIGS. 71-73 are respective isometric, top plan, and side plan views of the wall frame transfer and storage magazine station shown schematically in FIG. 1.

Figure 74:
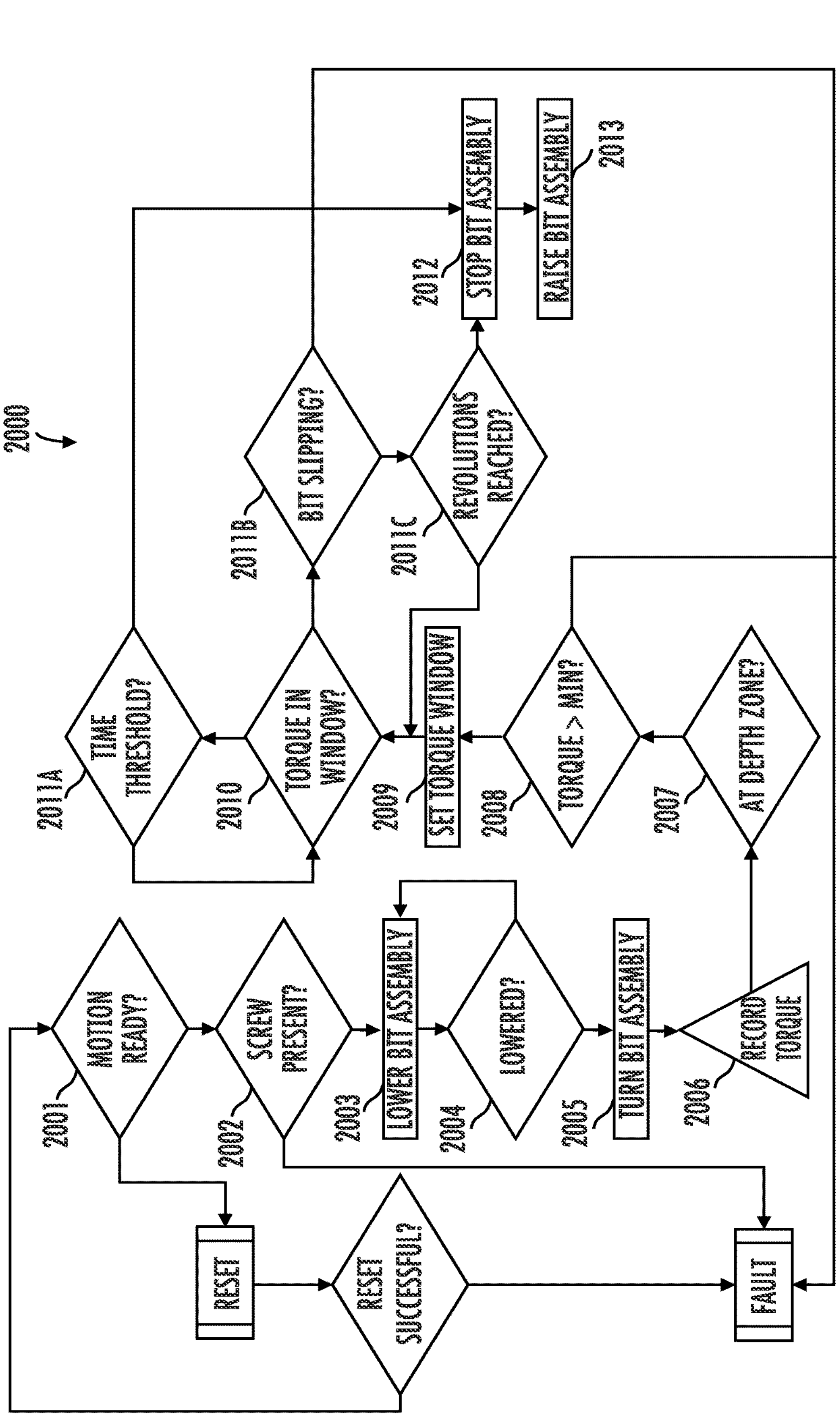

FIG. 74 is a flow chart for an example embodiment of a method for attaching objects together using an automated screwdriver system, for example, as may be implemented at the drywall installation station of FIGS. 63-66B.

DETAILED DESCRIPTION

The presently disclosed subject matter now will be described more fully hereinafter, in which some, but not all embodiments of the presently disclosed subject matter are described. Indeed, the disclosed subject matter can be embodied in many different forms and should not be construed as limited to the embodiments set forth herein; rather, these embodiments are provided so that this disclosure will satisfy applicable legal requirements.

The terminology used herein is for the purpose of describing particular embodiments only and is not intended to be limiting of the presently disclosed subject matter.

While the following terms are believed to be well understood by one of ordinary skill in the art, the following definitions are set forth to facilitate explanation of the presently disclosed subject matter.

All technical and scientific terms used herein, unless otherwise defined below, are intended to have the same meaning as commonly understood by one of ordinary skill in the art. References to techniques employed herein are intended to refer to the techniques as commonly understood in the art, including variations on those techniques or substitutions of equivalent techniques that would be apparent to one skilled in the art. While the following terms are believed to be well understood by one of ordinary skill in the art, the following definitions are set forth to facilitate explanation of the presently disclosed subject matter.

In describing the presently disclosed subject matter, it will be understood that a number of techniques and steps are disclosed. Each of these has individual benefit and each can also be used in conjunction with one or more, or in some cases all, of the other disclosed techniques.

Accordingly, for the sake of clarity, this description will refrain from repeating every possible combination of the individual steps in an unnecessary fashion. Nevertheless, the specification and claims should be read with the understanding that such combinations are entirely within the scope of the present disclosure and the claims.

All publications, patent applications, patents and other references cited herein are incorporated by reference in their entireties for the teachings relevant to the sentence and/or paragraph in which the reference is presented.

Following long-standing patent law convention, the terms "a", "an", and "the" refer to "one or more" when used in this application, including the claims. Thus, for example, reference to "an element" includes a plurality of such elements, and so forth.

Unless otherwise indicated, all numbers expressing quantities of ingredients, reaction conditions, and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter.

As used herein, the term "about," when referring to a value or to an amount of a composition, mass, weight, temperature, time, volume, concentration, percentage, etc., is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

The term "comprising", which is synonymous with "including" "containing" or "characterized by" is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

As used herein, the term "substantially," when referring to a value, an activity, or to an amount of a composition, mass, weight, temperature, time, volume, concentration, percentage, etc., is meant to encompass variations of in some embodiments ±40%, in some embodiments ±30%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed apparatuses and devices.

Referring now to FIG. 1, an example embodiment of a system, generally designated 100, for creating a wall frame assembly for use in creating a modular construction unit, such as, for example, a modular room that is built in a factory, transported in a substantially assembled state to a construction site, and secured to form a larger building, such as, for example, a hotel constructed from a plurality of such modular construction units, is disclosed. While the system 100 is described herein according to an example embodiment, any of the features can be augmented, duplicated, replaced, removed, modified, etc. without deviating from the scope of the subject matter disclosed herein.

In this example embodiment, the system 100 comprises a lumber yard and transport station 110, which provides dimensional lumber to a lumber saw station 140, where the dimensional lumber is cut to a length specified according to a set of instructions for the given wall section being assembled. After being cut to length, the cut lumber is transferred to a lumber distribution station 160, which is located at or adjacent to an output of the lumber saw station 140. At the lumber distribution station, the cut lumber is either transferred onto a plate conveyor 164 or onto a cut lumber storage rack 170. Lumber that is cut to a length for use as a top or bottom plate in the assembled wall section is transferred along the top and bottom plate conveyor, to a main framing assembly station 320. Lumber that is cut to a length for use in a smaller framing sub-assembly, such as, for example, a window frame or a door frame, is transferred to the cut lumber storage rack 170. The lumber is removed from the cut lumber storage rack 170 and transferred, when needed to assemble (e.g., produce, construct, etc.) a framing sub-assembly, to a framing sub-assembly station 200. A plurality of individual pieces of cut lumber are arranged and secured together to form a specified framing sub-assembly, which is then transferred to a sub-assembly storage rack and elevator(s) 260, 290. The framing sub-assemblies are then transferred, when needed to be integrated into a wall frame, to the main framing assembly station 320.

At the main framing assembly station 320, the top and bottom plates are transferred from the plate conveyor 164 into respective assembly positions, so that wall studs and/or framing sub-assemblies can be securely assembled therebetween. The system 100 comprises a wall stud station 400, which receives dimensional lumber from a lumber yard, cuts the dimensional lumber to a length corresponding generally to a height of the wall frame being assembled, and transports the cut wall stud to the main framing assembly station 320, where each wall stud is rigidly attached between the bottom plate and the top plate at the main framing assembly station 320 according to the design of the wall frame being constructed. As each wall stud and/or framing sub-assembly is attached to and/or between the top plate and the bottom plate at the main framing assembly station 320, the partially assembled wall frame is output from the main framing assembly station 320 onto an inspection and/or buffer station 470. More than one inspection and/or buffer station 470 may be provided between one or more of the stations disclosed herein for the system 100.

When signaled by a controller, the bare wall frame is transported to a sheathing station 500, which is where a section of the bare wall frame is covered by a plurality of sheathing panels. The sheathing panels can be formed of any suitable material including, for example, oriented strand board (OSB), plywood, and the like. Any portion of the upwardly facing surface of the wall frame can be covered by any suitable arrangement or pattern of sheathing panels based on placement instructions from a controller, which can be determined based on an inventory of sheathing panels in a sheathing panel storage area adjacent to the sheathing station 500. In some embodiments, it is advantageous to leave a portion of the wall frame uncovered at the top and bottom areas thereof to allow for improved attachment of the assembled wall section to the other components of the modular construction unit. The sheathing panels are, at least temporarily, secured in place over the wall frame by any suitable number of fasteners, such as, for example, staples, nails, screws, and the like.

After the specified amount of the surface of the wall frame is covered with the sheathing panels attached thereto is assembled, the sheathed wall frame is transferred to another inspection/buffer station 470, which may include a plurality of such stations or may be omitted entirely, as noted elsewhere herein. When signaled by the controller, the wall frame is transported from the inspection/buffer station 470 into a sheathing fastening station 620, in which one or more (e.g., a plurality of) fastening devices are used to securely attach the sheathing panels over the surface of the wall frame. The fastening devices of the sheathing fastening station 620 can use the same or different fasteners from the fasteners used to temporarily secure the sheathing panels to the wall frame at the sheathing station 500. The fastening devices follow the internal pattern of the wall studs and framing sub-assemblies to apply fasteners therealong, securely attaching the sheathing panels to the wall frame.

After the fasteners are applied thereto, the wall frame exits the sheathing fastening station 620 and proceeds to another inspection/buffer station 470, which may include a plurality of such stations or may be omitted entirely, as noted elsewhere herein. When signaled by the controller, the wall frame is transported from the inspection/buffer station 470 into a pre-drilling station 700. At the pre-drilling station 700, the wall frame has one or more holes formed through an entire thickness (e.g., in the direction defining the thickness of the wall frame) of one or more (e.g., all) of the individual wall studs that form the vertical dimension of the wall frame, defining the height thereof. These pre-drilled through-holes are used to insert threaded fasteners therethrough to attach the wall module, after it is completely assembled, to other structures of the modular construction unit, for example, the floor or the ceiling. The pre-drilled through-holes are advantageous at least for the reason that they allow for the threaded fasteners to be engaged through the thickness thereof without causing structural damage, for example, by splintering and/or cracking of the wall studs, when the threaded fasteners are threadably engaged through the corresponding wall stud.

After the through-holes are drilled through the wall studs, the wall frame exits the pre-drilling station 700 and proceeds to another inspection/buffer station 470, which may include a plurality of such stations or may be omitted entirely, as noted elsewhere herein. When signaled by the controller, the wall frame is transported from the inspection/buffer station 470 into a sawing/routing station 800. At the sawing/routing station 800, the controller provides instructions indicating the positions within the wall frame at which the one or more framing sub-assemblies (e.g., window frames and/or door frames) are installed within the wall frame. The instructions include, for example, the outer dimensions (e.g., height and width) of each framing sub-assembly, as well as the vertical and lateral positions at which each individual framing sub-assembly is attached within the wall frame. The sawing/routing station 800 has at least one saw that is aligned to cut a slot along the bottom edge and/or top edge of the framing sub-assembly. In some embodiments, two saws are provided, one each to cut the slots to define the top and the bottom edges of the framing sub-assembly substantially simultaneously. The sawing-routing station 800 has at least one further saw that is aligned to cut a slot along one of the lateral edges of the framing sub-assembly. After the respective saws have cut the corresponding slots to form the lateral and vertical edges of one or more of the framing sub-assemblies, the sheathing panel(s) through which the slots were formed may drop out of the wall frame, defining the openings through the framing sub-assembly. In some embodiments, it may be disadvantageous to cut fully through each corner defined by the open area of the framing sub-assembly. In such embodiments, the router of the sawing-routing station 800 may be used to remove all of the material at the corners and/or to remove any sheathing material within or adjacent to the opening defined by the framing sub-assembly.

After the openings corresponding to the framing sub-assemblies are cut in the sheathing, the wall frame moves from the sawing/routing station 800 to the first flip table 900. The first flip table 900 rotates the wall frame by approximately 90 degrees from the horizontal position, in which the wall frame is formed to this point, to a substantially vertical position and then transfers the wall frame to a utility installation station 950, at which internal contents are arranged and installed within the wall frame, including, for example, one or more of electrical wiring, plumbing, telecommunications, and the like. The installation of the utilities within the wall frame at the utility installation station 950 may be accomplished manually, via automation (e.g., one or more robots following aspects of the instructions at a controller), or a combination of manual and automated steps. In some aspects, the utility installation station 950 comprises a display on which schematics for the installation of the utilities corresponding to the instructions for the wall module being assembled can be displayed to one or more operator installing the utilities at the utility installation station 950. After the utilities are installed within the wall frame at the utility installation station 950, the wall frame is transferred to a second flip table 970, at which the wall frame is rotated by substantially 90 degrees in the same direction in which the first flip table rotates the wall frame from the substantially horizontal to the substantially vertical orientations, and is transferred to an insulation installation station 1000. As such, the wall frame is rotated, from the transfer of the wall frame onto the first flip table 900 to the transfer of the wall frame from the second flip table 970 to the insulation installation station 1000, by substantially 180 degrees, such that the sheathed side of the wall frame is turned from being oriented in the downward direction (e.g., relative to the direction of gravity) at the sawing/routing station 800 to being oriented in the upward direction (e.g., relative to the direction of gravity) at the insulation installation station 1000.

At the insulation installation station 1000, one or more automated robots are provided with an articulated insulation installation head, which is connected to an insulation loading area 1100 that supplies blown insulation material to be installed at a predetermined density within the cavities defined vertically between the top and bottom plates, laterally between adjacent and non-consecutive wall studs, and the depth of which is defined by the sheathing panels attached on the downward facing surface of the wall frame. The insulation is, in some embodiments, advantageously retained within the cavities of the wall frame while the wall frame is in, or transferred from, the insulation installation station 1000. After the insulation is installed within the wall cavities, the wall frame is transferred to a curing station 1300, at which the outer (e.g., exposed) surface of the insulation within each wall cavity is cured, for example, by applying radiative heat by an array of radiative heaters, to form a hardened outer surface of the insulation material.

Once at least the outer surface of the insulation within the wall cavities is cured to a specified moisture content, the wall frame is transferred to a drywall installation station 1200, at which a plurality of wall covering panels (e.g., drywall, sheetrock, or any suitable interior wall covering material) are applied to the uncovered, vertically upwardly arranged, surface of the wall frame. The drywall installation station 1200 comprises a plurality of fastening devices (e.g., automated screwdrivers), which can advantageously be arranged in a linear array to align with one of the corresponding wall studs forming the wall frame to sequentially attach the wall covering panels to each adjacent wall stud of the wall frame. The plurality of fastening devices can further advantageously be used to attach the wall covering panels around any framing sub-assemblies installed within the wall frame. A plurality of filler applicators can be provided in some embodiments, substantially aligned with a corresponding one of the fastening devices, the filler applicators being configured to apply a suitable amount of a filler (e.g., a heat-curable mastic) within the holes in the wall covering panels by each of the fasteners being driven into the wall covering panel to secure the wall covering panel to the wall frame. A blade can be provided, adjacent the filler applicators, to shape the surface of the mastic to be substantially coplanar with the wall covering panels and to remove any excess mastic from the surface thereof. In some further embodiments, a suitable cosmetic tape may be applied, along with a suitable mastic, over the joints formed between adjacent ones of the wall covering panels to form a finished internal surface of the wall.

After each of the plurality of wall covering panels has been secured in the designated position on the wall frame by the fasteners, the wall frame is transferred to a second curing station 1300 where the mastic applied within the holes formed by the fasteners and over/under the cosmetic tape sections is cured, for example by applying radiant heat to the exposed surface of the wall frame comprising the wall covering panels. The radiant heat can be applied by a plurality of radiant heaters arranged over and adjacent a conveyor along which the wall frame is transported in an array. The wall frame is moved along the conveyor at a suitable speed such that the mastic is exposed to a sufficient intensity of heat for a time sufficient to raise the temperature of the mastic to a temperature necessary to substantially cure the mastic and join the wall covering panels together.

After the mastic is cured to a sufficient degree of hardness, the wall frame is transferred to a wall covering station 1350, where a desired wall covering material is applied over the plurality of wall covering panels. The wall covering can be a wall paper having a desired texture, high-wear surface coating, or any other desired feature for a wall covering. The wall covering can be applied via an automated process from a substantially continuous roll of wall covering material. Each successively applied layer of wall covering material can be applied to overlap each previously applied layer of wall covering material to ensure that no lateral gaps are present between adjacent layers of wall cover material and a substantially continuous and/or uninterrupted layer of wall covering material is applied over the plurality of wall covering panels. An overlap region defined by a visible double layer of wall covering material is therefore created. To remove this dual layer of wall covering material, the wall covering station 1350 has, at a position after the position at which the wall covering material is removed from the roll and applied to the wall covering panels, a cutting device (e.g., a razor) that forms an incision through both layers of the wall covering material along the length thereof in the overlap region. The upper and lower severed portions of wall covering material are removed prior to the adhesive, which is applied to bond the wall covering material to the surface of the wall covering panels, being cured. As such, a substantially continuous and/or uninterrupted single layer of wall covering material is formed along the entire width and height of the surface of the wall covering panels of the wall frame. After the severed portions of the double layers of wall covering material have been removed, the wall frame is transferred to a curing station 1300 where the adhesive between the wall covering material and the wall covering panels is cured to adhesively secure the wall covering material over the wall covering panels.

With the wall covering material cured to the wall covering portions, the wall frame is transferred to a flip table 1400, which rotates the wall frame by substantially 180 degrees, such that the sheathing side of the wall frame faces in the upward direction, such that the wall covering panel faces downward, adjacent the conveyor surface. Next, the wall frame is transferred to a lag bolt installation station 1450, where lag bolts are threadably inserted, at least partially, through the through-holes formed in one or more of the wall studs at the pre-drilling station 700. These lag bolts are fed automatically into each of a plurality of automated robots with fastener heads attached at the distal ends thereof, the automated feeding of the lag bolts being performed such that the orientation of the lag bolts fed to the robots is consistent. This partial engagement of the lag bolts is advantageous at least for the reason that, when the wall modules are assembled with other structural modules to form the modular construction unit, the positions of the lag bolts will be known and they can be engaged and driven into the other structural modules in an automated manner without requiring manual insertion of each lag bolt during such a subsequent assembly process of the modular construction unit.

After the lag bolts are threadably secured in and/or to the wall frame as necessary, based on the positions indicated by the instructions for the wall module being assembled, the completed wall module is transferred to a storage station 1600, where the wall module is moved, via an automated robot, from a horizontal transport position into a vertical storage position. Once in the vertical storage position, the wall module is placed onto a storage trolley, which is laterally movable to align the vertically oriented wall module with a vacant slot in a storage magazine and then transfer, for example, using a plurality of rollers on the storage trolley and the vacant slot of the storage magazine, the wall module into the previously vacant slot in the storage magazine. The wall modules can be removed from the slots of the storage magazine in any suitable manner, whether manually or by an automated process, and transported for final assembly of the modular construction unit.

While FIG. 1 is a schematic illustration of the various stations of the system 100 and shows an example embodiment for their arrangement relative to each other, as well as the interactions therebetween, further aspects of each of the respective stations of the system 100 will be described further hereinbelow regarding FIGS. 2-73. It is further noted that the embodiments shown and described hereinbelow regarding these stations is by way of example only, and shall not be interpreted in any way as limiting the scope of the presently disclosed subject matter. Furthermore, one, some, or even a majority of the stations shown and described herein may be omitted, arranged in a different order, etc.

FIGS. 2-4 show various aspects of the lumber yard and transport station, generally designated 110, the lumber saw station 140, and the lumber distribution station, generally designated 160. The lumber yard and transport station 110 comprises a lumber yard with a plurality bays into which dimensional lumber can be loaded in a position under the lumber transport, generally designated 120, where the dimensional lumber is able to be grasped and transported by the lumber transport 120 to the lumber saw input, generally designated 130. The term "lumber," as used herein, is intended to be interpreted broadly to include any suitable building material. For example, "lumber" can include natural wood products, engineered wood products, metal products, and the like. Those having ordinary skill in the art will appreciate that the materials listed hereinabove are not exhaustive and other building materials may be used without deviating from the scope of the presently disclosed subject matter. In the embodiment shown, the lumber yard comprises a plurality of tracks 112 arranged parallel to each other and also to the direction of transport at the lumber saw input 130. For each track 112, a lumber cart 114 is provided, which can be moved, either manually or in an automated manner, along a corresponding one of the tracks 112 to ensure that the lumber is positioned beneath the lumber transport 120.

The lumber transport 120 can be any suitable type of transport apparatus or system; however, the lumber transport 120 is a vertically displaceable overhead crane 124 mounted on a laterally mobile gantry frame 122 in the example embodiment shown. The crane 124 is laterally movable, as generally designated by arrow 120T via wheels attached to the gantry frame 122, in a direction substantially parallel to the tracks 112, such that the crane 124 can be aligned to a sufficient degree with a center of mass of the lumber to allow the safe transport thereof to the lumber saw input 130. The crane 124 is longitudinally mobile, generally designated by the arrow 124T, e.g., along the length of the gantry frame 122, by a set of rollers and/or wheels 126 that rotatably engage against the top surface of the gantry frame 122 to allow the crane 124 to transport a designated piece (or pieces) of lumber from the lumber yard to the lumber saw input 130. The tracks 112 are spaced apart a sufficient distance to allow the lumber transport 120 to vertically access the lumber.

The lumber saw input comprises a plurality of rollers 132, some of which can be idler rollers and some or all of which can be driven rollers. The rollers 132 are configured to rotate and impart a force to move a piece of lumber into the lumber saw 140, where the lumber is cut to a specific length. The lumber saw input 130 also comprises an input conveyor 136, comprising at least two rails that transport, either actively or passively, the lumber deposited thereon by the crane 124 onto the rollers 132. The lumber is loaded by the crane 124 onto the input conveyor 136 in a specific order according to the instructions received by a controller. The quantity and dimension of lumber in each lumber cart 114 is known and the crane 124 is instructed by a computer from which lumber cart to remove lumber for transport onto the input conveyor 136. The instructions from the controller to the crane 124 are based on a specific order in which the pieces of lumber are to be cut by the lumber saw station 140 based on the particular design of the wall section being assembled. The crane 124 is configured to visually determine (e.g., using a camera or other suitable image processing device and techniques) a particular piece of lumber within a designated lumber cart 114 to be removed. In some embodiments, the crane 124 is vacuum operated and/or has mechanical gripping features that can be engaged about the piece of lumber being transported to lift the lumber clear of the lumber cart 114.

The lumber saw station 140 makes precision cuts based on instructions received from a controller, which can be a single controller for the system 100 (see FIG. 1) or a discrete controller at one or more of the individual stations. The instructions pertain to various lengths and quantities of dimensional lumber that are needed in the construction of a modular construction unit, such as, for example, a hotel room, condominium, apartment, commercial structure, or single family dwelling. The instructions are optimized to reduce material waste based on the type and quantity of lumber available in the lumber yard. An output conveyor 142 is arranged at an outlet from the lumber saw station 140 and is configured to transport the cut lumber into the lumber distribution station, generally designated 160. A scrap conveyor 144 is provided at or adjacent to an output of the lumber saw station 140 to remove any scrap pieces of lumber that are too small (e.g., short) to be used in forming any portion of the specified wall section.

The lumber distribution station 160 comprises a distribution robot, generally designated 150, a plate trolley, generally designated 162, and a plate conveyor 164. The distribution robot 150 comprises a rigidly-mounted base 152, a first arm 154 that is both rotatable and pivotable relative to the base 154, a second arm 156 that is rotatable relative to the first arm 154, and an end effector 158 that moves the cut lumber from the output conveyor onto either the plate trolley 162 or the cut lumber storage rack, generally designated 170. The end effector can utilize vacuum retention, mechanical gripping, or any suitable type of device to grasp and remove the cut lumber from the lumber conveyor 142 onto either the plate trolley 162 or the cut lumber storage rack 170. In some embodiments, an imaging processing system may be used to recognize whether a piece of cut lumber is of a size for use as a top plate or bottom plate or is of a size associated with constructing a framing sub-assembly. In some other embodiments, the cut piece of lumber is moved to a set position and the distribution robot 150 is triggered (e.g., by the controller) to grasp the cut lumber at the set position and transfer it onto either to plate trolley 162 or the cut lumber storage rack 170. In some embodiments, the distribution robot 150 may not need to physically lift the cut lumber for the top and bottom plates onto the plate trolley 162, but may instead be able to nudge or otherwise push the cut lumber off of the output conveyor 142 and onto the adjacent plate trolley 162. The plate trolley 162 comprises a plurality of rails oriented transverse to the length direction of the cut lumber, each of the rails having a plurality of rolling surfaces (e.g., wheels and/or rollers) sufficient to transport, advantageously only by the force of gravity, the cut lumber into an inlet trough of the plate conveyor 164. The inlet trough can be vertically lower than the output edge of the plate conveyor 164 and have inlet guide features to help ensure that the cut lumber is successfully transferred from the plate trolley 162 into the plate conveyor 164 without requiring further manual intervention. In some embodiments, a vibration may be induced (e.g., by a rotary or linear oscillator) in the plate conveyor 164 to ensure proper transfer of the cut lumber from the plate trolley 162. Once loaded into the plate conveyor 164, the cut lumber for use as a top plate or a bottom plate is transported along the lumber conveyor to the main framing assembly station (320, see, e.g., FIG. 1).

FIGS. 5-11B show various aspects of the cut lumber storage rack, generally designated 170, the framing sub-assembly station 200, and the framing sub-assembly elevator, generally designated 260, and the framing sub-assembly storage rack, generally designated 290.

The cut lumber storage rack 170 is, in the embodiment shown, a multi-level conveyor system having a plurality of levels into or onto which the cut lumber for use in forming a framing sub-assembly can be loaded. In the embodiment shown, because the framing sub-assemblies to be formed have a generally rectilinear profile requiring only two different lengths of lumber for their construction, the cut lumber storage rack 170 has two internal shelves 172A, 172B. The first shelf 172A is used to hold cut lumber having a first length associated with a top/bottom plate or a lateral side of the framing sub-assembly to be constructed. The second shelf 172B is used to hold cut lumber having a second length associated with the other of the top/bottom plate or the lateral side of the framing sub-assembly to be constructed that is not stored on the first shelf 172B. The first and second shelves 172A, 172B can comprise any suitable construction. In the embodiment shown, the first and second shelves comprise a plurality of driven belts running from the rear edge to the front edge of the respective shelf 172A, 172B. The rear edge is defined as the edge at which the cut lumber is loaded thereon by the distribution robot 150. The belts are connected to a motor 178 by a common driveshaft that is rotatably connected to a transmission 176. In some embodiments, the shelves 172A, 172B can be inclined so that the movement of the cut lumber from the rear edge to the front edge is accomplished solely by the force of gravity and, in such embodiments, the shelves 172A, 172B can comprise a plurality of rollers or wheels attached or affixed to a plurality of longitudinal members that are attached between the rear edge and the front edge (e.g., similar in construction to the plate trolley 162). In such embodiments, the angle of inclination of each shelf 172A, 172B can be independently controlled and can be varied between any of a plurality of angles of inclination. It is advantageous for a stop bar, or other suitable stop device (e.g., a plurality of protruding tabs), to be arranged at or adjacent to the front edge of each of the shelves 172A, 172B so that cut lumber stored thereon does not fall out of the cut lumber storage rack 170 onto the framing sub-assembly station 200. In some embodiments, each of the shelves 172A, 172B comprise a lateral registration device configured to ensure that the position of the cut lumber on each shelf 172A, 172B is in a known, repeatable position.

The framing sub-assembly station 200 is arranged adjacent to the front edge of, and may protrude beyond (e.g., towards the rear edge of), the cut lumber storage rack 170. The framing sub-assembly station 200 comprises an assembly table 210. At least one gripper robot, generally designated 240, and at least one fastener robot, generally designated 220 are provided at, about, and/or adjacent to the assembly table 210. While any suitable number of gripper robots 240 and fastener robots 220 may be provided based on the geometry of the framing sub-assembly being assembled. The framing sub-assembly can be any of a door frame, a window frame, a partial interior wall of the modular construction unit, or any other desired structure that is dimensionally smaller, when assembled, than the assembly table 210. In the embodiment shown, the framing sub-assembly comprises a plurality (e.g., two) of gripper robots 240 and a plurality (e.g., two) of fastener robots 220. The gripper robots are positioned adjacent to the assembly table 210 in positions where the gripper head, generally designated 256, can access and grasp cut lumber at a known, registered, position adjacent to the front edge of the cut lumber storage rack 170. In the example embodiment shown, the gripper robots 240 are mounted on pedestals and arranged substantially symmetrically on opposite sides of the assembly table 210. Similarly, in the example embodiment shown, the fastener robots 220 are mounted on a frame 216 that extends over a portion of the assembly table 210, the distance between the top surface of the assembly table 210 and the bottom surface of the frame 216 defining a gap 212 through which the assembled framing sub-assembly is transported from the assembly table 210 onto the sub-assembly elevator 260. The gap 212 has at least a vertical height greater than the thickness or depth of the framing sub-assembly being assembled to allow the assembled framing sub-assembly to pass therethrough. In some embodiments, the height of the frame 216 can be varied to accommodate framing sub-assemblies of varying thicknesses or depths.

After the cut lumber is removed from the cut lumber storage rack 170 by one or more of the gripper robots, the cut lumber is placed on the assembly table 210 and arranged in a geometric pattern, as detailed by the instructions via the controller, associated with the framing sub-assembly being assembled. By way of example, the geometric pattern can be one of an outer perimeter of a window frame, a door frame, or the constituent parts of an internal wall that will constitute a structure of the modular construction unit separate from the wall frame. These instructions may be dynamically interpreted by software and communicated by a controller to at least one of the gripper robots 240. The gripper head 256 is configured to engage with the cut lumber on the assembly table 210 in order to secure and stabilize the cut lumber in the specified geometric pattern, based on the instructions for the framing sub-assembly being assembled. Once the cut lumber is in the correct position, which can be stabilized by a stationary or mobile squaring guide and/or retractable pins within the assembly table 210 to align the cut lumber in the precise locations specified in the instructions, the lumber pieces are attached to each other by one or more of the fastener robots 220, which are equipped with fastener heads 236 (e.g., nail guns) at the distal ends thereof. Any suitable type of fastener and fastener head 236 may be used on the fastener robots 220. The gripper heads 256 can be used to secure a piece of cut lumber to prevent relative movement thereof, relative to the gripper head 256, during transport of the cut lumber from the cut lumber storage rack 170 and the assembly table 210. Further aspects of the example embodiment of the fastener robots 220 are shown in FIGS. 9A and 9B. The fastener robots 220 are 6-axis robotic arms that are connected, via a stationary base 222, to a frame 216 or other suitable support structure. The fastener robots 220 comprise a hub 224 that is attached to the base 222 and is capable of rotating relative to the base 222, as indicated by rotary motion path 224R. This rotary motion path is defined in a plane that is substantially parallel to the plane defined by the top surface of the assembly table 210. A first arm 226 is attached to the hub 224 and is rotatable, as indicated by arrow 226R, relative to the hub 224 in a plane that is substantially orthogonal to the plane defined by the rotary motion path 224R. A knuckle 228 is attached to the first arm 226 and is rotatable, as indicated by arrow 228R, relative to the first arm 226 in a plane that is, for example, substantially co-planar with the plane defined by arrow 226R. Knuckle 228 connects a second arm 230 to the first arm 226. The second arm 230 is, in some embodiments, rotatable relative to knuckle 228, as indicated by arrow 230R. A fastener head 236 is pivotably attached, as indicated by arrow 236R, at the distal end of the second arm 230.

Second arm 230 can be hollow to allow passage of control devices (e.g., pneumatic or hydraulic lines or tubes, electrical wires, actuation wires, and the like) between the knuckle 228 and the second arm 230. In the embodiment shown, the fastener head 236 comprises an automated nail gun that is fed by a magazine 238 containing nails of a specific size and length. The number of nails remaining in the magazine 238 can be tracked by a controller and a signal can be generated by the controller to proactively indicate that the magazine 238 needs to be replenished before the supply of nails therein is exhausted, thereby limiting downtime of the framing robot 220.

In some embodiments, the fastener robots 220 are configured for redundant operation such that, if one fastener robot 220 malfunctions, depletes the supply of nails available, etc., the remaining operational fastener robot 220 can continue operation to fasten together the cut lumber into the intended framing sub-assemblies, although likely at a reduced rate of throughput. Nails and a nail gun are shown in this example embodiment, however any suitable fastening device and type of fastener may be used without limitation for the fastener head 236 of one, some, or all of the fastener robots 220. Similarly, while fastener robot 220 is shown in this example embodiment as a 6-axis robotic arm, any suitable type of automated fastening system can be utilized without deviating from the scope of the subject matter disclosed herein.

In some embodiments, it is advantageous, due to the number of fasteners that are typically applied by the fastener robot 220, for the fastener head 236 to be configured for automated removal and replacement with a second fastener head 236 to extend the intervals between when the supply of fasteners must be replenished. As such, the fastener robot 220 is configured with a two-part tool changing system, with a mounting cleat being attached to the distal end of the second arm 230 and a quick-release mounting bracket attached to a surface of the fastener head 236. The mounting cleat and the mounting bracket can have, for example, complementary profiles so that the fastener head 236 can be removably and/or rigidly mounted to the fastener robot 220 by the mounting bracket being engaged over, around, etc. the mounting plate. In some embodiments, one or move retractable pins may be provided to interlock the mounting bracket with the mounting plate. This retractable pin can be retracted, e.g., by the fastener robot 220 pulling a wire connected to the pin, to allow for the mounting bracket, as well as the fastener head 236 attached thereto, to be separated from the distal end of the second arm 230 of the fastener robot 220.

In some such embodiments, a plurality of fastener heads 220 with substantially identical mounting brackets attached thereto are arranged (e.g., in an attachment area, which can be a linear array) in a position accessible by the fastener robot 220. A first fastener head 236 is attached to the fastener robot 220 and is used to apply fasteners in assembling variously sized and shaped framing sub-assemblies until the supply of fasteners in the first fastener head 236 is depleted. The fastener robot 220 then disengages the first fastener head 236, e.g., by disengaging the mounting bracket from the mounting plate, and discards the first fastener head 236 (e.g., places it in a location for depleted fastener heads to be reloaded with fasteners). The fastener robot 220 then engages a second fastener head 236 and continues applying fasteners in assembling the framing sub-assemblies at the framing sub-assembly station 200. After the fasteners preloaded in the second fastener head 236 are depleted, the second fastener head 236 is disengaged from the fastener robot 220 and discarded, then a third fastener head 236 is attached to the fastener robot 220. This process is repeated as many times as possible until there are no more fastener heads 236 located in the attachment area having fasteners loaded therein.

In some embodiments, the fastener heads 236 may be attached and discarded in a same position in the attachment area, a controller being used to determine which fastener heads 236 have already been used and the fasteners therein been depleted accordingly. In some embodiments, the fastener heads may be reloaded with fasteners by an automated process and replaced in a position designated within the attachment area, the controller being updated with the location of the newly replenished fastener head 236. In some embodiments, the fastener heads 236 in the attachment area are positioned on a frame in which each fastener head 236 is oriented substantially uniformly so that the fastener robot 220 can attach the mounting plate to the mounting bracket in a repeatable manner without requiring any video or imaging processing thereof to align and attach the mounting plate with the mounting bracket.

Further aspects of the example embodiment of the gripper robots 240 are shown in FIGS. 10A and 10B. The gripper robots 240 are 6-axis robotic arms that are connected, via a base 242, to a pedestal or other suitable support structure. The gripper robots 240 comprise a hub 244 that is attached to the base 242 and is capable of rotating relative to the base 242, as indicated by rotary motion path 244R. This rotary motion path is defined in a plane that is substantially parallel to the plane defined by the top surface of the assembly table 210. A first arm 246 is attached to the hub 244 and is rotatable, as indicated by arrow 246R, relative to the hub 244 in a plane that is substantially orthogonal to the plane defined by the rotary motion path 244R. A knuckle 248 is attached to the first arm 246 and is rotatable, as indicated by arrow 248R, relative to the first arm 246 in a plane that is, for example, substantially co-planar with the plane defined by arrow 246R. Knuckle 248 connects a second arm 250 to the first arm 246. The second arm 250 is, in some embodiments, rotatable relative to knuckle 248, as indicated by arrow 250R. A gripper head 256 is pivotably attached, as indicated by arrow 256R, at the distal end of the second arm 250.

Second arm 250 can be hollow to allow passage of control devices (e.g., pneumatic or hydraulic lines or tubes, electrical wires, actuation wires, and the like) between the knuckle 248 and the second arm 250. In the embodiment shown, the gripper head 256 comprises a clamping device having opposing and actuatable paddles 258 that can be actuated to clamp together to rigidly secure at least a portion of a piece of cut lumber therebetween. The paddles 258 can be coated with a friction-enhancing material, for example, a rubber or silicone material. In some embodiments, the paddles 258 comprise a metal surface that is machined in such a way as to form a pattern configured to grip (e.g., by having a plurality of small contact points that contact, grip, and/or embed slightly within the wood to a degree sufficient to provide a gripping surface with enhanced friction) at least a portion of a piece of cut dimensional lumber between the paddles 258 during the assembly of a framing sub-assembly.

In some embodiments, the gripper robots 240 are configured for redundant operation such that, if one gripper robot 240 malfunctions, the remaining operational gripper robot 240 can continue operation to position the cut lumber into the geometric patterns for the framing sub-assemblies to be formed, although likely at a reduced rate of throughput. Clamping paddles 258 are shown in this example embodiment, however any suitable gripping device may be used without limitation for the gripper head 256 of one, some, or all of the gripper robots 240. Similarly, while gripper robot 240 is shown in this example embodiment as a 6-axis robotic arm, any suitable type of automated gripping and arranging system can be utilized without deviating from the scope of the subject matter disclosed herein.

The movements of the fastening and gripping robots 220, 240 are directed by software using a dynamic algorithm that allows for the fastening and gripping robots 220, 240 to move collaboratively within the domain defined generally by the outline of the assembly table 210 without conflict (e.g., by contacting each other) regardless of the size of the cut lumber being arranged thereon and fastened together into a framing sub-assembly. The fastening and gripping robots 220, 240 are, in the example embodiment shown, 6-axis robotic arms. Once the instructions are completed and the framing sub-assembly is completely assembled, the completed framing sub-assembly is transferred, for example, by using a servo-driven push bar 214, from the assembly table 210 to a first sub-assembly elevator 260.

The first and second sub-assembly elevators 260 are substantially identical and will be described herein as such. However, possible permutations or alterations described herein may be present in one, both, or none of the sub-assembly elevators 260 of system 100. A sub-assembly storage rack 290 comprising a plurality of storage shelves 294A-E is arranged between the first and second sub-assembly elevators 260. The framing sub-assembly is transferred from the assembly table 210 onto the first sub-assembly elevator 260, onto the sub-assembly storage rack 290, and ultimately onto the second sub-assembly elevator 260. The first and second sub-assembly elevators 260 comprise a plurality of tracks 262 that can be laterally expandable to support framing sub-assemblies of various dimensions. These tracks 262 can comprise, for example, chain-driven conveyors that move the framing sub-assemblies therealong. The tracks 292 are mechanically linked together in a substantially planar arrangement and move vertically, as indicated by arrow 262T, to be able to deposit framing sub-assemblies onto whichever of the storage shelves 294A-E is indicated by a controller. The movement of the tracks 262 is driven by a common driveshaft to ensure that each track moves in unison and the framing sub-assemblies moving therealong are not skewed to any substantial degree during their transit. The shelf 294A-E on which each framing sub-assembly is deposited is tracked in a database so that the contents of each shelf 294A-E and the location of each framing sub-assembly on the shelf 294A-E is known. Each shelf 294A-E comprises a plurality of tracks 292 that can be laterally expandable to support framing sub-assemblies of various dimensions. These tracks 292 can comprise, for example, chain-driven conveyors that move the framing sub-assemblies therealong. The tracks 292 are mechanically linked together in a substantially planar arrangement. The movement of the tracks 292 on each shelf 294A-E is driven by a common driveshaft to ensure that each track moves in unison and the framing sub-assemblies moving therealong are not skewed to any substantial degree during their transit.

The height of the track 262 of both the first and second sub-assembly elevators is adjustable along the path indicated by arrow 262T. In the example embodiment shown, the height of the track by using an adjustment mechanism, generally designated 264 to move the frame to which each track 262 up or down (e.g., vertically) by a chain 266 connected to a motor-driven sprocket 268. Sprockets 268 are attached to the frame at the top and bottom of the corners of the first and second elevators 260 to define an upper and a lower bound of the travel of the tracks 262. The sprockets 268 are driven substantially in unison so that the tracks 262 remain substantially flat (e.g., co-planar). Any suitable drive mechanism, including a worm drive, direct gear, belt drive, and the like may be used for the adjustment mechanism 264.

The sub-assembly elevators 260 are configured to raise the completed framing sub-assembly within a specified shelf 294A-E of a sub-assembly storage rack 290, and then to transfer the finished framing sub-assembly into the specified shelf 294A-E. In the embodiment shown, the sub-assembly storage rack 290 has five shelves 294A-E. The second sub-assembly elevator 260 is located on an opposite side of the sub-assembly storage rack 290 from the first sub-assembly elevator 260. The second sub-assembly elevator 260 is configured to retrieve a specified framing sub-assembly from one of the shelves 294A-E and to move back, along the transport path indicated by arrow 292T, to a height at which the framing sub-assembly can be transported to the main framing assembly station 320. The tracks 262 of the second sub-assembly elevator then transport the framing sub-assembly to the main framing assembly station 320.

A diversion robot, generally designated 280, is provided at and/or adjacent to the first sub-assembly elevator 260. The diversion robot is provided to remove framing sub-assemblies that are assembled at the framing sub-assembly station 200 but are not to be integrated within the wall frame. Examples of such framing sub-assemblies can include, for example, a partial-height internal wall and/or a full-height wall having a smaller width, such as, for example, a bathroom or closet wall. When such a framing sub-assembly is transported from the framing sub-assembly station 200 to the first sub-assembly elevator 260, the diversion robot 280 is triggered (e.g., by a controller) to grasp, manipulate, lift, and/or remove the framing sub-assembly identified, whether by the controller or otherwise, from the first sub-assembly elevator 260 so that the identified framing sub-assembly is not joined to the wall frame at the main framing station 320. The diversion robot 280 is, in the embodiment shown, generally similar to the gripper robots 240 of the framing sub-assembly station 200. The diversion robot 280 can use any of suction features, mechanical gripping features, and the like to engage with and remove the identified framing sub-assemblies from the sub-assembly elevator 260.

FIGS. 12-14 show various aspects of the first and second sub-assembly elevators 260, the sub-assembly storage rack 290, and the sub-assembly merge area, generally designated 300. The framing sub-assemblies are transferred from the first sub-assembly elevator 260, into the sub-assembly storage rack 290, into the second sub-assembly elevator 260, and then into the sub-assembly merge area 300. The sub-assembly merge area 300 comprises a plurality of tracks 302, which are configured to transport the framing sub-assemblies in the same direction, until the framing sub-assemblies are driven against a registration surface 306 of an end block 304. A plurality of rollers 308 are provided and are aligned substantially parallel to the tracks 302, such that a rotation of the rollers 308 causes a movement of the framing sub-assemblies in contact therewith in a direction transverse to the direction of motion of the framing sub-assemblies on the tracks 320. The tracks 302 and/or the rollers 308 are vertically mobile relative to each other, such that the rollers can be positioned such that a plane that is at least substantially tangent to the uppermost surfaces of the rollers 308 can be, in an engaged position, vertically above the height of the tracks 302, such that framing sub-assemblies arranged thereover will not be in contact with and, consequently, cannot be driven by, the tracks 302. Conversely, when the plurality of rollers 308 are in the retracted position, in which the plane that is at least substantially tangent to the uppermost surfaces of the rollers 308 is below a height of the plane defined by the upper surface of the tracks 302, the rollers 308 are disengaged from, and spaced apart from so as to not make physical contact with, the framing sub-assemblies being transported by the tracks 302. This relative raising and lowering of the rollers 308 relative to the tracks 302 is accomplished, in the example embodiment shown, by inflating and deflating pneumatic bladders, however any suitable mechanism for achieving this relative motion can be implemented without deviating from the scope of the subject matter disclosed herein.

After the framing sub-assembly is driven against the registration surface 306 by the tracks 302, the rollers 308 are raised above the plane in which the tracks 302 contact the positionally registered framing sub-assembly to engage the framing sub-assembly. One or more of the rollers 308 is a driven roller, while others of the rollers 308 may be an idler roller. In some embodiments, all or a majority of the rollers 308 may be driven rollers, meaning that they are connected to a motor, whether directly or indirectly, and a force is transmitted to each such roller 308 to cause a rotary motion thereof about a longitudinal axis of each roller 308. Idler rollers are mounted on bearings and spin substantially freely, but are not driven directly by a motor. When the rollers 308 are raised to engage with, and support, the positionally registered framing sub-assembly, the controller sends a signal to the rollers 308 to rotate and transfer the framing sub-assembly to the main framing assembly station 320. In the embodiment shown, the main framing assembly station 320 is arranged beside the sub-assembly merge area 300, however this is merely one example embodiment. Any physical arrangement of the main framing assembly station 320 relative to the sub-assembly merge area 300 is contemplated, including embodiments where the sub-assembly merge area 300 is beside, at an inclined angle of between 0° and 180°, in front of, vertically above, vertically below, and the like, relative to the main framing assembly station 320.

At the main framing assembly station 320, the dimensional lumber that has been cut, using the lumber saw station 140, to a length specified for the top plate(s) and/or the bottom plate(s) for the wall frame being assembled is transported, via the plate conveyor 164, to the main framing assembly area, where the cut lumber is driven against a plate stop, generally designated 166, to positionally register the cut lumber at a fixed position within the main framing assembly station 320. Once registered, the cut lumber is physically engaged (e.g., grasped and lifted, whether by a clamping force, a vacuum force, or otherwise) by a plate robot, generally designated 350, and transferred to either the top plate conveyor 322A or the bottom plate conveyor 322B. The plate robot 350 can be of any suitable type of automated robot, but is a 6-axis robotic arm that is substantially similar to the gripper robot 240 in the example embodiment shown and described herein. As such, like parts for the gripper robot 240 and the plate robot 350 will not be expressly described again herein. Because the plate robot 350 knows, based on instructions received from a controller, at least the length of the cut lumber, the plate robot 350 is able to precisely position the cut lumber at a specified registered position within either the top plate conveyor 322A or the bottom plate conveyor 322B. To accommodate the construction of wall frames having different heights, the top plate conveyor 322A is laterally movable relative to the bottom plate conveyor 322B, in the embodiment shown by wheels 323 attached to a vertical support of the top plate conveyor 322A. The designation of the top and bottom plate conveyors 322A, 322B herein is substantially arbitrary and could be reversed without deviating from the scope of the subject matter disclosed herein.

As shown in FIGS. 17A and 17B, a plate drive assembly is shown. While the example embodiment shown is generally contemplated as being associated with driving a top plate along the top plate conveyor 322A, with a mirror-image plate drive assembly being provided to drive a bottom plate along the bottom plate conveyor 322B, it is contemplated to use an identically oriented plate drive mechanism as both of the top and bottom plate conveyors 322A, 322B without deviating from the scope of the subject matter disclosed herein. In the example embodiment shown, the plate driver assembly comprises a lateral plate guide 340 having a length that is generally co-axial with, or at least co-aligned with, the length dimension of the top or bottom plate that is to be placed therein. A linear drive track 344 is arranged adjacent and substantially parallel to the guide 340. The drive track 344 has a drive trolley 330 movably attached to it. Any suitable drive mechanism may be used to move the drive trolley 330 along the drive track 344, but a motor 338 is connected to the drive track 344 and drives either a worm gear that engages with the drive trolley 330 or a drive sprocket that drives a chain that engaged with the drive trolley 330 in the example embodiment shown. Any suitable type of motor 338 can be used. As such, the drive trolley 330 is movable in the directions indicated by arrow 330T.

The drive trolley 330 comprises a slot, generally designated 332, formed in a plate attached thereto. The slot 332 has a width that is substantially the same, or larger than, the width dimension of the top plate or the bottom plate that will be used in the assembly of the wall frame being constructed. In some embodiments, the plate in which the slot 332 is formed can be removed and replaced with a different plate having a slot 322 with different dimensions (e.g., width and/or length/depth). The removal and replacement of the plate may be automated or performed manually by an operator. In some embodiments, the plate may be secured to the drive trolley 330 by a quick-release mechanism, a plurality of threaded fasteners (e.g., screws or bolts), riveted, or by any suitable attachment mechanism. A lever 334 is attached to the drive trolley 330 and is biased by an elastic element 334 (here, a spring), which is connected between a rigid post and the lever 334, into a first position. In the embodiment shown, the lever has a generally "L" shape, however any suitable shape may be used. When the drive trolley 330 is driven along the drive track 344, the rear face of the top or bottom plate against the first, or bottom, leg of the lever 334, causing the lever 334 to rotate about a pivot point and press the second, or side, leg of the lever 334 against the top or bottom plate, thereby imparting a force to the top of bottom plate to cause the distal end of the top or bottom plate to be pressed against, or at least adjacent to, the guide rail 340.

Referring specifically to FIGS. 15 and 16, a plurality of rollers 324 are provided, oriented such that the rotational axis thereof is aligned substantially parallel to the longitudinal axis of the top and bottom plate conveyors 322A, 322B. As such, the rollers 324 are configured to receive the framing sub-assemblies from the sub-assembly merge area 300 and to move the framing sub-assemblies in the direction of rotation of the rollers 324 to a position within the wall frame corresponding to a height at which the framing sub-assemblies are to be installed within the assembled wall frame. At least one framing sub-assembly driver 326 is provided to drive the framing sub-assembly in the same direction as the longitudinal direction of the top and bottom plate conveyors 322A, 322B. As shown in FIG. 18, the rollers 324 are rotatably driven by a motor and the framing sub-assembly driver 326 comprises a track 327 and a trolley 328 that is linearly mobile along the track 327. When the framing sub-assembly is positioned at the correct "height" (e.g., as measured between the top plate and the bottom plate) by the rollers 324, the trolley 328 is pivoted from a disengaged position, in which the framing sub-assembly can move along the rollers 324 in a plane vertically above the trolley 328, into an engaged position and drive along the track, in the direction indicated by the arrow 326T, to move the framing sub-assembly into a proper lateral position within the wall frame.

FIG. 19 shows a plate 10 (e.g., a top plate or a bottom plate) positioned within the main framing assembly station 320. A vertical clamp 342 is provided to secure the plate 10 in a vertical position to be attached to a wall stud received from a wall stud station (400, see, e.g., FIGS. 23-25). A fastening device (e.g., a nail gun) is provided at a position where the wall stud is received from the wall stud station to apply fasteners (e.g., nails) to secure the plate 10 to the wall stud. FIG. 20 shows the frame onto which the assembled wall frame is transported as the plate 10, along with the wall studs attached thereto, moves in the length direction (e.g., in the direction of the length of the guide rails 340) at the main framing assembly station 320. FIG. 20 also shows the delivery trough 424, in which the wall studs are delivered from the wall stud station, being vertically mobile to vertically align each wall stud with the plate 10 to which the wall stud is attached. As such, a wall stud is transported and/or driven within the trough 424 while the trough 424 is in a position beneath the plane defined by the plates 10, such that the wall stud passes beneath the plate 10, then the trough 424 is raised such that the wall stud is at least substantially coplanar with the plates 10, the fastening devices adjacent each plate 10 secure both plates 10 to the wall stud, and the trough 424 moves back to the initial position below the plane in which the plates 10 are located. This is repeated ad many times as necessary to construct the specified wall frame. The trough 424 is also laterally expandable to accommodate wall studs of different lengths, corresponding to wall frames of different heights.

The framing sub-assembly driver 326 then is triggered to drive a framing sub-assembly against a specified wall stud and the framing sub-assembly can be attached thereto by suitable fasteners (e.g., nails, staples, screws, and the like) from a suitable fastening device, which may be laterally displaceable in the length direction of the wall stud. The framing sub-assembly driver 326 then retracts and the trolley 328 is rotated back to the disengaged position so that a further framing sub-assembly can be transferred by the rollers 324 from the framing sub-assembly merge area 300 to the main framing assembly station 320. Any suitable number of framing sub-assemblies may be assembled and/or attached within a wall frame section based on the instructions corresponding to the wall frame being assembled at a controller. FIG. 21 shows a plurality of position sensors 346 arranged along the length of each of the guide rails 340. These position sensors 346 detect a position of the plate 10 to ensure that the plates 10 are advanced a substantially identical and intended amount between attachments of the wall studs therebetween, this substantially identical distance defining a pitch dimension of the wall studs. In some embodiments, it is necessary to install wall studs in an immediately adjacent, coincident, arrangement to provide further structural rigidity and support to the wall frame, with the wall studs being substantially in direct contact with each other to form a "double stud" element. This can be especially advantageous in regions of the wall frame that are adjacent to, or surrounding, the framing sub-assemblies.

While the vertical clamp 342 provides vertical positional stability to the plates 10 whilst each of the individual wall studs is fastened therebetween, the main framing assembly station 320 comprises at least one lateral clamp 348, preferably at a position within the main framings assembly station 320 prior to the position of the trough 424. The lateral clamp 348, in order to allow the framing sub-assemblies to pass over top thereof to be attached to and/or between the wall studs, is advantageously capable of both vertical and lateral actuation. In this embodiment, the vertical actuation stage occurs prior to the lateral actuation stage, however any actuation order may be implemented that avoids physical contact of the lateral clamp 348 with unintended objects (e.g., drive track 344).

From the retracted position shown in FIG. 22A, the main body of the lateral clamp 348 extends vertically upwards, away from an attachment frame that rigidly connects the lateral clamp 348 to the frame of the main framing assembly station 320, to an intermediate position. The intermediate position is shown in FIG. 22B, in which the lateral clamp obstructs the plane in which the framing sub-assemblies move along the framing sub-assembly driver 326. From the intermediate position of FIG. 22B, a compression head is extended away from the main body of the lateral clamp 348 to exert a lateral force on the plate 10, pressing the plate 10 against the guide rail 340. The lateral clamp 348 may have force and/or position sensors to detect the distance the compression head is extended away from the main body and also to detect a reaction force from the plate 10 against the compression head when the compression head presses the plate 10 against the guide rail 340, thereby ensuring that the lateral clamp 348 is actually in contact with, and pressing against, the plate 10.

In some embodiments, because the width of the plate 10 is known, the lateral clamp 348 can be commanded to extend the compression head by a predetermined amount and, if a reactive force is not detected at the end of the travel of the compression head, an error or warning condition may be triggered to signal that the plate 10 may be of the wrong dimension for the wall frame being constructed or may be positioned incorrectly. Similarly, if the reactive force is detected before the compression head has been extended by the distance specified by the controller, this may also trigger an error or warning condition that may indicate, for example, that the plate has fallen over, is dimensionally incorrect based on the wall frame being constructed, or the like.

The wall studs provided to the main framing assembly station 320 are provided to the trough 424 by the wall stud station, generally designated 400. The wall stud station 400 comprises a cascade stager 402 configured to sequentially form individual wall studs. In the embodiment shown, the individual wall studs will be sequentially, in the order in which the wall studs are formed at the cascade stager 402, fed into the trough 424 and attached between the plates 10 at the main framing assembly station 320.

The cascade stager 402 is adjacent to at least one wall stud lumber yard, shown in FIG. 25B. Here, the primary lumber stud yard, generally designated 390 is configured to deliver dimensional lumber along a series of supply conveyors, generally designated 390A, from a staging area where dimensional lumber for wall studs is stored. The supply conveyors 390A comprise a plurality of rollers 394, some or all of which may be driven (e.g., by a motor) or may be idler rollers. When the lumber is delivered to the final conveyor 390B, the lumber is positionally registered (e.g., by being driven by the rollers 394 against a stop plate). The rollers 394 can then either be lowered and/or the tracks 392 can be raised, such that the lumber is now supported by the tracks 392. The tracks 392 then drive the lumber in a substantially orthogonal direction such that the lumber is adjacent to the cascade stager 402. This final conveyor 390B is shown adjacent to a backside of the cascade stager 402 in FIG. 25A. An auxiliary lumber yard, generally designated 380, can be provided adjacent to the cascade stager 402 and can be provided with one or more supply conveyors. The auxiliary lumber yard 380 comprises tracks 382 and rollers 384 that, just as with tracks 392 and rollers 394, can be vertically mobile relative to each other. The vertical actuation of the rollers 384, 394 relative to the tracks 382, 392 can be accomplished, for example, via a pneumatic lifting system mechanically attached to the rollers 384, 394, the tracks 382, 392, or the rollers 384, 394 and the tracks 382, 392. The auxiliary lumber yard 380 may be provided with differently dimensioned lumber (e.g., having a different length, thickness, and/or width) for forming differently dimensioned wall studs or with identical dimensional lumber to that provided to the primary lumber yard 390 in case of a system fault or to otherwise act as a supply buffer for the wall stud station 400.

A wall stud robot, generally designated 430, is provided at and, in the example embodiment shown, attached to, the frame of the cascade stager 402. The wall stud robot 430 is advantageously arranged in a position where it can access lumber in both the primary and auxiliary lumber yards 390, 380. In the embodiment shown, the wall stud robot 430 is a 6-axis robotic arm, substantially similar to the gripper robots 220 of the framing sub-assembly station. However, the wall stud robot 430 may be of any suitable type to perform the necessary functions without deviating from the scope of the disclosed subject matter. While any device suitable for engaging and loading lumber into the cascade stager 402 may be attached to the distal end of the wall stud robot 430, in the example embodiment shown the wall stud robot 430 comprises a vacuum-operated suction head 440.

In this embodiment, the suction head comprises dual vacuum-operated lifter assemblies 441 that are compliantly attached (e.g., by elastic members, such as springs) to a mounting plate that is rigidly attached to a pivotable and/or rotatable end member of the wall stud robot 430. As shown, each lifter assembly 441 of the suction head 440 has a compliant material 442 attached thereunder to be able to form a sufficiently tight vacuum seal to the wall stud lumber 20 being lifted, as the wall stud lumber 20 inherently has a rough outer surface with which the compliant material 442 must form a hermitic seal. The compliant material 442 can comprise any suitable material, including, for example, a suitably dense closed-cell foam, a silicone, a rubber, and the like. It is advantageous for the compliant material 442 to have a sufficiently low durometer to form a sufficiently tight seal against the surface of the lumber that the seal can be maintained without constantly generating a vacuum. In some embodiments, the vacuum force may be multiples of the weight of the wall stud lumber 20 being lifted to provide an adequate safety factor.

The suction head 440 is configured to engage and lift a plurality of pieces of wall stud lumber 20 simultaneously, thereby providing increased throughput and loading of the wall stud lumber 20 onto the cascade stager 402. Each lifter assembly 441 is individually actuatable, such that two or only one piece of the wall stud lumber 20 can be lifted by the wall stud robot 430, as necessary. Similarly, so that the wall stud lumber 20 can be deposited individually onto the cascade stager 402, each of the lifter assemblies 441 can be released (e.g., the vacuum can be released) individually.

The wall stud robot 430 comprises, attached to the suction head, distance and/or position sensors to sense the distance between the suction head 440 and the wall stud lumber 20 or a height (e.g., above a ground or pallet level) of the wall stud lumber 20, as well as the dimensions (e.g., the width) of the wall stud lumber 20. The suction head 440 comprises a plurality of lasers used to measure distance from, and presence of, the wall stud lumber 20, as well as, for each of the lifter assemblies 441, vacuum meters and pressure gauges. The vacuum meters and pressure gauges ensure that the wall stud robot 430 can monitor and adjust the vacuum pressure, which correlates with the suction force and, accordingly the lifting force. Together, this allows for the wall stud robot 430 to select wall stud lumber 20 from either of the primary or the auxiliary lumber stud yards 390, 380.

The distance and/or position sensors can be any suitable type of sensor, including infrared, laser, an imaging device, and the like. When triggered to retrieve one or more pieces of wall stud lumber 20, the wall stud robot 430 moves the suction head 440 over either of the primary or auxiliary stud lumber yards 390, 380. The distance and/or position sensors are used to detect the presence of the wall stud lumber 20 itself, the height of the suction head 440 above the wall stud lumber 20, the edges of each piece of the wall stud lumber 20, and the width of each piece of the wall stud lumber 20. The wall stud robot 430 is configured to, based on the height of the wall stud lumber 20 detected, proceed to consume all of the wall stud lumber on a first row of wall stud lumber 20 before proceeding to a lower row of wall stud lumber 20. The wall stud robot 430 is further configured to, based on the detection of the width of the pieces of the wall stud lumber 20 and the known width of the lifter assemblies 441, align each of the lifter assemblies 441 substantially over a middle or center of the wall stud lumber 20. In instances where the wall stud lumber 20 is too wide for the wall stud robot 430 to lift two pieces of wall stud lumber 20, the lifter assemblies 441 may be arranged, depending on the width of the wall stud lumber 20 being lifted, to both engage and lift a single piece of wall stud lumber 20.

Once the wall stud robot 430 determines that the individual lifter assemblies 441 are aligned over a piece of wall stud lumber 20 to be lifted, the wall stud robot 430 lowers the lifter assemblies 441 such that the compliant material 442 is in contact with the wall stud lumber 20. After contacting the wall stud lumber 20, a seal is produced by inducing a vacuum through one or more holes formed in the bottom of the lifter assemblies 441 through which air can be evacuated to form the vacuum force to lift the wall stud lumber 20. When the wall stud robot 430 detects that the wall stud lumber 20 has become misaligned, the suction head 440 can be rotated to better align one or both of the lifter assemblies 441 with the misaligned wall stud lumber 20. A plurality of position and distance sensors can be provided to detect such a misalignment of the wall stud lumber 20 relative to the lifter assemblies 441. In some embodiments, video imaging processing can be used to detect such misalignment of the wall stud lumber 20. In some embodiments, the wall stud lumber 20 can be lifted and/or released individually or simultaneously.

The wall stud robot 430 uses the suction head 440 to transport and deposit wall stud lumber 20 from one of the primary or auxiliary stud lumber yards 390, 380, onto the cascade stager 402, where holes for plumbing, electrical, and other utilities are formed (e.g., by boring, routing, and/or drilling) according to the instructions for the wall studs necessary in assembling the wall frame being constructed at the main framing assembly station 320. The cascade stager 402 comprises a plurality of supports 404 about which a rotary conveyor 406 (e.g., a chain-drive conveyor) rotates. The rotary conveyor comprises a plurality of stops 408 defining staging positions 420A-D that are spaced apart from each other. After the lowest staging position 420D, the finished wall stud is deposited into the wall stud delivery trough 424, which comprises, in the example embodiment shown, a conveyor that transports the finished wall stud to the main framing assembly station 320, underneath one of the plates 10 and the guide rail 340 associated therewith, where the finished wall stud is vertically raised between the top and bottom plates 10 and is fastened in place therebetween.

The wall stud station 400 comprises a cutting tool 416 (e.g., a circular saw or other suitable cutting device) that cuts the wall stud lumber 20 to the appropriate length, as specified by the instructions sent by a controller. The cutting tool 416 is laterally movable, in a direction substantially parallel to the direction of extension of the trough 424, to cut the wall stud lumber to any of a plurality of instructed lengths corresponding generally to the height of the wall frame being assembled. In some embodiments, the cascade stager has registration stops at the end of the frame opposite the cutting tool 416 to ensure that the wall stud lumber 20 is at a known position and the distance between the registration stop and the cutting tool 416 can be readily determined to produce precise lengths of finished wall studs. In some embodiments, the cutting tool 416 is held stationary while the wall stud lumber 20 is moved through the path of the cutting tool 416, while in other embodiments, the wall stud lumber 20 is held stationary (e.g., is mechanically fixed in place) while the cutting device is actuated in a direction substantially perpendicular to the lateral adjustment direction to cut through the wall stud lumber 20.

In the example embodiment shown, cascade stager 402 comprises a router, hole saw, spade drill bit, or other suitable cutting device 410 that is configured to cut holes, notches, etc. in the wall stud lumber 20, whether before, after, or at the same time as the wall stud lumber 20 is cut to length by the cutting tool 416. These holes, notches, etc. are provided for the routing of electrical, plumbing, and other utilities through the wall frame, these utilities passing through such holes and notches formed through the finished wall studs. Thus, the holes, notches, etc. allow the utilities to pass between adjacent wall stud cavities while remaining internal to the wall frame.

As shown in FIG. 25A, the wall stud station 400 comprises a wall stud dimensional analysis system attached to the frame of the cascade stager 402. The wall stud dimensional analysis system comprises a rigid (e.g., aluminum) frame that is equipped with distance measuring devices and/or imaging devices that are configured to detect bow, crown, twist, etc. of the wall stud lumber 20. Wall stud lumber 20 which has excessive amounts of any of the above physical deformations, based on tolerances in the instructions or elsewhere, is discarded by the wall stud robot 430.

After the wall studs are attached between the plates 10, the wall frame is transported onto a conveyor 370, which can be a chain driven conveyor or any other suitable type of conveyor member. This conveyor 370 has at least two substantially parallel longitudinal track portions that extend substantially parallel to the direction of the plates 10 in the assembled wall frame. The conveyor 370 can be a part of the main framing assembly station 320, a part of an inspection/buffer station 470, or a separate component altogether.

FIGS. 26-28 schematically show various stations of the system 100 through which the wall frame moves during the assembly and manufacture process. After exiting the main framing assembly station 320, the wall frame is transported onto an inspection/buffer station, generally designated 470. At station 470, the wall frame can be inspected for assembly and/or manufacturing defects. Further manual operations, such as, for example, installing internal bracing members between adjacent wall studs, can be performed here, either by one or more automated robots and/or manually by a human operator. Any number of stations 470 may be provided and, in some embodiments, station 470 may be omitted entirely. When triggered by a controller, the station 470 transfers the wall frame to the sheathing station, generally designated 500, where sheathing panels of any suitably rugged, durable, and rigid material (e.g., OSB, plywood, and the like). After the sheathing is applied to the entire surface of the wall frame, at least to the extent specified in the instructions, which may omit certain areal portions of the top and bottom of the wall frame to allow for application of fasteners in subsequent steps, the wall frame is transported onto another inspection/buffer station 470. As noted hereinabove, further inspection and other quality assurance work items can be performed here, either by human operators or by automated inspection systems. Additional manual and/or automated operations may also be performed on the wall frame here as well. The station 470 further acts as a staging area in which the wall frame can be held. Any number of stations 470 may be provided and, in some embodiments, station 470 may be omitted entirely.

When triggered by a controller, the station 470 transfers the wall frame to the sheathing fastening station, generally designated 620, at which the sheathing is securely attached to the wall studs and/or framing sub-assemblies by the application of a plurality of fasteners (e.g., nails, staples, screws, and the like) through the sheathing panels and into the wall studs and/or framing sub-assemblies of the wall frame immediately thereunder. Because the position of the wall frame itself, as well as the wall studs and the framing assemblies thereof, is known by a controller, the fasteners are advantageously applied only over areas of the sheathing panels that overlap the underlying wall studs and around the perimeter of, but not within the openings of, the framing sub-assemblies, so as not to waste fasteners, resulting in increased manufacture cost and time.

After securely attaching the sheathing to the wall frame, the wall frame is transported to a pre-drilling station 700, where through-holes are formed (e.g., by one or more drills) through the thickness of the wall studs at the top and bottom of the wall frame, these through-holes being provided at positions corresponding to attachment regions for the wall frame to be attached to other constituent components of a modular construction unit (e.g., floor and/or ceiling). In some embodiments, one or more inspection/buffer stations 470 can be provided between the sheathing fastening station 620 and the pre-drilling station 700. Once through-holes are drilled in one or more of the wall studs of the framing sub-assembly, as specified in the instructions by the controller, at the pre-drilling station 700, the wall frame is transported onto the sawing/routing station, generally designated 800. In some embodiments, one or more inspection/buffer stations 470 can be provided between the pre-drilling station 700 and the sawing/routing station 800. At the sawing/routing station, a plurality of cutting tools (e.g., routers, saws of any suitable type, and the like) are provided to cut out the sheathing substantially adjacent to the inner perimeter of the framing sub-assemblies. Each of these stations will be further described in greater detail hereinbelow.

Referring now to FIGS. 29-37, various aspects of the sheathing station are shown therein. The sheathing station 500 comprises a sheathing supply area, generally designated 510, a sheathing retrieval device, generally designated 530, a sheathing conveyor, generally designated 550, and a sheathing placement device, generally designated 570. FIG. 30 is an isolated isometric view of the sheathing supply area 510. The sheathing supply area is arranged adjacent to the sheathing conveyor 550 and comprises a plurality of sheathing storage bays, generally designated 512. Each sheathing storage bay 512 comprises a plurality of rollers 514, some or all (e.g., one or more) of which are driven rollers, with the others being idler rollers. One or more of the sheathing storage bays 512 can have different widths to allow sheathing panels of different widths to be more compactly held within the sheathing supply area 510.

A sheathing supply conveyor, generally designated 520, is provided to transfer and/or input one or more sheathing panels (e.g., a stack of sheathing panels) into one of the plurality of sheathing storage bays 512. The sheathing supply conveyor comprises a plurality of rollers 514, some or all (e.g., one or more) of which are driven rollers, with the others being idler rollers. A plurality of tracks 522, here in the form of rails, are provided. The tracks are substantially parallel to each other and extend substantially orthogonally to the direction in which the sheathing panels are transferred from the sheathing supply conveyor 520 into the respective sheathing storage bays 512. It is contemplated that a single track 522 may be utilized in some embodiments. In some such embodiments, a longitudinal track may be attached to frame 532 to movably secure the sheathing supply conveyor 520 relative to the frame 532.

The sheathing supply conveyor 520 is laterally movable, in a direction parallel to the direction of extension of the tracks 522, as indicated by arrow 522B. A plurality of wheels may be provided on the sheathing supply conveyor 520 in a position to engage with the tracks 522 in a rolling interface. For example, the wheels may have a slot milled circumferentially thereabout in which the track 522 can be accommodated or the tracks may have a slot milled along the length thereof, in which the wheel, or at least a portion thereof, can be accommodated. The engagement surfaces between the track and the wheel may be a geared interface with complementary grooves, teeth, or other profiled shapes formed in the respective mating surfaces thereof to limit a slipping movement between the sheathing supply conveyor 520 and the track 522. The lateral movement of the sheathing supply conveyor 520 can be controlled manually and/or by an automated process, using a controller and one or a plurality of position sensors to determine a position of the sheathing supply conveyor 520 relative to one or more of the sheathing storage bays 512.

In some embodiments, registration stops can be provided on, or adjacent to (e.g., at the terminal ends of) the tracks 522, such that the sheathing supply conveyor can be positionally returned to a known "zero" reference position by returning to a position in which the wheel(s) of the sheathing supply conveyor 522 cannot move further along the tracks 522 in the direction of the registration stop. Thus, by monitoring a number of rotations of a wheel having a known circumference and knowing the positions of the sheathing storage bays 512, a controller may be used to align the sheathing supply conveyor 520 with an intended sheathing storage bay 512 by commanding a number of rotations of the wheels of the sheathing supply conveyor 520.

In some embodiments, video/image processing may be used to ensure alignment between the sheathing supply conveyor 520 and an intended one of the sheathing storage bays 512, into which the one or more sheathing panels are to be transferred from the sheathing supply conveyor 520. Various imaging devices may be attached, for example, to the sheathing supply conveyor 520 and/or the sheathing storage bays 512 and may be used to capture images and/or video of navigational markers attached to the sheathing supply conveyor 520 and/or the sheathing storage bays 512 to determine the position of the sheathing supply conveyor 520 relative to the sheathing storage bays 512 or any other desired features of the sheathing supply area 510.

In the example embodiment shown, the transfer direction of the sheathing panels from the sheathing supply conveyor 520 to the sheathing storage bays 512 is substantially perpendicular to the direction of movement of the sheathing supply conveyor 520 relative to the sheathing storage bays 512. In order to ensure that the sheathing panels are accurately and repeatably deposited at a given position within the sheathing storage bays 512, each of the sheathing storage bays 512 comprises a registration stop 516 that serves to register the position of the sheathing panels at each such sheathing storage bay 512. When combined with the lateral position tracking of the sheathing supply conveyor 520, the position of the sheathing panels within each of the sheathing storage bays 512 can be precisely determined.

A sheathing transport conveyor 550 is provided adjacent to the sheathing storage bays 512. A sheathing retrieval device 530 is provided vertically above the sheathing storage bays 512. The sheathing retrieval device 530 moves laterally, relative to the sheathing storage bays 512, along frame 532. In the embodiment shown, the sheathing retrieval device 530 is an overhead crane with a plurality of vertically mobile suction heads that are configured to contact a sheathing panel indicated by a controller, apply a suction force, lift the sheathing panel vertically, transport the sheathing panel along the lateral motion path indicated by arrow 530T, and deposit the sheathing panel onto the sheathing conveyor 550 for transfer to the sheathing placement device 570 and ultimately to be positioned on the wall frame at the positions indicated by the controller. While any suitable gripping interface can be used by sheathing retrieval device 530, in the embodiment shown, the sheathing retrieval device 530 comprises a plurality of lifting assemblies 580 (see, e.g., 541, FIGS. 24A-D) that are suspended vertically beneath a gantry spanning over the top of the frame 532. Each of the lifting assemblies 580 is configured to generate a vacuum to create a suction force to retain the sheathing panels against the lifting assemblies 580 during the transport of each sheathing panel to the sheathing conveyor 550. The positions, pitch, and space between the individual lifting assemblies 580 of the sheathing retrieval device 530 can be, for example, expanded laterally depending on the dimensions of the sheathing panel being retrieved from one of the sheathing storage bays 512 and transported onto the sheathing conveyor 550. Each of the lifting assemblies 580 of the sheathing retrieval device can be controlled individually and the vacuum supplied thereto can be controlled discretely and separately from the vacuum supplied to any of the other lifting devices of the lifting assemblies 580. The position of the sheathing retrieval device 530 can be monitored and/or determined by, for example, monitoring a number of rotations of a transport wheel along a track attached to the frame 532, the transport wheel and the track having an interlocking (e.g., geared) interface to prevent relative movement therebetween that would otherwise cause a positional inaccuracy. In some embodiments, video/image processing and/or positional registration devices may be provided to determine a position of the sheathing retrieval device 530 relative to the frame 532.

The sheathing conveyor 550 comprises a plurality of rollers 554, some or all of which may be driven (e.g., by a motor) and others of which may be idler rollers. In some embodiments, all of the rollers 554 can be driven rollers. The sheathing conveyor 550 is arranged to extend transversely, relative to the direction of movement of the wall frame within the sheathing station 500, between the sheathing supply area 510 and the wall frame transport conveyor, generally designated 560. Gaps between the rollers 554 are, in the embodiment shown, covered by panels 552 such that the sheathing conveyor 550 comprises a substantially flat upper surface, with the rollers 554 protruding above the panels 552 a sufficient distance to impart a rotary force to the sheathing panels being transported by the sheathing conveyor 550. The sheathing conveyor 550 comprises one or more registration panels 556, against which the sheathing panels can be positionally registered to positively determine the position of the sheathing panels prior to their engagement and transport by the sheathing placement device 570. At a distal end of the sheathing conveyor 550, one or more (e.g., a plurality of) stops 558 are provided, which vertically protrude above the contact plane between the rollers 554 and the sheathing panel. The stops 558 can be attached at any desired position along the sheathing conveyor 550 based on the dimensions of the sheathing panels. A proximity sensor or other suitable device can be provided to trigger the sheathing placement device 570 to engage with, lift, transport, and place the sheathing panel from the sheathing conveyor 550 onto the designated place on the wall frame. This sensor can also be used, once a sheathing panel is detected in the proper registered position (e.g., based on the dimensions of the sheathing panel specified and/or anticipated by the controller, based on the instructions), to trigger the rollers 554 to stop spinning and, when a sheathing panel is not detected in the proper registered position, to trigger the rollers 554 and any other registration devices to rotate and/or drive the sheathing panel into the proper registered position. A time limit value may be specified by which the sheathing panel must be in the proper registered position and, if not detected within the time limit value specified, trigger and alert, warning, and/or error message.

When wall frame enters the sheathing station 550, the wall frame is transported along the tracks 564 of wall frame transport conveyor 560 along a plane that is vertically under the sheathing conveyor 550, as indicated by the arrow in FIG. 32. In the embodiment shown, the wall frame transport conveyor 560 comprises lateral guides 562 that positionally restrain the wall frame therebetween. One or more position sensors, for example, proximity sensors, can be provided to ensure proper alignment of the wall frame within the sheathing station 500. The wall frame transport conveyor 560 is laterally expandable, as indicated by arrow 564E, to accommodate wall frames of different heights. A plurality of idler wheel extensions 568 are provided at the distal end of the tracks 564 of the wall frame transport conveyor 560.

Wall frame squaring stations, generally designated 600, are attached at or adjacent to the distal ends of the wall frame transport conveyor 560. The wall frame squaring stations comprise a registration stop 604 and a linearly actuatable clamp 606. When a wall frame is detected, for example, by a position sensor associated with (e.g., attached to one or both guides 562), the wall frame squaring station(s) 600, the registration stop 604 is deployed to stop movement of the wall frame further along the tracks 564 of the wall frame transport conveyor 560. The registration stop 604 is pivotable about a hinge. A position sensor may be provided at or adjacent to (e.g., in front of) the hinge point of the registration stop 604 to detect the presence of the wall frame. During assembly and transport of the wall frame, it is not uncommon for the wall frame to become skewed and/or out of square, such that the four corners thereof are no longer at right angles. Attaching the sheathing to wall frames that are not square would lead to misalignments and, in some instances, may cause the sheathing fasteners to not secure the sheathing panels to the wall studs and/or framing subassemblies. As such, when one or both leading corners (e.g., in the direction of transit of the wall frame along the wall frame transport conveyor 560) contacts the registration stop 604 of one or both of the squaring stations 600 on opposite sides of the wall frame transport conveyor 560, the clamp 606 on each of the squaring stations compresses inwardly (e.g., in a direction substantially coaxial to the extension direction of the wall studs of the wall frame) to frictionally engage with the top and bottom plates of the wall frame, then the clamp is driven (e.g., via a linear actuator) in the direction indicated by the arrow in FIG. 37A, thereby ensuring that both leading corners of the wall frame are in contact with each registration stop 604 of the opposing squaring stations 600. Because the registration stops 604 are arranged in a single plane oriented perpendicular to the direction of travel of the wall frame along the wall frame transport conveyor 560, when the leading corners of the wall frame are in contact with both registration stops 604, the wall frame is sufficiently aligned, or square, to allow for the placement of the sheathing panels thereon. In some embodiments, a load cell or other force detection device may be provided to detect when the wall frame makes contact with each of the registration stops 604. The clamps 606 remain frictionally engaged with the wall frame while the sheathing panels are placed on the wall frame to ensure that the wall frame remains properly aligned, or square, during the placement of each sheathing panel. After each of the sheathing panels has been placed and at least temporarily fastened (e.g., by applying a limited number of fasteners, such as staples) to the wall frame, the clamps 606 move in an outward direction, away from the top and bottom plates, and are then retracted to their initial positions, so as to avoid frictionally re-skewing the wall frame and possibly damaging one or more sheathing panels if the clamps were returned to their initial positions prior to being retracted outwardly.

The sheathing placement device 570 comprises a plurality of lifting assemblies 580, which are suspended vertically beneath a gantry attached to, and spanning across the width of, the wall frame transport conveyor 560. While any suitable gripping interface can be used by sheathing placement device 570 to lift and move the sheathing panels, in the embodiment shown, the sheathing placement device 530 comprises a plurality of lifting assemblies 580, which are substantially similar to the lifting assemblies 441 (see, e.g., FIGS. 24A-D). Each of the lifting assemblies 580 is configured to generate a vacuum to create a suction force to retain the sheathing panels against the lifting assemblies 580 during the transport of each sheathing panel from the sheathing conveyor 550 onto the wall frame. The positions, pitch, and space between the individual lifting assemblies 580 can be, for example, expanded laterally depending on the dimensions of the sheathing panel at the registered position on the sheathing conveyor 550, just as was described hereinabove regarding the sheathing retrieval device 530. The direction in which the spacing between the lifting assemblies 580 can be increased or decreased by relative movements of the individual lifting assemblies 580 along the gantry is shown in FIG. 35 by an arrow oriented parallel to the transport direction of the sheathing panels along the sheathing conveyor 550 between the sheathing supply area 510 and the stops 558.

In the embodiment shown, the sheathing placement device 570 is an overhead crane with a plurality of vertically mobile suction heads that are configured to contact a sheathing panel in a registered position on the sheathing conveyor 550 (e.g., as indicated by a controller), apply a suction force, lift the sheathing panel vertically, transport the sheathing panel to a placement position on the surface of the wall frame designated by the controller, and deposit the sheathing panel onto the wall frame in the designated. This is repeated until the entire surface of the wall frame, or at least the portion of the wall frame designated to be covered by the sheathing, has been covered by a substantially continuous and uninterrupted (e.g., solid) layer of sheathing panels. Just as the spacing between the lifting assemblies 580 can be varied by moving the individual lifting assemblies 580 in the direction indicated by the arrow in FIG. 35, all of the lifting assemblies 580 may be moved in unison, for example, while holding a sheathing panel, to place the sheathing panel at a position that is not aligned with the registered position, which will be generally be the majority of sheathing panels. Any combination of sizes of sheathing panels may be combined and arranged (e.g., like puzzle pieces) to cover substantially the entire upper surface of the wall frame with sheathing panels.

Each of the lifting assemblies 580 of the sheathing placement device 570 can be controlled individually and the vacuum supplied thereto can be controlled discretely and separately from the vacuum supplied to any of the other lifting assemblies 580. The position of the sheathing placement device 570 can be monitored and/or determined by, for example, monitoring a number of rotations of a transport wheel along a track attached to the frame wall stud transport conveyor 560, the transport wheel and the track having an interlocking (e.g., geared) interface to prevent relative movement therebetween that would otherwise cause a positional inaccuracy. In some embodiments, video/image processing and/or positional registration devices may be provided to determine a position of the sheathing placement device 570 relative to the wall frame to determine the position at which the sheathing panel being transported should be placed and/or deposited on the wall frame.

Further aspects of the inspection/buffer stations 470 are shown in FIG. 38, which can be provided or omitted, as necessary, between any two stations of the system 100 of FIG. 1. The station 470 comprises a plurality of longitudinally extending tracks 472, which can be segmented conveyors, belts, chains, or any other suitable device for supporting and moving a wall frame therealong. In some embodiments, only two tracks 472 may be provided. In the embodiment shown, there are three tracks 472 which are spaced apart from each other in a direction transverse to the direction of the longitudinal extension of the tracks 472. The first and second tracks 472 are connected together and spaced apart by a fixed width, determined by a first cross-member 474A. The third track 472 is spaced apart from the second track 472, on a side opposite the first track 472, by a laterally extendable second cross-member 474B, which is laterally extendable relative to the first cross-member 474A in the direction indicated by the arrow labeled 474E. The lateral extension of the second cross-member 474B is accomplished by sliding the second cross-member into or out of a cavity formed along the length of the first cross-member 474A. The tracks 472 are all rotatably linked together by a common driveshaft 478D that is driven by a motor 478M, such that the tracks 472 all rotate and/or move at substantially a same rate of speed. A plurality of idler wheels 475 is provided at the ends of each of the tracks 472.

FIGS. 39-42 show various aspects of the sheathing fastening station, generally designated 620. A wall frame conveyor, generally designated 630, is provided to support and transport a wall frame with sheathing to be fastened substantially permanently (e.g., generally being incapable of removal without destruction of the wall frame and/or the sheathing itself) thereto through the sheathing fastening station 620. The wall frame conveyor 630 comprises a plurality of longitudinally extending tracks 632, which can be segmented conveyors, belts, chains, or any other suitable device for supporting and moving a wall frame therealong. In some embodiments, only two tracks 632 may be provided. In the embodiment shown, there are three tracks 632 which are spaced apart from each other in a direction transverse to the direction of the longitudinal extension of the tracks 632. The first and second tracks 632 are connected together and spaced apart by a fixed width, determined by a first cross-member 634A. The third track 632 is spaced apart from the second track 632, on a side opposite the first track 632, by a laterally extendable second cross-member 634B, which is laterally extendable relative to the first cross-member 634A in the direction indicated by the arrow labeled 634E. The lateral extension of the second cross-member 634B is accomplished by sliding the second cross-member into or out of a cavity formed along the length of the first cross-member 634A. The tracks 632 are all rotatably linked together by a common driveshaft 638D that is driven by a motor, such that the tracks 632 all rotate and/or move at substantially a same rate of speed. A plurality of idler wheels or rollers 636 is provided at the ends of each of the tracks 632.

An overhead gantry frame 640 is connected to the wall frame conveyor 630 and is movable along the length, as indicated by arrow 630T, of the wall frame conveyor 630 along a direction parallel to the direction of longitudinal extension of the tracks 632. The gantry frame 640 comprises vertical supports 642, which are connected by cross-supports 644 that extend across the width of the wall frame conveyor 630 in a direction transverse to the direction of extension of the tracks 632. A plurality of fastener devices, generally designated 650, is attached to the cross-supports 644 in a manner such that each of the fastener devices 650 is capable of independent lateral movement along a track affixed to and/or integrally formed in one of the cross-supports 644. In order to ensure that the wall frame remains in alignment, or substantially square, a wall frame squaring station 600 is attached on opposite sides of the wall frame conveyor 630. The squaring stations 600 are attached to the wall frame conveyor 630 at substantially identical longitudinal distances therealong, such that the components of each squaring station are substantially a mirror image of the other squaring station along a longitudinal axis of the wall frame conveyor 630. Stated somewhat differently, the squaring stations are arranged in a same plane that is transverse to the longitudinal direction of extension of the tracks 632, such that, when the leading corners of the wall frame are in contact with the registration stop 604 (see, e.g., FIGS. 37A, 37B) of both squaring stations 600, the wall frame will be properly aligned and substantially square, such that each outer corner of the wall frame will be substantially a right angle (e.g., ±5°, ±3°, ±2°, ±1°, ±0.5°, etc.). Also, since the third track 632 is movable laterally to expand a width of the wall frame conveyor 630, the squaring station attached to the wall frame conveyor 630 adjacent the third track 632 is also movable laterally by a same distance. Squaring stations 600 can be provided at any of the sheathing station 500, the sheathing fastening station 620, the pre-drilling station 700, the sawing/routing station 800, the insulation installation station 1000, the drywall installation station 1200, and/or the wall covering station 1350.

FIG. 41 is a detailed view of the sheathing fastener station 620. While only a portion of the wall frame is shown as being covered by the sheathing panels 30, a plurality of fastening devices 650 are provided and are mounted to one or more of the lateral cross-supports 644 by a track 646 attached along the length of the one or more cross-supports 646. The fastening devices 650 are attached along the track in a manner that the fastening devices 650 are laterally displaceable along the direction indicated by arrow 650T, which is substantially parallel to the longitudinal direction of extension of the cross-supports 644. The fastening devices 650 each have at least one (e.g., a plurality of) wheels 652 of a caster type that are able to swivel and roll over the surface of the sheathing panels 630 when in contact therewith. While the fastener devices 650 are shown herein as being automated staple guns, any suitable type of fastener device (e.g., automated nail gun, automated screw gun, and the like) can be used without deviating from the scope of the subject matter disclosed herein. The fastener devices 650 may be either staggered in the transport direction of the wall frame through the sheathing fastening station 620 or may be, as shown herein, substantially arranged in a single plane. A controller determines the layout of the wall studs 20 and the framing sub-assemblies within the wall frame and commands the gantry frame 640 and the fastening devices 650 thereon to an initialized position, generally at either one of the opposite ends of the wall frame, such that the gantry frame 640 can move along the length of the wall frame, stopping (as necessary) to allow the fastener devices to apply fasteners through the sheathing panels 30 at the positions where the sheathing panels 30 overlap or are otherwise coincident with the wall studs 20 arranged thereunder.

For fastening sheathing panels 30 to a wall stud, it is generally advantageous for the gantry frame to move such that each of the fastening devices 650 are aligned such that fasteners dispensed therefrom will pass into, and be secured within, the sheathing panels 30. The fastener devices 650 move along the direction 650T to apply fasteners at suitable fastening intervals, often determined by applicable building codes, along the entire length of the wall stud 20 that has a sheathing panel 30 arranged thereover. Once all of the fasteners have been applied, the gantry frame 640 is advanced to align with another vertically oriented sub-member, whether the lateral sides of a framing sub-assembly or a next wall stud 20, such that the fastener devices are aligned therewith. The fastener devices 650 again move along the direction 650T to apply fasteners at suitable fastening intervals. This is repeated until a suitable number of fasteners are applied to secure the sheathing panels 30 to each of the wall studs and framing sub-assemblies arranged thereunder. In some embodiments, it is necessary to attach the sheathing fasteners across structural members of the wall frame (e.g., cross-bracing or the top and bottom frames of the framing sub-assemblies) that are oriented transversely, or at least inclined, relative to the generally vertical orientation of the wall studs 20 when the wall frame is installed in a modular construction unit. In such instances, one or more of the fastener devices 650 are aligned with the applicable transverse or inclined cross-members and the gantry frame 460 is advanced along the length thereof, such that the fastener devices 650 arranged thereover are arranged in such a position to dispense fasteners through the sheathing panels 30 and into the lateral cross-members, thereby securing the sheathing panels 30 to the lateral cross-members while the gantry frame 460 can remain in motion during this dispensing process. It is advantageous for the sheathing panels 30 to be secured to each constituent part of the wall frame arranged thereunder, including, for example, framing sub-assemblies, wall studs 20, and plates 10. However, generally the sheathing panels 30 will not extend so far as to cover the plates 10 and will instead be spaced apart therefrom.

The fastener devices 650 are vertically movable in the direction indicated by arrow 650V, relative to the cross-supports 644 and the wall frame and surface of the sheathing panels 30. This vertical motion ensures that the proper spacing is maintained between the surface of the sheathing panels 30 and the fastener devices 650 and also allows for the fastener devices 650 to be disengaged from the surface of the sheathing panels 30 as or before the wall panel is transported from the sheathing fastening station 620 after the sheathing panels 30 are secured to the wall frame.

The placement of each of the fasteners is reported to the controller to monitor and confirm that each of the sheathing panels is sufficiently rigidly attached to the constituent parts of the wall frame. Once the controller receives confirmation that the sheathing attachment process is complete, the squaring stations 600 are disengaged from the wall frame, as described elsewhere herein, and the tracks 632 transport the wall frame out of the sheathing fastening station 620 and into the pre-drilling station 700. In some embodiments, one or more inspection/buffer stations 470, as described elsewhere herein, can be provided between the sheathing fastening station 620 and the pre-drilling station 700.

The pre-drilling station 700 is provided to drill through-holes through the wall studs 20 of the wall frame at suitable positions where the wall frame will be attached to other components of the modular construction unit. The pre-drilling station 700 comprises an overhead frame, generally designated 720, which comprises vertical support posts 722 and one or more lateral cross-members 724 arranged between and attaching the vertical support posts 722. The cross-member(s) 724 have a track 726 attached or integrally formed in an underside thereof, so as to be oriented in a direction of the wall frame in which the through-holes are to be formed. Any suitable number of tracks may be provided. For each track, at least one drilling unit 730 is movably attached thereto. The drilling unit 730 is displaceable in the direction indicated by the arrow 730T in FIG. 43. A drill head 732 is attached to the drilling unit 730 and is vertically mobile along the arrow 732V shown in FIG. 43. The drilling head 732 has any suitable number (e.g., one or a plurality of) drill chucks attached on an underside thereof, such that drill bits installed therein are oriented towards the wall frame. The movement 732V allow for the drill bits within the drill chucks 734 to be pressed through the wall studs, thereby forming the through-holes. The lateral movement of the drill units 730 along 730T allows the drill bits to be positioned along the length of the wall studs in which the through-holes are to be formed.

Underneath the frame 720, a wall frame conveyor, generally designated 710, is arranged to transport the wall frame under the frame 720 to have the through-holes formed therein. The wall frame conveyor 710 can, in some embodiments, be substantially similar to the wall frame conveyor 630, as well as any other structures (e.g., conveyors) provided in any of the subsystems and/or stations in system 100 described elsewhere herein. The wall frame conveyor 710 comprises a plurality of tracks, generally designated 712, which are supported by stationary cross-member 714A and mobile cross-member 714B, which is slidably attached to the stationary cross-member 714A such that at least one of the tracks 712 can be moved laterally such that wall frame conveyor 710 can transport wall frames of different heights. The tracks 712 can comprise any suitable transport device, including, for example, segmented conveyors, belts, chains, and the like. The tracks 712 are connected by a driveshaft 718D so that they each move and/or rotate at substantially a same speed, thereby preventing the wall frame from being skewed on the pre-drilling station, which could cause the wall studs to be misaligned relative to the drill units 730. Position sensors can be provided along the wall frame conveyor 710 to ensure that the wall frame is not skewed during transport therealong. The driveshaft is driven by a motor 718M attached to the wall frame conveyor 710.

At least two vertically actuated stopper systems, generally designated 740, are attached to the wall frame conveyor 710. In the embodiment shown, the stopper systems 740 are attached adjacent the tracks 712. The stopper system 740 comprises two vertically actuatable posts 744A, 744B that are staggered by a distance X in the direction of transport of the wall frame along the tracks 712. The first post 744A is actuated in the vertical direction to stop a wall stud 20 in a plane that is arranged underneath the drill head 732. The wall frame is transported forwards along the tracks 712 until a wall stud in which through-holes are to be formed is adjacent to, but not over or beyond, the first post 744A, at which time the first post 744A is vertically extended to block further movement of the wall stud beyond the first post 744A. As such, the plane in which the first posts 744A are arranged is substantially coplanar with the drill bits held within the drill chucks 734 of the drill head 732. With the wall stud being held in position by the first posts 744A so as to be aligned with the drill bits that will form the through-holes, the drill head 732 is extended in the direction 732V and the drill bits form through-holes through the wall stud.

The first posts 744A are then vertically retracted and the wall frame continues on along tracks 712 until another wall stud in which the through-holes are to be formed is detected adjacent to, but not beyond, the first posts 744A, which are then vertically extended such that the subsequent wall stud cannot move beyond the first posts 744A, the through-holes are formed through the subsequent wall stud, the first posts 744A are retracted, and the process is repeated ad infinitum until all of the necessary through-holes are formed in each of the specified wall studs. In some embodiments, through-holes are formed in every wall stud of the wall frame. The stopper systems 740 further comprise a second post 744B, which is utilized in a case of a “double stud” arrangement within a wall frame, which is where wall studs are placed in direct contact with each other, without allowing a space for a wall cavity to be defined therebetween. Because the controller knows the internal layout of the wall studs within the wall frame, the controller is able to count the number of wall studs that have been processed to identify the locations of such double studs. When a double stud configuration is detected, the first, or leading, stud is processed as described hereinabove. However, before the first post 744A is retracted, the second post 744B is vertically extended. The first post 744A is then retracted and the wall frame is advanced by the tracks 712 until the first stud contacts the second post 744B. The first and second posts are spaced apart a distance X, which can be an adjustable distance, the distance X corresponding to a width of the wall stud itself. As such, when the first stud contacts the second posts 744B, the second, or trailing, stud is arranged so as to be substantially coplanar with the drill bits held within the drill chucks 734 of the drill head 732. With the first stud being held in position by the second posts 744B so that the second stud is aligned with the drill bits that will form the through-holes therethrough, the drill head 732 is extended in the direction 732V and the drill bits form through-holes through the second stud. This process is repeated as necessary based on the instructions received by the controller regarding the presence, location, and number of double studs.

The drill head 732, comprises, in the embodiment shown, three drill chucks 734. The center drill chuck 734A is positionally fixed relative to the drill head 732. Each of the lateral drill chucks 734B are eccentrically mounted on pucks 736 that are rotatably mounted to drill head 732. As such, the rotation of the pucks causes the distance between the center drill chuck 734A and the lateral drill chuck 734B on the puck 736 being rotated to increase or decrease, depending on the direction in which the puck 736 is rotated. In some embodiments, the pucks 736 are rotated simultaneously and by the same amount, such that the drill chucks remain coplanar with each other. Thus, the distance between the adjacent through-holes can be varied. Due to the eccentricity of the pucks 736, it may be necessary to rotate the drill head 732 in the direction 732R to ensure that the plane in which the drill chucks 734 are arranged remains substantially coplanar to the vertical plane of the wall stud in which the through-holes are to be formed.

After the specified number of through-holes have been formed in the specified wall studs of the wall frame at the pre-drilling station 700, the wall frame is transported to an inspection/buffer station 470. Further inspections and other processes may be performed at the stations 470. In some embodiments, a plurality of such stations 470 can be provided between the pre-drilling station 700 and the sawing/routing station 800. In some other embodiments, no stations 470 are provided between the pre-drilling station 700 and the sawing/routing station 800. When triggered by a controller, the wall frame is transported to the sawing/routing station 800.

The sawing/routing station 800 shown in FIGS. 49 and 50 is where the portions of the sheathing panels 30 that are installed over, and fastened to, the wall frames are removed. These portions of the sheathing panels 30 are attached to the wall frame in a position that covers the openings of the framing sub-assemblies that will be window openings and door openings in a fully assembled wall unit produced by system 100. To reduce waste and also to prolong the life of the cutting implements at the sawing/routing station 800, it is advantageous for, in some embodiments, no fasteners to be applied within a region defined within any of the framing sub-assemblies within the wall frame.

The sawing/routing station 800 comprises a wall frame conveyor, generally designated 810, on which the wall frame is transported into, through, and/or out of the sawing/routing station 800. The wall frame conveyor 810 is, in some embodiments, substantially similar to the wall frame conveyors 630, 710, as well as any other structures (e.g., conveyors) provided in any of the subsystems and/or stations in system 100 described elsewhere herein. The wall frame conveyor 810, in the example embodiment shown, comprises a plurality of substantially parallel tracks 812, which can be any of a segmented conveyor, a belt, a chain conveyor, and the like. The tracks 812 are mechanically connected to each other by cross-members 814A, 814B, which are slidably expandable relative to each other in the direction indicated by arrow 814E to accommodate wall frames having a plurality of widths (e.g., the height of the wall when assembled into a modular construction unit). In an example embodiment for any of the wall frame conveyors (e.g., 630, 710, 810), a controller sends a command, based on the width (e.g., height, when assembled) of the wall frame being transported thereon, and the width of the wall frame conveyor (630, 710, 810) on which the wall frame is being transported is increased to be substantially the same as the width of the wall frame being processed. The tracks 812 move laterally away or towards each other depending on whether the width of the wall conveyor frame 810 needs of be increased or decreased to transport a given wall frame thereon. The tracks 812 are connected together so as to rotate and/or move substantially in unison by a driveshaft 818D, which is driven by a motor.

A frame, generally designated 830, is attached to the wall frame conveyor 810 in a manner so as to move therealong in the direction substantially parallel to the direction of motion of the wall frame along the tracks 812 (e.g., the length of extension of the tracks 812). The frame 830 comprises vertical supports 832 that support a plurality of cross-members 834 that extend across the width of the wall frame conveyor 810. A plurality of cutting devices 842, 844, 846, and 848 are mounted and/or attached to the cross-members 834. One or more of the cutting devices 842, 844, 846, and 848 are independently controllable and movable along the cross-members 834. In the embodiment shown, the cutting devices 842, 844, and 846 comprise saws, specifically circular saws, however other saw types are contemplated as well. In the embodiment shown, the cutting device 848 is a plunge router.

The cutting device 846 is a circular saw that is oriented along the width (e.g., the height, when assembled) of the wall frame, so as to cut slots to form the lateral edges of the framing sub-assemblies attached within the wall frame. Information is received from the controller regarding the locations of the framing sub-assemblies within the wall frame and the frame moves, in the direction of longitudinal extension of the tracks 812, to substantially align the cutting device 846 with one of the two edges of the framing sub-assembly having sheathing placed thereover that is currently designated to be removed. The cutting device 846 is also vertically movable such that a plunge cut can be made through the sheathing panels adjacent one of the lateral edges of the framing sub-assembly being processed.

Once engaged, the cutting device 846 moves along the direction indicated by arrow 846T to cut a slot that is substantially a same length as the length of the lateral edge of the framing sub-assembly for which an opening is being cut through the sheathing panel(s). After a slot of proper length has been cut, the cutting device 846 is raised to a height above the plane in which the sheathing panels are arranged such that no part of the cutting device 846 is coincident with the sheathing panel plane. The frame 830 then moves, in the direction parallel to the length direction of the tracks 812, such that the cutting device 846 becomes substantially aligned with edge of the other lateral edge of the opening associated with the framing sub-assembly that is being cut through the sheathing panel(s). The process described hereinabove is then performed again, such that the cutting device 846 vertically down to cut a slot through the sheathing panel, then move in the direction 846T to form the entire length of the slot of the opening being formed, and raising the cutting device 846 to be disengaged from the sheathing panel.

In some embodiments, the top and bottom slots of the opening being formed in the sheathing panel(s) to form the opening can be formed by the cutting devices 842, 844 while the frame 830 moves from the position in which the cutting device 846 cuts the first slot and the position in which the cutting device 846 cuts the second slot. According to this embodiment, the cutting devices 842, 844 are circular saws that are oriented such that the saw blades thereof are substantially parallel to the transport direction of the wall frame along the wall frame conveyor 810. According to this embodiment, the first cutting device 842 is moved to a position along the cross-member(s) 844 such that the first cutting device 842 is aligned with a first edge of the framing sub-assembly for which the opening is being cut through the sheathing panel(s), while the second cutting device 844 is moved to a position along the cross-member(s) 844 such that the second cutting device 844 is aligned with a second edge of the framing sub-assembly for which the opening is being cut through the sheathing panel(s). In some embodiments where the framing sub-assembly comprises a substantially rectilinear (e.g., square) construction, the first and second edges are opposing edges of the opening being formed. Before the frame 830 begins moving, the first and second cutting devices 842, 844 are moved vertically down to form a plunge cut through the sheathing panels, then the frame 830 moves to the position in which the cutting device 846 will form its second slot, thus the first and second cutting devices 842, 844 form opposing slots on opposite edges of the opening corresponding to the internal edges of the framing sub-assembly.

While a particular example embodiment is described herein regarding the order in which the slots are cut through the sheathing panels to form the opening for each framing sub-assembly, the slots may be cut in any order and in any manner. Because the cutting devices 842, 844, 846 are, in the embodiment shown, circular saws with circular blades, it may not be possible to cut through the entire thickness of the sheathing panels at the corners of the opening where the slots would otherwise intersect without also cutting a portion of the framing sub-assembly itself. As such, the cutting device 848, which is a plunge router in the embodiment shown, can be moved to each of these corners to cut through any remaining thickness of the sheathing panels that must be removed such that the portion of the sheathing panels within the opening can be fully separated from the wall frame. A scrap conveyor 820 is provided underneath the wall frame conveyor such that the portion of the sheathing panel removed from the wall panel by the cutting devices 842, 844, 846, 848 can be transported away for proper disposal, reuse, etc. The scrap conveyor 820 can be movably connected to the frame 830 so as to remain positioned under the cutting devices 842, 844, 846, 848 to collect scrap material therefrom. In some embodiments, the frame 830 and the scrap conveyor 820 may remain stationary while the wall frame is moved to the positions necessary for the cutting devices 842, 844, 846, 848 to form the slots necessary to form each of the openings for the framing sub-assemblies.

A sawdust disposal system is provided and connected to each of the cutting devices to collect sawdust and other debris formed by each of the cutting devices 842, 844, 846, 848 when forming the openings through the sheathing panels such that the area within the inner perimeter of the framing sub-assemblies will not be covered by the sheathing panels.

FIG. 51 generally shows an example arrangement of the first flip table, generally designated 900, the utility installation station, generally designated 950, the second flip table, generally designated 970, the insulation installation station, generally designated 1000, and the insulation loading station, generally designated 1100. The wall frame, after having the specified openings cut out of the sheathing panel(s) around the inner perimeter of the framing sub-assemblies at the sawing/routing station 800, is transported onto the first flip table 900. The first flip table 900 moves along tracks 912 and rotates the wall frame by approximately 90 degrees, from the substantially horizontal orientation in which the wall frame is received from the sawing/routing station 800 to a substantially vertical position. Stated somewhat differently, the wall first flip table 900 rotates and/or turns the wall to be oriented substantially vertically. The wall frame is then transported on a set of rollers from the first flip table 900 into the utility installation station 950, where any specified utilities (e.g., electrical wiring, plumbing, telecommunications, HVAC devices and/or ductwork, and the like) and any devices (e.g., electrical junction boxes, HVAC return and/or supply registers, and the like) to be housed internal to the wall structure are installed within the wall frame, including through holes formed in wall studs to connect adjacent wall cavities at the wall stud station 400. Once all of the utilities are installed per the instructions, which can be displayed to a human operator on a screen, monitor, or the like, the wall frame is transported along further rollers to a second flip table 970, which rotates the wall frame by a further 90 degrees, such that the side of the wall frame on which the sheathing panels are attached faces down, with the uncovered side of the wall frame facing up, away from the surface of the second flip table supporting the wall frame. The second flip table 970 also transports the wall frame along tracks 912 to the insulation installation station 1000. These stations will each be further described hereinbelow with respect to the figures.

The first flip table 900 comprises a frame, generally designated 910, which is connected to and supports a plurality of tracks 912, which can be any suitable transport mechanism, including, for example, a segmented conveyor, belt, chain, and the like. The distance between the tracks 912 can be changed to accommodate wall frames of different widths. A plurality of rollers 914 are arranged adjacent one of the outermost tracks 912. As such, when the wall frame is rotated from the horizontal position to the vertical position, the wall frame changes from being supported by the tracks 912 in the horizontal position to being supported by the rollers 914 in the vertical position. One or more of the rollers 914 can be a driven roller, while others can be an idler roller. In some embodiments, the rollers 914 alternate between driven rollers and idler rollers. The frame 910 comprises wheels 916 adjacent a bottom thereof, the wheels 916 being configured to engage with the tracks 902 and move the first flip table 900 along the tracks so that the rollers 914 of the first flip table 900 are substantially aligned, when the wall frame is rotated into the vertical position, with rollers 954 on which the wall frame is transported within the utility installation station 950.

The utility installation station 950 comprises one or more tracks 952 on which one or more rollers 954 are arranged. The rollers 954 receive the wall frame from the first flip table 900 when the wall frame is rotated into the vertical position and support the wall frame as it is driven from the first flip table 900 into the utility installation station 950 by the rollers 914. One or more of the rollers 954 may be driven rollers and one or more of the rollers 954 may be idler rollers. The utility installation station 950 comprises a frame 960 which supports lateral guides 956 that engage with the upper portion of the wall frame and guide the wall frame into, along, and/or through the utility installation station 950. After the utilities are installed within the wall frame, based on the instructions for the wall module being assembled, the rollers 954 of the utility installation station 950 are actuated to transport the wall frame out of the utility installation station 950 and onto rollers 976 affixed to the floor adjacent a location where the wall frame is engaged by, and picked up by, the second flip table 970. The second flip table 970 comprises a second frame, generally designated 920, that is pivotable between a vertical position, in which the wall frame is engaged after exiting the utility installation station 950, and a horizontal position, in which the sheathed side of the wall frame is facing downward, so that the wall cavities, generally designated 50, defined between adjacent wall studs 20, top and bottom plates 10, and the sheathing panels 30, are facing upwards, away from the frame 920 of the second flip table 970.

The second flip table 970 comprises a plurality of tracks 972, which can be any suitable transport mechanism, including, for example, a segmented conveyor, belt, chain, and the like. The distance between the tracks 972 can be changed to accommodate wall frames of different widths. A plurality of angled arms 974, which may be any shape, but have a generally L-shaped profile in the embodiment shown, are attached to the frame 920 adjacent one of the outermost tracks 972. As such, when the frame 920 is rotated to the vertical position and moved along the tracks to the retrieval position, the arms 974 are vertically beneath a plane in which the wall frame contacts and moves along the rollers 976 and arranged between one or more of the rollers 976.

Thus, when the frame 920 is rotated from the vertical position towards the horizontal position, the wall frame is engaged by (e.g., picked up by) the arms 974 and lifted off of the rollers 976. As the frame 920 rotates towards the horizontal position, the tracks 972 of the second flip table 970 progressively support more of the mass of the wall frame, such that the tracks 972 support substantially all of the mass of the wall frame when the frame 920 is rotated fully to the horizontal position.

The frame 920 comprises wheels 926 adjacent a bottom thereof, the wheels 926 being configured to engage with the tracks 902 and move the second flip table 970 along the tracks 902 so that the frame 920 can be rotated from the substantially vertical position to the substantially horizontal position at the same time as the second flip table 970 transports the wall frame to the insulation installation station 1000. Conversely, the frame 920 can be rotated from the substantially horizontal position to the substantially vertical position at the same time as the second flip table 970 moves, e.g., after the insulation is installed in the wall frame, back to retrieve another wall frame from the utility installation station 950. In other embodiments, the movement of any of the flip tables (e.g., 900, 970) along tracks (e.g., 902) can be staggered from (e.g., occur at a different time from) the rotation of the frame between the substantially vertical and horizontal positions.

Insulation material 80 is supplied to the insulation installation station 1000 by the insulation loading station 1100, which is an automated station wherein an insulation material is provided, unpacked, loaded into a hopper (e.g., 1140), and transferred to the insulation installation station 1000. The insulation material 80 can be any suitable material, including, for example, a blown cellulose material having a predetermined moisture content to achieve a desired insulation density within each wall cavity 50 at the insulation installation station 1000. At the insulation loading station 1100, insulation material 80 is loaded, e.g., by an insulation loading robot 1110 positioned on a pedestal 1112, onto a conveyor 1102. The insulation loading robot 1110 can be any suitable type of robot, however, in the embodiment shown, is a 6-axis automated robotic arm, substantially similar to the gripper robots 240 of the framing sub-assembly station 200. An end effector is attached at the distal end of the insulation loading robot 1110, such that insulation material 80, which can be a packaged insulation material 80, can be picked up from an insulation supply area and loaded onto the conveyor 1102 by the insulation loading robot 1110.

The insulation material 80 is transported along the conveyor 1102 to a primary insulation loading station, generally designated 1130, comprising a second insulation unloading robot, generally designated 1134, which unpackages the insulation material, as needed, using an end effector, generally designated 1136, removing any external packaging therefrom, and places the insulation material 80 into one or more insulation hoppers 1140, which can add a specified amount of moisture, on a measured moisture content of the insulation material 80 within the hopper 1140, so that the insulation material 80 supplied to the insulation installation station 1000 can be packed at a specified density and, therefore, the assembled wall module can achieve a specified insulation value. Once the proper moisture content is achieved, the hoppers 1140 supply the insulation material 80 to the insulation installation station 1000 by blowing the insulation material 80 through one or more supply tubes 1180 connected between the hoppers 1140 and the insulation installation station 1000. A second insulation robot, generally designated 1164, can be provided at a secondary insulation loading station, generally designated 1160, further along the conveyor 1102 and can load insulation material 80 into hoppers 1140 located adjacent to the second insulation robot 1164. The end effector 1166 can be the same or different from the end effector 1136 of the first insulation robot 1134, so long as the end effector 1166 is capable of picking up insulation material 80 from the conveyor, removing any packaging material therefrom, and placing (e.g., by dropping) the insulation material 80 into the hoppers 1140.

At the insulation installation station 1000, the second flip table 970 transports the wall frame between two insulation robots, generally designated 1030A, 1030B, which are supported on respective frames 1010. The frames 1010 are arranged on opposite sides of the second flip table 970 and the wall frame supported thereon. The frames 1010 comprise an upper substantially horizontally-oriented upper frame 1012 that is supported at a height where the insulation robots 1030A, 1030B can, together, access all of the wall cavities 50 within the wall frame on the second flip table 970. In the embodiment shown, a support pedestal 1014 is attached to each of the upper frames 1012 and one of the insulation robots 1030A, 1030B is mounted to each of the support pedestals 1014. The support pedestal 1014 and the upper frame 1012 are arranged at a height such that the second flip table 970 can transport, via a rotation of the tracks 972 thereof, the wall frame underneath the support pedestal 1014 and the upper frame 1012 to be transported to a curing station 1300.

The insulation robots 1030A, 1030B can be any suitable type of automated robotic devise, system, apparatus, etc, however, in the example embodiment shown, the insulation robots 1030A, 1030B are 6-axis automated robotic arms having substantially similar features and structures to the gripper robots 240 and the fastener robots 220 of the framing sub-assembly station 200, but with an insulation head, generally designated 1060, attached at the distal end of the second arm (e.g., 230, 250) rather than either of a gripper head or a fastener head. The insulation head 1060 is connected to one or more of the insulation supply tubes 1180 of the insulation loading station 1100 and receives insulation from one or more of the hoppers 1140.

The insulation head 1060 comprises a frame 1062, which comprises a bottom panel 1064, which can be opaque or translucent, but in the embodiment shown, is transparent. The frame 1062 is connected to one of the insulation robots 1030A, 1030B. by a compliant mount, generally designated 1066. The compliant mount has a base 1068 by which the insulation head 1060 is attached to the insulation robot 1030A, 1030B. An attachment plate 1072 is attached to the frame 1062 and the attachment plate 1072 is connected to the base 1068 by a compliant coupling 1070, which can comprise an elastic member (e.g., a spring). A secondary frame member 1074 is attached towards the center of the insulation head 1060, comprising a vertical support 1074A that is connected, via an actuator 1078, to a pivotable portion 1076, to which a supply fitting 1080 is attached, thereby defining a hole 1082 through which insulation material can be blown or otherwise transported and installed within a wall cavity 50 of a wall frame.

The pivotable portion 1076 is rotatably attached to the frame 1062 between and including a retracted position, in which the pivotable portion 1076 does not extend substantially beyond a plane defined by the bottom surface of the frame 1062, and a deployed position, in which the pivotable portion 1076 extends, at least to some degree, beyond and/or through the plane defined by the bottom surface of the frame 1062. The actuator 1078 can be any suitable actuator, for example, a linear actuator, the extension thereof being selected by a controller to control a rotatable position of the pivotable portion 1076 relative to the frame 1062 and the plane defined thereby. A segmented partition 1090 is attached to at least one side of the frame 1062. In the embodiment shown, the segmented partition 1090 is connected along a side of the frame 1062 adjacent the pivotable portion 1076.

In some embodiments, a feedback control circuit is provided at the insulation installation station 1000 to monitor the pressure within the wall cavity 50 as the insulation material is installed therein (e.g., by being blown in through the hole 1082). In a first example embodiment, a pressure feedback transducer is arranged in line with the insulation installation system 1000 (e.g., within the supply fitting 1080, the hole 1082, the supply tubes 1180, and/or attached to the frame 1062, the bottom panel 1064, or any other suitable structure of the insulation head 1060). The pressure within the wall cavity is measured by the pressure feedback transducer as the insulation material is installed therein. When the pressure reaches a predetermined threshold value, which can correspond to a specified density of insulation material, the insulation robot 1030A, 1030B with which the pressure feedback transducer is associated begins to advance the insulation head 1060 along the length of the wall cavity 50 to fill all of, or at least a designated portion of, the wall cavity 50 with the insulation material at the specified density. The speed at which the insulation robot 1030A, 1030B advances the insulation head 1060 along the length of the wall cavity 50 can be varied by monitoring the pressure measured by the pressure feedback transducer and increasing or decreasing a speed at which the insulation robot 1030A, 1030B advances the insulation head 1060 along the length of the wall cavity 50 to maintain the pressure measured within the wall cavity 50 by the pressure feedback transducer.

In some other embodiments, a strain gauge or any other type of suitable sensor could be used to monitor a density of the insulation material within the wall cavity 50 to control when the insulation head 1060 begins to advance along the length of the wall cavity 50 and/or to control the speed of the advance of the insulation head 1060 therealong. This feedback system is advantageous because the density of the insulation material within the wall cavity 50 can be monitored to prevent the insulation material from being packed at either an insufficiently low density, in which case the insulating value of the insulation material may not meet applicable building codes, or at too great of a density, which can cause excess backpressure and cause a fault, whether from clogging or due to mechanical failure, of the insulation robot 1030A, 1030B, or within the hoppers 1140 and/or the supply tubes 1180 that supply the insulation material from the insulation loading station 1100 to the insulation installation station 1000.

The insulation head 1060 is inserted over and/or at least partially within a wall cavity 50 of the wall frame into which insulation is to be installed. The segmented partition 1090 is segmented, meaning comprising a plurality of strips of the same and/or different widths. The strips of the segmented partition 1090 extend within the wall cavity 50 when the insulation head 1060 is inserted over and/or at least partially within the wall cavity 50 of the wall frame, substantially forming a seal within the wall cavity 50 such that the insulation material does not pass beyond the segmented partition 1090.

Once the insulation head 1060 is engaged with the wall cavity 50, it can be advantageous to arrange the end of the frame 1062 opposite the end thereof at which the segmented partition 1090 is attached. There, the pivotable portion 1076 can be pivoted downward at least partially within the wall cavity 50, such that the direction in which the insulation material is blown into the wall cavity 50 is inclined against one of the plates 10 of the wall frame to provide a predetermined density of insulation material throughout substantially the entirety of the wall cavity 50. In some embodiments, the supply fitting 1080 is substantially inclined, relative to the bottom panel 1064, in the direction of rotation of the pivotable portion 1076 even when the pivotable portion 1076 is in the retracted position. The insulation robots 1030A, 1030B, move the insulation head 1060 along the length of the insulation cavity, preferably in the direction opposite the direction in which the supply fitting 1080 is oriented when the pivotable portion is rotated from the retracted position.

In some embodiments, the angle at which the pivotable portion 1076 is rotated decreases (e.g., in the direction of the retracted position) as the insulation robot 1030A, 1030B to which the insulation head 1060 is attached moves the insulation head along the length of the wall cavity 50 in the direction of the segmented partition 1090. In some embodiments, the pivotable portion 1076 moves from the deployed position, in which the pivotable portion 1076 is deflected a maximum amount relative to the bottom plane of the frame 1062, at a first end of the wall cavity 50, to the retracted position at a second end of the wall cavity 50, which is opposite the first end of the wall cavity 50. In some embodiments, the angle of inclination of the pivotable portion 1076 changes substantially linearly as the insulation head 1060 is moved from the first end to the second end of the wall cavity 50. In some embodiments, the angle of inclination of the pivotable portion 1076 is altered substantially as a step function and/or over a portion of the length of the wall cavity that is less than an entire length of the wall cavity 50. In some such embodiments, the portion of the length of the wall cavity 50 over which the pivotable portion 1076 is pivoted into the retracted position can be, for example, less than 50%, less than 25%, less than 10%, less than 5%, etc. of the wall cavity 50.

Once the insulation head 1060 reaches the second end of the wall cavity, the insulation robot 1030A, 1030B moves the insulation head 1060 to a next wall cavity 50 of the wall frame that is designated to be filled with insulation material and the process is repeated until all wall cavities 50 designated to be filled with insulation material have been filled with a predetermined density of insulation material. In some embodiments, the insulation robot 1030A, 1030B moves, after filling a first wall cavity 50, the insulation head 1060 from the second end of the first wall cavity 50 to the first end of the second wall cavity 50, the second end of the first wall cavity 50 being adjacent a bottom plate of the wall cavity 50 and the first end of the second wall cavity being adjacent a top plate of the wall cavity 50, or vice versa. In some embodiments, the insulation robot 1030A, 1030B rotates the insulation head 1060 by substantially 180 degrees between filling adjacent wall cavities 50, such that the wall cavities 50 can be filled in a “serpentine” pattern, proceeding from a second end of a first wall cavity 50 to a second end of the second wall cavity 50 and proceeding to the first end of the second wall cavity, filling the second wall cavity 50 with insulation material.

After all of the wall cavities 50 designated to be filled with insulation material have been filled with the predetermined density of insulation material, the wall frame is transported to a curing station 1300. In some embodiments, the insulation is covered with a wall covering material (e.g., a netting) to prevent the insulation from being dislodged from the wall cavities 50. At the curing station 1300, an array of heating devices, for example, infrared heating lamps in the example embodiment shown, are arranged over the transport path of the wall frame. The heating devices provide heat, for example, radiative or conductive heat, to the upper exposed surface of the insulation material, thereby causing the outermost surface thereof to be dried sufficiently to allow for installation of a drywall material to be installed thereagainst without causing mold or other bacterial growth therein.

FIG. 60 shows an example embodiment of a man-machine interface, generally designated 1050, which comprises, in the example embodiment shown, a touch-sensitive display 1052, which can comprise a plurality of virtual buttons, graphical interfaces, menus screens, physical buttons, and the like. In the embodiment shown, the interface 1050 comprises an emergency stop, generally designated 1056, and a start button 1054. The emergency stop 1056 and start button 1054 may be implemented as virtual buttons on the display 1052. In some embodiments, the display 1052 is not touch sensitive and a plurality of virtual buttons may be provided around the display 1052 to provide inputs to the insulation installation system 1000.

Next, as shown in FIGS. 63-66B, the wall frame is transported to a drywall installation station, generally designated 1200, where a plurality of drywall panels 40 are rigidly affixed to (e.g., by fasteners) the wall frame, thereby substantially entirely enclosing the portions of the wall cavities in which the insulation material is installed. While the term "drywall" is used herein, any suitable wall covering material can be installed at the drywall installation station 1200. Drywall panels 40 are generally delivered and/or stacked with finished, or outer-facing, sides adjacent and facing each other and rough, or inner-facing, sides adjacent and facing each other. Due to the alternating orientations of the drywall panels 40 as delivered to the drywall installation station 1200 to be attached to the exposed surface of the wall frame, on an opposite side thereof from the sheathing panels 30, every other (e.g., in an alternating pattern) drywall panel 40 must be "flipped" so that each of the drywall panels 40 can be installed on the wall frame with the finished surface thereof facing outwards, away from the interior space of the wall cavity 50.

To accomplish this, the drywall installation station 1200 comprises at least two drywall robots, generally designated 1270A, 1270B. The drywall panels 40 are delivered to the drywall installation station 1200 in a stack via one or more drywall conveyors 1202 adjacent to the frame transport, generally designated 1210, of the drywall installation station 1200. A plurality of drywall conveyors 1202 may be provided to transport the stacks of drywall panels 40 from a supply area to the drywall installation station 1200 and/or to act as a supply buffer of drywall panels 40 to the drywall installation station 1200 to minimize downtime of the drywall installation station 1200 due to delivery disruptions of the drywall panels 40 to the drywall installation station 1200. The drywall conveyor(s) 1202 can be, for example, substantially similar to the sheathing conveyors 390A, 390B, but any suitable design may be utilized. The first drywall robot 1270A is positioned adjacent to a last drywall conveyor 1202 in a position in which the first drywall robot 1270A is capable of grasping and lifting (e.g., by applying a suction force generated by applying a vacuum to a lifting assembly, which can be substantially similar to the lifter assemblies 441 of the wall stud robot 430) a drywall panel 40 on the top of the stack of drywall panels 40 off of the last drywall conveyor 1202.

For the purposes of this discussion, it is assumed that the first drywall panel 40 has the finished side facing up, such that the lifter assembly/assemblies of the first drywall robot 1270A engages with the finished side of the first drywall panel 40 to lift the first drywall panel 40 off of the stack of the drywall panels 40. After being lifted by the first drywall robot 1270A, this first drywall panel 40 is transferred to, and deposited on, a position registration jig, generally designated 1260. This position registration jig 1260 comprises a substantially planar table 1262 onto which the first drywall robot 1270A places and/or releases the first drywall panel. The table 1262 is supported, in the example embodiment shown, by a frame 1264 that spans the width of the frame transport 1210. The frame 1264 is inclined with respect to gravity in a plane defined by the width and length thereof, so that a corner of the table 1262 is a lowest corner of the table 1262. Therefore, when the first drywall panel 40 is placed on the table 1262, the force of gravity will cause the first drywall panel 40 to slide such that a corner of the first drywall panel 40 will be located at a known position relative to the corner of the table 1262, thereby positionally registering the first drywall panel 40 into a repeatable (e.g., precise) and predetermined position on the table 1262. This is necessary because positional inaccuracies may be induced when loading the stack of drywall panels 40 onto the drywall conveyor 1202 or due to staggered positions of one or more drywall panels 40 in the stack of drywall panels 40 relative to other drywall panels 40 in the same stack.

After having been positionally registered to a sufficient degree of precision, the first drywall panel 40 is then reengaged and/or lifted by the first drywall robot 1030 from the frame and is placed (e.g., by releasing the vacuum generating the suction force) onto the wall frame at a position where indicated based on the instructions received at a controller, as communicated to the first drywall robot 1270A. The first drywall robot 1270A then returns to the stack of drywall panels 40 at/on the drywall conveyor 1202 and removes a second drywall panel 40 from the stack of drywall panels 40. Because of the alternating arrangements of the drywall panels 40 within the stack of drywall panels 40, the second drywall panel 40 will be oriented within the stack of drywall panels 40 such that the finished surface of the second drywall panel 40 will be opposite the orientation of the finished surface of the first drywall panel, which has already been described herein having been placed on the wall frame by the first drywall robot 1270A. As such, since it is assumed that the finished surface of the first drywall panel 40 was oriented to face in the upwards direction, it is therefore assumed that the finished surface of the second drywall panel 40 is oriented to face in the downwards direction (e.g., against the finished surface of a third drywall panel 40).

As such, when the second drywall panel 40 is engaged, grasped, and/or lifted by the first drywall robot 1270A off of the stack of drywall panels 40, the finished surface thereof will be facing down and cannot be placed by the first drywall robot 1270A onto the wall frame with the finished surface thereof in the upwards orientation. Accordingly, it is necessary to transfer the second drywall panel 40 to the second drywall robot 1270B, so that the finished surface will be engaged by the lifter assembly/assemblies of the second drywall robot 1270B, thereby allowing the second drywall robot 1270B to place the second drywall panel 40 on the wall frame in precisely the position indicated based on the instructions received at a controller, as communicated to the second drywall robot 1270B.

However, before the second drywall panel can be placed onto the wall frame in the position indicated by the second drywall robot 1270B, it is generally necessary to positionally register the second drywall panel 40 to ensure the placement thereof onto the wall frame in the position indicated is done with sufficient precision to not have adjacent panels be misaligned, have gaps that are too large therebetween, or even to overlap onto each other. In the embodiment shown, this positional registration of the second drywall panel 40 is accomplished in substantially the same manner as is disclosed herein regarding the positional registration of the first drywall pattern, i.e., by using the first drywall robot 1270A to place and/or deposit the second drywall panel 40 onto the table 1262 of the positional registration jig 1260, such that the second drywall panel 40 is moved, for example, using only the force of gravity to slide the second drywall panel 40 relative to the table 1262, to a predetermined, positionally registered, position. The second drywall panel 40 is then re-engaged by the first drywall robot 1270A and transferred to the second drywall robot 1270B, such that the orientation of the finished surface of the second drywall panel 40 is reversed, relative to the lifter assembly/assemblies of the first and second robots 1270A, 1270B, so that the finished surface of the second drywall panel 40 can be oriented to face outwards, in the up direction, and/or away from the outer surface of the wall frame on which the second drywall panel 40 is being positioned.

In some embodiments, the positional registration jig 1260 can be positioned, relative to the frame transport 1210, where drywall panels 40 can be placed thereon for positional registration and/or removed therefrom after positional registration by either the first drywall robot 1270A or the second drywall robot 1270B. As such, the drywall panels 40 can be placed onto the table 1262 and removed from the table 1262 by different drywall robots 1270A, 1270B. In some embodiments, it may be advantageous, to improve throughput and minimize the time necessary to place the drywall panels 40, to provide drywall conveyors 1202 adjacent both the first drywall robot 1270A and the second drywall robot 1270B. In some other embodiments, it may be advantageous to allow for a drywall panel 40 that is to be placed on the wall frame in a position accessible by the second drywall robot 1270B, when the drywall panel 40 is oriented the same as the first drywall panel, to be placed onto the table 1262 by the first drywall robot 1270A, which then returns to remove a further drywall panel 40 from the stack of drywall panels 40, while the second drywall robot 1270B removes the drywall panel 40 from the table 1262 and places the drywall panel 40 in the position on the wall frame indicated by the instructions received by a controller, thus the first drywall robot 1270A can retrieve the further drywall panel 40 while the first drywall panel 40 is being positioned on the wall frame by the second drywall robot 1270B, increasing throughput of the drywall installation station 1200.

In some embodiments, position sensors may be used to ensure that each drywall panel 40 placed on the table 1262 for positional registration thereof is actually positionally registered and does not get "stuck" (e.g., by friction, fouling, or otherwise) on the table 1262 at a non-positionally registered position, in which the drywall panel 40 would not be able to be precisely positioned on the wall frame by either the first or the second drywall robots 1270A, 1270B. In order to mitigate this, a vibration device may be coupled to the table 1262 to induce vibrations that would tend to cause any frictional forces between the table 1262 and the drywall panel 40 attached thereto to be minimized and to promote the drywall panel 40 to slide along the table 1262 into the positionally registered position. In some embodiments, a warning or error message may be generated, in which case the lifter assembly/assemblies of either the first or the second drywall robots 1270A, 1270B could be used to physically drag the drywall panel 40 to the positionally registered position on the table 1262, an operator may be requested to investigate, move the drywall panel 40 on the table 1262, clean the frame of any contaminants that is causing the increased friction between the drywall panel 40 and the table 1262, as necessary, and reinitialize the process so that the drywall panel 40 can then be placed onto the wall frame with a sufficient degree of precision.

In an alternate embodiment, photo and/or video recognition techniques may be used to determine a position of a drywall panel, as and/or while being held by the first drywall robot 1270A, for example by moving the lifter assembly/assemblies of the first drywall robot 1270A to a predefined position relative to one or more visual landmarks (e.g., in front of a known visual pattern, such as a checkerboard pattern) to determine a position of the first drywall panel 40 relative to the one or more visual landmarks using an imaging device and/or imaging system comprising a plurality of imaging systems to have a three-dimensional view of the first drywall panel 40 relative to the one or more visual landmarks. With such a position of the first drywall panel 40 known, the first drywall robot 1270A can account for any misalignment of the first drywall panel 40 relative to the lifter assembly/assemblies when placing the first drywall panel 40 onto the wall frame, thereby ensuring that the first drywall panel 40 is placed on the wall frame in precisely the position indicated based on the instructions received at a controller, as communicated to the first drywall robot 1270A.

Similarly, when the second drywall panel 40 is being placed onto the wall frame, it is necessary to account for any positional inaccuracies of the second drywall panel 40 relative to the first drywall robot 1270A or the second drywall robot 1270B. As such, while the second drywall panel 40 may be placed onto the table 1262 for positional registration thereof, the second drywall panel 40 may instead, in another example embodiment, be moved by either the first drywall robot 1270A or the second drywall robot 1270B to a predefined position relative to one or more visual landmarks, as described elsewhere herein regarding positionally registering the first drywall panel, and, using image and/or video processing techniques, positionally registering the second drywall panel 40 relative to the lifter assembly/assemblies of whichever of the first or second drywall robots 1270A, 1270B is holding the second drywall panel 40 adjacent the one or more visual landmarks. With such a position of the second drywall panel 40 known, whichever of the first and second drywall robots 1270A, 1270B by which the second drywall panel 40 is held can account for any misalignment of the second drywall panel 40 relative to its lifter assembly/assemblies when placing the second drywall panel 40 onto the wall frame, thereby ensuring that the second drywall panel 40 is placed on the wall frame in precisely the position indicated based on the instructions received at a controller, as communicated to either of the first drywall robot 1270A or the second drywall robot 1270B.

In some embodiments, the drywall panels 40 are positioned over the wall frame such that the openings defined by the framing sub-assemblies are covered by a substantially continuous and/or uninterrupted layer of drywall panels 40, such that the openings defined by the framing sub-assemblies are obscured and/or occluded by the drywall panels 40 positioned thereover. In such embodiments, the portions of the drywall panels 40 covering the openings defined by the framing sub-assemblies may be removed, whether by an automated process (e.g., a robotic arm comprising a cutting implement, such as a serrated blade, router head, or other suitable cutting device) defined by a controlled based on the known positions of the framing sub-assemblies within the wall frame, either at the drywall installation station 1200 or at any other subsequent station of the system 100, or via a manual process (e.g., at an inspection/buffer station 470) by an operator. In some embodiments, a plurality of drywall panels 40 having different dimensions may be provided on respective drywall conveyors 1202 adjacent the first and/or second drywall robots 1270A, 1270B, and the drywall panels 40 of different sizes are arranged over the surface of the wall frame such that the openings defined by the positions of the framing sub-assemblies are not obstructed by the drywall panels 40 placed on, and attached to, the wall frame at the drywall installation station 1200. In some embodiments, it is advantageous for only the portions of the wall frame that will be exposed internal to the modular construction unit (e.g., not the top and bottom areas which will be abutted against and fastened to a floor or ceiling module via a balloon framing technique) to have drywall panels 40 arranged thereover, such that portions and/or regions of the wall frame that will be directly attached to another structural module of the modular construction unit, so as to not be visible within the assembled modular construction unit, will not be covered by any drywall panels 40.

The example embodiments recited herein regarding positionally registering the drywall panels 40 relative to the first and second drywall robots 1270A, 1270B are not exhaustive and other alternatives may be implemented without deviating from the scope of the subject matter disclosed herein.

As noted elsewhere herein, the frame transport 1210 of the drywall installation station 1200 may comprise a squaring station 600 to ensure that the corners of the wall frame being assembled are at a substantially right angle (e.g., ±5°, ±3°, ±2°, ±1°, ±0.5°, etc.) and are not "out of square" when the drywall panels 40 are being placed thereon. When the wall frame is engaged, and held in a stationary position, by the squaring station 600, the wall frame does not move relative to the frame transport 1210, the first drywall robot 1270A, the second drywall robot 1270B, and/or the positional registration jig 1260. To ensure that the wall frame does not shift "out of square" before each of the drywall panels 40 are sufficiently attached to the wall frame by a drywall fastening system, generally designated 1230, which will be described further hereinbelow, the wall frame remains engaged with the squaring station 600 until each of the drywall panels 40 has been attached to the wall frame by a sufficient number of fasteners applied by the drywall fastening system 1230.

The drywall fastening system 1230 comprises a frame 1232 that is attached to the frame transport 1210 so as to be movable along the frame transport 1210 along the longitudinal direction of extension of the frame transport 1210, which is the direction along which the wall frame is moved by the frame transport 1210. The frame transport 1210 is, in some embodiments, substantially similar to the wall frame conveyors 630, 710, 810, as well as any other structures (e.g., conveyors) provided in any of the subsystems and/or stations in system 100 described elsewhere herein. Similar features will not be described further hereinbelow, but are instead incorporated herein by reference.

The drywall fastening system 1230 comprises a plurality of fastening devices 1234 and filler applicators 1250, both of which are attached to the frame 1232. In some embodiments, the plurality of fastening devices 1234 are arranged as an array of fastening devices 1234 which can be coplanar and/or staggered, or offset, from each other by a predetermined amount based on a specified pattern. In some embodiments, the plurality of filler applicators 1250 are arranged as an array of filler applicators 1250 which can be coplanar and/or staggered, or offset, from each other by a predetermined amount based on a specified pattern. In some embodiments, it is advantageous for the arrangement (e.g., coplanar, offset, staggered, etc.) of the plurality of fastening devices 1234 to be substantially identical to the arrangement of the filler applicators 1250.

The fastening devices 1234 receive suitable fasteners, advantageously in a sequential manner (e.g., individually) from a centralized supply so that the fastening devices do not have to be reloaded individually, which could be accomplished manually or by an automated process. In the embodiment shown, the fastening devices 1234 are automated screw guns and the fasteners received by the fastening devices 1234 and used to attach the drywall panels 40 to the wall frame are screws of any suitable type. The screw guns comprise a screwdriver head 1238 that receives the fasteners via a supply tube 1236 connected between the centralized supply and the screwdriver head 1238. The centralized supply can be reloaded with suitable fasteners either manually or by an automated robot that receives a plurality of fasteners and loads these fasteners into the centralized supply. The fastening devices 1234 are laterally movable in the direction indicated by the arrow labeled 1234T, which is oriented in the direction transverse to the direction along which the wall frames are transported by the frame transport 1210. The fastening devices 1234 may be moved, relative to the frame 1232 and/or each other, along the direction 1234T in an automated manner by being driven along a track affixed to the frame 1232 or may be moved manually, for example, by an operator, to set a pitch between adjacent fasteners. The fastening devices 1234 may be spaced apart from each other to have a substantially uniform pitch, which may be determined based on applicable building codes defining a minimum allowed distance between adjacent fasteners to secure a drywall panel 40 to a wall frame for the modular construction unit being assembled.

Because the position of the openings defined by the framing sub-assemblies is known, it is advantageous for fasteners to not be applied by the fastening devices 1234 in positions within openings defined by the positions of the framing sub-assemblies within the wall frame, regardless of whether such openings are covered by one or more drywall panels 40. The drywall fastening system moves, relative to the frame transport 1210, in the direction indicated by the arrow labeled 1230T, stopping when the array of fastening devices is aligned in a plane over a wall stud or a framing sub-assembly. In embodiments where portions and/or regions of the wall frame that are to be directly attached to another structural module of the modular construction unit are not covered by drywall panels 40, the wall studs will remain visible. As such, a sensor (e.g., a proximity or other suitable sensor) can be attached to the frame 1232 in a same plane in which the array of fastening devices 1234 are arranged, the sensor being oriented to detect when the sensor is directly over a wall stud. In embodiments where the sensor is coplanar to the array of fastening devices, it may be advantageous to advance the frame 1232 in the direction 1230T by a distance corresponding to a half-width of the wall stud, so that the array of fastening devices 1234 is substantially centered over the wall stud detected by the sensor. In some embodiments, it may be advantageous to position the sensor so that it is offset by a preset distance from the plane in which the array of fastening devices 1234 is arranged, this preset distance corresponding to the width of the wall stud so that the array of fastening devices 1234 is substantially centered over the wall stud when the edge of the wall stud is detected by the sensor. In some embodiments, the drywall fastening system 1230 is positionally registered relative to the frame transport 1210 and moves therealong using a non-sliding interface (e.g., a geared rack-and-pinion interface with a rotary encoder to monitor movement thereof) to apply fasteners at positions corresponding to internal positions of the wall frame where wall studs and/or framing sub-assemblies are located based on positions thereof provided by instructions (e.g., an electronic wall definition file) from a controller. These arrangements of the sensor are mere examples and other embodiments are contemplated without deviating from the scope of the subject matter disclosed herein.

Referring now to the flowchart of FIG. 74, a fastener installation process for an using an array of fastening devices (see, e.g., 1234, FIGS. 63-66B) to secure a plurality of panel members (e.g., drywall panels 40) to an underlying framework (e.g., wall frame), such as is shown and described in the drywall installation system 1200, is shown. According to the method, the depth of the fastener (e.g., a helically threaded screw) into the panel member can be tightly and precisely controlled using a method, generally designated 2000, described hereinbelow, of attaching a plurality of drywall panels to an internal surface of a wall panel comprising a plurality of wall studs attached between opposing top and bottom plates, thereby ensuring that the fastener is precisely and accurately "seated" in panel members comprising any of a variety of materials, including, by way of example but not limitation, drywall, which can sometimes be referred to as "sheetrock," lumber, fire-treated lumber, laminated strand lumber (LSL), laminated veneer lumber (LVL), oriented strand board (OSB), plywood, chipboard, and the like. Although the description of the method herein makes reference to a single fastening device, it is to be understood that the method is applicable to a plurality and/or array of fastening devices acting in unison and/or in cooperation with one another.

In an initial step 2001, a drive controller, which can be a controller of the entire system 100, (see, e.g., FIG. 1) of a station, sub-component, and the like of the system 100, or even a dedicated controller for each of the fastening devices 1234, queries a fastening device 1234 to determine if the fastening device 1234 is initialized, ready to begin motion. This step can include, for example, determining that the fastening device 1234 is powered on and that the rotational portion thereof (e.g., the rotatable chuck connecting the screwdriver head 1238 to the fastening device 1234) is engaged. If the fastening device 1234 is not ready for motion, the fastening device 1234 is reset. If the fastening device 1234 is ready for motion, the method continues to step 2002, where another query is made to confirm that a fastener is present adjacent to the screwdriver head 1238 in a position to be engaged by the screwdriver head 1238. If a fastener is present in the fastening device 1234, the screwdriver head 1238 is then lowered at step 2003. The drive controller again confirms that the lowering step has been completed at step 2004. If the screwdriver head 1238 has not been lowered, the drive controller re-sends the lowering signal to the screwdriver head 1238. Step 2003 can be repeated until a predetermined number of attempts to lower the screwdriver head 1238 has been reached, in which case a warning or error message can be generated for diagnosis and/or remedial action, as needed, or until the screwdriver head 1238 is lowered. When the screwdriver head 1238 is successfully lowered, the fastening device 1234 begins to rotate the fastener at step 2005.

In addition to a drive controller, the automated fastening device 1234 includes a torque controller and a depth controller, both of which can communicate with the drive controller. The torque controller controls and measures the torque generated by the resistance of the fastener as it penetrates the wall material and any structure arranged thereunder, as well as performing additional functions such as limit-setting, time-based calculations, etc. The depth controller controls advancement of the screwdriver head 1238. In particular, the screwdriver head 1238 is lowered to a predetermined distance, known as a "depth zone," which is based on aspects, such as screw length and material thickness of the wall material and any underlying structures.

As the screwdriver head 1238 advances in the downward direction, as the fastener is progressively rotated and driven into the wall material and underlying wall materials, the torque controller records the torque produced by the action of threadably engaging (e.g., screwing) the fastener into the wall material and underlying structures at step 2006. At substantially the same time (e.g., substantially simultaneously), the depth controller monitors the screw depth and communicates when the screwdriver head 1238 reaches the "depth zone" at step 2007. When the fastener reaches the "depth zone," the torque controller compares an averaged measured torque value (e.g., measured over a predetermined time window) against a standard minimum torque value threshold for the threadable insertion of the fasteners into the wall material and/or the associated structures arranged thereunder at step 2008. The minimum torque value threshold is assigned based on strength parameters for a particular combination of fastener and the materials comprising the wall material and any associated structures arranged thereunder to which the wall material is to be attached by the fastener. If the averaged measured torque value does not meet the minimum torque value threshold, a fault is generated by/at the drive controller. If the averaged measured torque value meets the minimum torque value threshold, then a range of acceptable final torque values, referred to herein as a "torque window," is created. The "torque window" can be determined based on the average torque value measured at the time the screw reaches the "depth zone" at step 2009.

Next, the automated fastening device 1234 determines how much additional torque to apply to the fastener to achieve a target fastener depth beneath the outermost surface of the wall material. In step 2010, the torque controller continues measuring the torque at the fastening device 1234 and compares the torque value measured to the acceptable range within the "torque window." The screwdriver head 1238 will continue to rotate the fastener until one of several scenarios occurs. For example, in a first aspect of the method, the measured torque value remains within the "torque window." In this first aspect, the fastener application method is limited by a maximum time threshold at step 2011A. This can be accomplished, for example, by measuring the amount of time that the fastener has been in the "depth zone" and comparing this amount of time to a predetermined maximum time value.

Alternately, in a second aspect of the method, the measured torque value could be above or below the "torque window." In this second aspect, a slip monitor is used for determining whether an adequately robust mechanical connection exists between the fastener and the screwdriver head 1238 as another check on the quality of the fastener connection to the screwdriver head 1238 at step 2011B. If the slip monitor exceeds an expected value (e.g., in the case of stripping), a fault can be generated by/at the drive controller. Otherwise, according to a third aspect of the method, the screwdriver head 1238 will continue to turn until either a maximum number of revolutions are reached at step 2011C or until a predetermined time limit is met or exceeded. In each of the three aspects noted and described herein, the method 2000 concludes with stopping the screwdriver head 1238 at step 2012 and raising the screwdriver head 1238 at step 2013.

The plurality of filler applicators 1250 are attached to the frame 1232 and are provided with a filler material, e.g., a suitable curable mastic, each of the plurality of filler applicators 1250 dispensing the filler material into each of the holes formed by the fasteners that are applied to fill the surface of drywall panels 40 to obscure the holes made by the fasteners that are used to secure the drywall panels 40 to they wall frame. In some embodiments, the filler applicators are provided with a blade 1252 or other smoothing device that scrapes along the surface of the drywall panels 40 over the regions where the filler material is applied so that the surface of the drywall panels 40 is substantially flat where the fasteners are applied therethrough. The blade 1252 is movable along a track in the direction indicated by the arrow 1252T so be substantially aligned behind a corresponding one of the filler applicators 1250. The amount of filler material dispensed by each filler applicator 1250 may be precisely controlled based on the type and fastener that was applied, such that a different amount of filler material may be applied by the filler applicators 1250 based on the size of the hole formed by the fastener in the drywall panels 40. The filler applicators 1250 are, just as was described elsewhere herein regarding the fastening devices 1234, the description of which is incorporated herein, movable relative to the frame 1232 to change a position of each of the filler applicators, to control a pitch between each of the filler applicators 1250. In some embodiments, it is advantageous to have the filler applicators 1250 spaced apart from each other and/or arranged substantially identically to the pitch and/or arrangement (e.g., uniformly or non-uniformly spaced apart, coplanar, staggered, or offset) of the fastening devices 1234, so that each filler applicator 1250 is substantially aligned (e.g., relative to the directions 1234T, 1250T) with a corresponding one of the plurality of fastening devices 1234.

The drywall fastening system 1230 moves along the frame transport 1210 in the direction indicated by the arrow 1230T, applying fasteners to secure the drywall panels 40 at each of the wall studs and/or framing sub-assemblies, proceeding in the direction 1230T from one end of the wall frame to the other end of the wall frame until the drywall panels 40 are attached to each of the wall studs and/or framing sub-assemblies of the wall frame. In some embodiments, a layer of mastic material and/or paper tape can be applied over joints between adjacent drywall panels 40 and any excess mastic material can be removed to produce a substantially continuous and uninterrupted layer of drywall material, excepting, in some embodiments, the areas where portions of the drywall panels 40 covering some or all of the openings defined by the framing sub-assemblies have been removed. After this, the drywall fastening system 1230 returns to a registered position and the wall frame is transported along the frame transport 1210 out of the drywall installation station 1200 and to a second curing station 1300. At the second curing station 1300, an array of heating devices, for example, infrared heating lamps in the example embodiment shown, are arranged over the transport path of the wall frame. The heating devices provide heat, for example, radiative or conductive heat, to the upper exposed surface of the drywall panels 40, substantially curing the mastic material applied over and/or in the drywall panels 40.

After the mastic material is cured at the second curing station 1300, a wall covering material is applied at the wall covering station, generally designated 1350. Here, a roll of durable wall covering material, comprising, for example, a fiberglass impregnated fabric, is applied, either via automation or manually, over the outer surface of the drywall panels 40. At the wall covering station 1350, an adhesive (e.g., a glue) is applied to the bottom surface of the wall covering material and/or to the drywall itself and the wall covering material is dispensed from a wall covering material magazine, generally designated 1370, and applied over the surface of the drywall panels 40 to provide enhanced protection to the walls and also to aid in prevention of stress crack formation at the drywall joints. In the embodiment shown, the wall covering material is applied vertically over the wall frame (e.g., in the transverse direction between the top and bottom plates, aligned with the direction of extension of the wall studs between the top and bottom plates) with a roller or other suitable applicator. The roller is configured to ensure that no air pockets are present between the drywall surface and the wall covering material. A cutting device is provided to cut the wall covering material to a length corresponding to the width of the drywall material in the vertical direction, either before or after the wall covering material is applied to the drywall panels 40 and/or before the roller is used to apply the wall covering material over the drywall material. However, in some embodiments, the wall covering material may be applied over the drywall panels 40 in a horizontal direction, substantially orthogonal to the vertical direction described herein. The wall covering roll loading magazine 1370 can be fed manually by an operator or in an automated fashion (e.g., by a robotic loading system).

Adjacent pieces of the wall covering material are applied over the drywall panels 40 so as to overlap each other by a prescribed amount. FIG. 68 shows a wall covering cutter, generally designated 1390. The wall covering cutter 1390 comprises a cutting head 1394 which is movably attached to a track 1392. Track 1392 extends in a direction transverse (e.g., substantially perpendicular) to the direction along which the wall frame is transported by frame transport 1310. The frame transport 1310 is, in some embodiments, substantially similar to the wall frame conveyors 630, 710, 810, 1210, as well as any other structures (e.g., conveyors) provided in any of the subsystems and/or stations in system 100 described elsewhere herein. Similar features will not be described further hereinbelow, but are instead incorporated herein by reference. In the embodiment shown, track 1392 is fixed relative to the frame transport 1310, but track 1392 can be movable relative to the frame transport 1310 (e.g., in the direction along which the wall frame is transported by frame transport 1310). Cutting head is positioned at a height to contact and cut through both layers of the wall covering material in the overlap region thereof and moves along the track 1392 to make the cut or incision through both overlapping sheets of the wall covering in the overlap region. For purposes of the disclosure herein, reference will be made hereinafter to a first sheet of wall covering material, which overlaps an adjacent second sheet of the wall covering material by a predetermined amount, this predetermined amount corresponding to, and defining, the overlap region between the first and second sheets of wall covering material. After the cut or incision has been made through the first and second sheets of the wall covering material along the length of the overlap region, the cutting head 1394 moves back to the home position along the track 1392 and the severed portion (e.g., a strip) of the first sheet of the wall covering material formed by the cut or incision along the length of the overlap region is removed (e.g., by suction, mechanical lifters, grabbers, and/or the like). Thereafter, the edge of the first sheet within and/or adjacent the overlap region is lifted (e.g., by suction, mechanical lifters, grabbers, and/or the like), the severed portion (e.g., strip) of the second sheet of the wall covering material is removed from underneath the first sheet of wall covering material within the overlap region, and the edge of the first sheet of the wall covering material is pressed back down (e.g., by the same or a different roller) to securely press the first sheet against the drywall panel(s), thereby producing a substantially flat joint for the wall covering material, such that the wall covering material is a single layer, without overlapping regions, across the entirety of the drywall panels 40 of the wall frame, such that the joints between adjacent (e.g., first and second) sheets of the wall covering material are imperceptible to a human eye from a distance greater than a few feet away (e.g., about 1 ft., 2 ft., 3 ft., 5 ft., etc.). After the wall covering material is applied to cover the drywall panels 40, the wall frame is transferred to a third curing station 1300. In some embodiments, the wall frame can span across two or more of the second curing station 1300, the wall covering station 1350, and the third curing station 1300, such that the wall frame may be positioned to have a first portion thereof within the second curing station 1300, in which the filler material is being cured, a second portion thereof in the wall covering station 1350 having the wall covering material applied thereover, and a third portion thereof in the third curing station 1300, in which the adhesive applied to the drywall panels 40 and/or the wall covering material is cured to permanently bond the wall covering material to the drywall panels 40. In some embodiments, quality assurance (QA) imaging devices, such as, for example, cameras, may be provided to collect images and/or videos which are used to collect and compare installation performance against a QA standard.

After and/or as the wall covering material is bonded to the surface of the drywall panels 40 of the wall frame, the wall frame is transported to the flip table station, generally designated 1400, at which the wall frame is rotated by between 60° and 180°, so that the side of the wall frame having the sheathing panels attached thereto will be facing up. A plurality of flip robots, generally designated 1440, may be provided at the flip table station 1400, preferably on opposite sides of the flip table, generally designated 1420. The flip robots 1440 may be of any suitable automated type of robotic system or device capable of lifting, moving, grasping, manipulating, etc. the wall frame with sheathing panels on one face thereof and drywall panels 40 on another face thereof, in coordination with the flip table 1420. In the example embodiment shown, the flip robots 1440 are 6-axis articulated robotic arms that are substantially similar to the gripper robots 240 of the framing sub-assembly station 200. The flip table 1420 is mobile, much like flip tables 910, 920, along tracks 1410, such that the wall frame is, after having been flipped by the flip table 1420 and/or the flip robots 1440, aligned with and transported to the lag bolt installation station 1450.

At the lag bolt installation station 1450, the wall is transported underneath a plurality of lag bolt robots, generally designated 1480, which are supported by a frame 1470 vertically over a frame transport, generally designated 1460. The frame transport 1460 is, in some embodiments, substantially similar to the wall frame conveyors 630, 710, 810, 1210, 1310, as well as any other structures (e.g., conveyors) provided in any of the subsystems and/or stations in system 100 described elsewhere herein. Similar features will not be described further hereinbelow, but are instead incorporated herein by reference. The lag bolt robots 1480 can be any suitable type of robotic system or device capable of installing, at least to a partial thread depth, fasteners (e.g., helically threaded lag bolts) within the through-holes formed in some or all of the wall studs at the pre-drilling station 700 of system 100. In the example embodiment shown, the lag bolt robots 1440 are 6-axis articulated robotic arms that are substantially similar to the fastener robots 220 of the framing sub-assembly station 200, however a rotatable driver (e.g., a hexagonal driver head or other suitable driver head) is provided to engage with, and threadably insert a lag bolt within each of the through-holes. Just as the frame transport 1460 is laterally expandable to accommodate wall frames of varying dimensions the frame 1470 has a track installed thereon with which the lag bolt robots are movably engaged to move in the direction indicated by the arrow 1480T. Based on the depth of the through-holes and the thread pitch of the lag bolts, the lag bolt robots monitor a number of rotations and/or a vertical displacement of the rotatable driver to ensure that each lag bolt is threadably inserted within each through-hole by a substantially identical predetermined distance, which is advantageously less than or equal to the depth of each through-hole in the wall stud in which the lag bolt is being threadably inserted. In some embodiments, the lag bolt robots 1480 may be replaced with human operators to threadably engage the lag bolts at least partially within the through-holes. As such, the lag bolts will be captive within, and transported along with, the finished wall section to the storage magazine station 1600. While the term lag bolt is used herein, any suitable fastener that can be used to secure the wall frame to another modular component (e.g., a floor or ceiling) of a modular construction unit being assembled can be installed at the lag bolt installation station 1450.

Also shown in FIG. 70 is a lag bolt loading and transport system, generally designated 1500. In the lag bolt loading and transport system 1500, a supply conveyor 1540 is provided, onto which a plurality of lag bolts (e.g., in bulk packaging) are loaded and transported to a loading robot, generally designated 1510. The loading robot can be any suitable type of robotic system or device capable of transporting the plurality of lag bolts from the supply conveyor and unloading the lag bolts into a feeder, generally designated 1530. In the embodiment shown, the loading robot 1510 is a 6-axis articulated robotic arms that are substantially similar to the insulation unloading robot 1134 of the insulation loading area 1100. In some such embodiments where the lag bolts are loaded onto the supply conveyor 1540 without any packaging, the loading robot 1510 may comprise an electromagnet at a distal end thereof, which is configured to magnetically attract a plurality of lag bolts from the supply conveyor, transport them over the feeder 1530, and, once over and/or in the feeder 1530, deactivate the electromagnet to release the lag bolts into the feeder 1530. In some embodiments, the feeder comprises a vibratory bowl that singulates the lag bolts, which are then fed, via one or more supply tubes, to the lag bolt robots 1480 in the orientation so as to be driven into the through-holes by the rotatable driver(s) of the lag bolt robots 1480.

After the lag bolts are installed in each of the wall studs having through-holes formed therein, the wall frame is transported in the horizontal configuration shown to the storage magazine, generally designated 1600, by a frame transport, generally designated 1610. The frame transport 1610 is, in some embodiments, substantially similar to the wall frame conveyors 630, 710, 810, 1210, 1310, 1460, as well as any other structures (e.g., conveyors) provided in any of the subsystems and/or stations in system 100 described elsewhere herein. Similar features will not be described further hereinbelow, but are instead incorporated herein by reference. The fully assembled wall frame is transported in the direction of the arrow to a position adjacent to a storage robot, generally designated 1620. The storage robot 1620 engages with the wall frame in the horizontal transport position, in which the wall frame is against the frame transport 1610. The storage robot 1620 comprises a lifter frame, generally designated 1630, that is configured to engage and/or clamp around the edges of the wall frame for transporting the wall frame from the transport frame 1610 onto a magazine trolley, generally designated 1640. The position of the storage robot 1620, the lifter frame 1630, and the wall frame in the horizontal position is shown in solid line, while the position of the storage robot 1620, the lifter frame 1630, and the wall frame in the vertical position is shown in broken line for clarity.

The storage magazine, generally designated 1602, comprises a plurality of vertically-oriented storage slots, generally designated 1650, the widths of which are wide enough to accommodate an assembled wall frame therein. The storage magazine 1602 comprises a plurality of vertically-oriented frames 1654 and a plurality of rollers 1652 along a bottom surface of the storage magazine 1602, the rollers 1652 being for supporting the assembled wall frames that are inserted from the magazine trolley 1640 into one of the storage slots 1650 and allowing the assembled wall frame to roll within the storage slots 1650. The magazine trolley 1640 moves in the direction indicated by arrow 1640T to align the assembled wall frame on the magazine trolley 1640 with one of the magazine slots 1650. The magazine trolley 1640 comprises a plurality of rollers, which can be any combination of driven rollers and idler rollers, including all driven rollers. Once the assembled wall frame is transferred onto the magazine trolley 1640 by the storage robot 1630, the lifter frame 1630 is disengaged from the assembled wall frame and the storage robot 1620 returns to a position over the frame transport 1610 in which a next assembled wall frame transported to the storage magazine station 1600 can be engaged and lifted by the lifter frame 1630.

Once the assembled wall frame on the magazine trolley 1640 is aligned with a designated one of the plurality of storage slots 1650, the driven rollers of the magazine trolley 1640 are activated to transfer the assembled wall frame into the designated one of the storage slots 1650. Once the assembled wall frame is fully transferred from the magazine trolley 1640 into a designated one of the storage slots 1650, the magazine trolley moves in the direction 1640T to a position adjacent the storage robot 1620 where a next assembled wall frame will be transferred from the frame transport 1610 onto the magazine trolley 1640 by the storage robot 1620 and the process of aligning the magazine trolley 1640 with a designated one of the storage slots 1650 and transferring the assembled wall frame into the designated one of the storage slots 1650 is repeated. The position in which each of the assembled wall frames are loaded into the storage magazine 1602 is tracked by a controller (e.g., in a database) and, based on which modular construction units are being assembled, the controller indicates in which storage slot 1650 a needed wall frame is located, such that it can be removed from the storage slot 1650 (e.g., by an overhead crane) and transported to a final assembly area where the assembled wall frame is assembled with other components of the modular construction unit.

While the subject matter has been described herein with reference to specific aspects, features, and illustrative embodiments, it will be appreciated that the utility of the subject matter is not thus limited, but rather extends to and encompasses numerous other variations, modifications and alternative embodiments, as will suggest themselves to those of ordinary skill in the field of the present subject matter, based on the disclosure herein.

Various combinations and sub-combinations of the structures and features described herein are contemplated and will be apparent to a skilled person having knowledge of this disclosure. Any of the various features and elements as disclosed herein can be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims.

The methods and systems disclosed herein can be combined in any combination and/or sub-combination, adding elements from other systems and/or sub-systems or steps from other methods and/or sub-methods, as the case may be, and/or omitting elements from other systems and/or subsystems or steps from other methods and/or sub-methods without limitation. Nothing disclosed herein shall be interpreted as limiting in any way the combinations in which the features, structures, steps, etc. may be organized, described, and/or claimed in this or any related applications.

What is claimed is:

1. A system for assembling a wall structure for a modular construction unit, the system comprising:

a framing sub-assembly station configured to form one or more framing sub-assemblies, each of which define one or more openings through the wall structure after the wall structure is assembled;

a wall stud station configured to form and provide a plurality of wall studs for forming a wall frame of the wall structure;

a main framing assembly station configured to form the wall frame of the wall structure by attaching each of the wall studs between top and bottom plates that define top and bottom edges of the wall structure, wherein the one or more framing sub-assemblies are installed within the wall frame of the wall structure according to a set of assembly instructions in a controller for the wall structure being assembled;

a sheathing system configured to position a plurality of sheathing panels over an outer surface of the wall frame of the wall structure, wherein the plurality of sheathing panels are placed over the wall frame of the wall structure in a predetermined pattern specified in the set of assembly instructions, and wherein the sheathing system is configured to apply a plurality of first fasteners to at least temporarily secure each of the plurality of sheathing panels onto the outer surface of the wall frame of the wall structure;

a sheathing fastening station configured to apply a plurality of second fasteners at a plurality of predetermined positions to secure the plurality of sheathing panels over the outer surface of the wall frame of the wall structure, wherein the plurality of predetermined positions correspond to locations of the plurality of wall studs and/or the one or more framing sub-assemblies within the wall frame, wherein none of the plurality of second fasteners is installed in a position within cavities defined by the one or more framing sub-assemblies or an area between studs of the wall structure;

a pre-drilling station configured to form one or more through-holes in designated positions of one or more of the wall studs of the wall frame of the wall structure, the one or more through-holes being configured for a third fastener to be at least partially threadably engaged therein for connection of the wall structure to a floor or ceiling structure;

a sawing/routing station comprising a plurality of cutting devices configured to form openings through one or more of the sheathing panels at positions corresponding to the openings defined by the one or more framing sub-assemblies, wherein locations of each of the cavities is stored within the set of assembly instructions;

a utility installation system configured to allow installation of at least one of a plurality of utilities within the wall structure, the plurality of utilities comprising plumbing and/or electrical facilities;

at least one flip table station at which the wall frame is rotated from a first horizontal position, in which the sheathing panels are facing up, in a direction away from a transport frame supporting and/or transporting the wall frame, to a vertical position, in which the wall frame is in a substantially similar orientation to a position in which the wall structure will be in when assembled as part of the modular construction unit, and to a second horizontal position, in which the sheathing panels are facing down, in a direction towards the transport frame supporting and/or transporting the wall frame, the first and second horizontal positions being rotated by approximately 180° relative to each other;

an insulation installation system configured to apply an insulation material within one or more of the cavities defined between adjacent wall studs of the wall frame;

a drywall installation station configured to arrange and attach a plurality of drywall panels over an opposite surface of the wall frame from the outer surface on which the sheathing panels are attached, wherein the plurality of drywall panels are arranged over the wall frame of the wall structure in a predetermined pattern specified in the set of assembly instructions, and wherein the drywall installation station is configured to apply a plurality of drywall fasteners to secure each of the plurality of drywall panels onto the opposite surface; and a wall covering station configured to adhesively apply a plurality of wall covering strips from a roll of wall covering material in a substantially continuous single layer without adjacent wall covering strips overlapping each other.

2. The system of claim 1, further comprising a lumber saw station which receives dimensional lumber from a lumber yard and transport station, cuts the dimensional lumber to a specified length, and outputs cut lumber in a form for use as one of the top and bottom plates or as a member of a framing sub-assembly.

3. The system of claim 2, further comprising a distribution robot configured to, based on a length of the cut lumber output from the lumber saw station, pick up and deposit the cut lumber onto one of a plurality of shelves on a cut lumber storage rack or to divert the cut lumber onto a plate trolley configured to transport the cut lumber having a length specified for one of the top and bottom plates of the wall frame onto a plate conveyor.

4. The system of claim 3, wherein the plate conveyor is configured to transport lumber for one of the top and bottom plates of the wall structure to the main framing assembly station.

5. The system of claim 3, wherein the framing sub-assembly station comprises:

a table on which one or more of the one or more framing sub-assemblies of the wall frame are assembled;

at least one gripper robot configured to retrieve the cut lumber from the cut lumber storage rack and position the cut lumber onto the table in a position to form a specified framing sub-assembly, and at least one fastener robot configured to apply fasteners to attach a plurality of pieces of cut lumber on the framing sub-assembly together in a form of the specified framing sub-assembly.

6. The system of claim 5, comprising a framing sub-assembly storage rack configured to receive and dispense a plurality of differently shaped and/or sized framing sub-assemblies assembled at the framing sub-assembly station to the main framing assembly station.

7. The system of claim 1, wherein the wall stud station comprises a cascade stager configured to hold a plurality of wall studs in respective different positions, wherein the wall studs are pieces of dimensional lumber retrieved from a lumber yard adjacent the cascade stager by a wall stud robot.

8. The system of claim 7, wherein the wall stud station comprises one or more first cutting devices configured to create holes in one or more of the pieces of dimensional lumber while on the cascade stager.

9. The system of claim 8, wherein the one or more first cutting devices is movable along a frame of the cascade stager in a direction of a length of the wall studs on the cascade stager for forming the through-holes at a plurality of positions along the length of the wall studs.

10. The system of claim 7, wherein the cascade stager is configured to transfer a finished wall stud from a final, or bottom, position on the cascade stager to a delivery trough configured to transport the finished wall stud to the main framing assembly station and raise the finished wall stud into an installation position between, and substantially coplanar with, the top and bottom plates at the main framing assembly station.

11. The system of claim 7, comprising at least one second cutting device configured to cut one or more of the plurality of wall studs on the cascade stager to a designated length according to a height of the wall frame, as measured in an orientation in which the wall frame is assembled as part of the modular construction unit.

12. The system of claim 7, comprising a wall stud robot configured to analyze lumber and load the lumber into the cascade stager when the dimensional lumber is determined to satisfy at least one of a plurality of lumber quality parameters.

13. The system of claim 12, wherein the wall stud robot comprises a suction head comprising one or more lifter assemblies having a distance measuring device, a stud presence detector, at least one vacuum meter, and at least one pressure gauge.

14. The system of claim 12, wherein the wall stud robot is configured to apply a lifting force against one or more of the pieces of dimensional lumber adjacent the cascade stager by generating a vacuum to lift one or more of the pieces of dimensional lumber at a same time for loading into the cascade stager.

15. The system of claim 12, wherein the wall stud station comprises a stud dimensional analysis system, which is configured to analyze the lumber to measure one or more of the plurality of lumber quality parameters.

16. The system of claim 10, wherein the main framing assembly station comprises top and bottom plate conveyors configured to receive a top or bottom plate, respectively, from a plate robot and transport the top and bottom plates, respectively, in a direction of a length of the top and bottom plates to be arranged on opposite sides of the delivery trough.

17. The system of claim 16, wherein the main framing assembly station is configured to receive finished wall studs from the wall stud station via the delivery trough and attach the finished wall studs at predetermined intervals between the top and bottom plates to form the wall frame.

18. The system of claim 17, wherein the main framing assembly station is configured to position at least one of the one or more framing sub-assemblies at a designated position, such that the at least one of the one or more framing sub-assemblies is arranged horizontally between adjacent wall studs and vertically at the designated position between the top and bottom plates.

19. The system of claim 1, comprising a lag bolt installation station comprising at least one articulating robotic arm with a fastener driver configured to insert one or more lag bolts into one of the one or more through-holes and rotationally engage each of the one or more lag bolts within a corresponding one of the one or more through-holes.

20. The system of claim 19, wherein the lag bolt installation station comprises a feeder which is connected to the robotic arm and is configured to dispense the one or more lag bolts sequentially to the fastener driver for threadable insertion within a designated one of the one or more through-holes of the wall studs of the wall frame.

21. The system of claim 19, wherein the fastener driver is extendable in a direction substantially aligned with a longitudinal axis of the one or more through-holes.

22. The system of claim 1, wherein one or more of the main framing assembly station, the sheathing system, the sheathing fastening station, the pre-drilling station, the sawing/routing station, the insulation installation system, and the drywall installation station comprise a respective frame transport, which comprises a conveyor configured to transport the wall frame between adjacent stations on a plurality of tracks, the tracks being laterally expandable to support wall frames of different heights, as measured in the direction substantially transverse between the top and bottom plates.

23. The system of claim 1, wherein the pre-drilling station comprises, adjacent to at least two tracks of a frame transport on which the wall frame is movable through the pre-drilling station, a stopper system comprising at least a first post and a second post that are vertically actuatable, wherein the first post is configured to stop a movement of the wall frame such that the one or more through-holes may be formed through a wall stud in contact with the first post, wherein the second post is spaced apart from the first post, in a direction of movement of the wall frame along the frame transport, by a width of the wall stud, and wherein the second post is vertically actuated, when a double wall stud configuration is detected, to stop a movement of the wall frame such that the one or more through-holes may be formed through a trailing wall stud of the double wall stud configuration.

24. The system of claim 1, wherein one or more of the main framing assembly station, the sheathing system, the sheathing fastening station, the sawing/routing station, and the drywall installation station comprise a squaring station configured to ensure that the wall frame is substantially square at each such station.

25. The system of claim 1, wherein the drywall installation station comprises a sensor configured to detect a position of each stud in the wall frame such that the plurality of drywall fasteners are inserted through the drywall panels and into the wall studs.

26. The system of claim 1, wherein the drywall installation station comprises a plurality of filler applicators configured to dispense a filler material into holes formed by the plurality of drywall fasteners being driven into and/or partially through the drywall panels.

27. The system of claim 1, wherein the drywall installation station comprises a plurality of drywall tape applicators configured to apply a mastic and a drywall tape over joints between adjacent drywall panels.

28. The system of claim 1, wherein the insulation installation system comprises an insulation head configured to extend over and/or at least partially within the cavities between adjacent wall studs to pack the insulation material within the cavities at a specified density.

29. The system of claim 28, wherein the insulation installation system comprises a segmented partition connected to a frame of the insulation head, the segmented partition being configured to retain the insulation material within the cavity into which the insulation material is being installed.

30. The system of claim 28, wherein the insulation installation system is configured to install a cellulose insulation by blowing the cellulose insulation into each of the cavities between adjacent wall studs.

31. A method of assembling a wall structure for a modular construction unit, the method comprising: cutting, at a lumber saw, dimensional lumber to form a top plate and/or a bottom plate of the wall structure;

- transporting, using a plate conveyor, the top plate and/or the bottom plate of the wall structure to a main framing assembly station;
- cutting, at the lumber saw, dimensional lumber to form pieces of cut lumber for assembly into one or more framing sub-assemblies;
- forming, at a framing sub-assembly station, one or more framing sub-assemblies that define one or more openings through the wall structure after the wall structure is assembled;
- forming, at a wall stud station, a plurality of wall studs for assembly as a wall frame of the wall structure;
- transporting the wall studs to the main framing assembly station, where the wall studs are positioned between, and attached to, the top plate and/or the bottom plate;
- inserting, at the main framing assembly station, the one or more framing sub-assemblies within the wall frame of the wall structure according to a set of assembly instructions for the wall structure being assembled;
- arranging, at a sheathing station, a plurality of sheathing panels over at least a portion of an outer surface of the wall frame of the wall structure, wherein the plurality of sheathing panels are arranged over the wall frame of the wall structure in a predetermined pattern specified in a set of assembly instructions provided to a controller;

applying, at a sheathing fastening station, a plurality of first fasteners to at least partially secure each of the plurality of sheathing panels onto the wall frame of the wall structure;

applying, at a sheathing fastening station, a plurality of second fasteners at a plurality of predetermined positions to secure the plurality of sheathing panels onto the wall frame of the wall structure, wherein the plurality of predetermined positions correspond to locations of the wall studs and/or the one or more framing sub-assemblies over which the plurality of sheathing panels are arranged, and wherein none of the plurality of second fasteners is installed in a position within openings defined by the one or more framing sub-assemblies or within cavities between adjacent studs of the wall structure;

drilling, at a pre-drilling station, one or more through-holes in designated positions of one or more of the wall studs of the wall frame of the wall structure, the one or more through-holes being configured for a third fastener to be at least partially threadably engaged therein for connection of the wall structure to a floor or ceiling structure;

cutting, using one or more cutting devices of a sawing/routing station, slots within the sheathing panels to form openings through one or more of the sheathing panels at positions corresponding to the openings defined by the framing sub-assemblies, wherein locations of each of the cavities is stored within the set of assembly instructions;

installing, at a utility installation system, at least one of a plurality of utilities within the wall frame, the plurality of utilities comprising plumbing and/or electrical utilities;

flipping, at one or more flip table stations, the wall frame such that the outer surface of the wall frame on which the sheathing panels are attached is rotated by approximately 180° to be adjacent to tracks of a frame transport on which the wall frame is transported to an insulation installation station;

applying, at the insulation installation station, an insulation material within one or more of the cavities defined between adjacent wall studs of the wall frame;

arranging, at a drywall installation station, a plurality of drywall panels over an opposite surface of the wall frame from the outer surface of the wall frame on which the sheathing panels are attached, wherein the plurality of drywall panels are placed over the wall frame of the wall structure in a predetermined pattern specified in the set of assembly instructions;

applying a plurality of fasteners to secure each of the plurality of drywall panels onto the opposite surface; and adhesively applying, at a wall covering station, a plurality of wall covering strips from a roll of wall covering material in a substantially continuous single layer without adjacent wall covering strips overlapping each other.

32. The method of claim 31, comprising: receiving, at a lumber saw station, dimensional lumber from a lumber yard and transport station;

cutting, using a lumber saw of the lumber saw station, the dimensional lumber to a specified length; and outputting cut lumber from the lumber saw in a form for use as one of the top plate and/or the bottom plate or as a member of a framing sub-assembly.

33. The method of claim 32, comprising, using a distribution robot and based on a length of the cut lumber output from the lumber saw: picking up and depositing the cut lumber onto one of a plurality of shelves on a cut lumber storage rack, or diverting the cut lumber onto a plate trolley configured to transport the cut lumber having a length specified for one of the top plate and/or the bottom plate of the wall frame onto a plate conveyor.

34. The method of claim 32, comprising transporting lumber for one of the top plate and/or the bottom plate of the wall structure to the main framing assembly station.

35. The method of claim 33, comprising:

retrieving, using at least one gripper robot of the framing sub-assembly station, the cut lumber from the cut lumber storage rack and positioning the cut lumber onto a table of the framing sub-assembly station in a position to form a specified framing sub-assembly;

applying, using at least one fastener robot of the framing sub-assembly station, fasteners to attach a plurality of pieces of cut lumber on the framing sub-assembly together in a form of the specified framing sub-assembly;

assembling the one or more framing sub-assemblies on the table of the framing sub-assembly station;

and transporting, using a first framing sub-assembly elevator, each of the one or more framing sub-assemblies to a framing sub-assembly storage rack.

36. The method of claim 35, comprising: receiving, at the first framing sub-assembly elevator, a plurality of different framing sub-assemblies from the framing sub-assembly station;

storing each different framing sub-assembly on a different shelf of the framing sub-assembly storage rack; and dispensing, using a second framing sub-assembly elevator, the framing sub-assemblies from the framing sub-assembly storage rack for assembly into a wall frame of a wall structure in the main framing assembly station.

37. The method of claim 31, comprising holding, using a cascade stager of the wall stud station, a plurality of wall studs in respective different positions, wherein the wall studs are pieces of dimensional lumber retrieved from a lumber yard adjacent the cascade stager by a wall stud robot.

38. The method of claim 37, comprising forming, using one or more first cutting devices of the wall stud station, holes in one or more of the pieces of dimensional lumber while on the cascade stager.

39. The method of claim 37, comprising:

transferring a finished wall stud from a final, or bottom, position on the cascade stager to a delivery trough that transports the finished wall stud to the main framing assembly station; and raising, via a portion of the delivery trough within the main framing assembly station, the finished wall stud into an installation position between, and substantially coplanar with, the top plate and the bottom plate at the main framing assembly station.

40. The method of claim 37, comprising cutting, using at least one second cutting device, one or more of the plurality of wall studs on the cascade stager to a designated length according to a height of the wall frame, as measured in an orientation in which the wall frame is assembled as part of the modular construction unit.

41. The method of claim 39, wherein the main framing assembly station comprises top and bottom plate conveyors configured to receive a top or bottom plate, respectively, from a plate robot and transport the top plate and/or the bottom plate, respectively, in a direction of a length of the top plate and/or the bottom plate to be arranged on opposite sides of the delivery trough.

42. The method of claim 41, comprising receiving, at the main framing assembly station, finished wall studs from a wall stud station and attaching the finished wall studs at predetermined intervals between the top plate and/or the bottom plate to form the wall frame.

43. The method of claim 42, comprising positioning, at the main framing assembly station, at least one framing sub-assembly at a designated position, such that the at least one framing sub-assembly is arranged horizontally between adjacent wall studs and vertically at the designated position between the top plate and the bottom plate.

44. The method of claim 37, comprising, using a stud robot of the wall stud station, analyzing and loading the dimensional lumber adjacent the cascade stager into the cascade stager when the dimensional lumber is determined to satisfy at least one of a plurality of lumber quality parameters.

45. The method of claim 44, wherein the stud robot comprises a lifter having a distance measuring device, a stud presence detector, at least one vacuum meter, and at least one pressure gauge.

46. The method of claim 44, comprising applying, using the stud robot, a lifting force against one or more of the pieces of dimensional lumber adjacent the cascade stager by generating a vacuum to lift one or more of the pieces of dimensional lumber at a same time and loading the pieces of dimensional lumber into the cascade stager.

47. The method of claim 44, comprising, using a stud dimensional analysis system, analyzing the dimensional lumber lifted by the stud robot to measure one or more of the plurality of lumber quality parameters.

48. The method of claim 31, comprising inserting, using at least one robotic arm with a fastener driver of a lag bolt installation station, and rotatably engaging one of a plurality of lag bolts into a corresponding one of the one or more through-holes.

49. The method of claim 48, comprising dispensing, from a feeder of the lag bolt installation station that is connected to the at least one robotic arm, the plurality of lag bolts sequentially to the fastener driver for threadable insertion within a designated one of the one or more through-holes of the wall studs of the wall frame.

50. The method of claim 49, wherein the fastener driver is extendable in a direction substantially aligned with a longitudinal axis of the one or more through-holes.

51. The method of claim 31, wherein one or more of the main framing assembly station, the sheathing station, the sheathing fastening station, the pre-drilling station, the sawing/routing station, the insulation installation station, and the drywall installation station comprise a respective frame transport, which comprises a conveyor that transports the wall frame between adjacent stations on a plurality of tracks, the tracks being laterally expandable to support wall frames of different heights, as measured in a direction substantially transverse between the top plate and the bottom plate.

52. The method of claim 31, wherein the pre-drilling station comprises, adjacent to at least two tracks of a frame transport on which the wall frame is movable through the pre-drilling station, a stopper system comprising at least a first post and a second post that are vertically actuatable, wherein the first post is configured to stop a movement of the wall frame such that the one or more through-holes may be formed through a wall stud in contact with the first post, wherein the second post is spaced apart from the first post, in a direction of movement of the wall frame along the frame transport, by a width of the wall stud, and wherein the second post is vertically actuated, when a double wall stud configuration is detected, to stop a movement of the wall frame such that the one or more through-holes may be formed through a trailing wall stud of the double wall stud configuration.

53. The method of claim 31, wherein one or more of the main framing assembly station, the sheathing station, the sheathing fastening station, the sawing/routing station, and the drywall installation station comprise a squaring station that engages with the wall frame to ensure that the wall frame is substantially square at each such station.

54. The method of claim 31, wherein the drywall installation station comprises a sensor that detects a position of each stud in the wall frame such that the fasteners are inserted through the drywall panels and into the wall studs.

55. The method of claim 31, wherein the drywall installation station comprises a plurality of filler applicators that dispense a filler material into holes formed by the fasteners being driven into and/or partially through the drywall panels.

56. The method of claim 31, wherein the drywall installation station comprises a plurality of drywall tape applicators that apply a mastic and a drywall tape over joints between adjacent drywall panels.

57. The method of claim 31, wherein the insulation installation station comprises an insulation head that extends over and/or at least partially within one of the cavities between adjacent wall studs to pack the insulation material within the cavities at a specified density.

58. The method of claim 57, wherein the insulation installation station comprises a segmented partition connected to a frame of the insulation head, the segmented partition being provided to retain the insulation material within the cavities into which the insulation material is being installed.

59. The method of claim 57, wherein the insulation installation station blows a cellulose insulation material into each of the cavities between adjacent wall studs.

* * * * *